United States Patent
Moffat et al.

(10) Patent No.: US 10,723,415 B2
(45) Date of Patent: Jul. 28, 2020

(54) MOORING SYSTEM FOR DRIFTING ENERGY CONVERTERS

(71) Applicant: Mangrove Deep LLC, Moorpark, CA (US)

(72) Inventors: Brian Lee Moffat, Simi Valley, CA (US); Garth Alexander Sheldon-Coulson, Moorpark, CA (US)

(*) Notice: Subject to any disclaimer, the term of this patent is extended or adjusted under 35 U.S.C. 154(b) by 78 days.

(21) Appl. No.: 15/666,521

(22) Filed: Aug. 1, 2017

(65) Prior Publication Data

US 2018/0050764 A1 Feb. 22, 2018

Related U.S. Application Data

(60) Provisional application No. 62/454,926, filed on Feb. 6, 2017, provisional application No. 62/370,401, filed on Aug. 3, 2016.

(51) Int. Cl.

| B63B 21/50 | (2006.01) |
| F03B 13/20 | (2006.01) |
| F03D 9/25 | (2016.01) |
| F03D 13/25 | (2016.01) |
| B63B 35/44 | (2006.01) |
| F03B 13/18 | (2006.01) |
| B63B 21/00 | (2006.01) |

(Continued)

(52) U.S. Cl.
CPC ............ *B63B 21/50* (2013.01); *B63B 35/44* (2013.01); *F03B 13/1885* (2013.01); *F03B 13/20* (2013.01); *F03D 9/25* (2016.05); *F03D 13/25* (2016.05); *H02K 7/183* (2013.01); *B63B 2021/005* (2013.01); *B63B 2035/446* (2013.01); *B63B 2035/4466* (2013.01); *F03D 5/00* (2013.01); *F05B 2240/40* (2013.01); *Y02E 10/38* (2013.01); *Y02E 10/725* (2013.01); *Y02E 10/727* (2013.01)

(58) Field of Classification Search
USPC ...................................... 290/42, 53; 114/295
See application file for complete search history.

(56) References Cited

U.S. PATENT DOCUMENTS

| 1,502,511 A * | 7/1924 | Marvin | F03B 13/186 60/501 |
| 2,654,796 A * | 10/1953 | Hubbard | H02G 7/056 174/139 |

(Continued)

FOREIGN PATENT DOCUMENTS

WO WO 2010110799 A1 * 9/2010 ............ F03B 13/183

*Primary Examiner* — Pedro J Cuevas
(74) *Attorney, Agent, or Firm* — Fulwider Patton LLP

(57) ABSTRACT

A system that maintains the relative and/or absolute geographical positions of two or more buoyant devices floating in a body of water. A plurality of formation restoring tethers are disclosed which permit the unrestricted vertical movement of networked buoyant devices, while resisting increases in their lateral separations by providing restoring forces to oppose such separations. Tensioning mechanisms incorporated into the tethers generate the resistance to the lateral separations of two or more entities by transforming such separations into an increase in the potential energy stored within such tensioning mechanisms, the potential energy of which is released in the process of restoring the original separations and/or positions of the displaced buoyant devices.

28 Claims, 124 Drawing Sheets

(51) Int. Cl.
  *F03D 5/00* (2006.01)
  *H02K 7/18* (2006.01)

(56) References Cited

U.S. PATENT DOCUMENTS

| | | | | |
|---|---|---|---|---|
| 2,881,591 A * | 4/1959 | Rumsey | ............... | B63B 21/50 114/305 |
| 3,850,128 A * | 11/1974 | Lovell | ............... | B63B 21/26 114/295 |
| 4,033,281 A * | 7/1977 | Lundh | ............... | B63B 21/26 114/295 |
| 4,130,076 A * | 12/1978 | Van Bilderbeek | .... | B63B 22/021 441/133 |
| 4,417,831 A * | 11/1983 | Abbott | ............... | B63B 21/50 114/293 |
| 4,447,740 A * | 5/1984 | Heck | ............... | F03B 13/22 290/53 |
| 4,480,966 A * | 11/1984 | Smith | ............... | F03B 13/1815 417/332 |
| RE32,119 E * | 4/1986 | Abbott | ............... | E02B 17/027 114/293 |
| 4,631,921 A * | 12/1986 | Linderfelt | ............... | F03B 13/1845 290/53 |
| 4,850,190 A * | 7/1989 | Pitts | ............... | F03B 13/10 290/53 |
| 5,439,321 A * | 8/1995 | Hunter | ............... | B63B 21/502 166/350 |
| 5,842,838 A * | 12/1998 | Berg | ............... | B01D 61/10 290/53 |
| 6,756,695 B2 * | 6/2004 | Hibbs | ............... | F03B 13/183 290/42 |
| 6,983,712 B2 * | 1/2006 | Cottrell | ............... | B63B 21/50 114/230.15 |
| 7,245,041 B1 * | 7/2007 | Olson | ............... | F03B 13/1885 290/42 |
| 7,819,608 B2 * | 10/2010 | Joshi | ............... | F16L 1/20 405/169 |
| 7,963,721 B2 * | 6/2011 | Joshi | ............... | F16L 1/20 405/171 |
| 8,197,208 B2 * | 6/2012 | Sharples | ............... | F03D 1/0608 415/7 |
| 8,613,569 B2 * | 12/2013 | Belinsky | ............... | E02D 27/425 405/203 |
| 8,629,572 B1 * | 1/2014 | Phillips | ............... | F03B 13/16 290/42 |
| 8,641,324 B2 * | 2/2014 | Quash | ............... | B63B 27/24 405/158 |
| 8,803,346 B2 * | 8/2014 | Pitre | ............... | F03B 13/186 290/42 |
| 8,808,041 B2 * | 8/2014 | Hine | ............... | B63H 19/02 440/9 |
| 8,825,241 B2 * | 9/2014 | Hine | ............... | B63B 21/66 114/242 |
| 8,925,313 B2 * | 1/2015 | Moffat | ............... | F03B 13/22 60/497 |
| 8,946,919 B2 * | 2/2015 | Phillips | ............... | F03B 13/16 290/42 |
| 8,946,920 B2 * | 2/2015 | Phillips | ............... | F03B 13/16 290/42 |
| 8,952,560 B2 * | 2/2015 | Phillips | ............... | F03B 13/16 290/42 |
| 8,963,358 B2 * | 2/2015 | Phillips | ............... | F03B 13/16 290/53 |
| 8,997,873 B2 * | 4/2015 | Riordan | ............... | E21B 17/015 166/343 |
| 9,051,913 B2 * | 6/2015 | Feiler | ............... | F03B 11/02 |
| 9,074,577 B2 * | 7/2015 | Dehlsen | ............... | F03B 13/18 |
| 9,080,708 B2 * | 7/2015 | Early | ............... | F16L 1/235 |
| 9,353,501 B2 * | 5/2016 | Halkyard | ............... | E02F 3/905 |
| 9,353,725 B2 * | 5/2016 | Hine | ............... | B63H 19/02 |
| 9,500,176 B2 * | 11/2016 | Moffat | ............... | F03B 13/22 |
| 9,574,550 B2 * | 2/2017 | Fyfe | ............... | E02D 27/42 |
| 9,688,373 B2 * | 6/2017 | Hine | ............... | B63H 19/02 |
| 9,802,681 B1 * | 10/2017 | Hine | ............... | B63B 35/00 |
| 9,828,069 B2 * | 11/2017 | Johnstone | ............... | B63B 21/50 |
| 10,150,546 B2 * | 12/2018 | Hine | ............... | B63H 19/02 |
| 10,183,400 B2 * | 1/2019 | Trigui | ............... | G01N 29/04 |
| 10,190,568 B2 * | 1/2019 | Gregory | ............... | F03B 15/02 |
| 10,309,374 B2 * | 6/2019 | Nelson | ............... | B64F 3/02 |
| 10,369,705 B2 * | 8/2019 | Trigui | ............... | B08B 3/024 |
| 10,370,905 B2 * | 8/2019 | Bech | ............... | B63B 21/20 |
| 10,414,476 B2 * | 9/2019 | Cole | ............... | H04M 1/15 |
| 2003/0061980 A1 * | 4/2003 | Cottrell | ............... | B63B 21/50 114/293 |
| 2003/0193197 A1 * | 10/2003 | Hibbs | ............... | F03B 13/183 290/53 |
| 2005/0099010 A1 * | 5/2005 | Hirsch | ............... | F03B 13/1845 290/42 |
| 2006/0067792 A1 * | 3/2006 | Joshi | ............... | F16L 1/163 405/171 |
| 2008/0056825 A1 * | 3/2008 | Joshi | ............... | F16L 1/163 405/170 |
| 2008/0233818 A1 * | 9/2008 | Quash | ............... | B63B 27/24 441/133 |
| 2009/0211241 A1 * | 8/2009 | Moffat | ............... | F03B 13/22 60/501 |
| 2010/0171312 A1 * | 7/2010 | Burns | ............... | B63B 22/00 290/53 |
| 2010/0230971 A1 * | 9/2010 | MacKie | ............... | F03B 17/061 290/54 |
| 2011/0012358 A1 * | 1/2011 | Brewster | ............... | F03B 13/1885 290/53 |
| 2011/0155383 A1 * | 6/2011 | Christiansen | ......... | E21B 17/015 166/345 |
| 2013/0006445 A1 * | 1/2013 | Hine | ............... | B63B 21/66 701/2 |
| 2013/0059488 A1 * | 3/2013 | Hine | ............... | B63H 19/02 440/6 |
| 2013/0146300 A1 * | 6/2013 | Riordan | ............... | E21B 17/015 166/343 |
| 2013/0183163 A1 * | 7/2013 | Fyfe | ............... | E02D 27/42 416/244 R |
| 2013/0236314 A1 * | 9/2013 | Feiler | ............... | F03B 11/02 416/177 |
| 2013/0341927 A1 * | 12/2013 | Murphree | ............... | F03B 13/20 290/53 |
| 2014/0023440 A1 * | 1/2014 | Early | ............... | F16L 1/235 405/168.2 |
| 2014/0117673 A1 * | 5/2014 | Phillips | ............... | F03B 13/16 290/53 |
| 2014/0117674 A1 * | 5/2014 | Phillips | ............... | F03B 13/16 290/53 |
| 2014/0225371 A1 * | 8/2014 | Nair | ............... | H02N 2/18 290/53 |
| 2014/0232116 A1 * | 8/2014 | Thomson | ............... | A61K 31/337 290/53 |
| 2014/0290233 A1 * | 10/2014 | Hine | ............... | B63H 19/02 60/327 |
| 2015/0145258 A1 * | 5/2015 | Phillips | ............... | F03B 13/16 290/53 |
| 2015/0293213 A1 * | 10/2015 | Felber | ............... | G01S 7/521 367/3 |
| 2016/0003214 A1 * | 1/2016 | Mundon | ............... | F03B 13/22 290/53 |
| 2016/0010619 A1 * | 1/2016 | Phillips | ............... | F03B 13/16 290/53 |
| 2016/0075409 A1 * | 3/2016 | Wegener | ............... | B63B 21/50 290/53 |
| 2016/0186715 A1 * | 6/2016 | Fait | ............... | F03B 13/20 290/53 |
| 2016/0237983 A1 * | 8/2016 | Hayman | ............... | F03B 13/10 |
| 2016/0272294 A1 * | 9/2016 | Hine | ............... | B63H 19/02 |
| 2017/0045027 A1 * | 2/2017 | Moffat | ............... | F03B 13/22 |
| 2017/0191461 A1 * | 7/2017 | Fait | ............... | F03B 13/10 |
| 2017/0226984 A1 * | 8/2017 | Gregory | ............... | F03B 13/1895 |
| 2017/0291671 A1 * | 10/2017 | Hine | ............... | B63H 19/02 |
| 2017/0295759 A1 * | 10/2017 | Hine | ............... | A01K 61/80 |
| 2017/0363066 A1 * | 12/2017 | Hart | ............... | F03D 9/25 |
| 2017/0363067 A1 * | 12/2017 | Hart | ............... | F03D 9/32 |
| 2017/0363068 A1 * | 12/2017 | Hart | ............... | F03D 13/20 |

(56) References Cited

U.S. PATENT DOCUMENTS

| | | | |
|---|---|---|---|
| 2017/0363069 A1* | 12/2017 | Hart | F03D 5/00 |
| 2017/0363070 A1* | 12/2017 | Hart | F03D 13/25 |
| 2018/0079475 A1* | 3/2018 | Trigui | B25J 15/0009 |
| 2018/0111665 A1* | 4/2018 | Tsao | F03B 17/06 |
| 2018/0156199 A1* | 6/2018 | Nelson | F03D 7/00 |
| 2019/0048668 A1* | 2/2019 | Bech | E21B 17/012 |
| 2019/0106187 A1* | 4/2019 | Hine | B63H 19/02 |
| 2019/0111572 A1* | 4/2019 | Trigui | F16H 35/18 |
| 2019/0344452 A1* | 11/2019 | Trigui | B25J 9/0009 |

\* cited by examiner

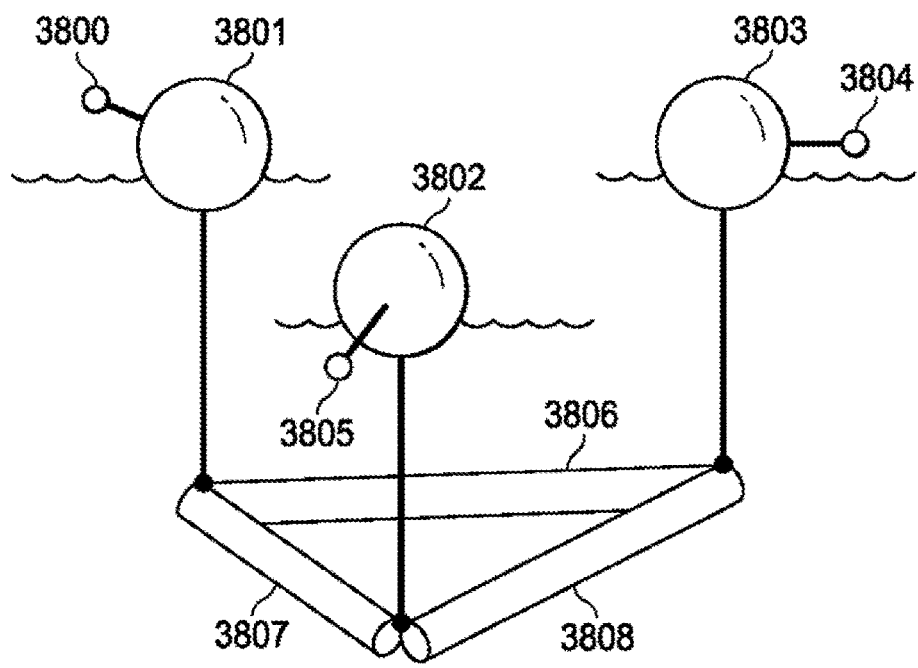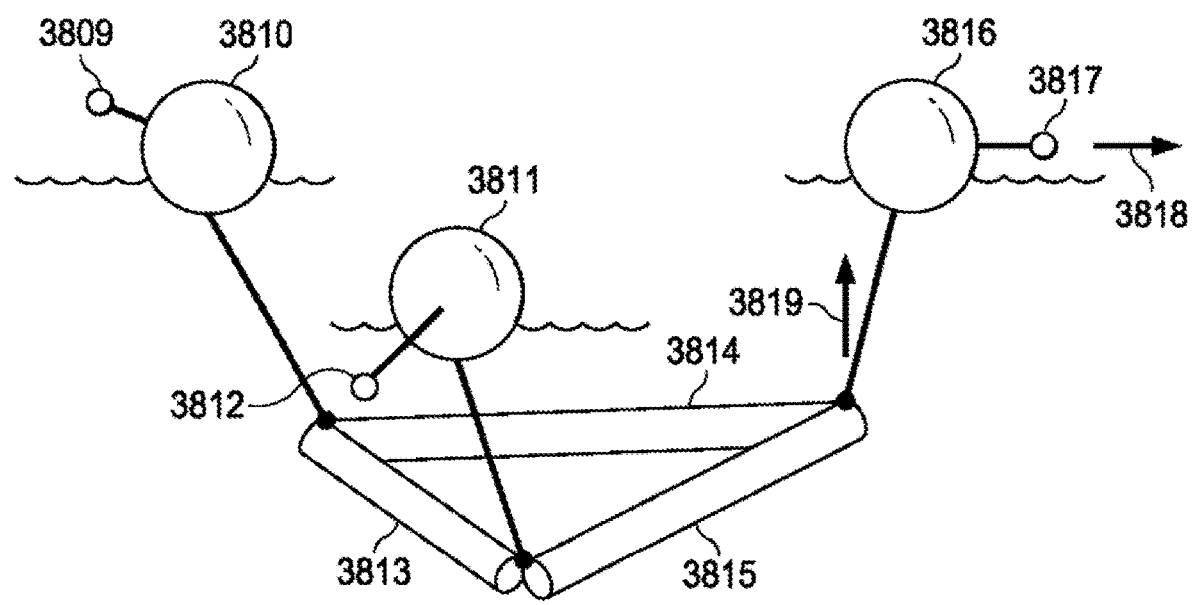
FIG. 37

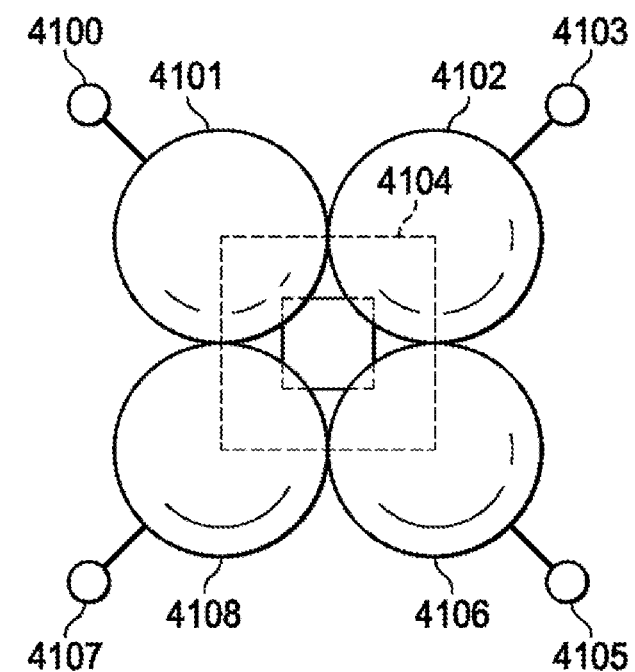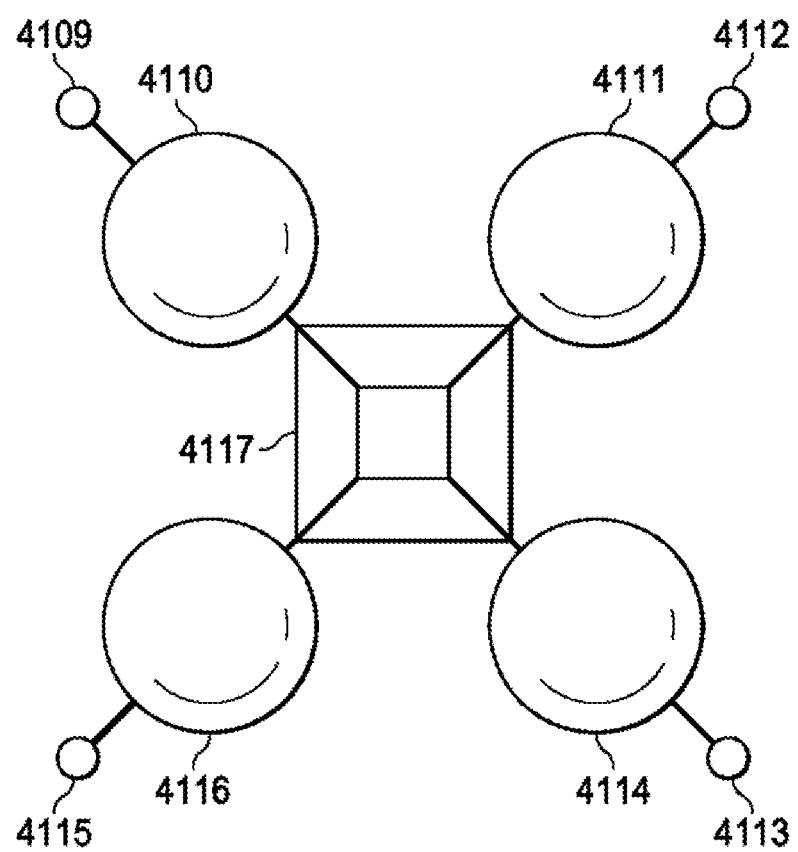
FIG. 40

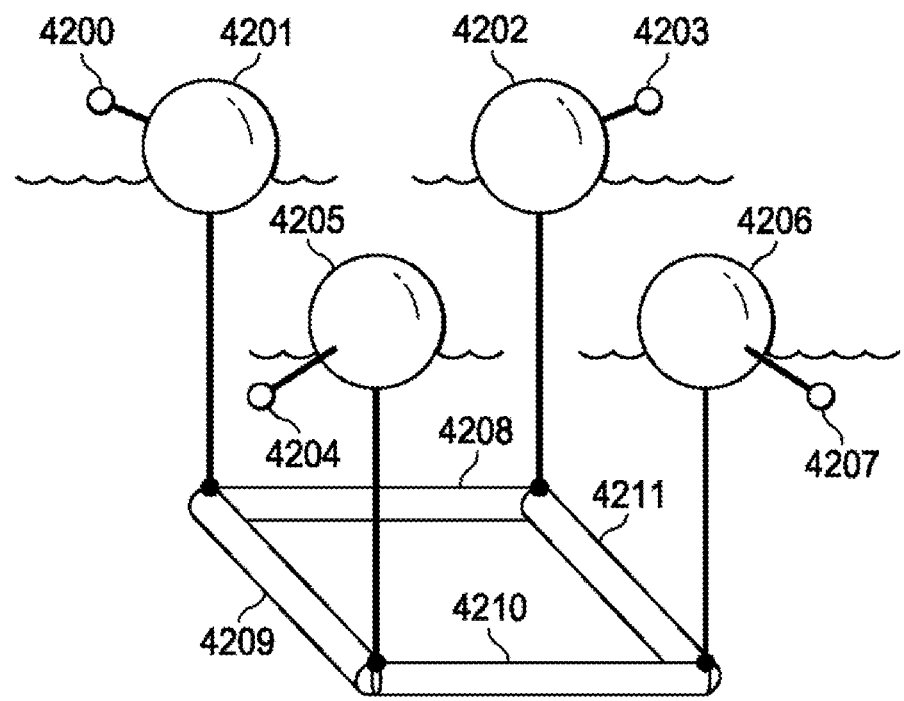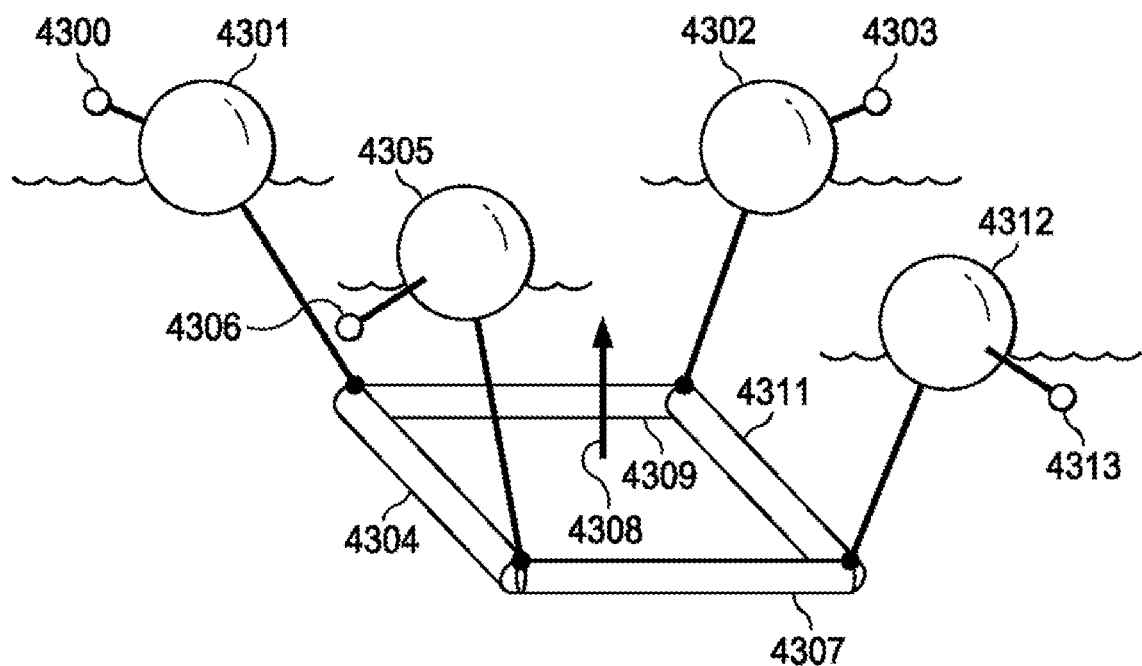
FIG. 41

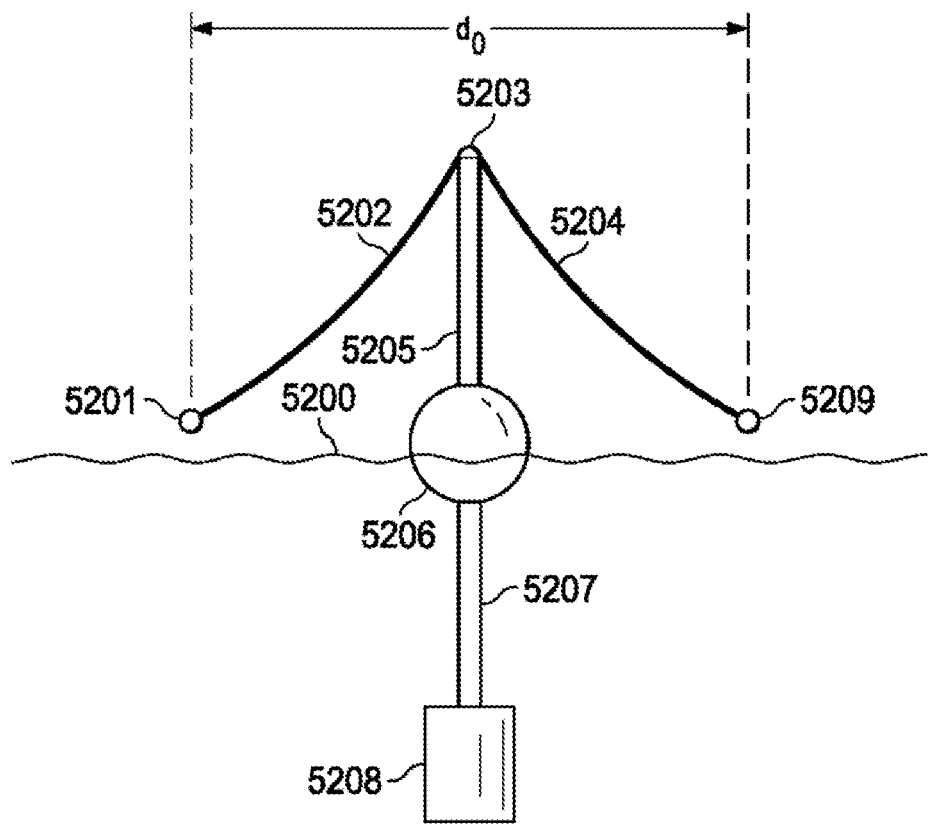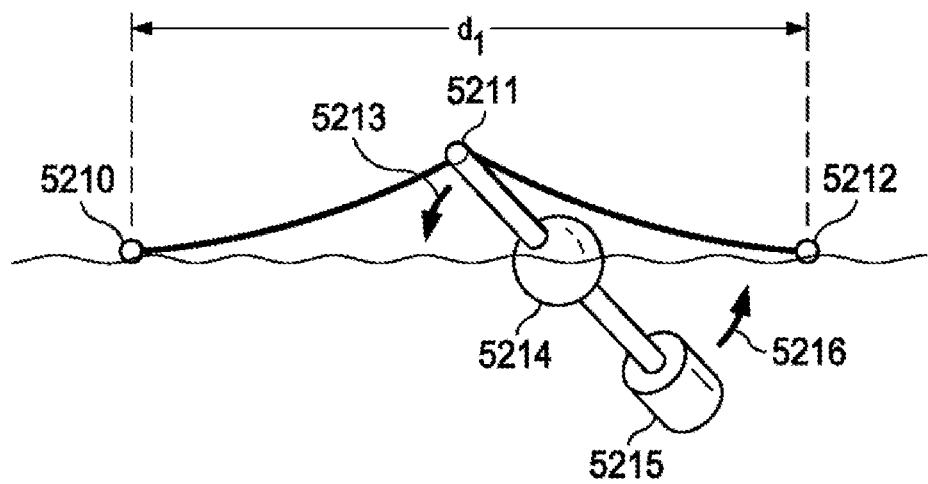
FIG. 47

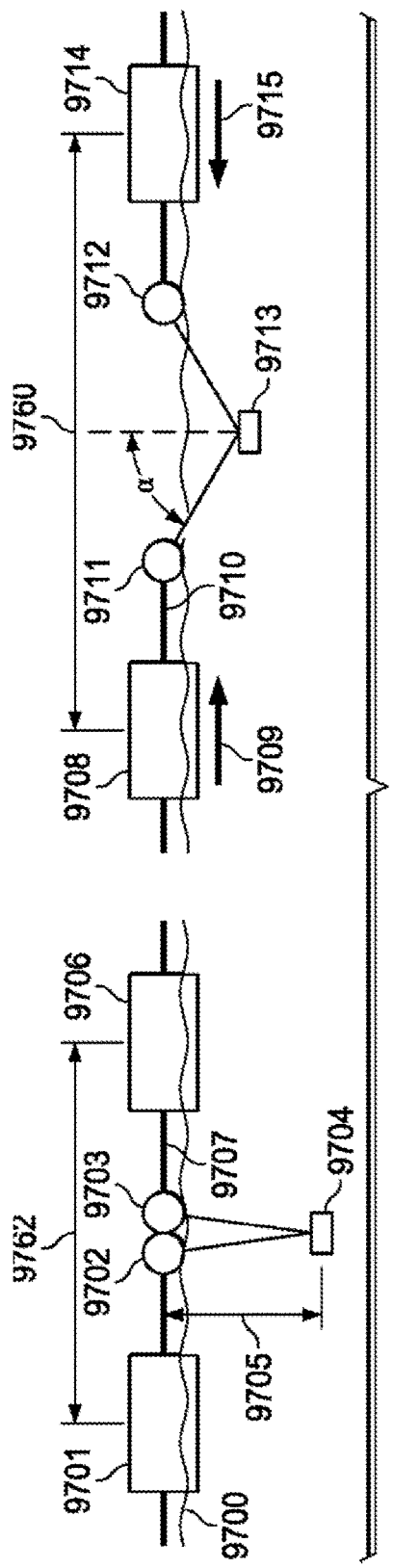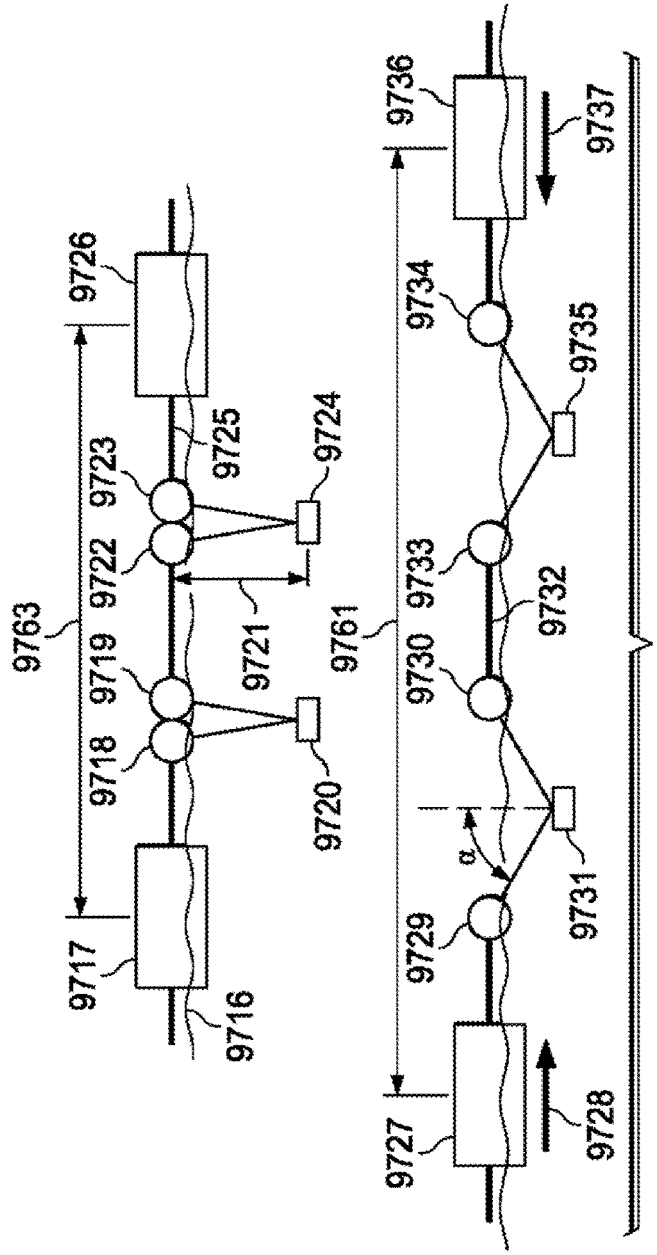
FIG. 92
FIG. 93

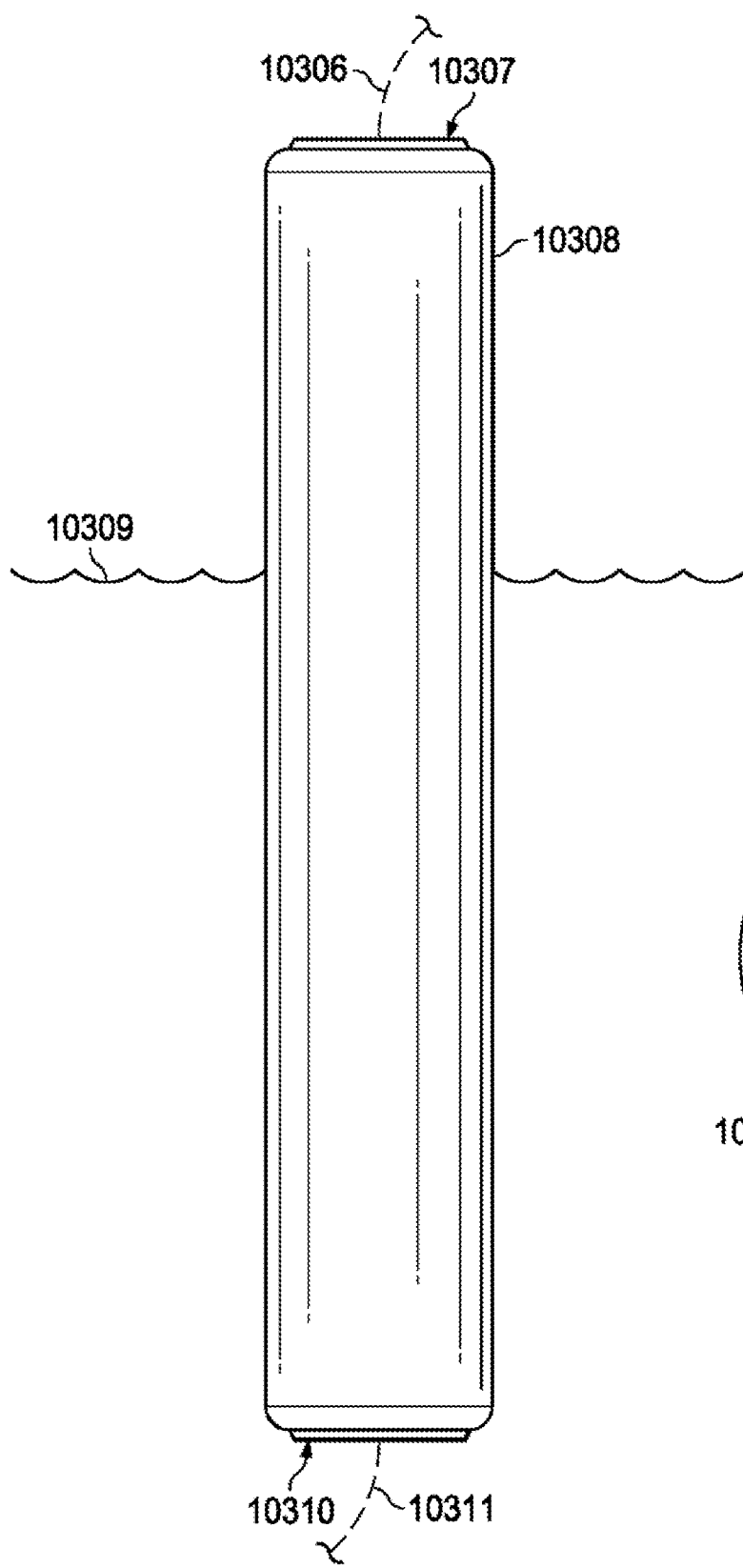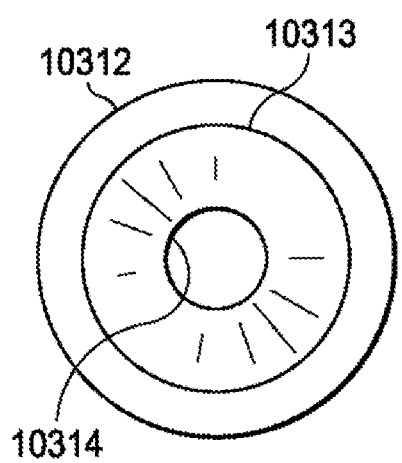
FIG. 112
FIG. 111

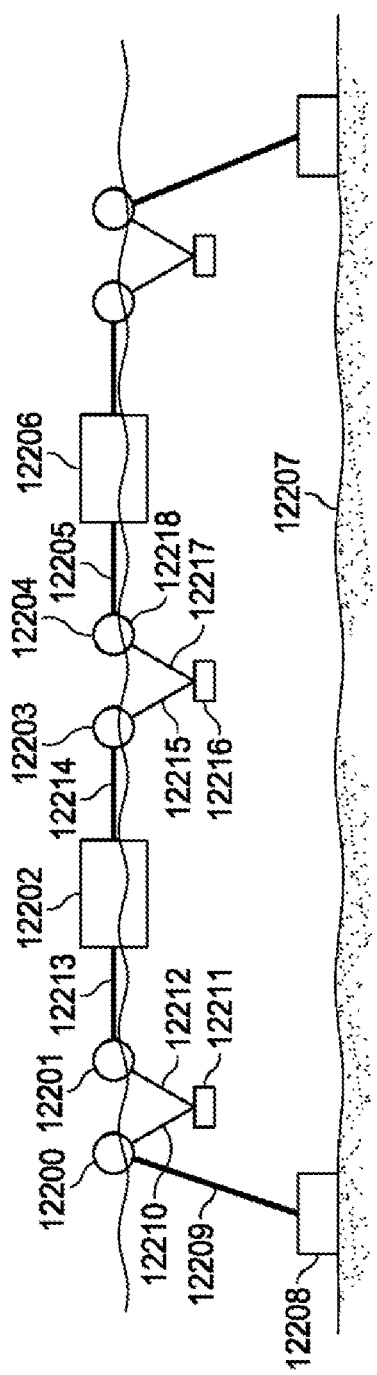
FIG. 155
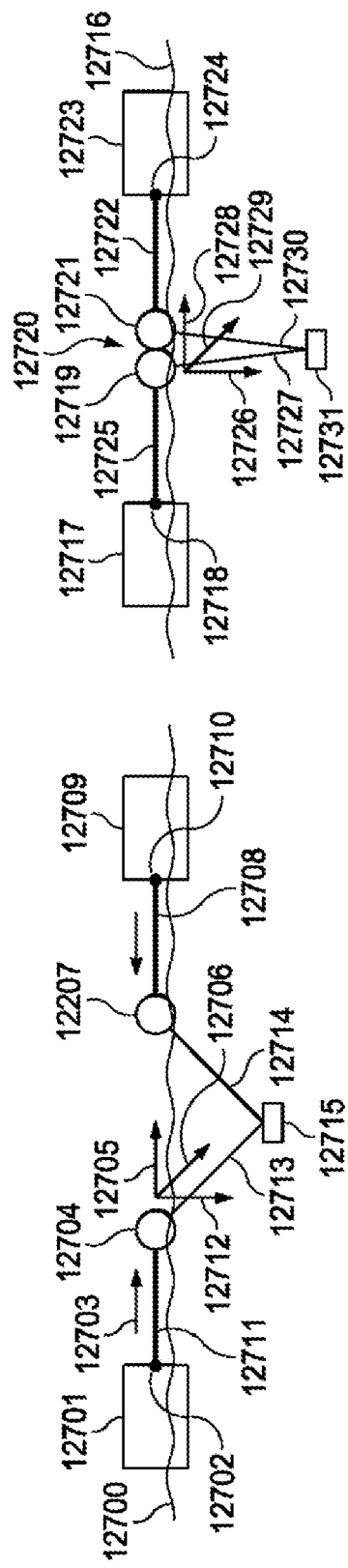
FIG. 157
FIG. 156

MOORING SYSTEM FOR DRIFTING ENERGY CONVERTERS

CROSS-REFERENCES TO RELATED APPLICATIONS

This application claims priority from U.S. Provisional Patent Application No. 62/370,401 filed Aug. 3, 2016, and U.S. Provisional Patent Application No. 62/454,926 filed Feb. 6, 2017, the contents of which are incorporated herein by reference in their entirety.

BACKGROUND

Large bodies of water and the large surface areas that they occupy present many opportunities for energy extraction. Wind turbines represent one type of energy converter, but a second type of energy converter utilizes the motion of the water's waves to produce electrical energy. Examples of this type of energy converter are disclosed in U.S. Pat. No. 9,500,176 entitled "Wave Energy Apparatus Having A Venturi Shroud" to one of the present inventors, the contents of which are incorporated herein by reference. In this application, for shorthand purposes, a type of device that takes motion, such as wind, tides, currents, waves, etc., and converts the motion to energy may be referred to hereafter as a Motion-To-Electrical Energy Transforming Device, or "MTEETD."

There are many good reasons to engage in research and development efforts concerning energy extraction from the oceans. Ocean waves represent a renewable energy source whose harvesting would not degrade the environment and ecology of the earth. Ocean waves also represent a very concentrated energy source, offering the potential for the harvesting of large amounts of energy using relatively small devices. Most wave energy devices are constrained to use in relatively shallow ocean waters where they may be anchored in some manner to the ocean floor. When anchored to the ocean floor, a wave energy device may create and exploit a tension between the immovable ocean bed and the vertical oscillations of the waves. These types of devices are generally not capable of operating in the deeper parts of the ocean.

Among the many wave energy devices proposed or built, some are able to operate in the deeper parts of the ocean. Many of these devices utilize a buoy at the surface of the ocean, and a submerged component, which, in one way or another, exploits the relatively motionless waters which are found some distance below the ocean's surface to facilitate the extraction of energy from the waves at the surface. Some of these devices utilize submerged turbines that are moved through the still waters by the action of waves above causing the turbines to rotate and generate power.

Currently, buoyant devices like MTEETDs tend to be individually anchored to the seafloor, often by multiple anchors per device, when it is desired that they be kept at an approximately stationary position on the surface of the ocean. And, farms of such buoyant devices also tend to be anchored individually even though they perform the same, or similar, functions and even though the output of their individual processors (e.g. electrical energy) tends to be pooled and sent to shore via a common channel (e.g. a power cable, a hydraulic tube, etc.). Individually anchored devices are problematic in that this may cause damage to the sea bed and the wildlife that inhabit the area, and deployment and maintenance of such anchoring systems can be expensive and time consuming. A better approach would be to have the MTEETDs drift in a formation with only some of the devices anchored. However, both water and wind currents can cause the formation of MTEETDs to become distorted, tangled, and less effective unless a system is put in place to restore the collection of MTEETDs to its formation using a mooring system. At present, no such system exists.

SUMMARY OF THE INVENTION

The present disclosure is a system that moors buoyant devices to each other in addition to optional additional mooring to anchors and/or other dedicated geospatial moorings. The disclosed system permits a relatively few number of anchors, and/or other geospatial moorings, to be shared among and/or within an interconnected farm of buoyant devices. This has the benefit of reducing the cost and complexity of the overall system.

The mooring system of the present invention is characterized by:

1) Reducing the need for fixed anchoring in favor of dynamic "relative" tensioning. This has the benefit of requiring (far) fewer anchors and/or piles to be attached to the seafloor with respect to, and/or in comparison to, the number of functional and/or operational devices (e.g., MTEETDs) deployed in a floating formation connected by energy absorbing tethers. This reduction in the number of anchors required minimizes the cost of a farm and its deployment and permits farms to be deployed in deeper waters where the impracticality of deploying anchors and/or piles in such deeper waters is mitigated by the reduced number of such anchors that are required. It thus makes the deployments of some farms in deeper waters (e.g. where the wave resource is better) practical when they might not otherwise have been so.

2) Providing more stable distributions, configurations, and/or relative positioning, of devices within farms by interconnecting the devices and providing for, and/or allowing, an interconnected network of devices to maintain their relative positions through their cooperative and mutual enforcements of separation distances. That is, the present invention provides farms with an ability for the geospatial locations of the devices to change, e.g. when moving, as a group, in response to shifting currents, winds, tides, etc., while still maintaining the approximate relative separations of those devices. Furthermore, when a farm utilizes self-propelled anchoring elements instead of anchors and/or other "fixed" anchoring elements, then the farm can be "migrated" and/or moved to a new geospatial location without disrupting the relative spacings and locations of the devices, and while allowing the devices within the farm to continue functioning without interruption. Such migrations can also be initiated and executed automatically through the dynamic and/or automated control of the relative thrusts, propulsions, and/or thrust vectors, implemented by the system(s) controlling the self-propelled anchoring elements. Migrations can also be executed dynamically, for instance, with respect to a farm of wave-energy conversion devices, so as to move a farm to a geospatial location or orientation where a resource, e.g. the wave climate, is better and/or will be better. Migrations might also be executed so as to move a farm out of harm's way, e.g. away from the forecasted path of a hurricane.

3) Dynamically resisting deviations in the relative positions of farm elements through the creation of opposing forces whose magnitudes vary with the direction and/or extent of positional variations. A complementary and opposing set of tensions and/or tensioning forces are created and maintained throughout a farm of the present disclosure. Anchoring elements "pull" outward on other elements and/or "hold" their positions while other interconnected elements pull away. And, by contrast, tensioning mechanisms, "pull" inward on adjacent elements and/or on portions of the interconnected network of elements. By combining a dynamic and complementary interconnected network of opposing forces and/or tensions, some of which pull elements apart, and others of which pull them together, a dynamic tension is created throughout a farm network in which deviations in the relative positions of farm elements are resisted, corrected, and/or restored. The same mechanisms which resist overextensions and/or separations of elements also store as potential energy some or all of the energy that acts to otherwise pull elements apart, which is then dissipated through the restoration of the original, nominal separations. By this mechanism, overextensions and/or separations of farm elements are corrected and/or restored relatively quickly which reduces the probability that an already overextended inter-elemental separation will be further perturbed and/or exacerbated by additional impulsive forces which will cause one or more interconnections to suffer structural failure.

4) Providing elements within a farm the ability to move, e.g. in response to waves, with virtually unlimited freedom, especially in a vertical direction. Thus, positional stability is achieved by means of a mechanism which is fully compatible with its application to farms of devices whose value is derived from their ability to move responsively with respect to wave motion and/or other environmental factors. Perhaps paradoxically, the present disclosure combines effective positional control and/or stability without any significant limitation on the ability of devices within such a farm to move nor on their effective range of motion.

"Elements" in a farm can have, provide, support, and/or execute, different and/or overlapping functionalities, and/or exhibit properties, characteristics, functionalities, and/or behaviors, that belong to, are, and/or might be construed as being consistent with, characteristics of and/or associated with more than a single "elemental category" (e.g. operational, tensioning, anchoring, etc.) defined in this disclosure. The definitions of elemental categories provided herein are for explanatory purposes and should not be construed, and are not in any way or manner, limiting of the scope of this disclosure. Language and explanation are inherently limited, but this disclosure is sufficient to enable those skilled in the art to apply its teachings, designs, principles and/or solutions in creative and even unforeseen variations. "Elements" in a farm can also have overlapping functional characteristics and belong to more than one "elemental category." Individual components, e.g. individual floats, floating objects, weights, connectors, etc., may contribute to the implementation of one, two, or a multitude of function elements, and the associated "elemental" functionalities.

Embodiments of the present invention exploit the inherently stochastic nature of the kinds of forces, impulses, waves, gusts of wind, etc., to which components and/or elements within a farm would be expected to encounter, and which would tend to cause, promote, and/or precipitate many, if not all, of the disruptions to the positional stability and/or positional integrity of a farm. Embodiments of the present disclosure tend to distribute the impacts of such stochastic and/or localized disruptions to the positional stability of a farm across many elements, and/or interconnected networks of elements, within a farm.

Thus, the momentary stability of one element, and/or subset of elements, within a farm can help, and/or be leveraged to help, other elements when those other elements are subjected to momentary, impulsive, localized, and/or stochastic disruptions to their positional stability. Using, combining, and/or leveraging, the inertial resistance of relatively large and/or heavy elements, plus the "fixed" resistance of anchored anchoring elements and/or the "active" resistance of self-propelled anchoring elements, plus the drag-induced resistance of laterally-stabilized elements (e.g. those containing and/or attached to sea anchors), plus the "elastic" resistance of tensioning mechanisms (which absorb, distribute, and store some of the disruptive and/or stochastic energy, storing it as buoyancy-related potential energy), the apparatus and/or farm disclosed herein, combines overlapping, cooperative, complementary, and opposing dynamic mechanisms to resist, absorb, diminish, and restore, momentary, impulsive, and/or stochastic deviations in the positions and/or relative separations and/or relative angular orientations of the elements and/or components in a farm.

To achieve the objectives of the present invention, the tensioning system uses tethers to connect adjacent buoyant devices such as MTEETDs that are otherwise free floating in a body of water. The MTEETDs may be wind, wave, or other energy converters, and the tethers may also connect other elements of the formation such as buoys, communication towers, generators, vessel navigational devices, and a wide array of other buoyant devices that may be incorporated into a farm of energy converters. The tethers are characterized by energy storing mechanisms incorporated into the tether that operate like mechanical springs in that, once deformed by the movement of connected drifting components to as to "stretch" or expand the energy storing mechanism, the device in turn undergoes a contraction that pulls the drifting components closer together. These devices in many cases utilize buoyancy-related potential energy rather than the mechanical energy of a coil spring or elastomeric member, and are referred to herein as buoyancy springs for their ability to apply a resultant contracting force in response to being expanded from an inert or neutral position.

A unique feature of the buoyancy springs, which act as tensioning mechanisms for the separation restorative tethers, is that they apply no horizontal force on, in, and/or along, the tether until a critical separation is achieved. That is, the buoyancy springs only transition to an active or energized state where they create a restorative tension in the tether upon reaching and/or exceeding a critical distance between the connected devices for that specific tether. Unlike common weighted or anchored moorings which continually place a loading on the moored vessel or device, the present system allows for free floating of the MTEETDs until the critical separation is reached, whereupon the system activates to restore the formation to a nominal separation.

In a first preferred embodiment, when a relative movement of connected drifting MTEETDs leads to a separation exceeding the critical distance of the associated separation restorative tether, the incorporated tensioning mechanism transitions from an inert state having a neutral horizontal applied force to an energized state having a net horizontal applied force. The energized state is characterized by the expansion of the tensioning mechanism to impart a buoyancy-related potential energy to a vertically displaceable element of the tensioning mechanism. The subsequent release of the buoyancy-related potential energy of the vertically displaceable element contracts the tensioning mechanism until the tensioning mechanism reaches its inert state, and this release of the buoyancy-related potential energy serves to contract the tensioning mechanism, which in turn biases the connected drifting MTEETDs to a separation less than the critical distance.

It is to be understood that buoyancy can be both positive and negative and that the general term buoyancy can refer to either a positive buoyancy or a negative buoyancy. Buoyancy-related potential energy may refer to an object having a density less than a density of water seeking to elevate from a position beneath the surface of a body of water, or it may refer to an object having a density greater than a density of water seeking to sink below a position at or below the surface of the body of water. A buoyancy-related potential energy created by the aforementioned conditions can refer to both a positive and a negative buoyancy.

Many of the figures, illustrations, descriptions and claims are made with respect to objects floating on the sea and/or anchored to the seafloor. However, this disclosure and all such figures, illustrations, descriptions and claims are intended to apply with equal force to any other body of water, e.g. a lake, overlying any other type of non-fluid surface, e.g. the bottom surface of a lake. The scope of this disclosure, all of its elements, and all of its claims, are intended to include embodiments designed for use on, and/or actually used on, any body of water. Many of the figures, illustrations, descriptions and claims are made with respect to MTEETDs. However, this disclosure and all such figures, illustrations, descriptions and claims are intended to apply with equal force to any other buoyant object that would benefit from mutual inter-mooring, especially those carrying an electrical conduit. Such buoyant objects can include: floating solar arrays, floating distributed radar arrays, floating wind turbines, floating aquaculture facilities, floating "drone" charging stations, floating seafloor-mining equipment, and so forth.

BRIEF DESCRIPTION OF THE DRAWINGS

For a fuller understanding of the nature and objects of the disclosure, reference should be made to the following detailed description, taken in connection with the accompanying drawings, in which:

FIGS. 33-37 are schematic diagrams of various three-way buoyant springs;

FIG. 40 is a top view of the four way buoyant spring of FIG. 39;

FIG. 41 is a schematic diagram of an alternate embodiment of a four way buoyant spring;

FIG. 47 is a schematic diagram of another embodiment of a buoyant spring;

FIGS. 92-97 are schematic diagrams of alternate embodiments of the present invention;

FIG. 111 is a side view of the buoy of FIG. 110;

FIG. 112 is a top view of the buoy of FIG. 110;

FIG. 155 is a schematic diagram of an alternate embodiment of the present invention;

FIGS. 156 and 157 are schematic diagrams of the buoyancy spring of FIG. 155;

DETAILED DESCRIPTION OF THE PREFERRED EMBODIMENTS

Figure 1:
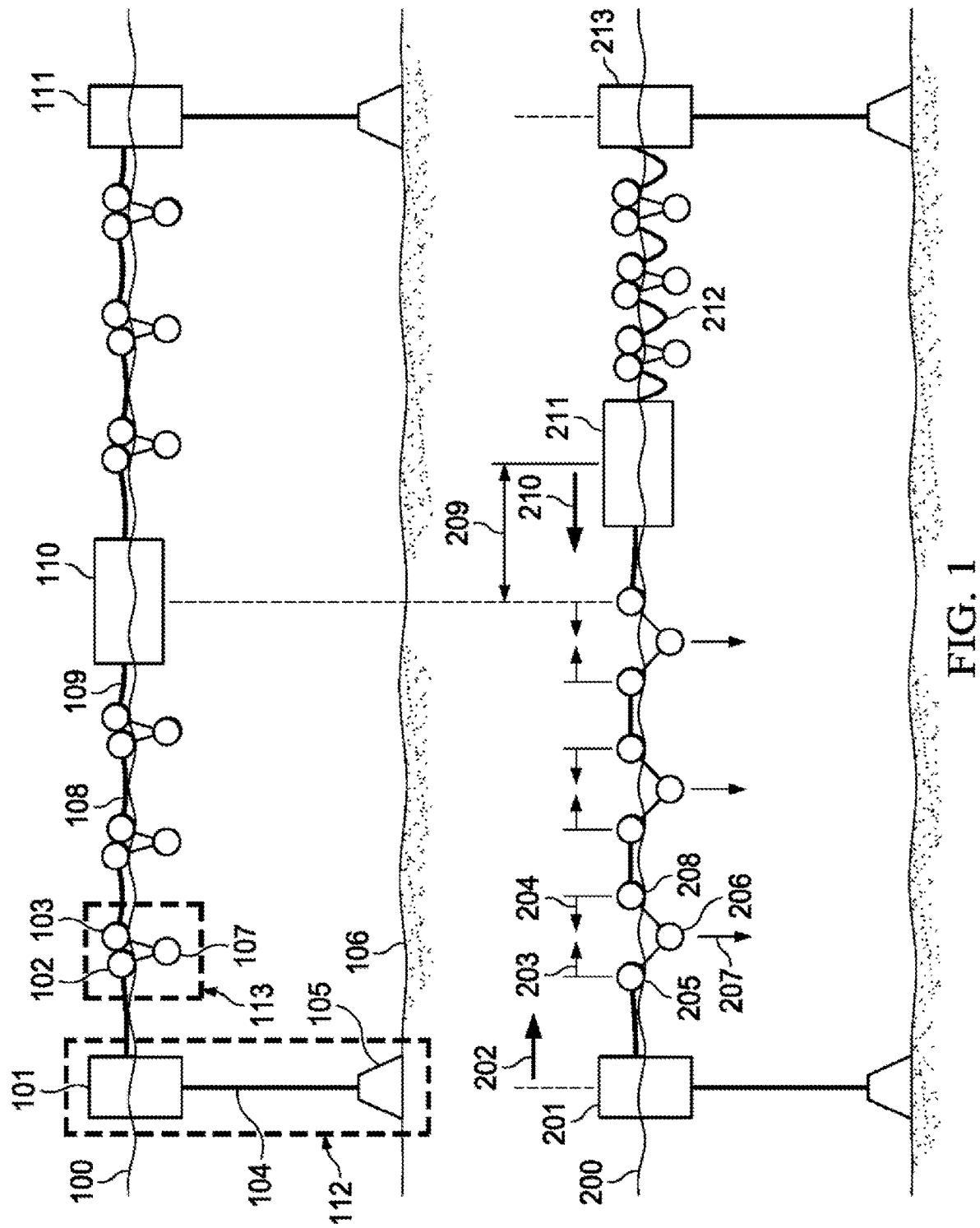
FIG. 1 a schematic diagram of a first embodiment of the present invention.

FIG. 1 is an illustration of a first embodiment of the invention disclosed herein. Nine farm elements, e.g. 112, 110, and 111, are connected together and constitute an individual segment of a farm of the type disclosed herein, where many such segments can be combined to form a large formation of elements connected together by restorative tethers. This interconnected network of farm elements in the embodiment of FIG. 1 is held above a specific location on the seafloor 106 by means of two anchoring elements, e.g. 112 (which is a combination of an anchor 105, a connector 104, and a float 101). Nine farm elements, e.g. 112, 113, 110, and 111, are floating adjacent to the surface 100 of a body of water, e.g. the sea. Two anchoring elements, 112 and 111, are each composed of an anchor, e.g. 105, resting on the ground 106 (e.g. on the seafloor), which is connected to a respective cable or chain, e.g. 104, which is in turn connected to a respective float, e.g. 101. The float of each anchoring element is connected to a respective tensioning mechanism, e.g. 113 (the combination of 102, 103, and 107). While the positions of the anchoring-element floats 101 and 111 are constrained by their respective anchors, the position of an operational element 110 is constrained by tensioning mechanisms, e.g. 113, relative to the anchoring-element floats 101 and 111 on either side.

The upper illustration denotes the configuration of an embodiment in an inert state, sometimes referred to herein as a resting state or condition. The central operational element 110 is connected to each of the adjacent anchoring elements 112 and 111 by connectors, e.g. 109, that incorporate tensioning mechanisms, e.g. 113. When all of the anchoring and operational elements 112, 110, and 111, are in or at their nominal positions, the tensioning mechanisms are configured in a resting orientation in which the potential energy of their weights, e.g. 107, with respect to the connected floats, e.g. 102-103, is minimal.

The lower illustration denotes the configuration of an embodiment when the relative distance between the operational element 211 and an anchoring element 201 has increased and the relative distance between the operational element 211 and an anchoring element 213 has decreased. As a consequence of moving away from anchoring element 201, operational element 211 has extended the connector that connects those two elements. However, the only way for the connector to extend is for the tensioning mechanisms, e.g. 113 (the combination of 102, 103, and 107), therein to transition from their inert or neutral, zero-energy, configurations and into energized or active configurations in which they both resist further extension (in this case by raising a weight, e.g. 107, from its maximal depth) and store buoyancy related potential energy (due to the raised displacement of the weight, e.g. 107) that will eventually bring the elements back to their nominal degree of proximity.

Note that when referring to a "weight" herein, the implication is that the weight is denser than the surrounding water and tends to sink or place connectors in tension by virtue of its negative buoyancy. In this manner, the tensioning mechanism acts like a mechanical spring that resists expansion with a resultant tensile contraction, only the mechanical potential energy of the spring is replaced with the buoyancy-related potential energy from the displacement of the weight (or in subsequent cases, a float) to transition to the energized state. Thus, where the tensioning mechanism relies on the displacement of either a positive or negative buoyant object, the tensioning mechanism may be referred to as a buoyant spring hereafter.

In this illustration, each tensioning mechanism, e.g. 113, is composed of a pair of floats, e.g. 102 and 103, under which is suspended a weight, e.g. 107. When at rest, the weight hangs directly beneath the associated pair of floats, and the pair of floats are immediately adjacent to one another. However, in order to extend this kind of tensioning mechanism, which is the principal, if not only, method by which the connector in which it is embedded can be extended, the two floats must be pulled apart. This, in turn, requires that the weight suspended between them must be raised. The gravitation potential energy of the raised weight (which may also be referred to as a negative buoyancy-related potential energy) tends to impart a restoring force to the pair of floats to which it is attached, tending to pull them, or biasing them, back together, and, in like fashion, to pull back together an extended connector.

When a tensioning mechanism is in its resting configuration, e.g. when the weight (e.g. 107) hangs directly beneath a pair of adjacent floats, e.g. 102 and 103, then the tensioning mechanism will not cause, nor tend to cause, the further shortening of the connector in which it is embedded. This means that a pair of elements linked by a connector containing tensioning mechanism 113 will not tend to shorten to a distance less than a predetermined length. In other words, a pair of elements linked by a connector containing tensioning mechanisms will not tend to shorten to a distance that will cause them to collide, potentially causing structural damage to the elements involved.

However, whether inert or energized, a separation restorative tether allows farm elements connected to it freedom of movement in both the horizontal and vertical axes. On the other hand, any element whose movement tends to increase the horizontal separations between it and its adjacent, interconnected objects beyond their nominal separations will be gently and smoothly moved so as to restore their desired nominal separations. Devices floating in some bodies of water, for example in the sea, can be moved by powerful and intermittent movements of water. These water-induced movements of devices can tear them free of inflexible moorings and set them adrift. And, moorings strong enough to resist such intermittent forces can be complicated, hard to deploy, and expensive.

The present invention has the advantage of absorbing and storing energy from movements of devices beyond their nominal inter-object separations, thus resisting and dissipating the extent and force of those undesirable movements. However, following the cessation of such water-induced movements of a device away from at least one of its neighbors to which it is connected via a tensioned connection, the excessive-movement-derived potential energy is subsequently and passively released as it is expended during the correction and/or reversal of the excessive separation that caused its generation.

While a separation restorative tether resists and restores the nominal separation of an extended tether, it does not prevent the inadvertent or unwanted reduction of the separation, or even the collision, between two or more connected buoyant devices. Note in FIG. 1 that while the movement of operational element 211, away from anchoring element 201, has extended the separation restorative tether which connects them, the movement of operational element 211 toward anchoring element 213 has reduced the length of the separation restorative tether that connects it to anchoring element 213.

The abnormally shortened separation restorative tether connecting operational element 211 and anchoring element 213 is not effectively, nor significantly, resisted or opposed by the "compacted" separation restorative tether 212 that connects them. Instead, portions, e.g. 212, of the connector "droop". However, because operational element 211 is connected to both anchoring elements 201 and 213, the shortening of the connection between operational element 211 and anchoring element 213 is complemented by the extension of the connection between operational element 211 and anchoring element 201. The restorative potential energy of the overextended separation restorative tether connecting operational element 211 and anchoring element 201 will reduce and restore that connection to its nominal length, and, in the process, because anchoring element 213 is also anchored, will increase and thereby indirectly restore to its nominal length the connection between operational element 211 and anchoring element 213.

It can be seen that there is a critical distance for each separation restorative tether that will cause the incorporated tensioning mechanism to transform from an inert state to an active state. In FIG. 1, it is the distance at which the floats (e.g., 102 and 103) begin to separate and to lift the weight 107. Each tensioning mechanism will exhibit this critical separation whereby the tensioning mechanism transforms from the inert state to the active state. This can also be expressed as a critical tension in the separation restorative tether, where after a certain tension is reached the floats (e.g. 102, 103) will be forced apart when the force exceeds the force imparted on the floats by the weight 107 keeping them together. As the expansion of the tension mechanism increases and the weight rises, the restoring force supplied by the weight increases and biases the floats back together, which in turn shortens the tether and biases the connected operational elements together.

Figure 2:
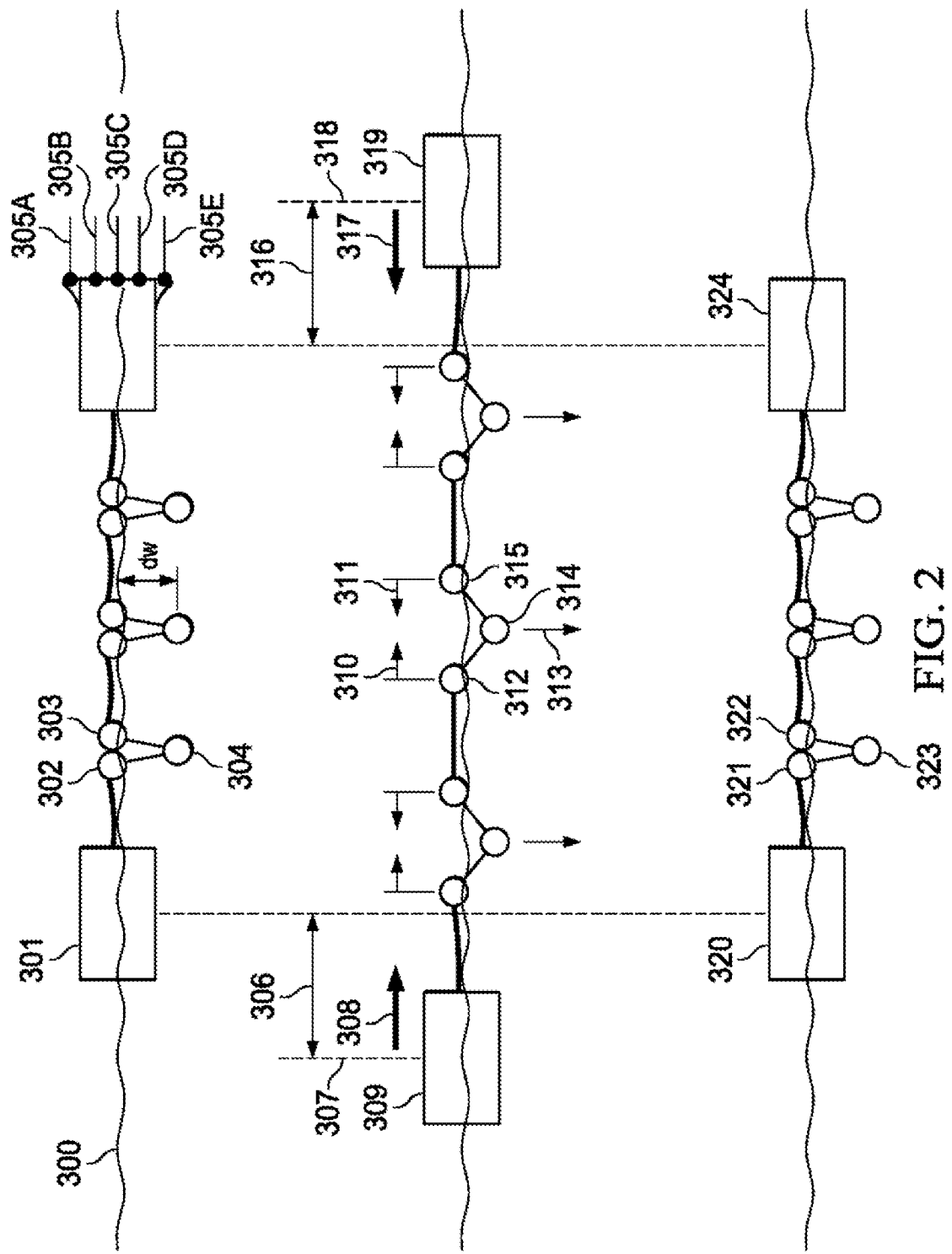
FIG. 2 is a schematic diagram of the embodiment of FIG. 1.

FIG. 2 illustrates the extension and subsequent restoration of a separation restorative tether's length. Two buoyant devices 301 and 305 are floating adjacent to the surface of the sea 300 and are connected to each other by a separation restorative tether. Each separation restorative tether incorporates three tensioning mechanisms, e.g. 302-304, and each separation restorative tether's weight, e.g. 304, is suspended under each respective pair of floats, e.g. 302-303, and, when inert and in its nominal configuration, hangs beneath its respective pair of floats at a depth "dw". When pulled apart by a wave, by wind, by a current, or through the impact of, or under the influence of, some other force, flow, or impact, devices 309 and 319 may be separated by a distance greater than the nominal, "resting" length of the separation restorative tether that joins them. The extension of a separation restorative tether is achieved through the separation of at least one respective adjacent pair of floats, e.g. 312 and 315, within each tensioning mechanism. Each pair of floats within a tensioning mechanism can only be separated through the concomitant lifting, e.g. from a depth of "dw" to a lesser depth, of the mutually-supported weight, e.g. 314, that hangs between and beneath them.

With respect to the middle illustration in FIG. 2, lifting the three weights supported by the respective three tensioning mechanisms that connect the two devices 309 and 319 will store some of the energy that would have otherwise and further separated the objects 309 and 319. Moreover, when the force driving and/or pulling the objects 309 and 319 apart diminishes or stops, then the potential energy of the respective lifted weights, e.g. 314, will pull, e.g. 313, down on the respective floats, e.g. 312 and 315, and thereby will also pull, e.g. 310-311, those respective floats back together to a position of adjacency as the weight descends to its original, maximal depth "dw".

Figure 3:
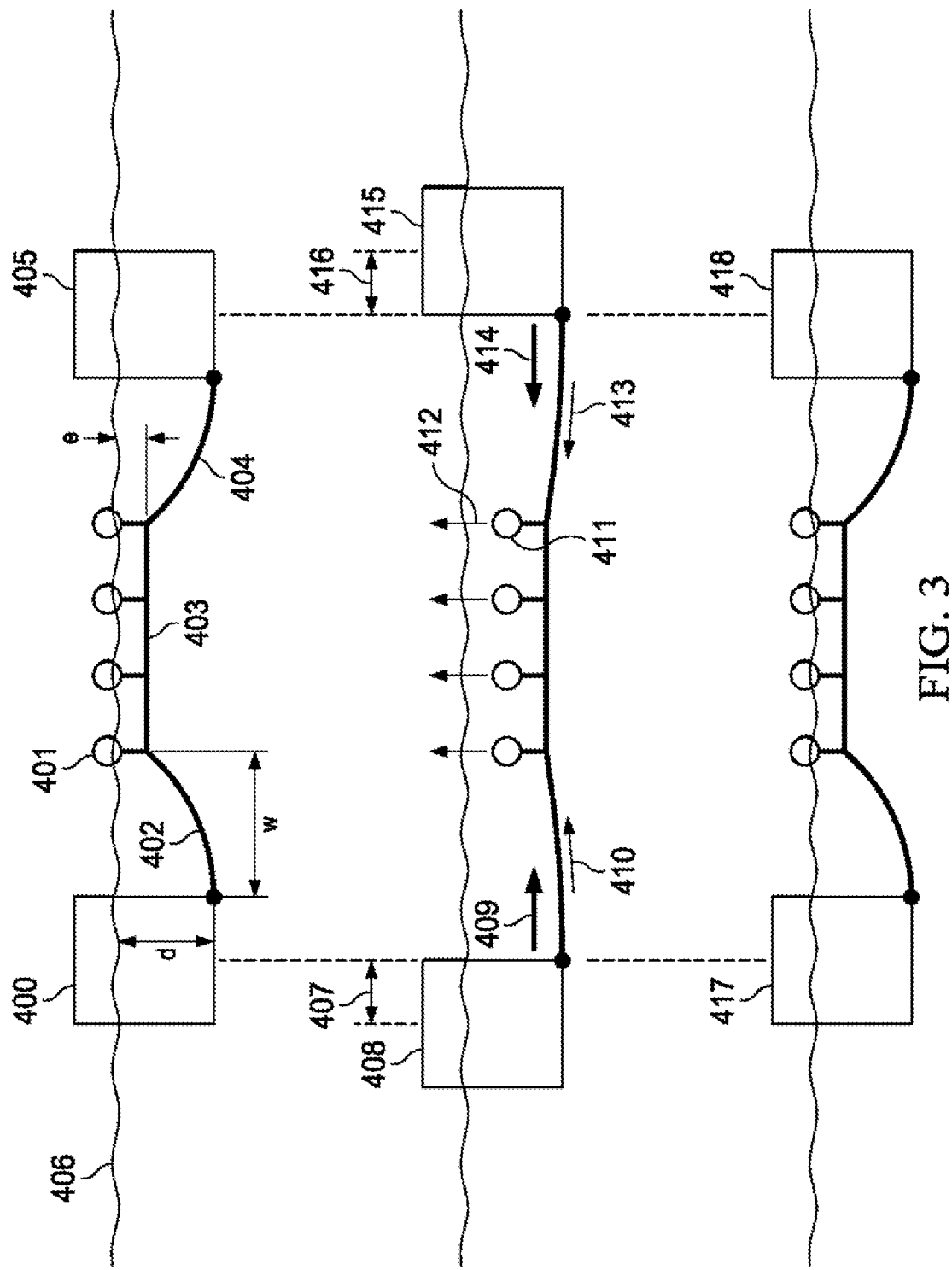
FIG. 3 is a schematic diagram of a second embodiment of the present invention.

FIG. 3 is an illustration of another buoyancy spring embodiment of the invention disclosed herein. The illustrated embodiment is a pair of operational elements 400 and 405 that are connected by a separation restorative tether 402-404 containing four floats, e.g. 401, connected in series. When resting, the operational elements 400 and 405 of the illustrated farm formation have a specific nominal separation corresponding to the width and/or length of the separation restorative tether (composed of 402-404). The end portions of the resting separation restorative tether transition from a depth of "d" up to a greater depth of "e". They make this transition over a lateral distance of "w". Thus, the length of the connector 402-404 is greater than the distance separating the points on the respective operational elements to which the connector is connected.

When the separation of the operational elements 400 and 405 increases 407 and 416 beyond the nominal distance, then the operational elements 408 and 415 pull taught, at least to a degree, the separation restorative tether that connects them. The portion of the resting connector 403 that had been at a depth of "e" is now pulled down to a depth of approximately the same depth "d" at which the connector is attached to each operational element. This requires that the floats within the tensioning mechanism, e.g. 411, be submerged. The resulting buoyant forces, e.g. 412, generated by those, at least partially, submerged elements act to pull together 410 and 413 the connector and restore its original, nominal length.

Figure 4:
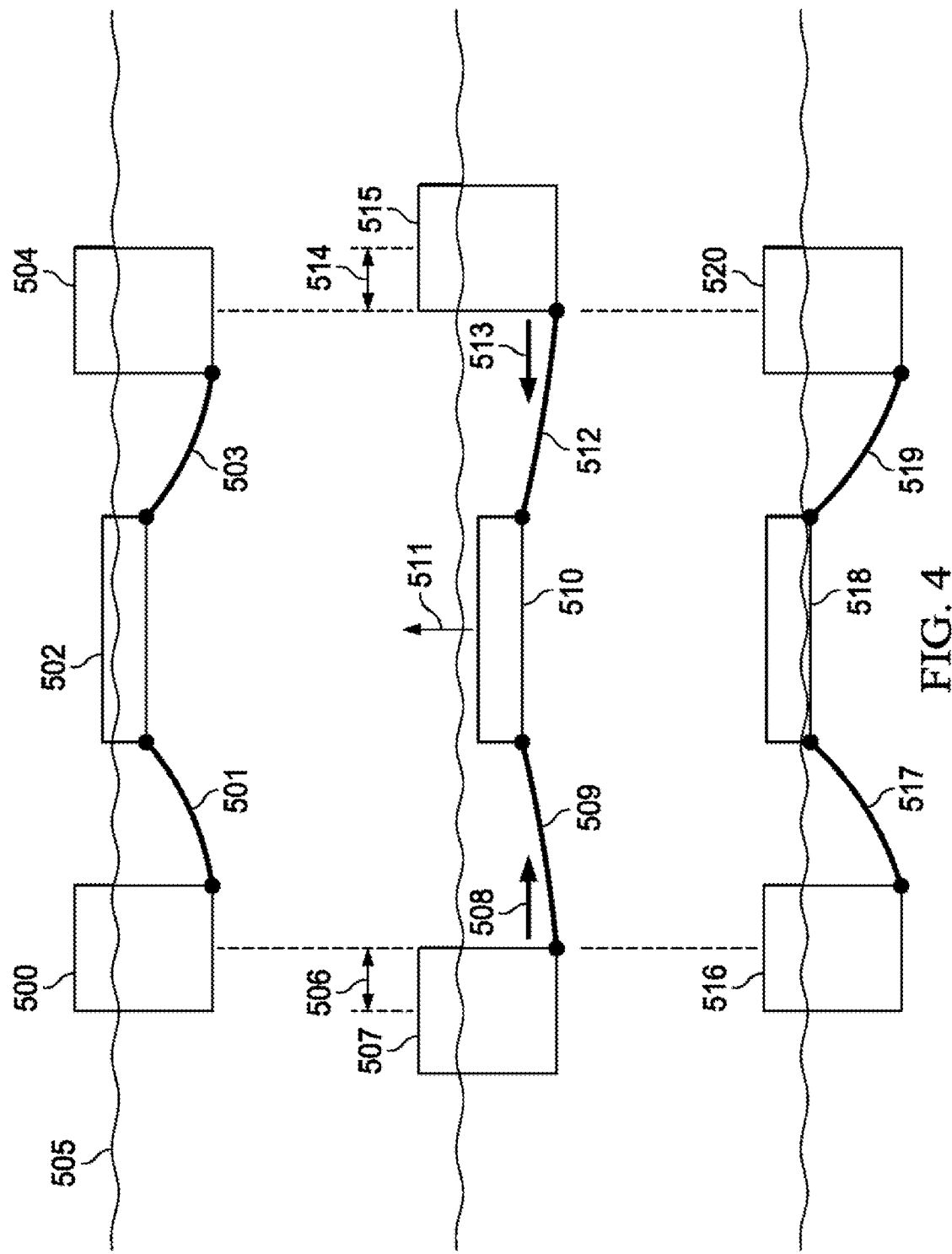
FIG. 4 is a schematic diagram of a third embodiment of the present invention.

FIG. 4 is an illustration of a farm formation containing two operational elements 500 and 504 that are floating on the surface 505 of a body of water. A float 502 is connected by elongate connectors on opposing sides at a position below the height of the connection to the float at the two operational elements, and imparts a restoring force 508 and 513 following any movement of the operational elements that results in a separation distance that exceeds, e.g. by the sum of 506 and 514, the nominal desired distance.

The tensioning mechanism includes two connectors 501 and 503 on either side. Each connector is connected, in turn, to an operational element. However, the point at which each connector is connected to an operational element is at a greater depth than the depth at which that same connector is connected to the float. Thus, when the separation between two connection points at which the float is connected to another element is increased beyond a nominal maximum distance, the connection points are forced to move toward, and/or to, the same depth. When the connection points at which a connector is attached to the float and another (e.g. an operational) element are forced to move toward, and/or to, the same depth, then the element with the deeper connection will be pulled higher (e.g. closer to the surface) and the element with the "not-as-deep" connection will be pulled lower (e.g. to a greater depth).

While the illustration in FIG. 4 shows connectors that are fully, or almost fully, submerged, either or both ends of the connector could have been above the surface of the water, so long as the connector's point of attachment to the float were higher than the connector's point of attachment to the other (e.g. operational) element. When the operational elements move beyond the critical distance, the float 502 connected between them is forced, at least partially, to submerge 510. The buoyant force 511 of the, at least partially, submerged float 510 creates a correlated restoring force 508 and 513 along the connectors connecting the float 510 to the connected operational elements 507 and 515. The restoring force returns the operational elements 516 and 520 to a separation no greater than their nominal separation (less than the critical distance).

Figure 5:
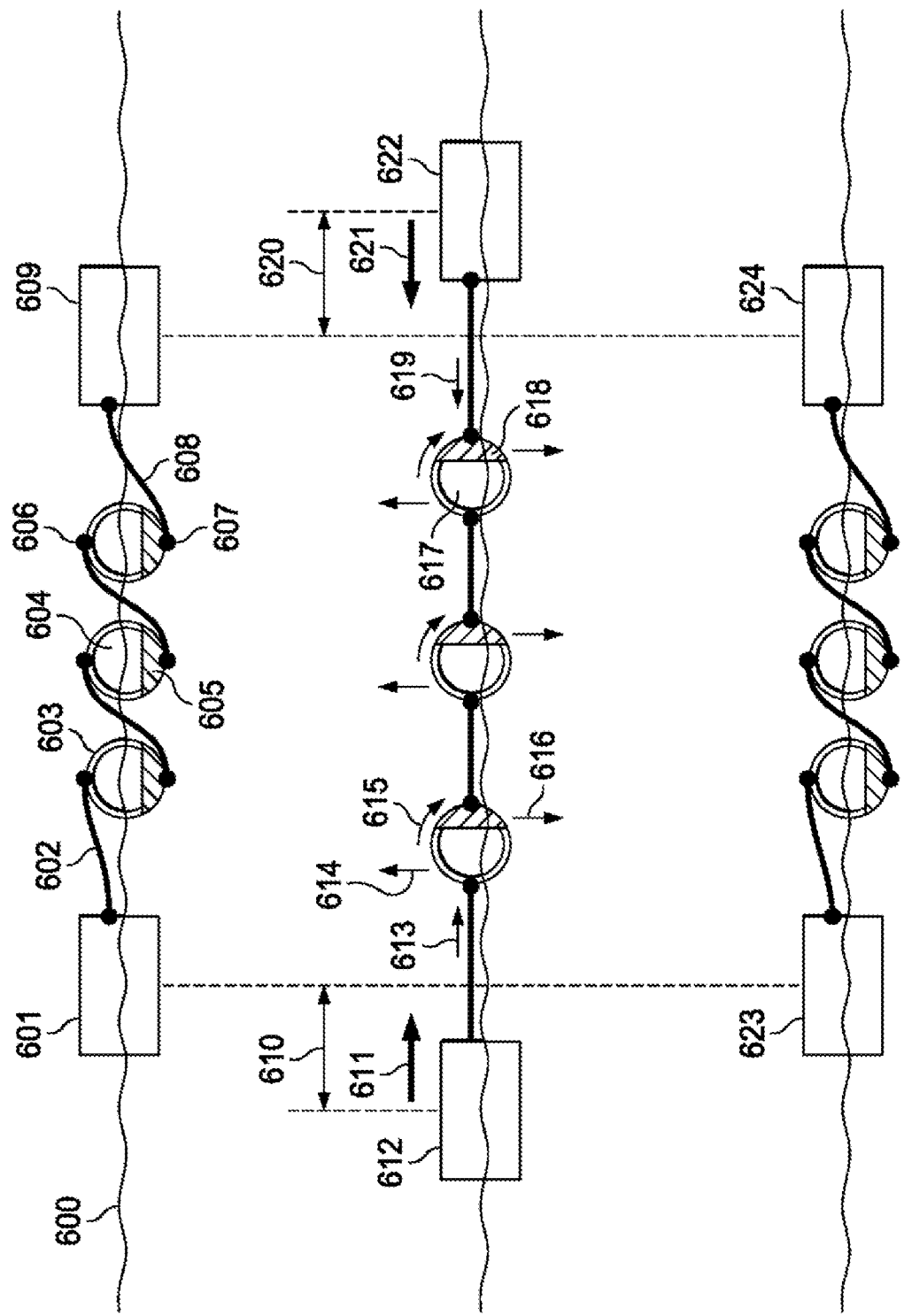
FIG. 5 a schematic diagram of a fourth embodiment of the present invention.

FIG. 5 illustrates a farm formation containing two operational elements 601 and 609, and a tensioning mechanism made up of three buoyant springs, e.g. 603, floating adjacent to the surface 600 of a body of water. When the operational elements 612 and 622 move, or are moved, apart to a separation distance that exceeds, e.g. by distances of 610 and 620, the desired maximum separation distance, the buoyancy springs in the form of spherical buoyant/weighted units are forced to "roll" to a non-equilibrium and unstable orientation in which their weighted ends, e.g. 605, are rotated away from their nominal positions at the bottoms of the elements, to positions, e.g. 618, in which they are not at the bottoms of their respective elements.

Like any buoyant object possessing a positively buoyant side and a negatively buoyant side, the buoyant springs illustrated in FIG. 5 will assume a gravitationally-induced orientation in which the heavy end is pointed downward (at its minimum gravitational potential) and the buoyant, i.e. lightest, end is pointed upward. Rotating such a buoyant spring to any other, non-equilibrium, orientation requires energy, and stores at least a portion of that energy as gravitational potential energy. When the force causing the rotation(s) of the buoyant spring(s) is removed, they will rotate back to their nominal, resting orientations, shortening the connectors connecting them to one another and to the outer operational elements, thus correcting and restoring the original nominal separation.

Figure 6:
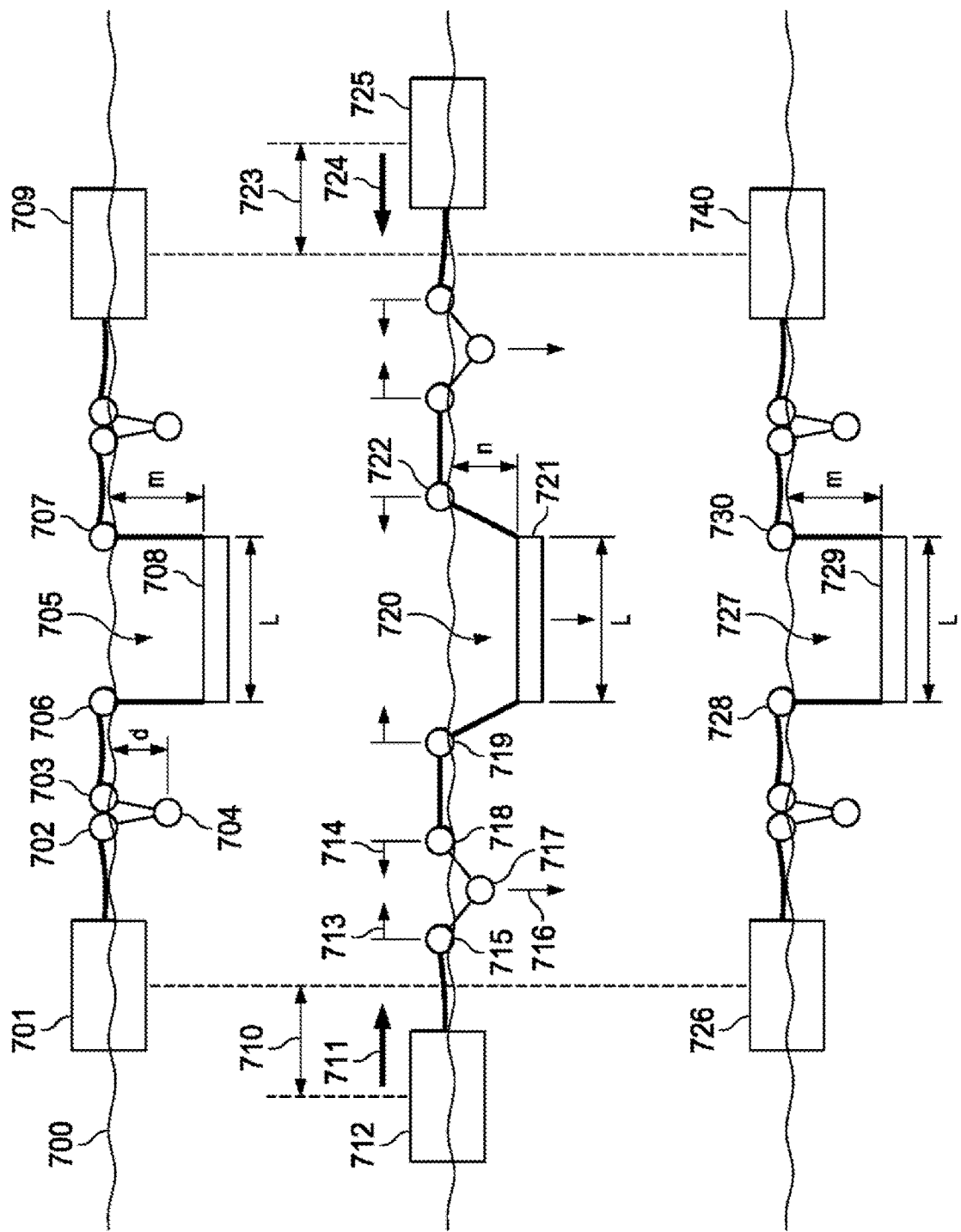
FIG. 6 is a schematic diagram of a fifth embodiment of the present invention.

FIG. 6 illustrates a farm formation incorporating and/or composed of two operational elements 701 and 709 and an alternate tensioning mechanism, e.g. (combination of 706-708). Two different types of tensioning mechanisms are illustrated. Both types incorporate a weight suspended between two floats. However, one, e.g. 702-704, is relatively "compact" and involves a relatively compact weight, e.g. 704, in which the floats are in close proximity to each other and/or touch when the respective weight, e.g. 704, hangs directly down beneath them, i.e. when the tensioning mechanism is in its nominal inert configuration. By contrast, the other type of tensioning mechanism, 706-708, is relatively "wide" and involves a relatively "wide" weight, 708. When this second type of tensioning mechanism is in its nominal inert configuration, the floats are not in close proximity to each other, nor do they touch. If the gap, i.e. if the distance "L," between the floats 706-707 is wide enough, and if the resting depth "m" of the weight 708 is deep enough, then vessels traversing the surface of the body of water may pass through the gap, especially when the tensioning mechanism is in its nominal inert configuration, and the depth of the weight 708 is maximal.

The "compact" version permits more tensioning mechanisms per unit length of connector, and therefore a greater capacity for absorbing and restoring excessive separations with respect to any desired separation of connected operational elements. By contrast, the "wide" version facilitates the passage of floating vessels through and among the elements of a farm. For example, these wide tensioning mechanisms could be used to create, define and/or establish passageways through a farm. Such passageways will then facilitate the movement of maintenance vessels between and among the elements within a farm, albeit at the cost of some tensioning efficiency (e.g. restoration power per meter of nominal connection length).

Figure 7:
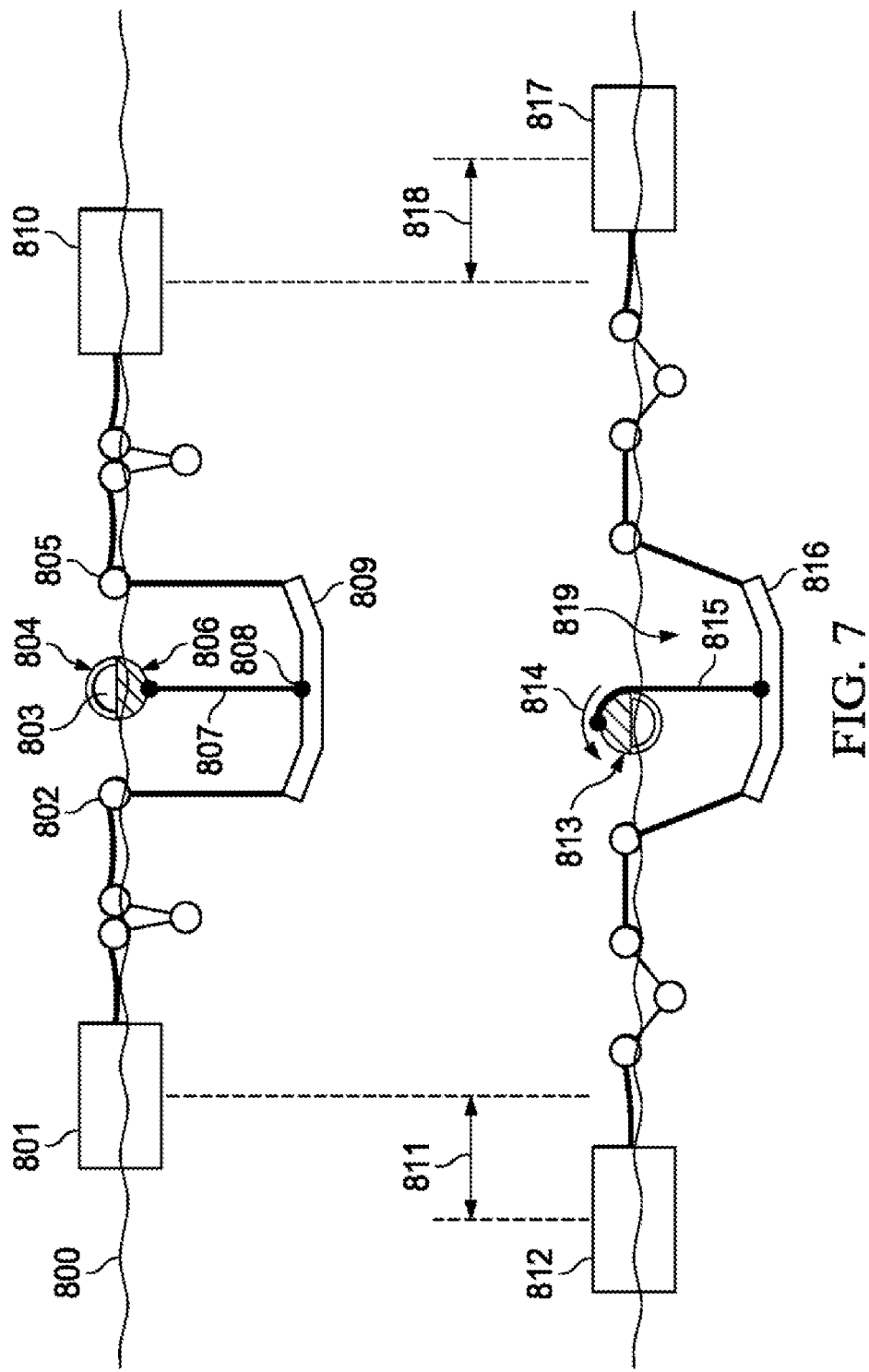
FIG. 7 a schematic diagram of a sixth embodiment of the present invention.

FIG. 7 illustrates a farm formation containing two outer operational elements 801 and 810, and three tensioning mechanisms: one "wide" (a combination of 802, 805, and 809) and the other two "compact". This figure illustrates another novel feature of the current disclosure, namely a "depth indication buoy" 803. When the respective tensioning mechanism to which it is attached is in its nominal inert configuration, and the respective weight 809 is at its nominal inert depth, the depth indication buoy displays an upper side that may be colored green and/or produce or provide some other useful indication of the depth of the point at which it is attached to the tensioning mechanism, e.g. the depth of at least one of its associated weights.

A depth indication buoy is attached to a point along the length of the submerged weight associated with a "wide" flotation-weight-type tensioning mechanism (a combination of 802, 805, and 809). When that tensioning mechanism is inert, the weight 809 is at its maximum depth. And, when the weight is at its maximum depth, the float and/or buoy 804 is held under tension in an unstable orientation in which its weighted upper end 803 is raised, at least in part, above the surface 800 of the water, and its buoyant end 806 is held beneath, at least in part, the surface 800 of the water. If the buoy displays an indication of the depth, e.g. a green surface, when in this orientation, then any vessel wishing to traverse the tensioning mechanism will receive an indication that the depth is maximal and/or sufficient to make such passage relatively safe.

On the other hand, if the tensioning mechanism is extended beyond its relaxed or inert configuration, then the depth of the submerged weight 816 will be lessened and the ability of a vessel to safely pass through and/or above the tensioning mechanism is reduced and/or may be unsafe. At such a reduced weight depth, the connector between the weight 816 and the depth indication buoy 813 is relaxed. The relaxation of the depth indication buoy's connector allows the buoy to roll over 814, at least in part, under the weight of its upper end where it better assumes its "natural" orientation in which its gravitational potential energy is minimal, and wherein the weighted end (e.g. 803), which might be colored "green," is at the bottom of the buoy and the buoyant end (e.g. hatched side 806), which might be colored "red," is at the top of the buoy.

After its at least partial rolling over to its own inert configuration (which only occurs when the associated tensioning mechanism is in a non-relaxed or "active" configuration) the buoy now displays, at least in part, a side of the buoy that is typically submerged, or at least downward-facing, when the buoy is in its "unstable" orientation and the tensioning mechanism is in its inert configuration. If this typically hidden side of the buoy is painted red, or provides some other indication of the lessened depth of its associated tensioning-element weight, then vessels that wish to pass through its channel 819 will be advised that the channel's associated weight is not at its maximum, and perhaps its "safest", depth. Such a warning might prevent a utility vessel from damaging its hull by attempting to pass through a "wide" extended tensioning mechanism when its associated weight it too near the surface.

Figure 8:
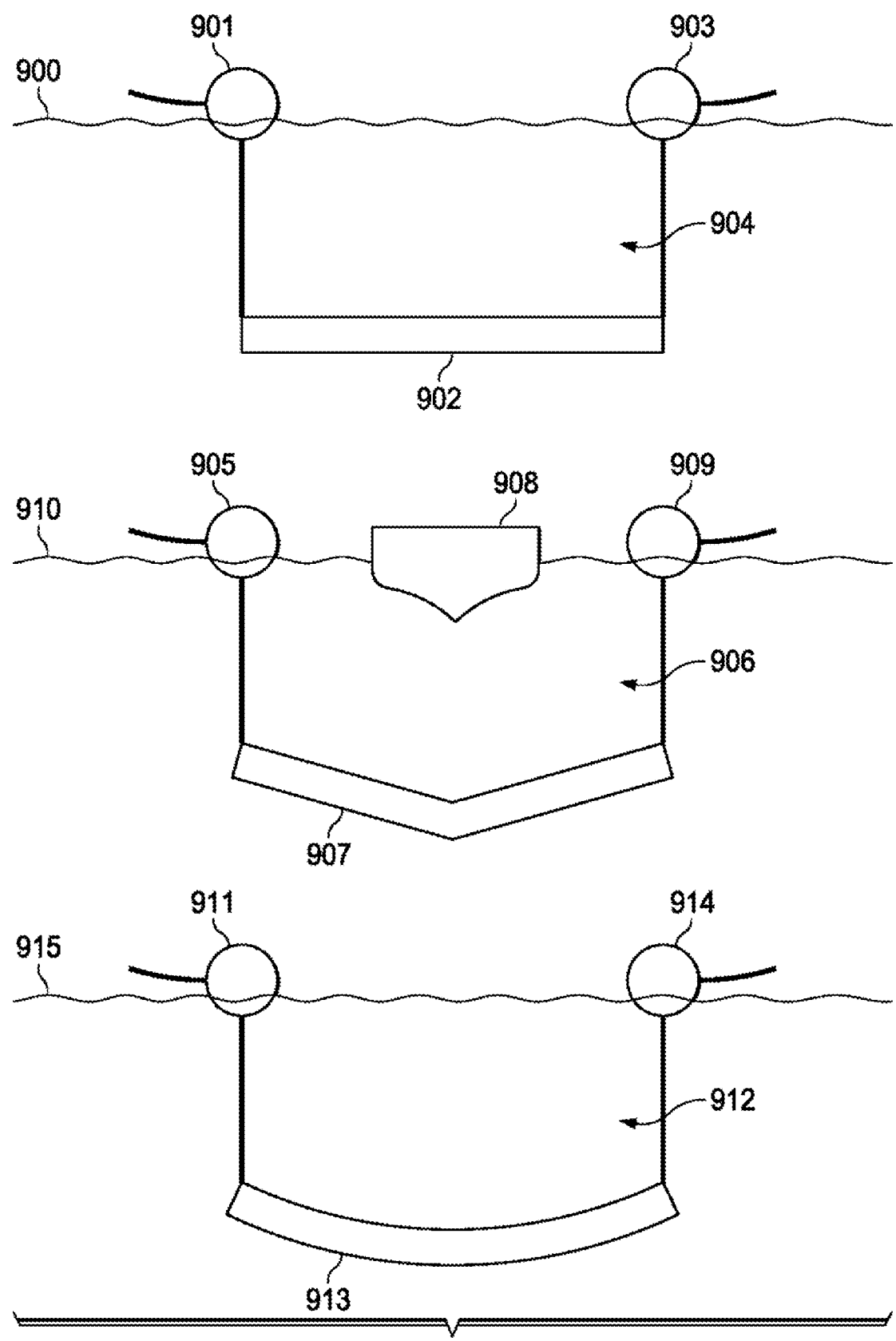
FIG. 8 is a schematic diagram of a seventh embodiment of the present invention.

FIG. 8 is an illustration of examples of "wide" and/or "bypass" tensioning mechanisms. The types of bypass tensioning mechanisms that fall within the scope of this disclosure include, but are not limited to, the examples provided in this illustration. In addition to other designs and configuration which will be obvious to those skilled in the art, such bypass tensioning mechanisms can utilize a linear, horizontal weight 902 (e.g. a pipe). They can also utilize a "v-shaped" weight 907, or a curved weight 913.

Figure 9:
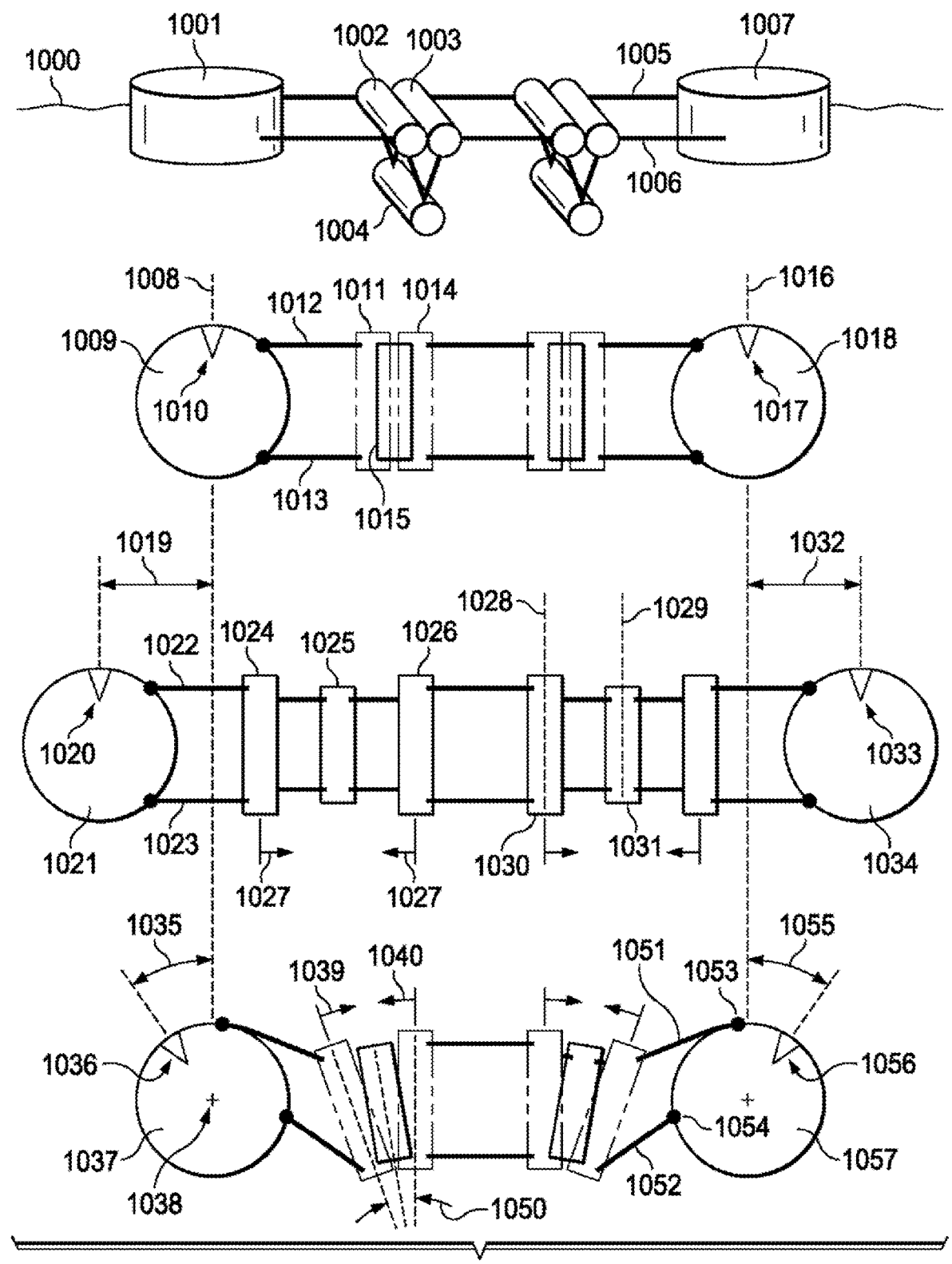
FIG. 9 a schematic diagram of an eighth embodiment of the present invention.

FIG. 9 is a farm formation that illustrates the use of tensioning mechanisms that not only regulate, restore, and resist deviations from, the nominal distances by which elements (operational or otherwise) are separated laterally or horizontally, but also regulate, restore, and resist deviations from, the nominal relative angular orientations of the associated elements (operational or otherwise). The top illustration in FIG. 9 is a perspective view. The other three illustrations are top-down views. The operational elements 1009 and 1018, and their associated tensioning mechanisms (e.g. a combination of 1011, 1014 and 1015) are in their relaxed, nominal relative positions and relative angular orientations. The angular orientations of the operational elements are illustrated through the inclusion of wedge-shaped markings 1010 and 1017 at 12-o'clock radial positions 1008 and 1016. These operational elements, and their intermediate tensioning mechanisms, are connected by means of two (i.e. upper and lower) connectors, e.g. 1012 and 1013.

If the tensioning mechanisms are long enough with respect to the normal of the longitudinal axis of the connection and/or the connector in which they are embedded, then unequal extensions of the connections at each of its ends will result in a "turning" or rotation of the components of the tensioning mechanisms. Thus, while one "end" of a tensioning mechanism will hardly, if at all, raise its associated weight, or portion of a shared weight, the other end may raise its weight, or portion of a shared weight, to a relatively great extent. The resulting stored gravitational potential energy, and the resulting restoring force, with respect to each of the two connections (e.g. upper and lower, e.g. 1051 and 1052) will be unequal and will tend to cause the rotation of the adjacent elements back to their nominal relative angular orientations.

A linear separation of the operational elements beyond 1019 and 1032, i.e., the critical distance, results in a linear extension of the tensioning mechanism, e.g. 1024-1026, resulting in the creation of a linear restoring force, e.g. 1027, which will tend to pull the elements back together until the operational elements 1021 and 1034 are no further apart than their nominal separation distance. A relative rotation of one or both operational elements 1037 and 1057 relative to the longitudinal axis of the connection between them will cause a non-linear extension of the tensioning mechanisms, e.g. 1051 and 1052, and will tend to restore the original nominal relative angular orientations of the other elements, e.g. 1037 and 1057.

A similar "angular restorative tether" may be constructed and/or configured through the use of two "separation restorative tethers" attached to a pair of operational elements such that they are approximately parallel. Angular displacements will result in unequal biasing restorative forces within each tether that will tend to restore the nominal inert angular orientation.

Figure 10:
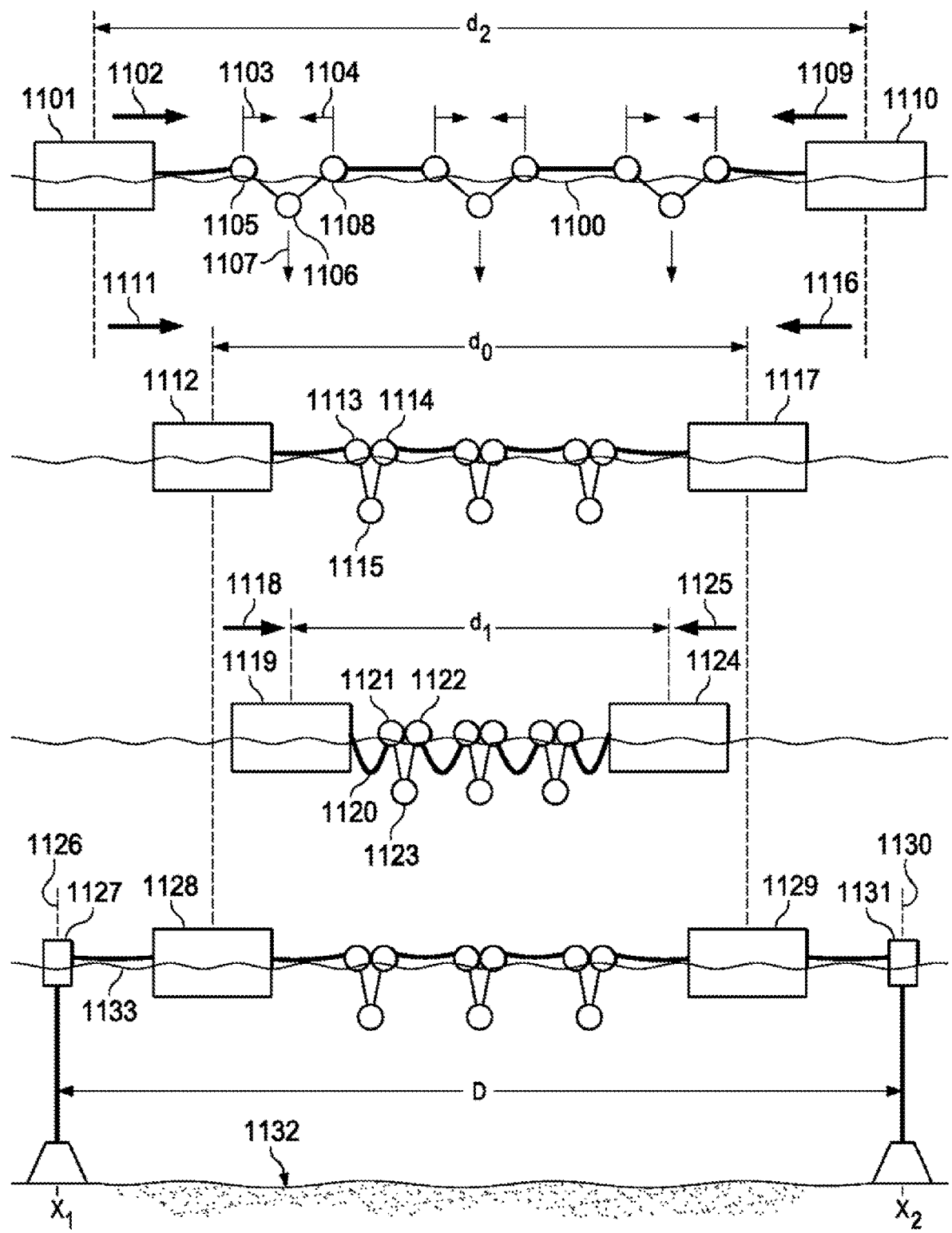
FIG. 10 a schematic diagram of a ninth embodiment of the present invention.

FIG. 10 is a farm formation that illustrates two important features and/or consequences of the current disclosure. While an overextended assembly, e.g. 1101 and 1110, will tend to shorten as a consequence of the buoyancy-related potential energy stored by intervening tensioning mechanism (e.g. the combination of 1105, 1106 and 1108), a tensioning mechanism alone will not prevent elements, especially operational elements 1119 and 1124 from moving to separations less than, and even far less than, their nominal desired separations—even to the point at which they collide.

In the absence of "anchoring elements", such as 1127 and 1131 (lower illustration), the form, structure, and desired relative and/or absolute positioning of elements may be compromised and lost through undesirable reductions in inter-elemental separations. For this reason, the strategic inclusion of anchoring elements in a farm formation is highly desirable. Anchoring elements such as anchors and/or pylons, can provide "absolute" positional stability (e.g. relative to locations on a seafloor or a lake bed). And, anchoring elements such as dynamically and/or passively propelled elements (e.g. motorized vessels, wave-propelled buoys, etc.) can either provide purely relative positional stability to a farm formation (e.g. by pulling other elements in a particular direction) or, through the use of, and response to, indicators of absolute positions can provide absolute positional stability.

Figure 11:
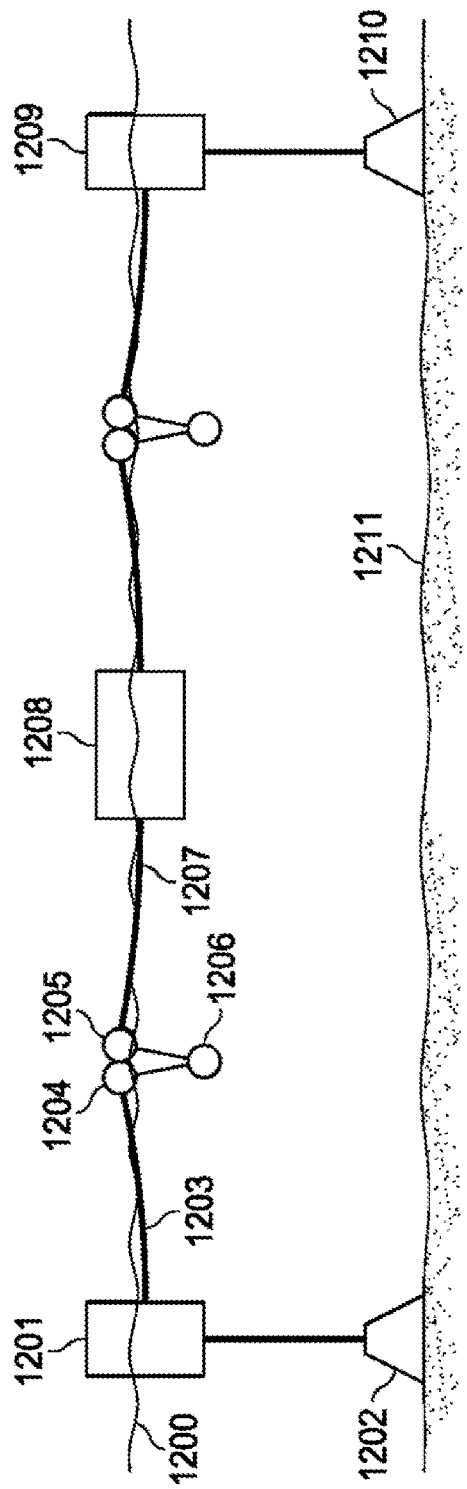
FIG. 11 is a schematic diagram of a tenth embodiment of the present invention.

FIG. 11 is a farm formation that illustrates the use of anchoring elements 1201 and 1209 composed of deadweight anchors 1202 and 1210, respectively, and corresponding floats 1201 and 1209, respectively. These anchoring elements fix, at least to an approximate degree, the absolute positions of the interconnected tensioning mechanism (e.g. a combination of 1204-1206) and operational 1208 elements.

Figure 12:
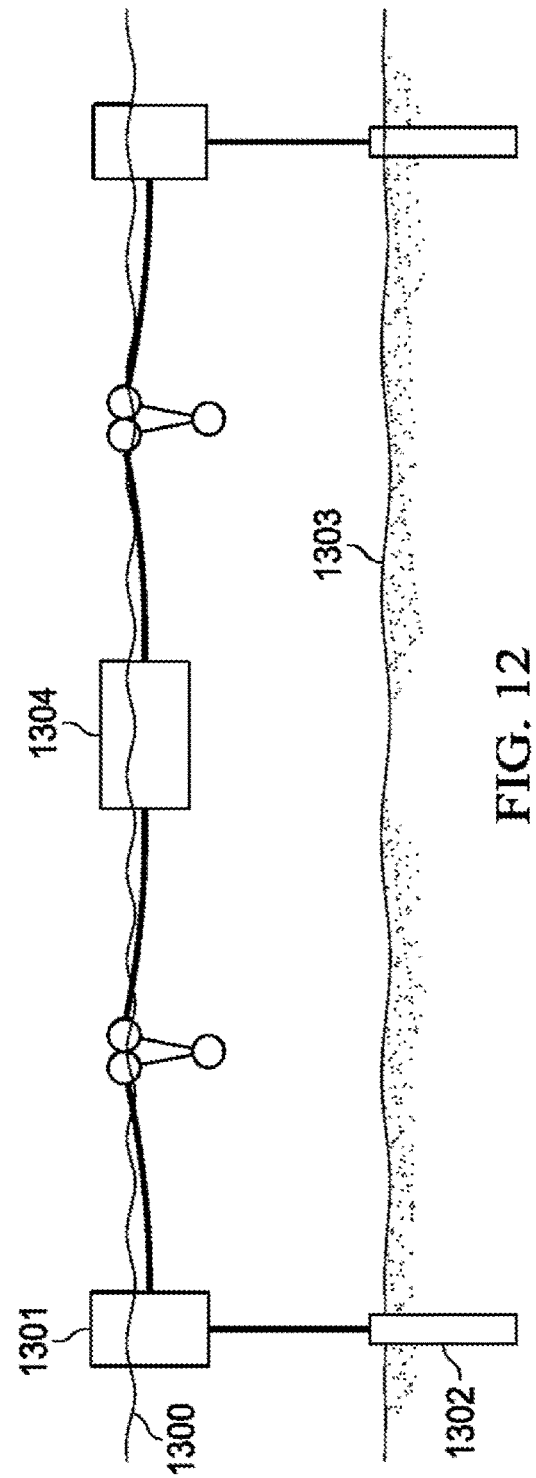
FIG. 12 a schematic diagram of an eleventh embodiment of the present invention.

FIG. 12 is a farm formation illustrating the use of anchoring elements composed of pylons, e.g. 1302, embedded in the ground 1303, e.g. in the seafloor or a lake bed, and corresponding mooring buoys, e.g. 1301, respectively. These anchoring elements fix, at least to an approximate degree, the absolute positions of the interconnected tensioning and operational 1304 elements.

Figure 13:
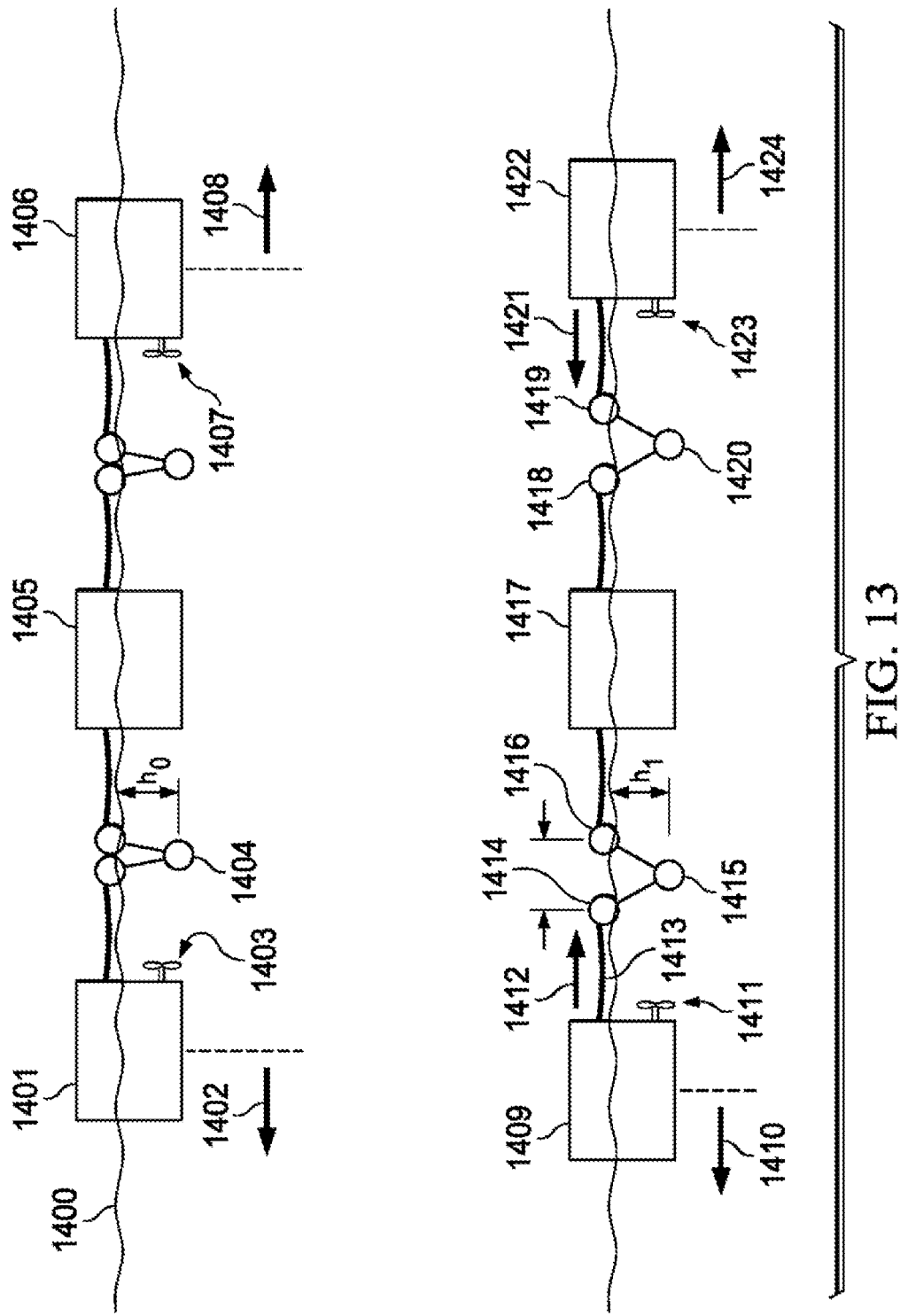
FIG. 13 is a schematic diagram of a twelfth embodiment of the present invention.

FIG. 13 is farm formation illustrating the use of anchoring elements composed of self-propelled vessels and/or buoys 1401 and 1406 which use motorized propellers 1403 and 1407, respectively, to pull away from the center of the farm formation and thus prevent the "collapse" of its nominal structure and separation of elements. These anchoring elements fix, at least to an approximate degree, the relative positions of the interconnected tensioning and operational 1405 elements.

These anchoring elements 1409 and 1422 pull against their associated tensioning mechanisms 1414-1416 and 1418-1420 causing a sustained and slight tension within them. As the operational element 1417 moves back-and-forth between the anchoring elements 1409 and 1422 the excessive separation of the anchoring elements is corrected by the tensioning mechanisms. This illustrated farm formation is free to drift. The anchoring elements, which tend to pull the assembly apart, complement the tensioning mechanisms, which tend to pull it together. The tension between these opposing, but complementary, elements acts to preserve the formation of the farm by protecting, maintaining, and/or restoring, the nominal separation of the anchoring elements with respect to both over-extensions and sub-nominal separations.

If the anchoring elements 1409 and 1422 are equipped with the capability to detect and/or monitor their geospatial locations, e.g. their latitude and longitude, and with the ability to control the magnitudes and/or directions of their respective thrusts, then the farm formation, and the anchoring elements therein, will be able to maintain both the farm formation's relative shape, width, and/or diameter, as well as its absolute geospatial position and/or location.

Figure 14:
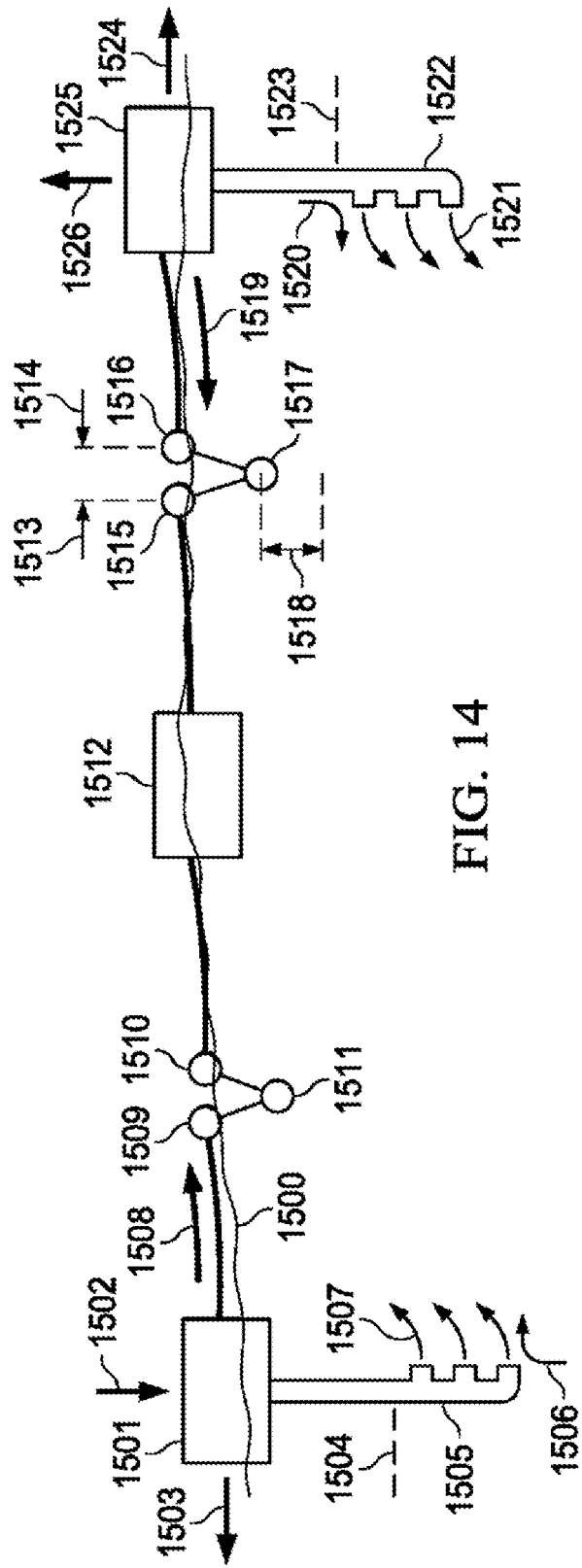
FIG. 14 a schematic diagram of a thirteenth embodiment of the present invention.

FIG. 14 is an illustration of a farm formation incorporating two anchoring elements 1501 and 1525, two tensioning mechanisms 1509-1511 and 1515-1517, and one operational element 1512. The anchoring elements generate thrust, that draws apart the interconnected elements, through the use of flaps, e.g. 1507, that are positioned below the wave base 1504 such that as the anchoring elements 1501 and 1525 are moved up and down due to wave action, the flaps bend and/or flex and thereby generate a thrust away from the assembly's center. This thrust partially extends the tensioning mechanisms. Any lateral dislocation of the operational element allows one tensioning mechanism to relax while exacerbating the extension of the other. The elements of the assembly then recover their nominal relative separations through the lateral forces imparted to the connections as the potential energy stored in the tensioning mechanisms restores its equilibrium.

If the angular orientations, the ranges of rotation and/or flexing, and/or the resistance, of the flaps can be controlled and/or otherwise regulated or adjusted, then the adjustment of such flap thrust-generating attributes in response to an indicator and/or sensor of each anchoring element's absolution location (e.g. by GPS) can be used to fix, at least to an approximate degree, the absolute position of the assembly.

The illustrated assembly can only control its relative width and/or separation. And, if appropriately controlled (e.g. in conjunction with GPS) it can only control its absolute position with respect to lateral adjustments. However, if the assembly were modified to include one or more anchoring elements that were attached to the assembly along axes and/or with respect to connectors that were oriented, at least in part, in directions normal to the existing onedimensional connector axis, then the resulting "two-dimensional" assembly (relative to the plane of the surface 1500 of the body of water on which it floats) could maintain its absolute position on the surface 1500 of the respective body of water with respect to any geospatial coordinates (e.g. latitude and longitude).

Figure 15:
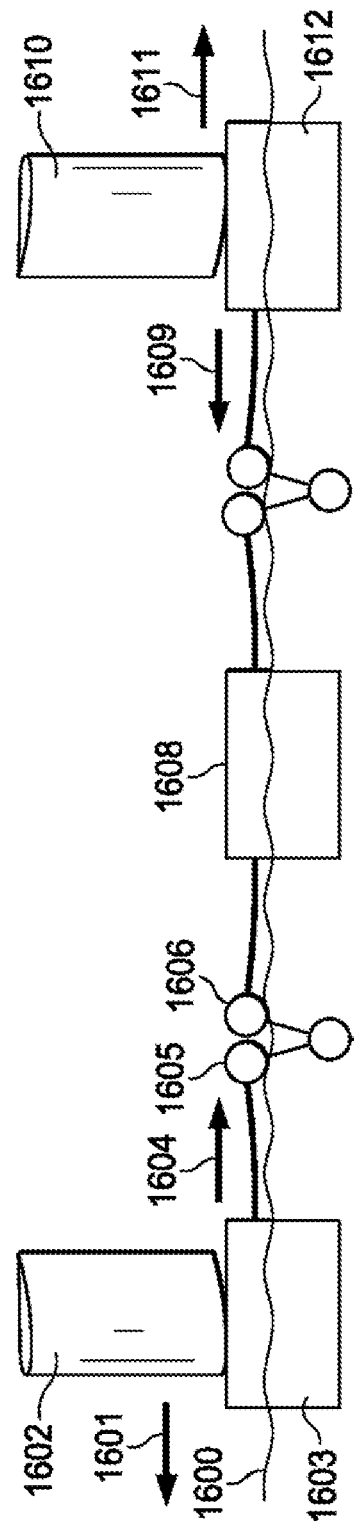
FIG. 15 a schematic diagram of a fourteenth embodiment of the present invention.

FIG. 15 is an illustration of an embodiment of the invention similar to the embodiment illustrated in FIG. 14. The illustrated embodiment differs from the one illustrated in FIG. 14 in that the anchoring elements 1603 and 1612 are powered and/or driven by wind, through the use of rigid sails 1602 and 1610, respectively, rather than by the heave of waves. All of the characteristics, features, and behaviors discussed in relation to the embodiment illustrated in FIG. 14 would also apply to this embodiment. However, instead of generating thrust and maintaining the relative separation and/or absolute position of the assembly by means of thrust (perhaps differential thrust) generated by heave-driven flaps, this embodiment would generate thrust and maintain the relative separation and/or absolute position of the assembly by means of thrust (perhaps differential thrust) generated by wind passing over rigid sails 1602 and 1610, and that thrust would be regulated through the rotation of the rigid sails about their vertical axes of rotation.

Figure 16:
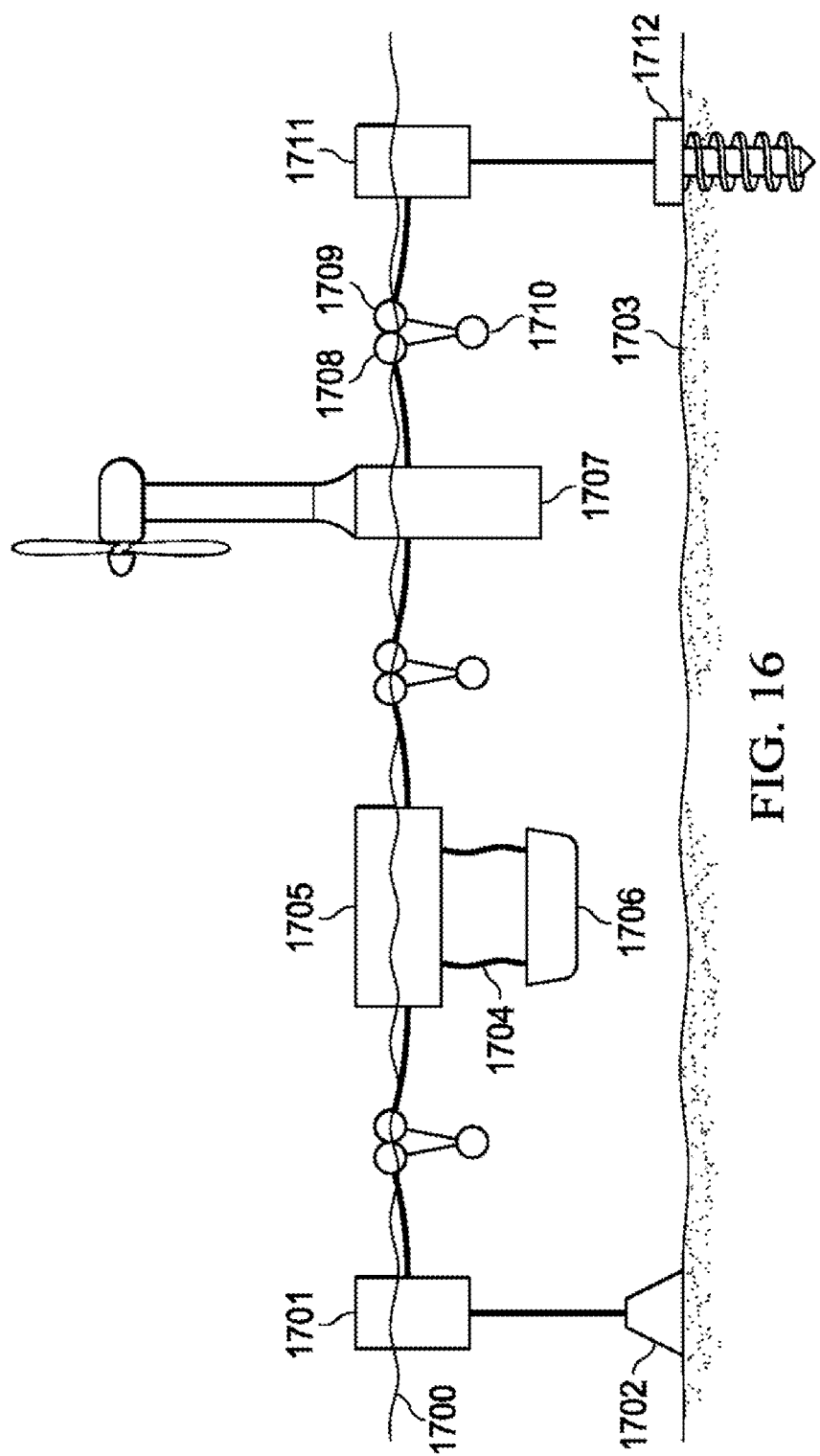
FIG. 16 is a schematic diagram of a fifteenth embodiment of the present invention.

FIG. 16 is an illustrated embodiment that includes two anchoring elements, one of which is composed of a deadweight anchor 1702 and an attached mooring buoy 1701, and the other of which is composed of a "screw-shaped" pylon 1712 driven and/or screwed into the ground 1703 (e.g. into the seafloor) and an attached mooring buoy 1711. It also includes a tensioning mechanism (e.g. the combination of 1708-1710) and two operational elements. One operational element is composed of a flotation module 1705 and an attached submerged module 1706 that is suspended beneath it. Such an operational element might be useful for the culturing of mussels. Alternately, the submerged module 1706 might serve as a vertical sea anchor or heave plate, and the heave of waves might lift the flotation module 1705 allowing energy to be extracted through the forces applied to the connectors 1704 that connect the submerged and floating modules. The other operational module 1707 is a floating wind turbine.

Figure 17:
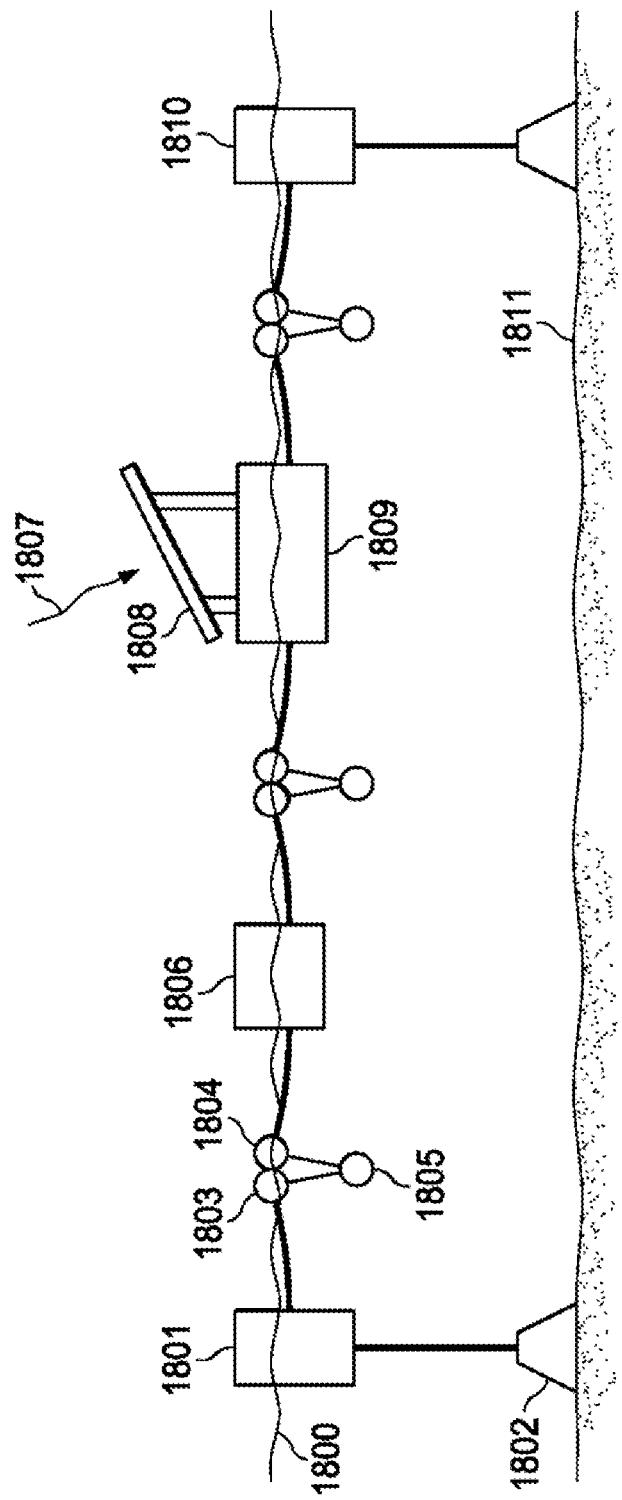
FIG. 17 a schematic diagram of a sixteenth embodiment of the present invention.

FIG. 17 is an illustrated embodiment that includes two anchoring elements, each of which is composed of a deadweight anchor, e.g. 1802, and an attached mooring buoy, e.g. 1801. It also includes a tensioning mechanism (e.g. the combination of 1803-1805) and two operational elements. One operational element is composed of a flotation module 1806 that might house communications equipment, a sonar system, a refinery device that extracts metals from the water, equipment supporting processing related to aquaculture endeavors and/or marine harvesting, electronics used to aid navigation, equipment supporting the detection and/or monitoring of marine organisms, etc.

The other operational module is a floating solar energy harvesting device. It incorporates a flotation module 1809, a panel of solar cells 1808, and is powered by incident sunlight. Note the utility of deploying such a solar-collecting device 1808-1809 in a farm that utilizes tensioning mechanisms (like the ones discussed in relation to FIG. 9) that maintain not only the relative separations and/or absolute positions of elements, but also their relative and/or absolute (e.g. with respect to magnetic north/south) angular orientations.

Figure 18:
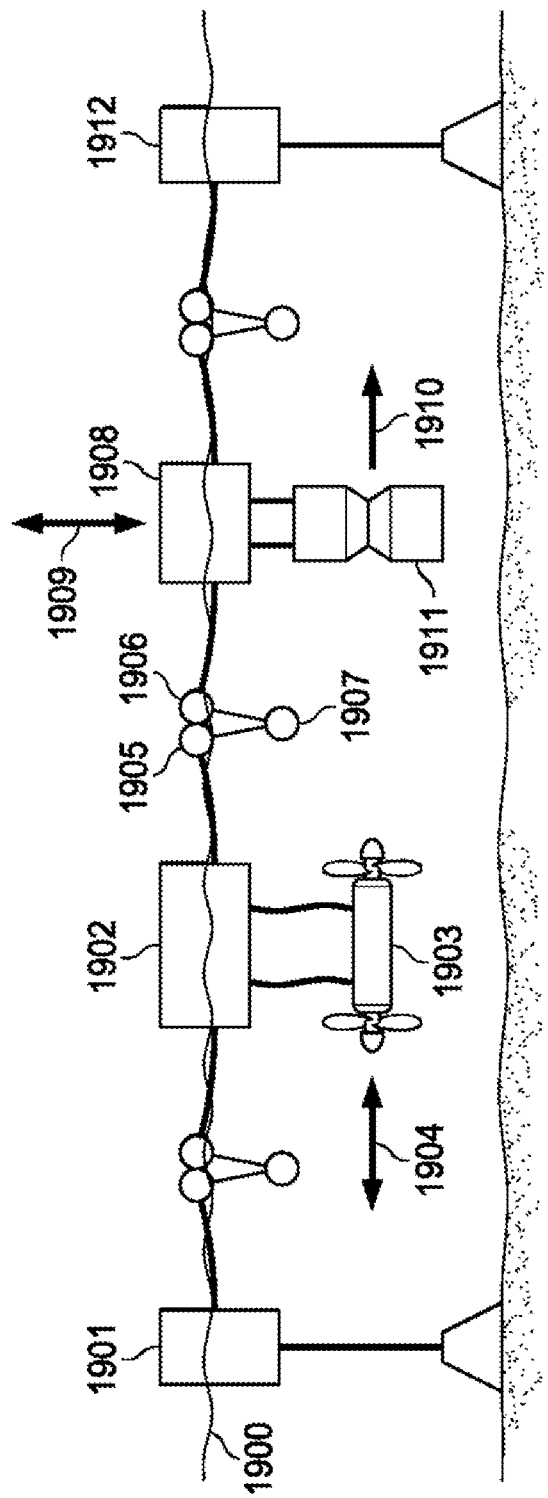
FIG. 18 is a schematic diagram of a seventeenth embodiment of the present invention.

FIG. 18 is an illustrated embodiment that includes two anchoring elements, a tensioning mechanism (e.g. the combination of 1905-1907), and two operational elements. One operational element is composed of a flotation module 1902 below which is attached and/or suspended a tidal, ocean current, and/or river flow turbine 1903 that extracts energy from lateral currents (e.g. tide-induced). The other operational module is a wave energy device that extracts energy from the heave of passing waves through the associated up-and-down motion of a Venturi tube 1911 containing a hydrokinetic turbine in its throat, said tube being located adjacent to or below the wave base 1910. The unfettered up-and-down motion of elements facilitated in the current disclosure are advantageous to the mooring of wave energy devices since they allow relatively unfettered movement of the devices while preserving their approximate nominal geospatial locations.

Figure 19:
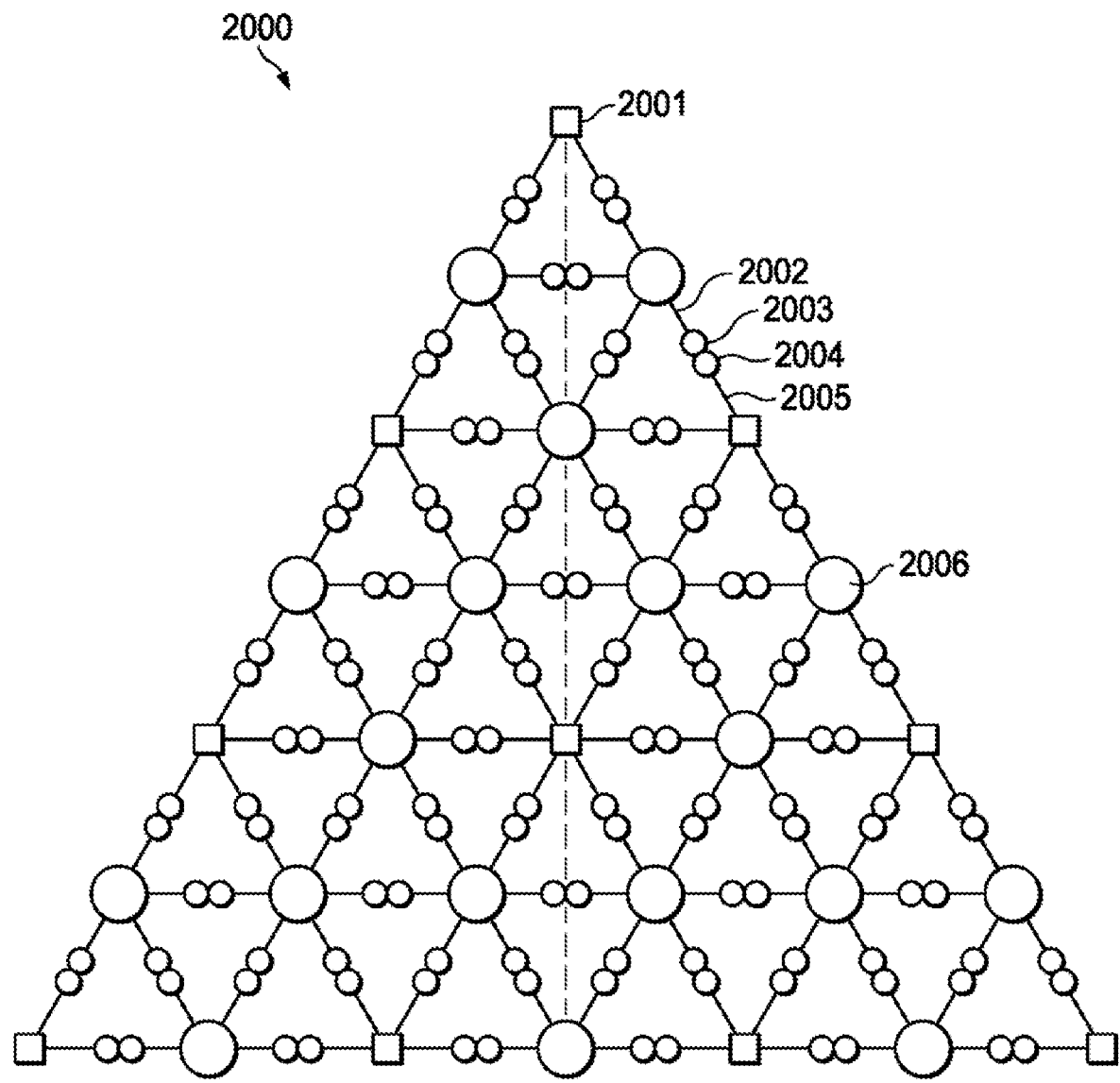
FIG. 19 a schematic diagram of an eighteenth embodiment of the present invention.

FIG. 19 illustrates a farm formation composed of ten anchoring elements, e.g. 2001, eighteen operational elements, e.g. 2006, and sixty-three tensioning mechanisms, e.g. 2003-2004. These various elements are joined together and/or connected by means of tethers, e.g. 2002 and 2005. This farm formation is organized into a triangular deployment and/or layout pattern which allows the shape and/or internal relative separations of the various elements to be maintained efficiently. This type and/or pattern of farm formation would be conducive to the use of anchoring elements that incorporate permanent linkages to the ground (e.g. to the seafloor), e.g. by means of anchors and/or pylons. Although this type of farm layout could also be associated with, and maintained by, floating self- or environmentally-propelled vessels.

Figure 20:
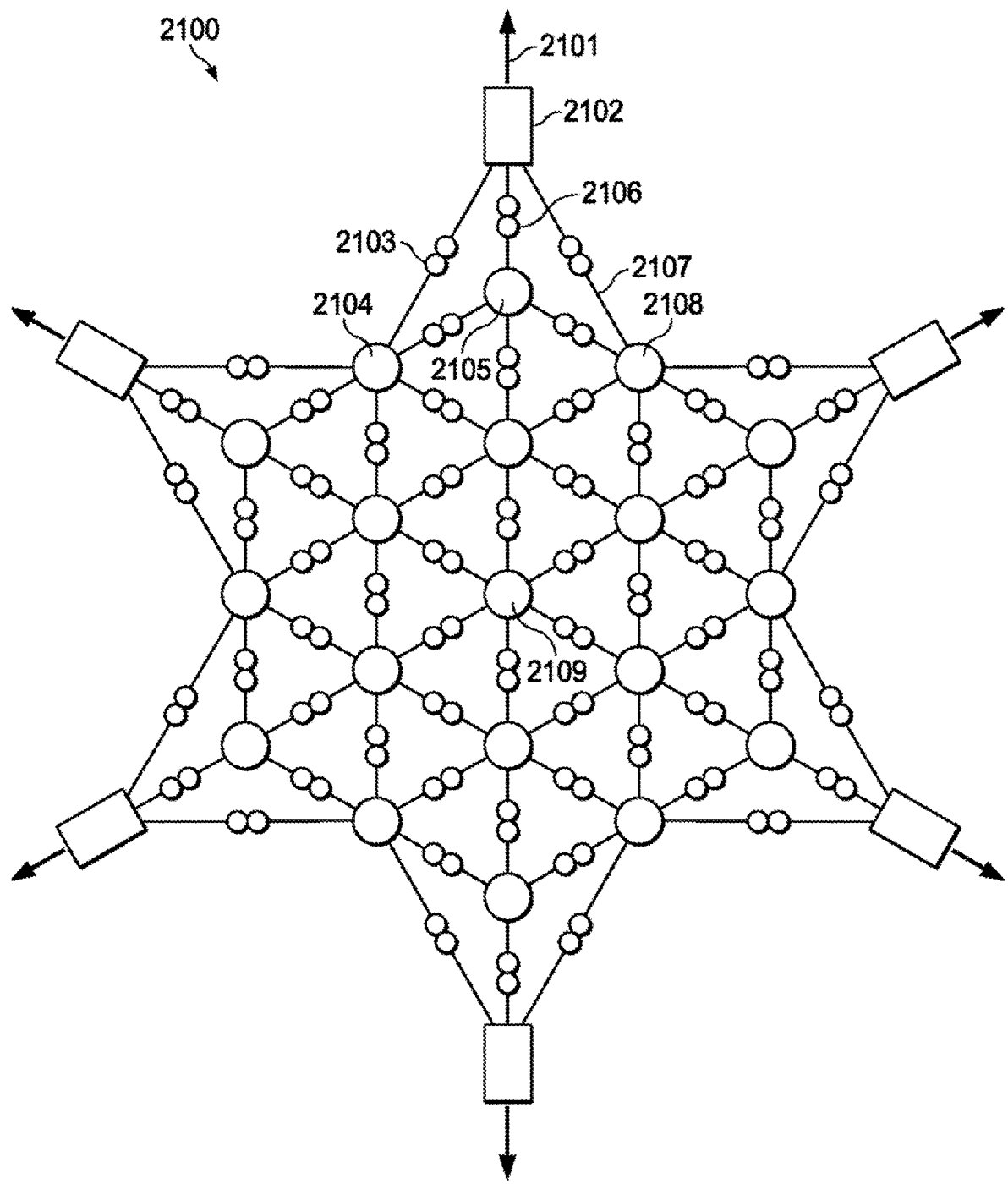
FIG. 20 a schematic diagram of a nineteenth embodiment of the present invention.

FIG. 20 illustrates a farm formation floating adjacent to the surface 2100 of a body of water and composed of six anchoring elements, e.g. 2102, nineteen operational elements, e.g. 2104, and a variety of tensioning mechanisms, e.g. 2103. These various elements are joined together and/or connected by means of tethers, e.g. 2107. This farm formation is organized into a roughly circular deployment and/or layout pattern which allows the shape and/or internal relative separations of the various elements to be maintained efficiently by the six self- and/or environmentally-propelled vessels, e.g. anchoring element 2102, distributed about its perimeter. Note that if some or all of this farm's operational elements were generating electricity, then a portion of that electricity might be used to power some or all of the self-propelled anchoring elements. This type and/or pattern of farm formation would be conducive to a deployment in very deep water where the deployment of anchors and/or pylons would be impractical. Note that some of the operational elements, e.g. 2105, are connected to four other elements, while other operational elements, e.g. 2108, are connected to six other elements.

Figure 21:
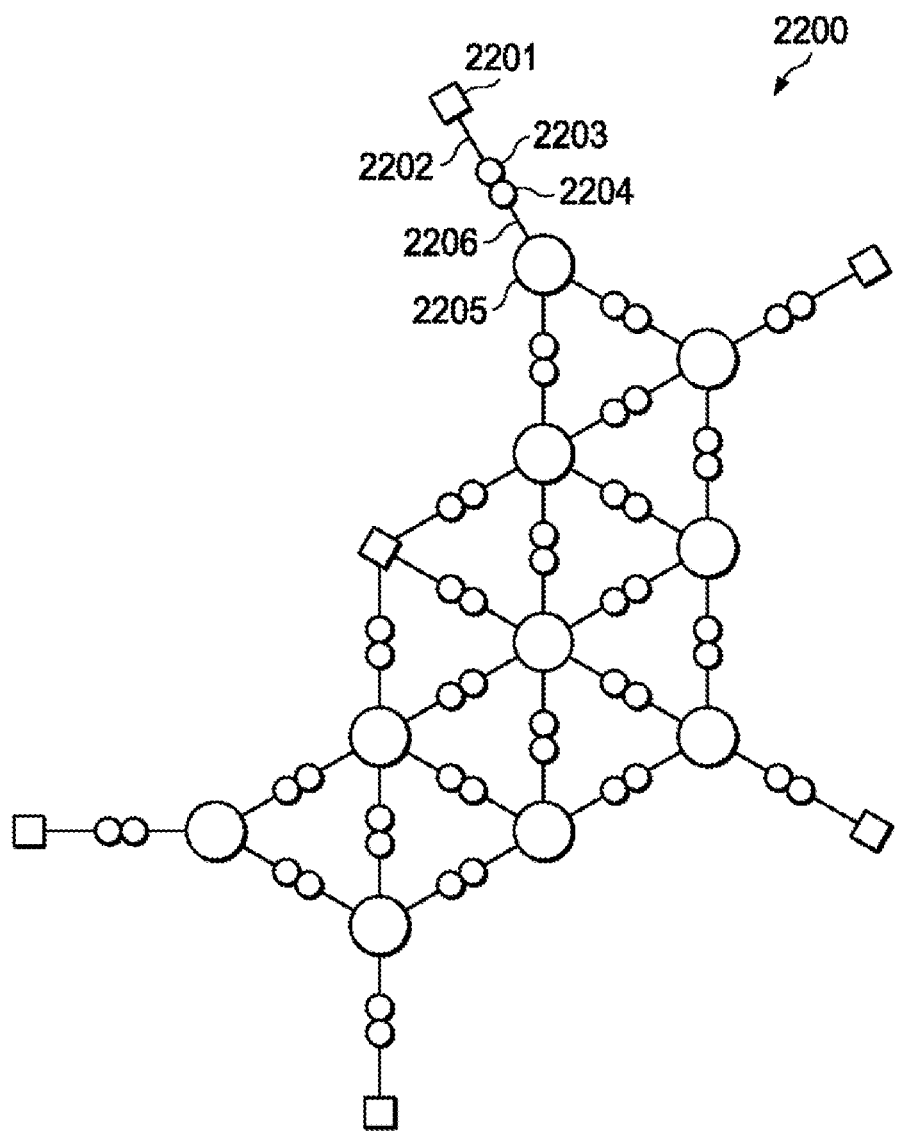
FIG. 21 is a schematic diagram of a twentieth embodiment of the present invention.

FIG. 21 illustrates a farm formation composed of six anchoring elements, e.g. 2201, ten operational elements, e.g. 2205, a variety of tensioning mechanisms, e.g. 2203-2204. These various elements are joined together and/or connected by means of tethers, e.g. 2202 and 2206. This farm formation is organized into a roughly linear and/or rectangular deployment and/or layout pattern which makes the maintenance of the farm shape and/or internal relative separations of the various elements more difficult than would be the case for a circular or triangular farm pattern.

However, if this were a farm of wave energy devices, for example, then this rectangular deployment pattern, if orientated so that its longitudinal or long axis were roughly parallel to a deployment site's prevailing and/or typical wave front, i.e. if the long axis of the farm is approximately normal to the direction from which waves typically approach the farm, then the operational elements will be exposed to more of the available wave front, and more wave energy, than if they were deployed in a circular deployment pattern. With respect to a farm in which many devices are deployed in a "thick," e.g. circular, deployment pattern, those devices that first encounter a wave may diminish the energy available to, and/or will "shade," at least some of the other "downstream" devices.

Figure 22:
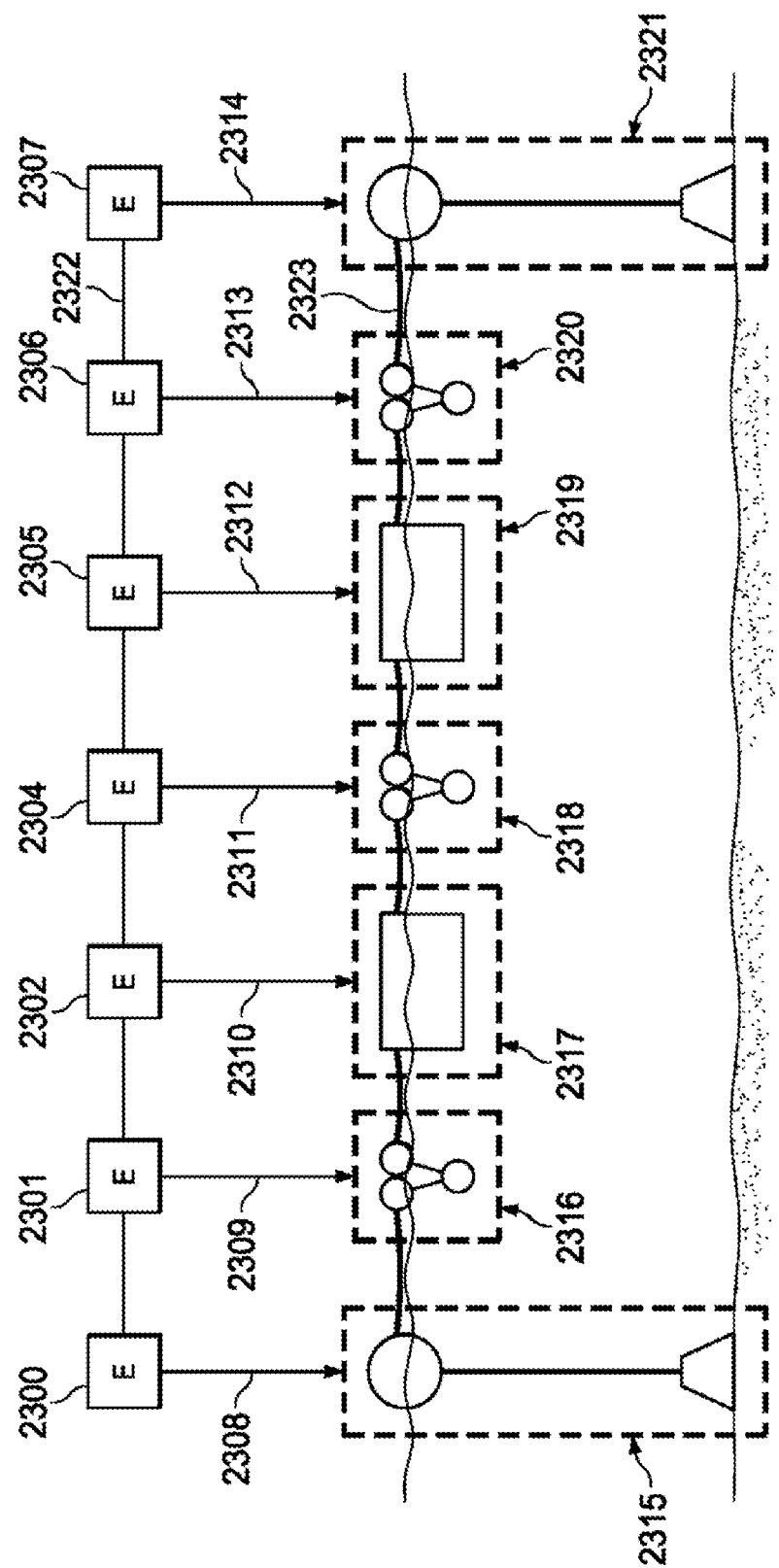
FIG. 22 a schematic diagram of an eleventh embodiment of the present invention.

FIG. 22 is an illustration of a method for describing and/or discussing embodiments of the invention disclosed herein. A farm may, at least approximately, be described in terms of how many "elements", 2300-2307, it contains, and the manner in which those constituent elements are connected and/or interconnected. FIG. 22 illustrates an "elemental farm layout" 2300-2307 in which seven elements are connected one-to-another in a linear fashion. Each element in the layout is represented symbolically as a box with an upper-case "E" inside. Each symbolic element in the elemental farm layout can then be associated with a categorical and/or specific elemental type. For example, the mapping of each element in the elemental farm layout 2300-2307 is mapped to a specific type of element in FIG. 22.

Elements 2300 and 2307 are mapped to anchoring elements 2315 and 2321, respectively. Elements 2301, 2304, and 2306 are mapped to tensioning mechanisms. And, elements 2302 and 2305 are mapped to operational elements (buoyant objects) 2317 and 2319, respectively. Thus one way (but certainly not the only way) to specify an embodiment of the invention disclosed herein is to specify an element farm layout and to specify the mapping of each element to a corresponding category, type and/or specific instance of (an) element.

Figure 23:
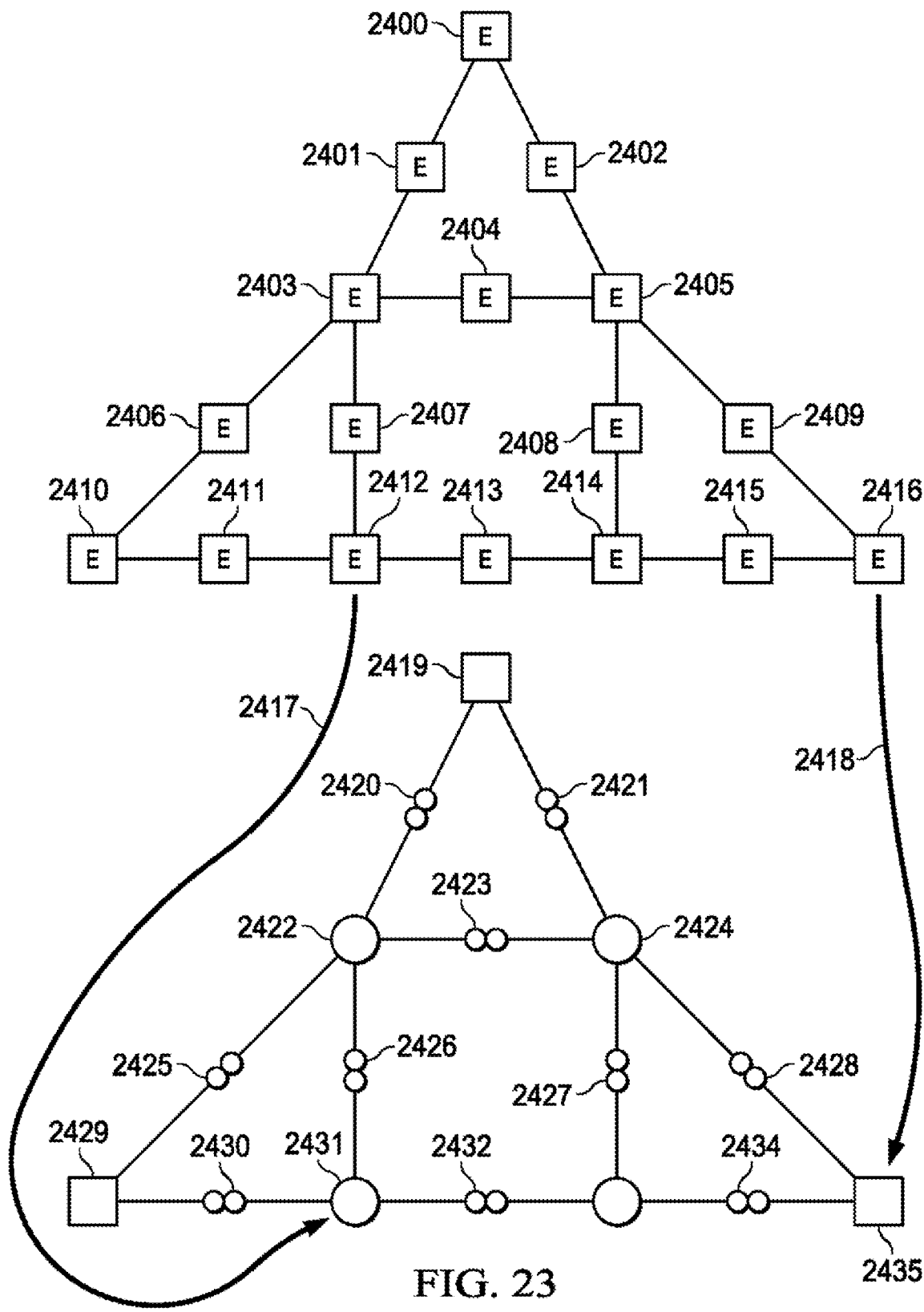
FIG. 23 is a schematic diagram of another embodiment of the present invention.

FIG. 23 is an illustration of a method for describing and/or discussing embodiments of the invention disclosed herein. A farm, or farm layout or topology, may be, at least approximately, described in terms of how many "elements", 2400-2416, it contains, and the manner in which those constituent elements are connected and/or interconnected. FIG. 23 illustrates an "elemental farm layout" 2400-2416 in which seventeen elements are connected and interconnected so as to form a roughly triangular shape, and containing four chordless loops. Each element in the layout is represented symbolically as a box with an upper-case "E" inside. Each symbolic element in the elemental farm layout can then be associated with a categorical and/or specific elemental type. For example, the mapping of each element in the elemental farm layout 2400-2416 is mapped to a specific type of element in FIG. 23.

Elements 2400, 2410, and 2416 are mapped to anchoring elements 2419, 2429, and 2435, respectively. Elements 2401-2402, 2404, 2406-2409, 2411, 2413, and 2415 are mapped to tensioning mechanisms 2420-2421, 2423, 2425-2428, 2430, 2432, and 2434, respectively. And, elements 2403, 2405, 2412, and 2414 are mapped to operational elements 2422, 2424, 2431, and 2433, respectively. The "elemental farm layout" illustrated in FIG. 23 has a triangular shape, and four "loops" or "chordless loops". Elements 2400-2405 compose one loop in which the connections and the elements therein form a closed loop. In the case of loop 2400-2405, the loop has a triangular shape. The illustrated elemental farm layout has three triangular loops containing and/or defined by six elements each. It also contains a single square-shaped loop 2403-2405, 2407-2408, and 2412-2414.

Figure 24:
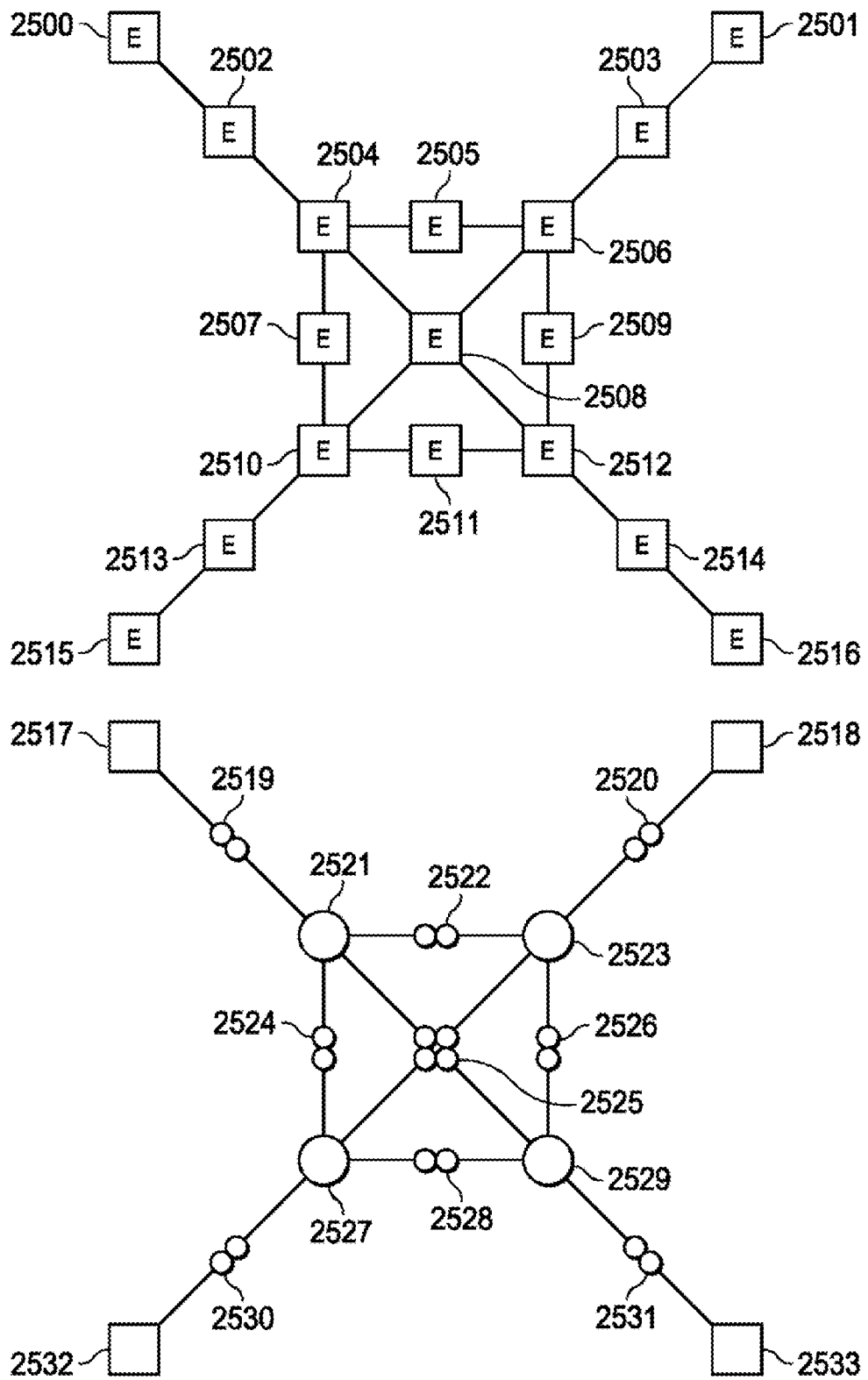
FIG. 24 a schematic diagram of another embodiment of the present invention.

FIG. 24 is an illustration of a method for describing and/or discussing embodiments of the invention disclosed herein. A farm may be, at least approximately, described in terms of how many "elements", 2500-2516, it contains, and the manner in which those constituent elements are connected and/or interconnected. FIG. 24 illustrates an "elemental farm layout" 2500-2516 in which seventeen elements are connected and interconnected so as to form a roughly square shape, and containing four chordless loops, e.g. 2504-2506, and 2508 form one loop. The illustrated layout also contains elements and related connections, e.g. 2500 and 2502, that do not belong to a loop. Each element in the layout is represented symbolically as a box with an upper-case "E" inside. Each symbolic element in the elemental farm layout can then be associated with a categorical and/or specific elemental type. For example, the mapping of each element in the elemental farm layout 2500-2516 is mapped to a specific type of element in FIG. 24. Elements 2500-2501 and 2515-2516 are mapped to anchoring elements 2517-2518 and 2532-2533, respectively. Elements 2502-2503, 2505, 2507-2509, 2511, and 2513-2514 are mapped to tensioning mechanisms 2519-2520, 2522, 2524-2526, 2528, and 2530-2531, respectively. And, elements 2504, 2506, 2510, and 2512 are mapped to operational elements 2521, 2523, 2527, and 2529, respectively.

Figure 25:
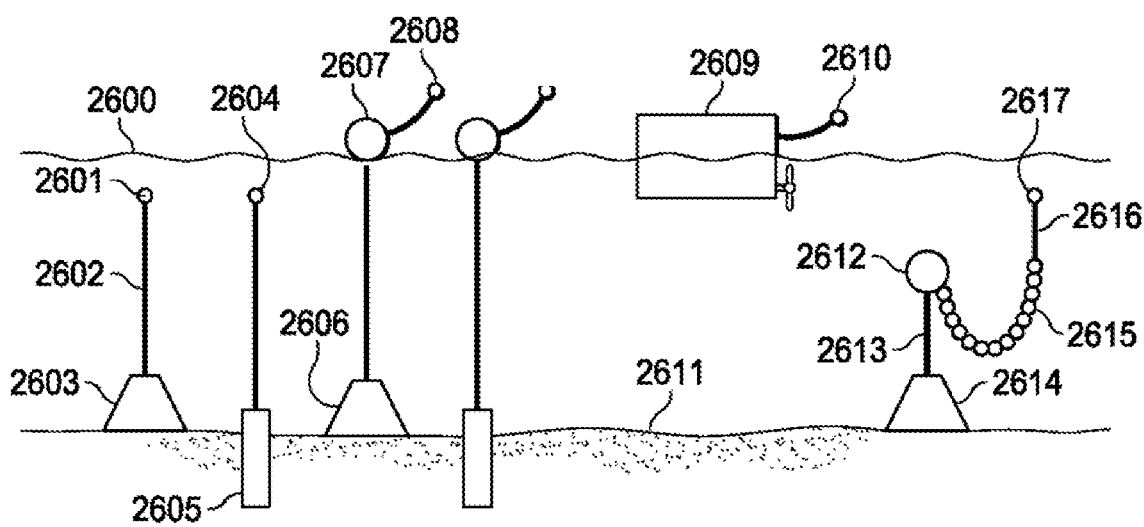
FIGS. 25-27 are schematic diagrams of another embodiment of the present invention.

FIG. 25 is an illustration of possible anchoring elements which might be used in conjunction with, and/or as component elements of, the invention disclosed herein, or in the case of anchoring element 2609-2610, an embodiment of the invention disclosed herein.

The illustrated embodiments are anchoring elements. These anchoring elements are designed to connect to one, and only one, other element. Each anchoring element has an illustrated point of connection, e.g. 2601, 2604, 2608, etc. However, another element, or a connector connected to another element might attach directly to a part or feature on an anchoring element, e.g. it might connect directly to an anchor 2603, to a pylon 2605, etc. One of the illustrated anchoring elements has a submerged buoyant float 2612 attached to an anchor. A weighted chain or other connector is then attached to the float 2612, and that weighted connector or chain is then connected to a connection point 2617 or directly to another element or connector.

Figure 26:
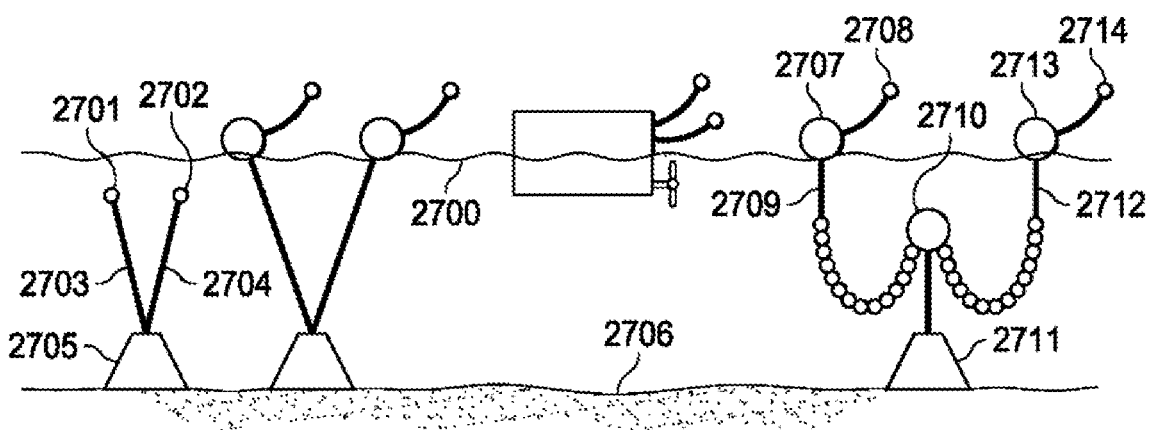

FIG. 26 is an illustration of alternate anchoring elements. These anchoring elements are designed to connect to two other elements. Each anchoring element has two illustrated points of connection, e.g. 2701 and 2702. However, any part or feature on an anchoring element might be connected directly to another element or to another connector.

Figure 27:
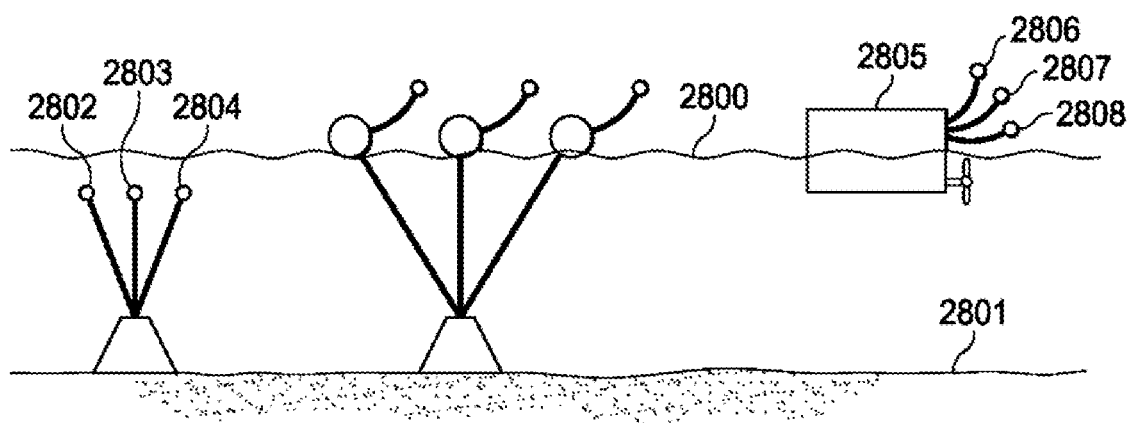

FIG. 27 is an illustration of anchoring elements that are designed to connect to three other elements. Each anchoring element has three illustrated points of connection, e.g. 2802-2804. However, any part or feature on an anchoring element might be connected directly to another element or to another connector. Anchoring elements may be attached, designed to attach, and/or modified or adapted to attach, to one or more other elements, i.e. to any number of other elements.

Figure 28:
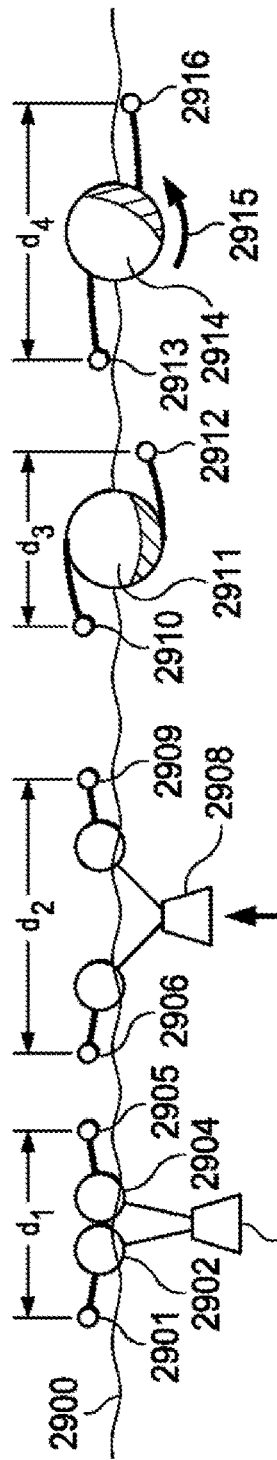
FIGS. 28-30 are schematic diagrams of various buoyant springs.
Figure 29:
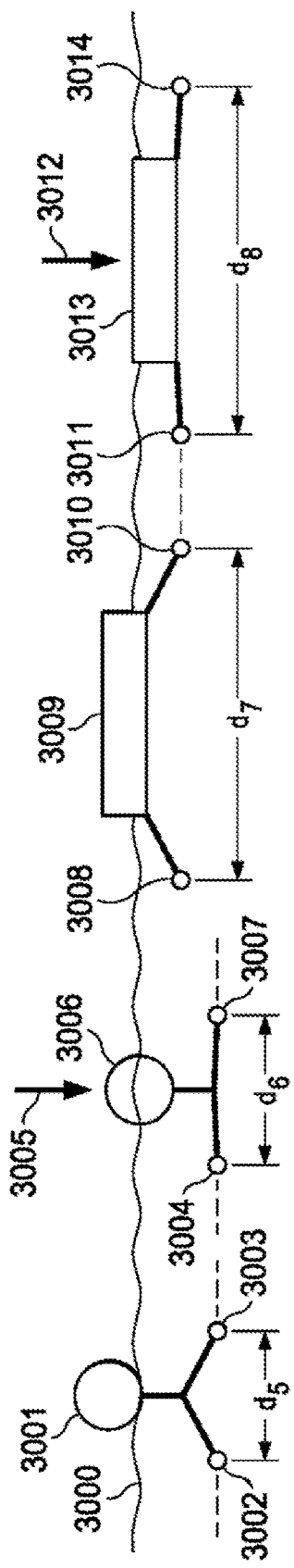
Figure 30:
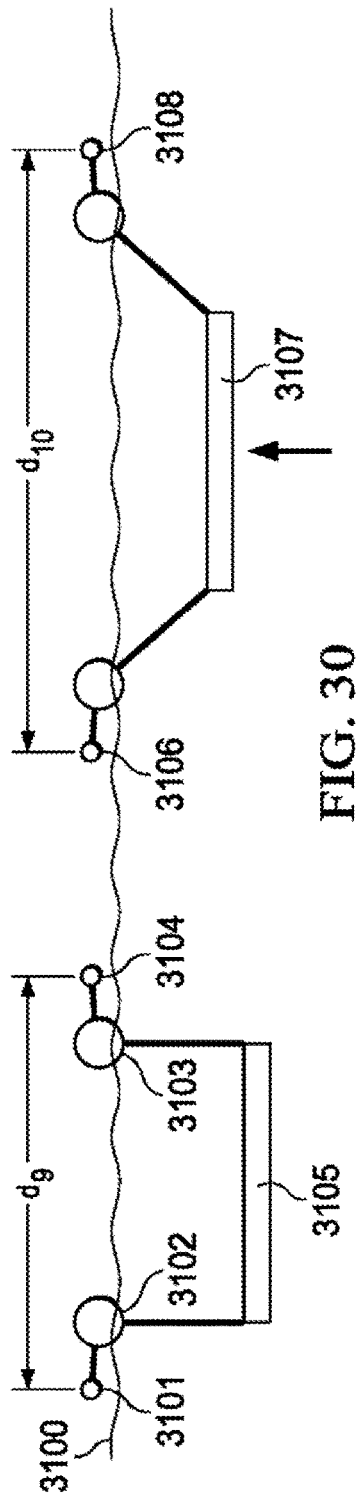

FIG. 28 is an illustration of an alternate tensioning mechanism. The tensioning mechanism is designed to connect to two other elements. FIG. 29 is an illustration of a tensioning mechanism that is designed to connect to two other elements. FIG. 30 is an illustration of embodiments of a "wide" or "bypass" tensioning mechanism. These tensioning mechanisms are designed to connect to two other elements and to facilitate the passage of surface vessels through a farm.

Figure 31:
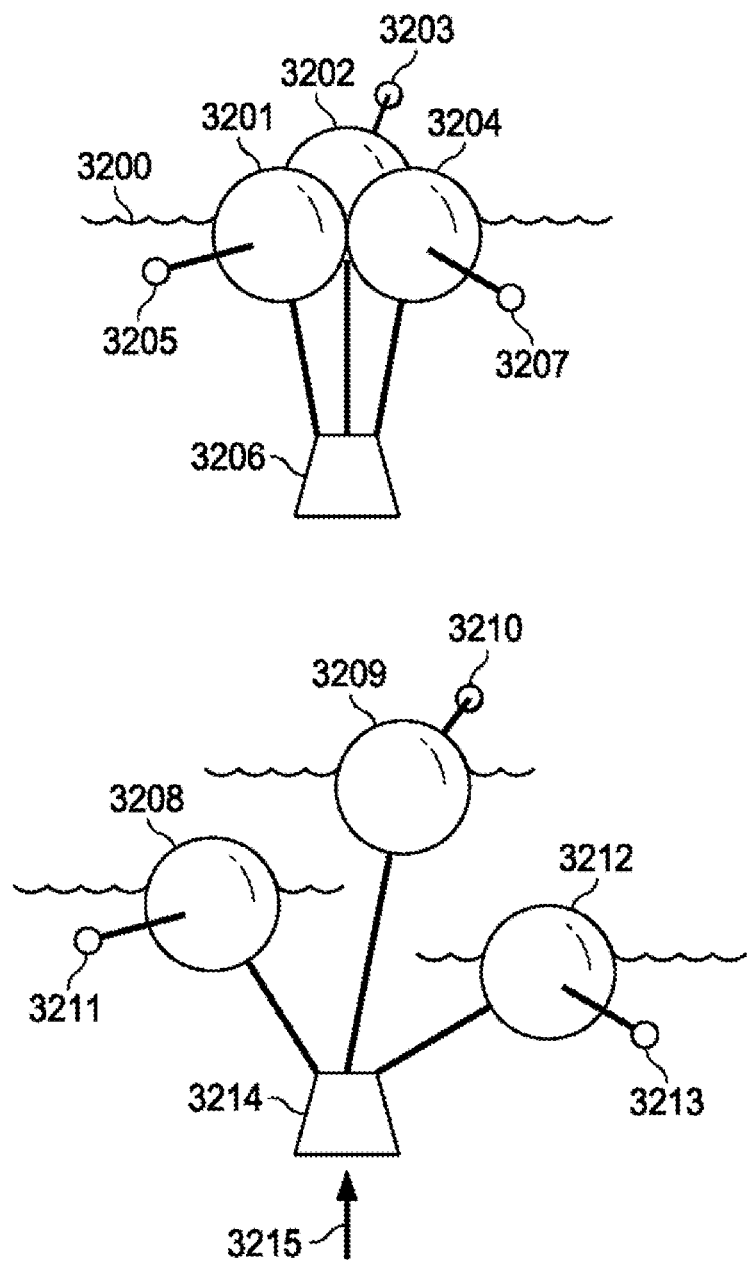
FIG. 31 a schematic diagram of a three-way tensioning mechanism of the present invention.

FIG. 31 illustrates a tensioning mechanism that is designed to connect to three other elements. The upper illustration shows the tensioning mechanism in a relaxed and non-extended configuration. The lower illustration shows the tensioning mechanism in an extended configuration, wherein a shared weight has been raised 3215 from its nominal depth.

Figure 32:
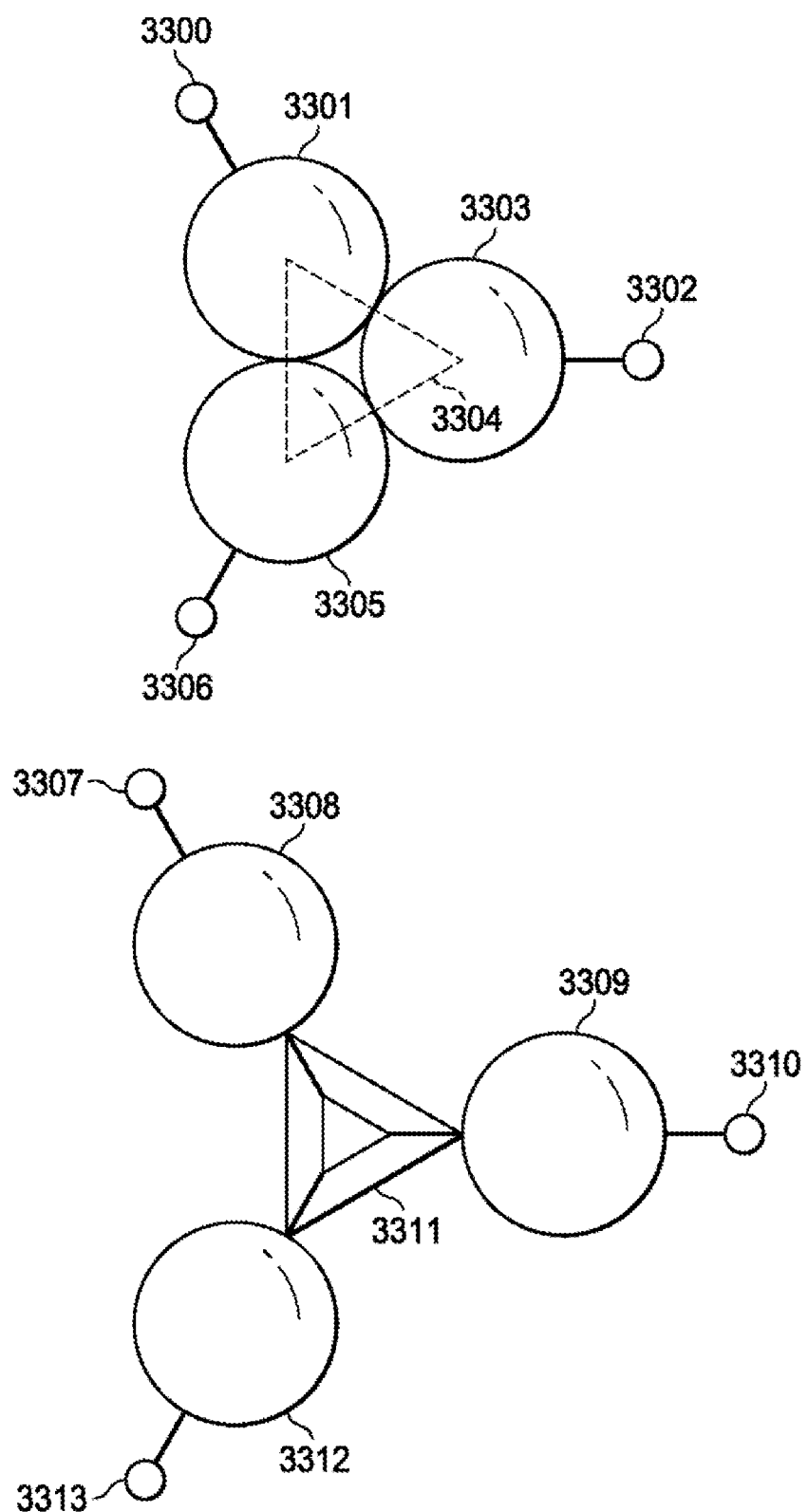
FIG. 32 a top view of the three-way tensioning mechanism of FIG. 31.

FIG. 32 provides a "top-down" perspective view of the tensioning mechanism of FIG. 31. The upper illustration shows the tensioning mechanism in a relaxed and non-extended configuration, wherein a shared weight 3304 is suspended directly beneath its respective floats 3301, 3303, and 3305, at its nominal depth. The lower illustration shows the tensioning mechanism in an extended configuration, wherein a shared weight 3311 has been raised from its nominal depth.

Figure 33:
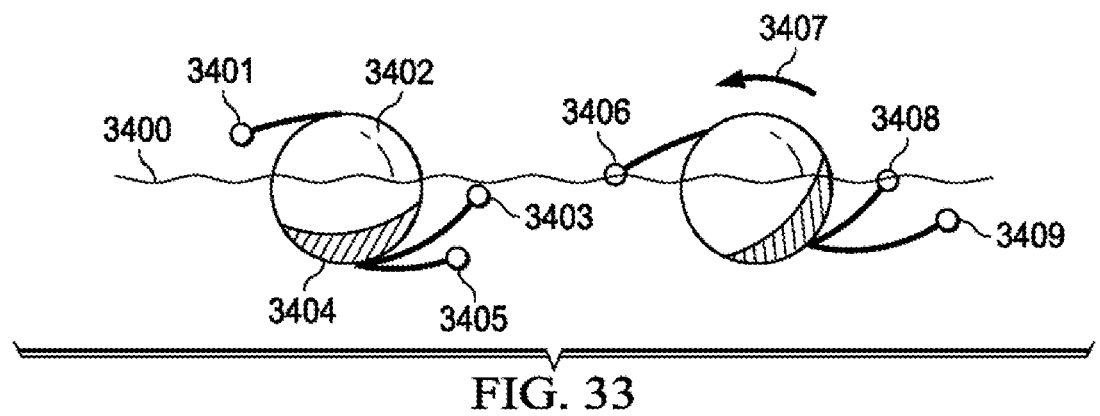

FIG. 33 illustrates a tensioning mechanism that is designed to connect to three other elements. The illustration on the left shows the tensioning mechanism in a relaxed and non-extended configuration. In its relaxed configuration, the weighted side 3404 is at the bottom and is supported at the surface 3400 of the body of water by the buoyant side 3402. The illustration on the right shows the tensioning mechanism in an extended configuration, wherein the weighted side has been rotated away from its bottom-most position to one in which its gravitational potential energy will, if and when conditions permit, cause the element to rotate back to its nominal orientation.

Figure 34:
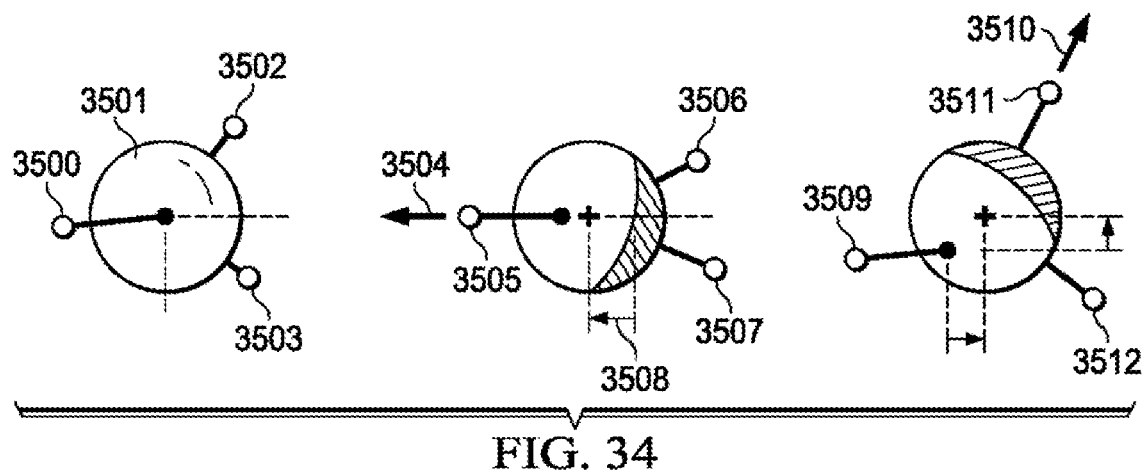

FIG. 34 is an illustration of the same embodiment of the invention disclosed herein that is also illustrated in FIG. 33. FIG. 34 provides a "top-down" perspective view. The illustrated embodiment is a tensioning mechanism that is designed to connect to three other elements. The illustration on the left shows the tensioning mechanism in a relaxed and non-extended configuration. In its relaxed configuration, the weighted side is at the bottom and is supported at the surface of a body of water by the buoyant side 3501. The center and right illustrations show the tensioning mechanism in extended configurations, wherein the weighted side has been rotated away from its bottom-most position to one in which its gravitational potential energy will, if and when conditions permit, cause the element to rotate back to its nominal orientation.

Figure 35:
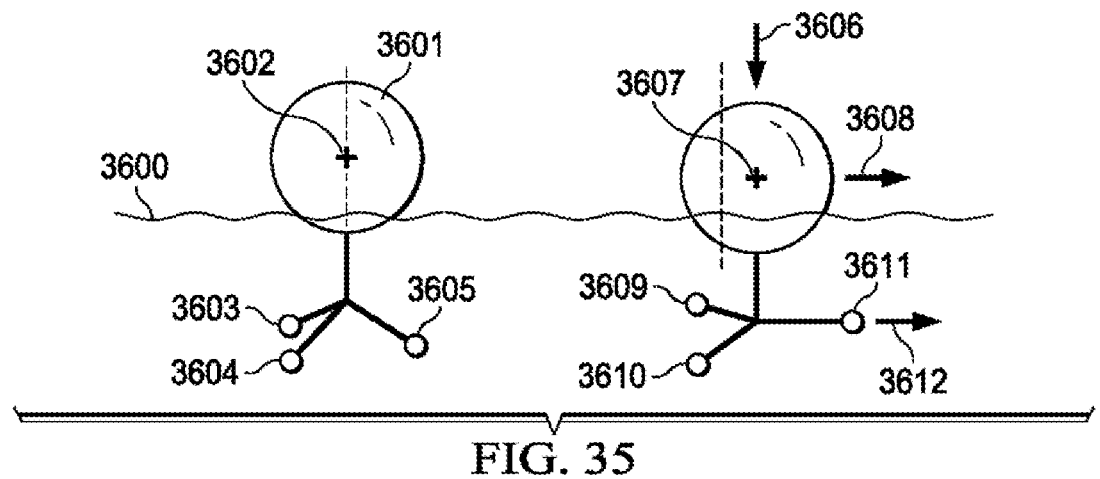

FIG. 35 illustrates another tensioning mechanism that is designed to connect to three other elements. The illustration on the left shows the tensioning mechanism in a relaxed and non-extended configuration. In its relaxed configuration, the element 3601 is floating at the surface 3600 of a body of water and its connections to other elements are directed in, at least partially, downward directions (i.e. not in purely lateral or horizontal directions). The illustration on the right shows the tensioning mechanism in an extended configuration, wherein the buoyant element 3607 has been pulled, at least partially, beneath the surface 3600 of the water so that the nominally downward-pointing connectors are now extended, to at least a degree, in a more horizontal orientation which permits the points of connection, e.g. 3609, to be separated by greater distances. When conditions permit, the extended tensioning mechanism 3607 will rise to its nominal position at the surface of the water due to the buoyant potential energy stored by the element during its extension.

Figure 36:
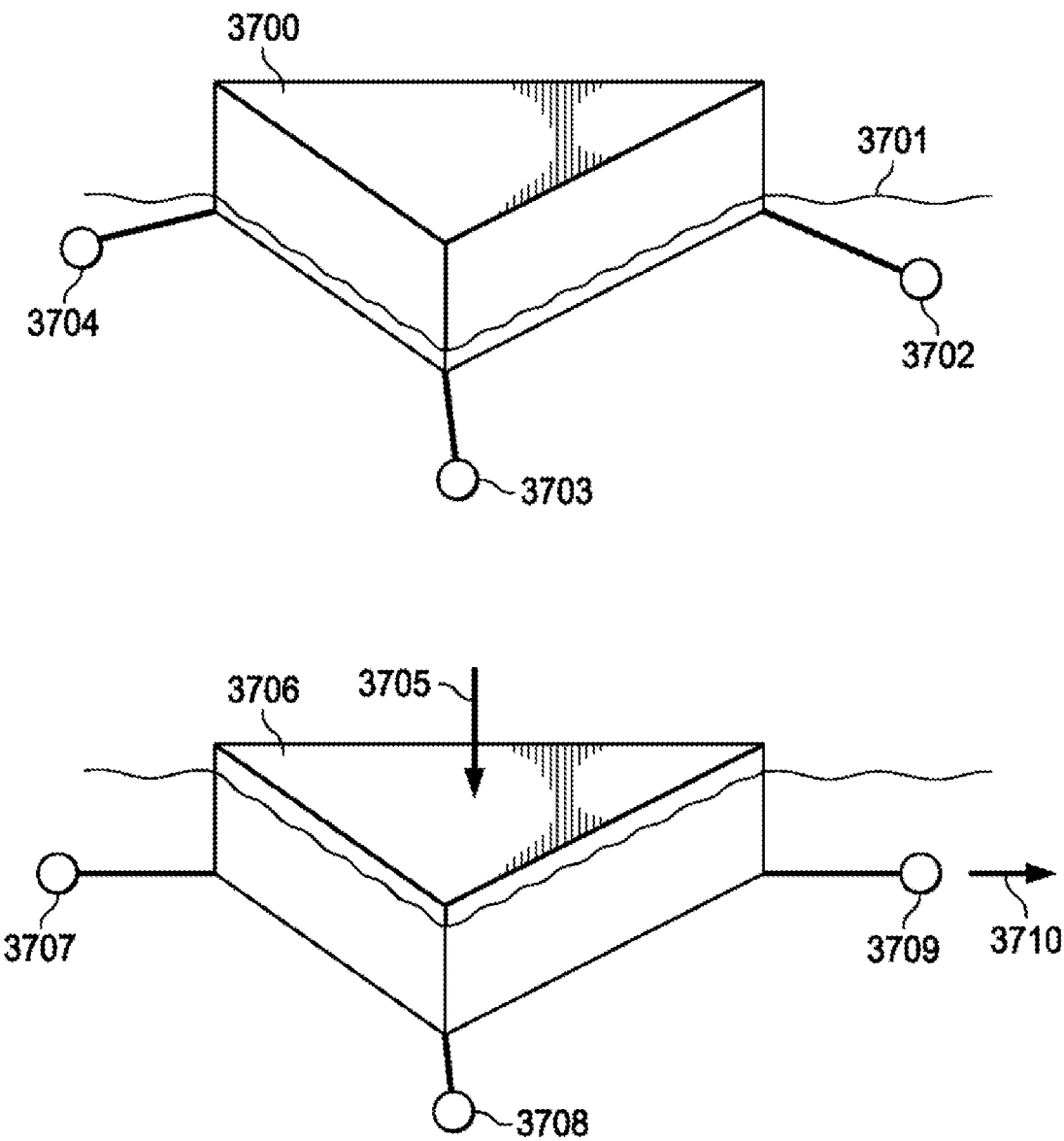

FIG. 36 illustrates another tensioning mechanism that is designed to connect to three other elements. The upper illustration shows the tensioning mechanism in a relaxed and non-extended configuration where it floats at the surface 3701 of a body of water. It has three connection points (here illustrated as points at the ends of element-dedicated connectors, cables, or struts). The connection points 3702-3704 of the tensioning mechanism will have a certain depth and/or maximal depth. And, the point at which the connector connected to each of these three connection points connects to another element, e.g. to an operational element, or the float of an anchoring element, must have a greater depth, and/or maximal depth, than the depth of the respective, related, and/or complementary, connection point on the tensioning mechanism, so that when the other element connected to one of the tensioning mechanism's connection points moves to a separation distance exceeding the nominal distance the connector, and thereby the connected tensioning mechanism float, is drawn down to a greater depth.

The lower illustration shows the tensioning mechanism in an extended configuration, wherein the float has been pulled, at least partially, beneath the surface 3701 of the water so that the nominally downward-pointing connectors 3702-3704 are now extended 3707-3709, to at least a degree, in a more horizontal orientation which permits the points of connection to be separated by greater distances. When conditions permit, the extended tensioning mechanism 3706 will rise to its nominal position at the surface of the water due to the buoyant potential energy stored by the element during its extension.

Figure 38:
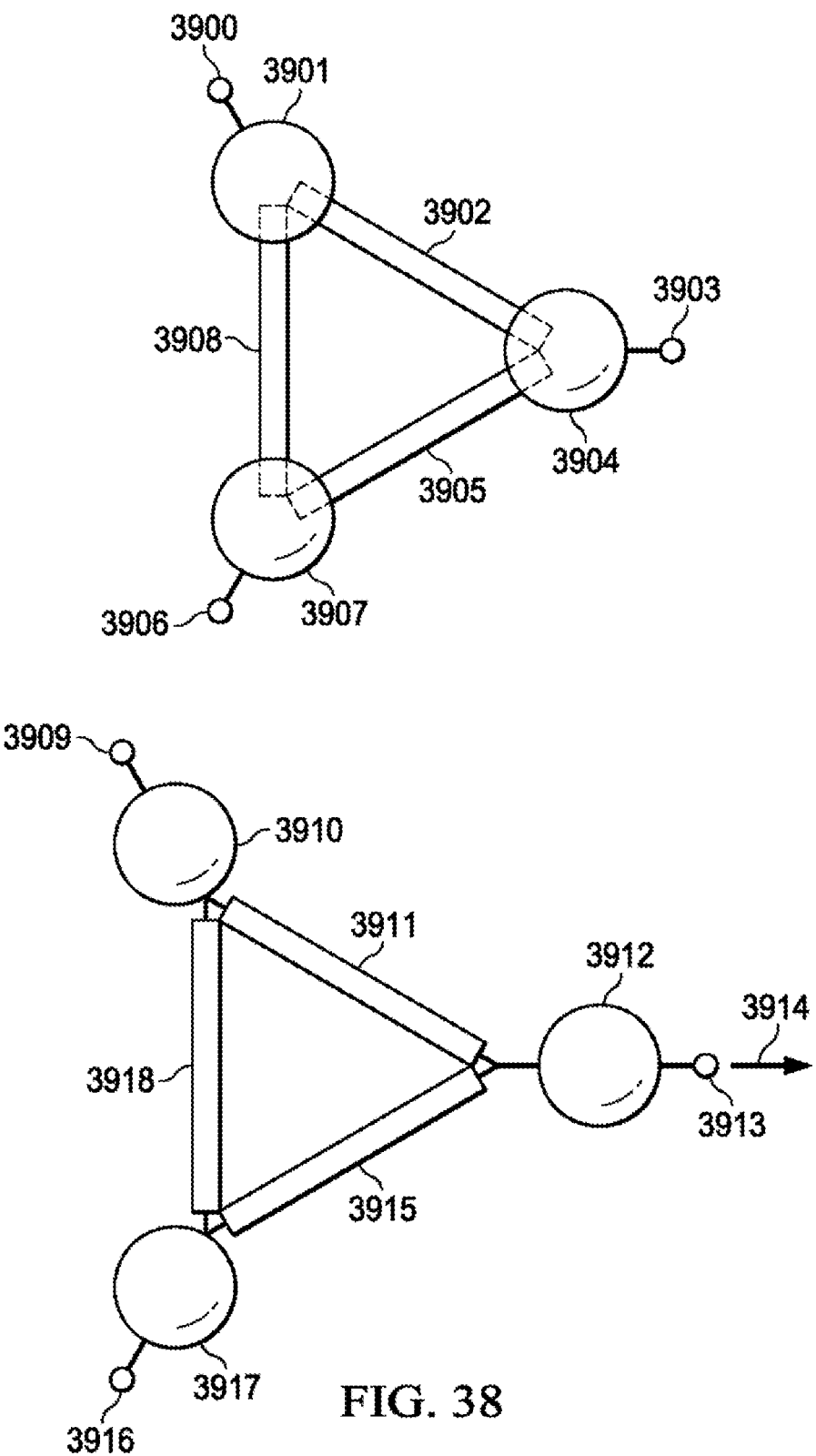
FIG. 38 is a top view of the three way buoyant spring of FIG. 37.

FIG. 37 illustrates a tensioning mechanism that is designed to connect to three other elements. This tensioning mechanism has been previously described within this disclosure as a "wide" or "bypass" tensioning mechanism that facilitates the passage of surface vessels through an among the elements of a farm. The upper illustration shows the "bypass" tensioning mechanism in a relaxed and non-extended configuration where it floats at the surface of a body of water. The lower illustration shows the tensioning mechanism in an extended configuration, wherein one 3816 of the three floats has been pulled 3818 away from the element's center. This results in that corner of the triangular weight (e.g. made of lengths of pipe) being lifted 3819 closer to the surface. When conditions permit, the extended tensioning mechanism will contract and fall to its nominal position and/or configuration due to the gravitational potential energy stored by the weight, and especially by the one lifted corner of the weight, during its extension. FIG. 38 is an illustration of the same embodiment illustrated in FIG. 37, where FIG. 38 provides a top-down perspective.

Figure 39:
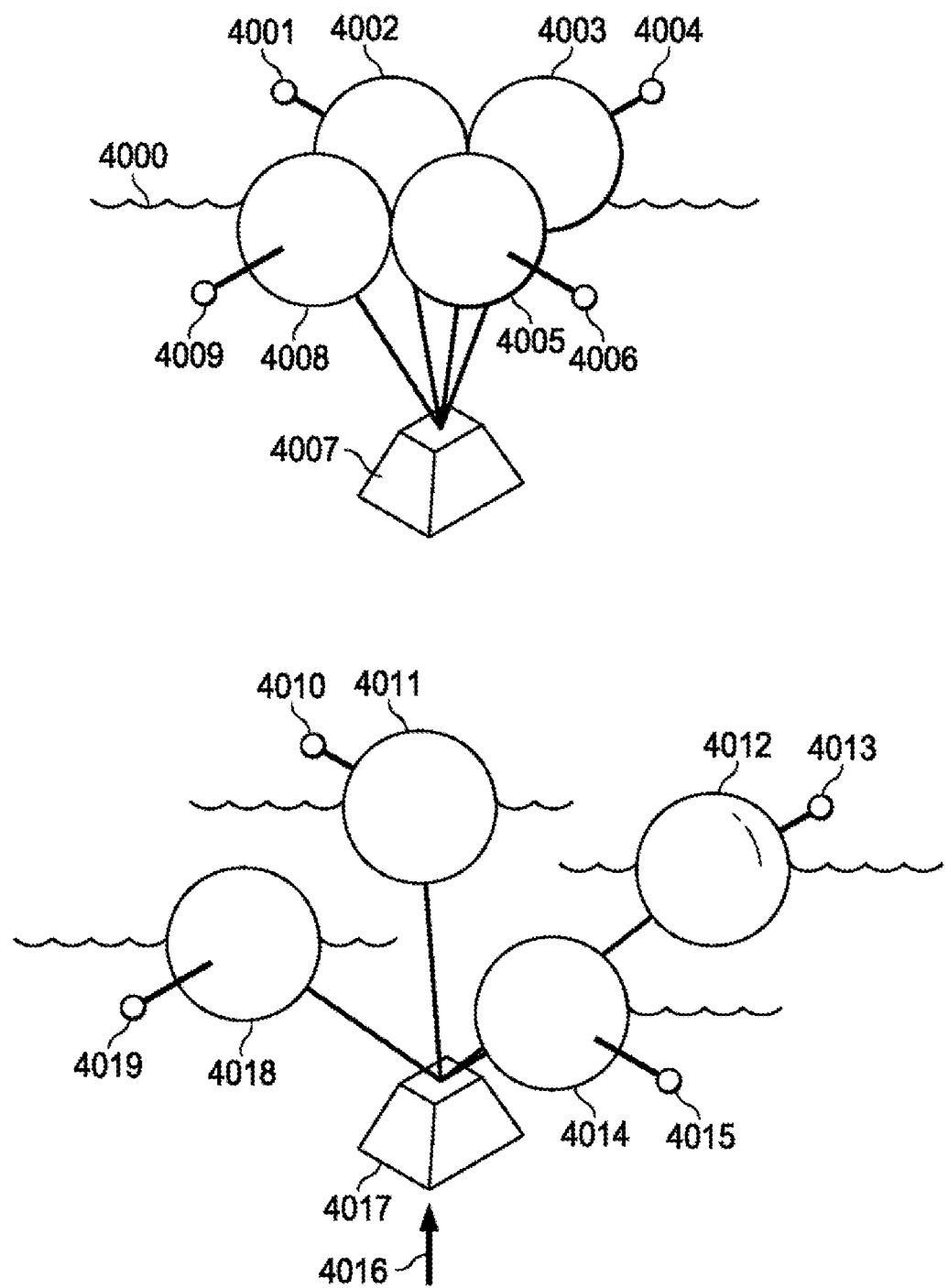
FIG. 39 is a schematic diagram of a four way buoyant spring.

FIG. 39 illustrates a tensioning mechanism that is designed to connect to four other elements. Aside from its number of connections, it is similar to the embodiment illustrated and discussed in FIG. 31. The upper illustration shows the tensioning mechanism in a relaxed and non-extended configuration. The lower illustration shows the tensioning mechanism in an extended configuration, wherein a shared weight has been raised 4016 from its nominal depth. FIG. 40 is an illustration of the same embodiment illustrated in FIG. 39, where FIG. 40 provides a top-down perspective.

FIG. 41 illustrates a tensioning mechanism that is designed to connect to four other elements. This tensioning mechanism has been previously described within this disclosure as a "wide" or "bypass" tensioning mechanism that facilitates the passage of surface vessels through an among the elements of a farm. The upper illustration shows the "bypass" tensioning mechanism in a relaxed and non-extended configuration where it floats at the surface of a body of water. The lower illustration shows the tensioning mechanism in an extended configuration, wherein all of its four floats have been pulled away from the element's center. This results in the center of the square-shaped weight (e.g. made of lengths of pipe) being lifted 4310 closer to the surface. When conditions permit, the extended tensioning mechanism will contract and fall to its nominal position and/or configuration due to the gravitational potential energy stored by the weight during its extension. Appropriately-designed tensioning mechanisms may be designed, fabricated and deployed for the purpose of connecting any two or more other elements.

Figure 42:
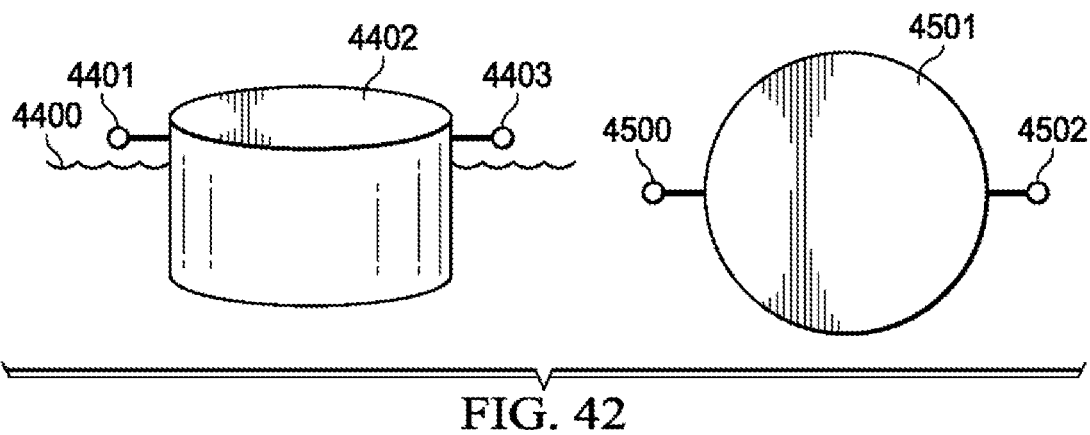
FIGS. 42-44 are schematic diagrams of a two way, three way, and four way buoyant springs.
Figure 43:
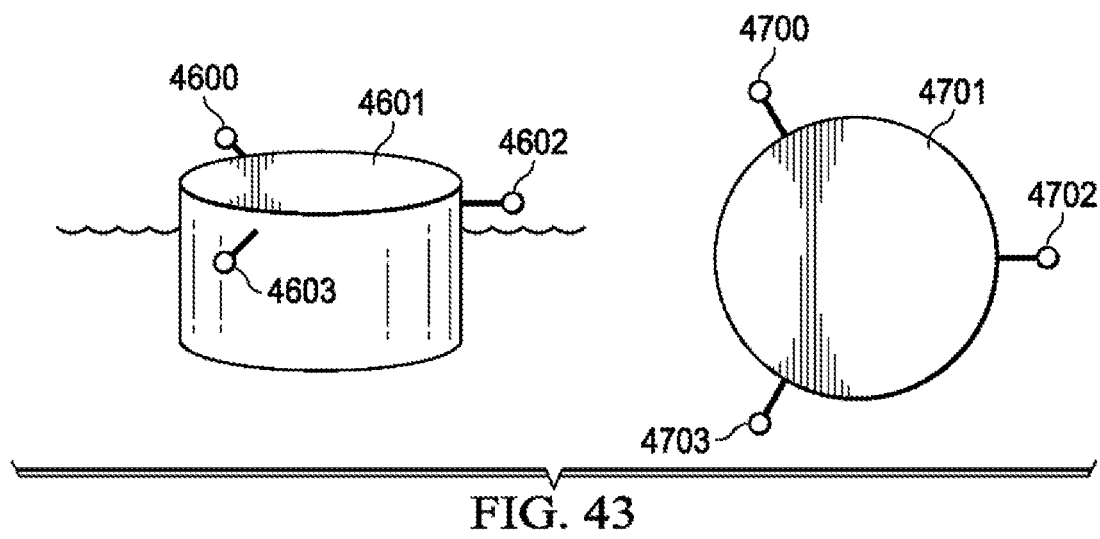
Figure 44:
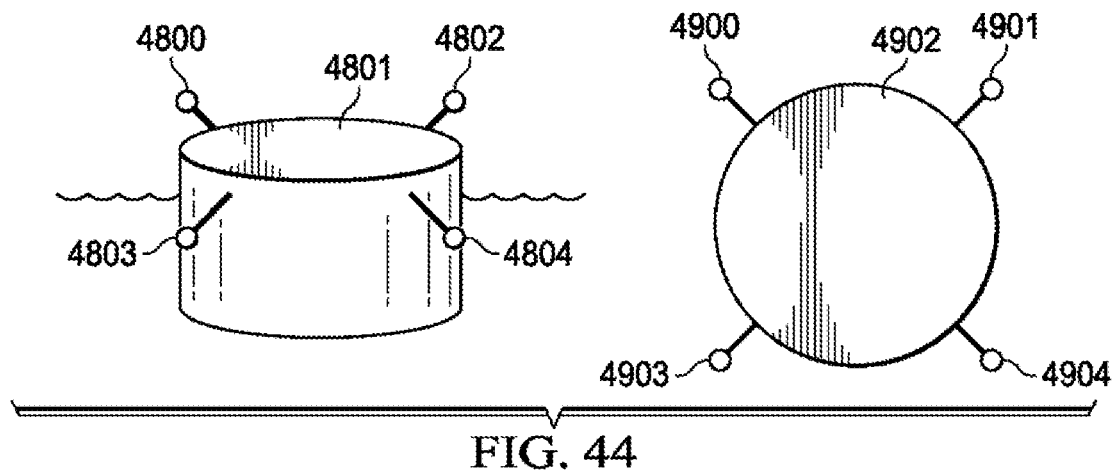

FIG. 42 illustrates an operational element 4402 (perspective view) and 4501 (top-down view) designed to connect to two other elements (e.g. via connection points 4401 and 4403). FIG. 43 illustrates an operational element 4601 (perspective view) and 4701 (top-down view) designed to connect to three other elements (e.g. via connection points 4600, 4602, and 4603). FIG. 44 illustrates an operational element 4801 (perspective view) and 4902 (top-down view) designed to connect to four other elements (e.g. via connection points 4800 and 4802-4804). Appropriately-designed operational elements may be designed, fabricated and deployed for the purpose of connecting to one or more other elements.

Figure 45:
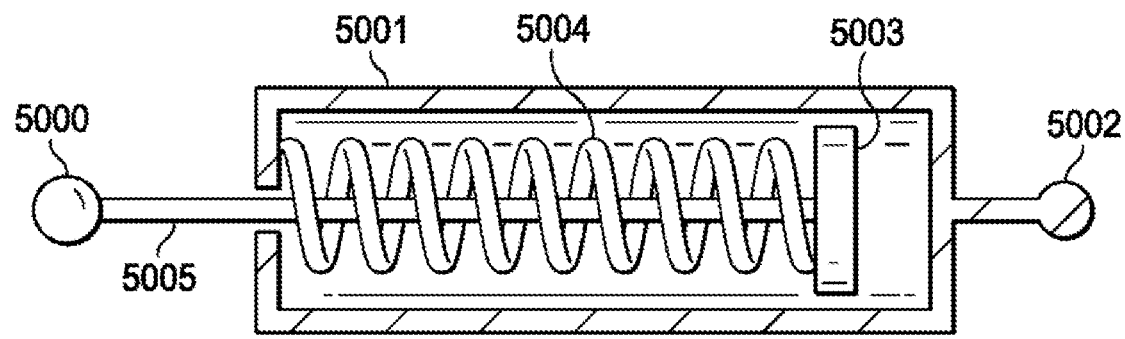
FIG. 45 is a schematic diagram of a tensioning mechanism of the present invention.

FIG. 45 illustrates a tensioning mechanism that is not a buoyancy spring, but rather an actual mechanical spring, where one element pulls (at 5002) on a hollow cylinder 5001, while another element pulls (at 5000) a piston (5005 and 5003) which causes an internal mechanical spring 5004 to be compressed, thereby resisting any extension and storing potential energy (via the compression of the spring) that will later result in the restoration of the nominal separation of the attached neighboring elements.

Figure 46:
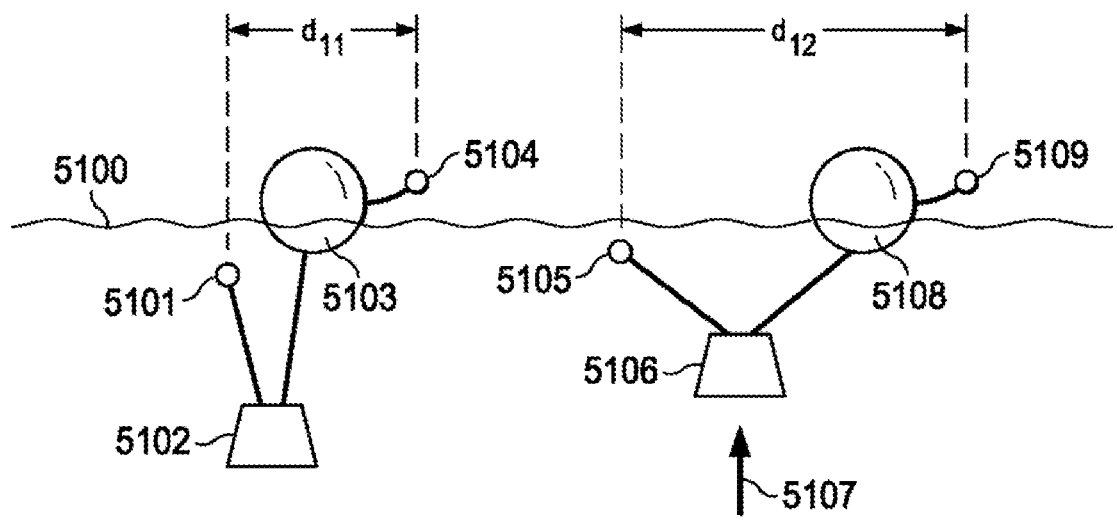
FIG. 46 is a schematic diagram of another embodiment of the present invention.

FIG. 46 illustrates a tensioning mechanism in which a different buoyant element (e.g. an operational element) is attached (at 5101) to a weight 5102. Another element is attached (at 5104) to a float 5103. When the adjacent connected elements move apart, increasing their separation beyond the critical distance, the weight 5106 is lifted 5107 and the resulting negative buoyancy related potential energy will eventually restore the original separation of the neighboring elements.

FIG. 47 illustrates a tensioning mechanism in which a spar 5205 is held above the surface 5200 of a body of water by a float 5206, and wherein that float is attached to a weight 5208 by a strut or other connector 5207. Two connectors attached to the top 5203 of the elevated spar 5205 are connected to a pair of neighboring elements (at 5201 and 5209). When the connected elements are drawn apart, and increase their separation by more than the critical distance, the floating spar is forced to "tip over" bringing the top 5211 of its elevated spar closer to the surface of the water. This results in the production of gravitational potential energy (through the elevation of the weight 5215). Eventually, the spar's gravitational potential energy will compel it to "straighten back up," thus bringing back to a nominal separation distance the attached elements.

Figure 48:
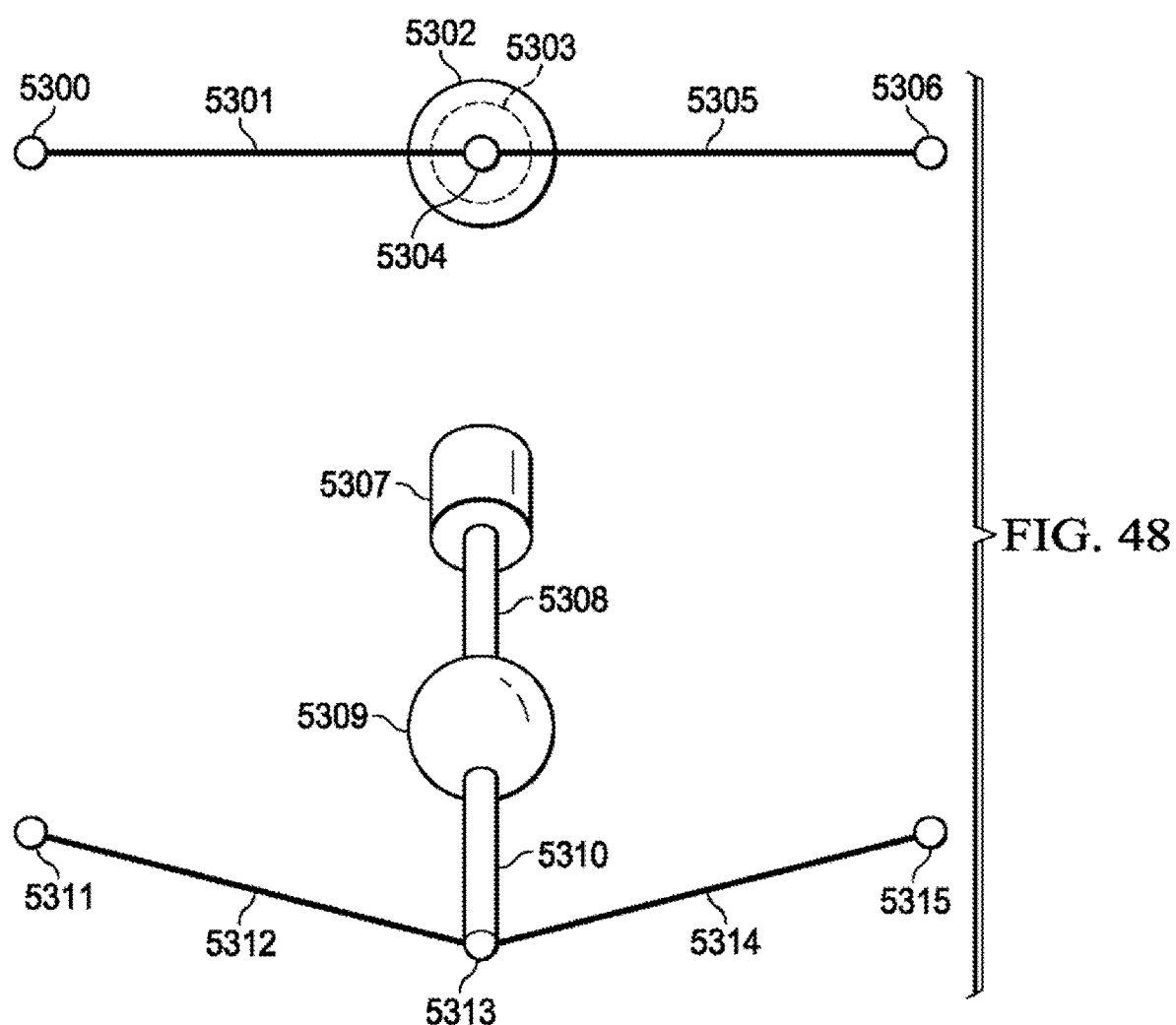
FIG. 48 is a top and perspective views of the embodiment of FIG. 47.

FIG. 48 is an illustration of the same embodiment illustrated in FIG. 47, where FIG. 48 provides a top-down perspective of a relaxed (upper illustration) and tensioned or "active" (lower illustration) tensioning mechanism.

Figure 49:
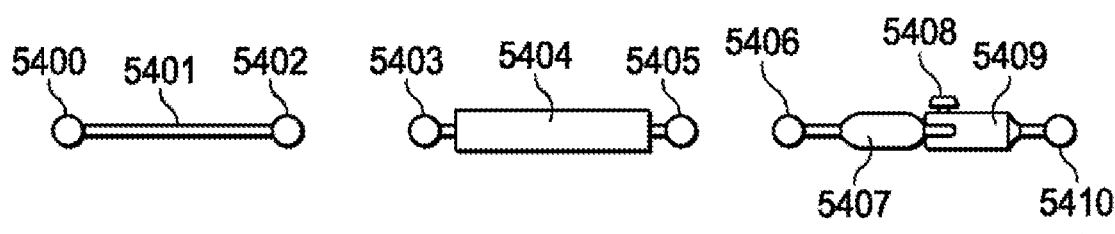
FIGS. 49-51 are schematic diagrams of two way, three way, and four way linkages.

FIG. 49 illustrates three examples of "junctions" or "junction elements" that are designed to connect two other elements. A simple connector 5401 to which two elements may be connected or attached (at 5400 and 5402) is depicted. Connector 5401 may include, but is not limited to: an elongate connector, a cable, a chain, a rope, a series of interconnected linkages, and/or any other fully or partially flexible connector. Also illustrated in the center is a buoyant junction 5404. A junction 5406-5410 facilitates the connection and disconnection of elements through the insertion and removal, respectively, of a bolt 5408 or pin. The number of possible two-connection junctions is large and the examples provided in FIG. 49 are not exhaustive nor exclusive. The variety of possible two-connection junctions includes, but is not limited to, the three illustrated in FIG. 49.

Figure 50:
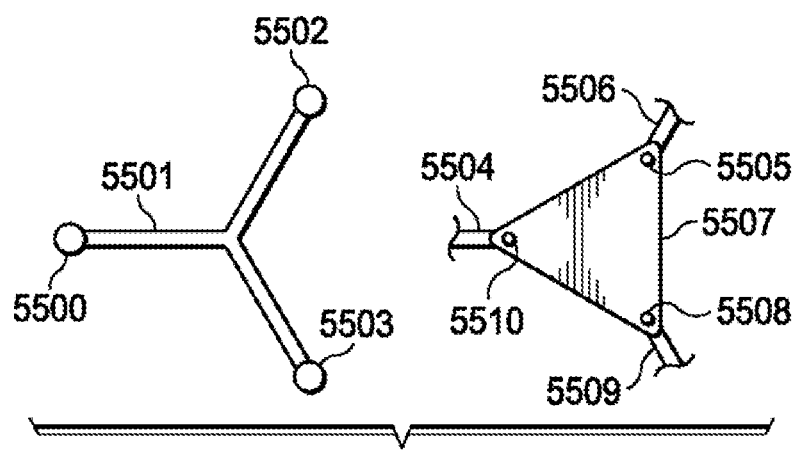

FIG. 50 illustrates two of the many possible examples of "junctions" or "junction elements" that are designed to connect three other elements. A simple connector 5500-5502 having three elements may be connected or attached to operational elements (at 5500, and 5502-5503). A triangle-shaped junction 5504-5510 may also be connected or attached (at 5505, 5508, and 5510) to three other elements. The number of possible three-connection junctions is large and the examples provided in FIG. 50 are not exhaustive nor exclusive. The variety of possible three-connection junctions includes, but is not limited to, the two illustrated in FIG. 50.

Figure 51:
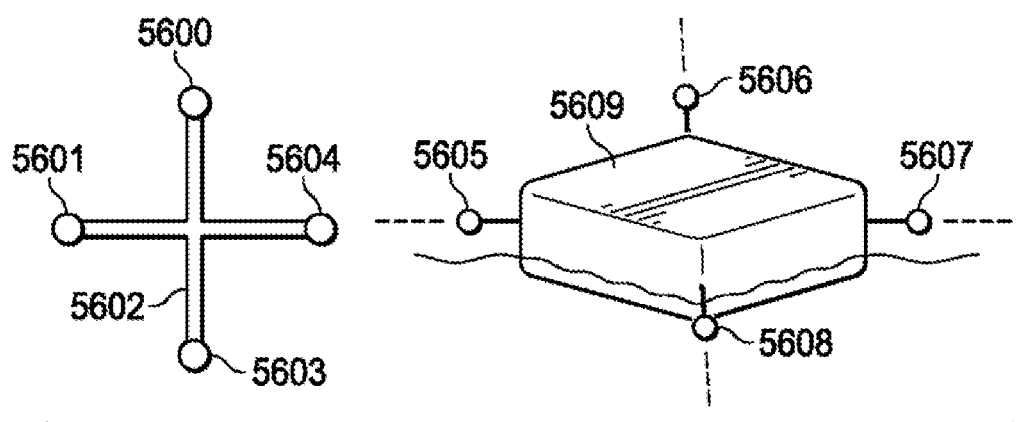

FIG. 51 illustrates two examples of "junctions" or "junction elements" that are designed to connect four other elements. A simple connector 5600-5604 to which four elements may be connected or attached (at 5601-5604) is disclosed, as is a buoyant square- or cube-shaped junction 5605-5609 that may be connected or attached (at 5605-5608) to four other elements. The number of possible four-connection junctions is large and the examples provided in FIG. 51 are not exhaustive nor exclusive. The variety of possible four-connection junctions includes, but is not limited to, the two illustrated in FIG. 51. Appropriately-designed junctions may be designed, fabricated and deployed for the purpose of connecting any two or more other elements.

Figure 52:
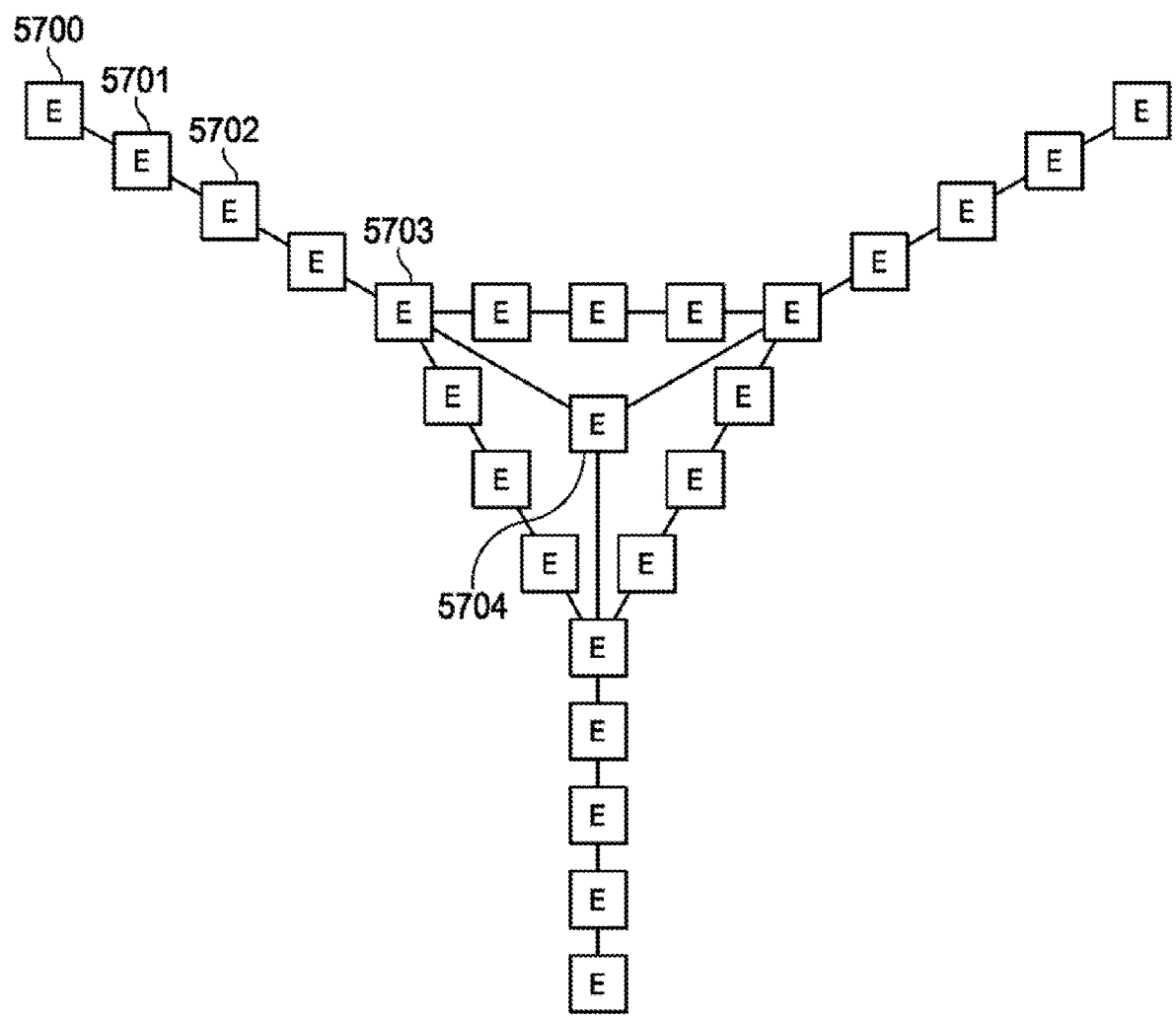
FIGS. 52-54 are schematic diagrams of a farm formation and components.
Figure 53:
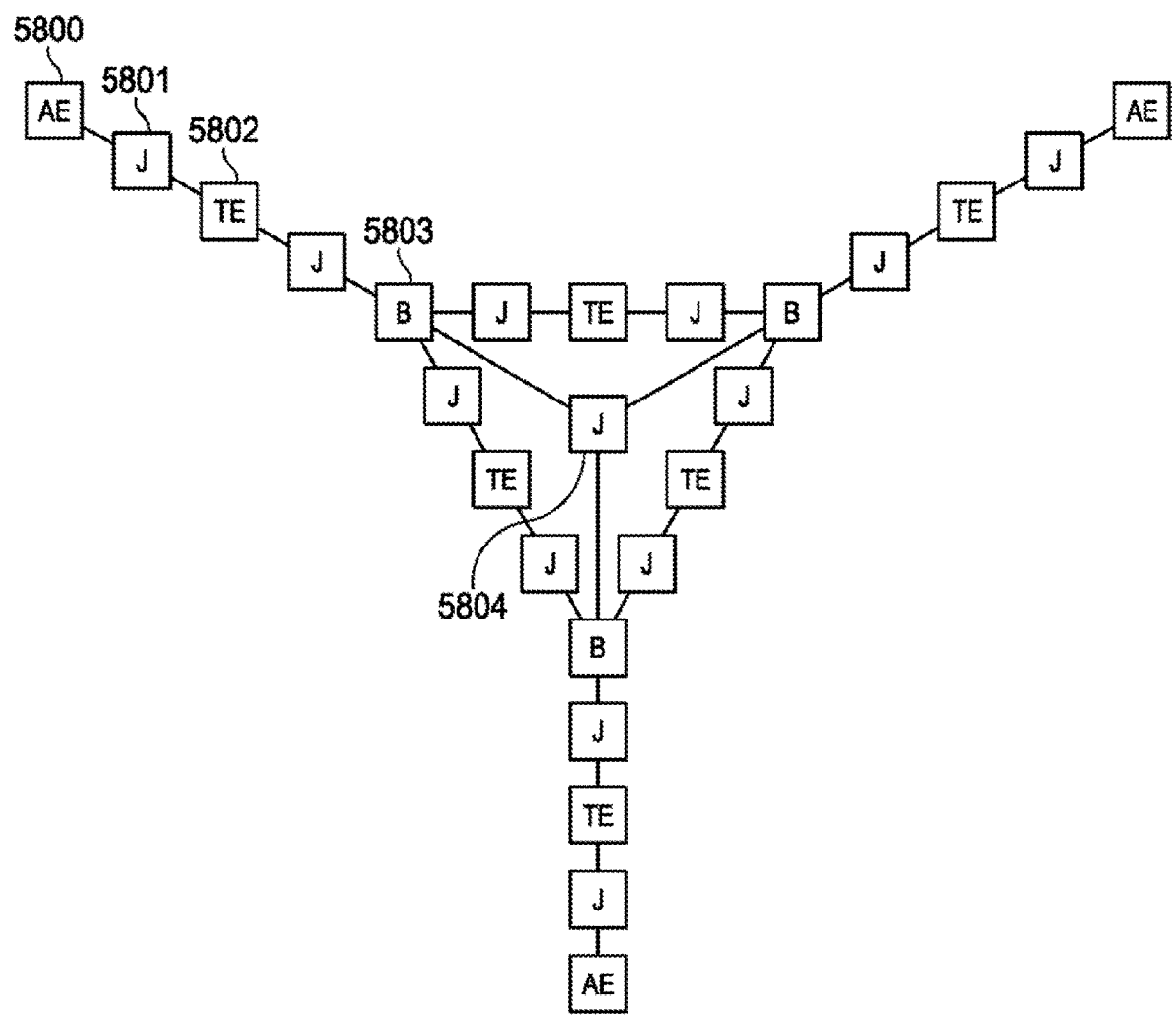

FIG. 52 is an illustration similar the illustrations of FIGS. 22-24. FIG. 52 illustrates an "elemental farm layout". This farm layout specifies an element 5704 at the center of a surrounding triangular pattern of elements. FIG. 53 a successor of the element farm layout illustrated in FIG. 52. In this illustration, the categorical type of each element has been specified. Each box containing an "AE" represents an anchoring element. Each box containing a "J" represents a "junction". Each box containing a "TE" represents a tensioning mechanism. And, each box containing a "B" represents a buoyant object (or operational element). Note that while all other junctions connect to only two elements, junction 5804 connects to three.

Figure 54:
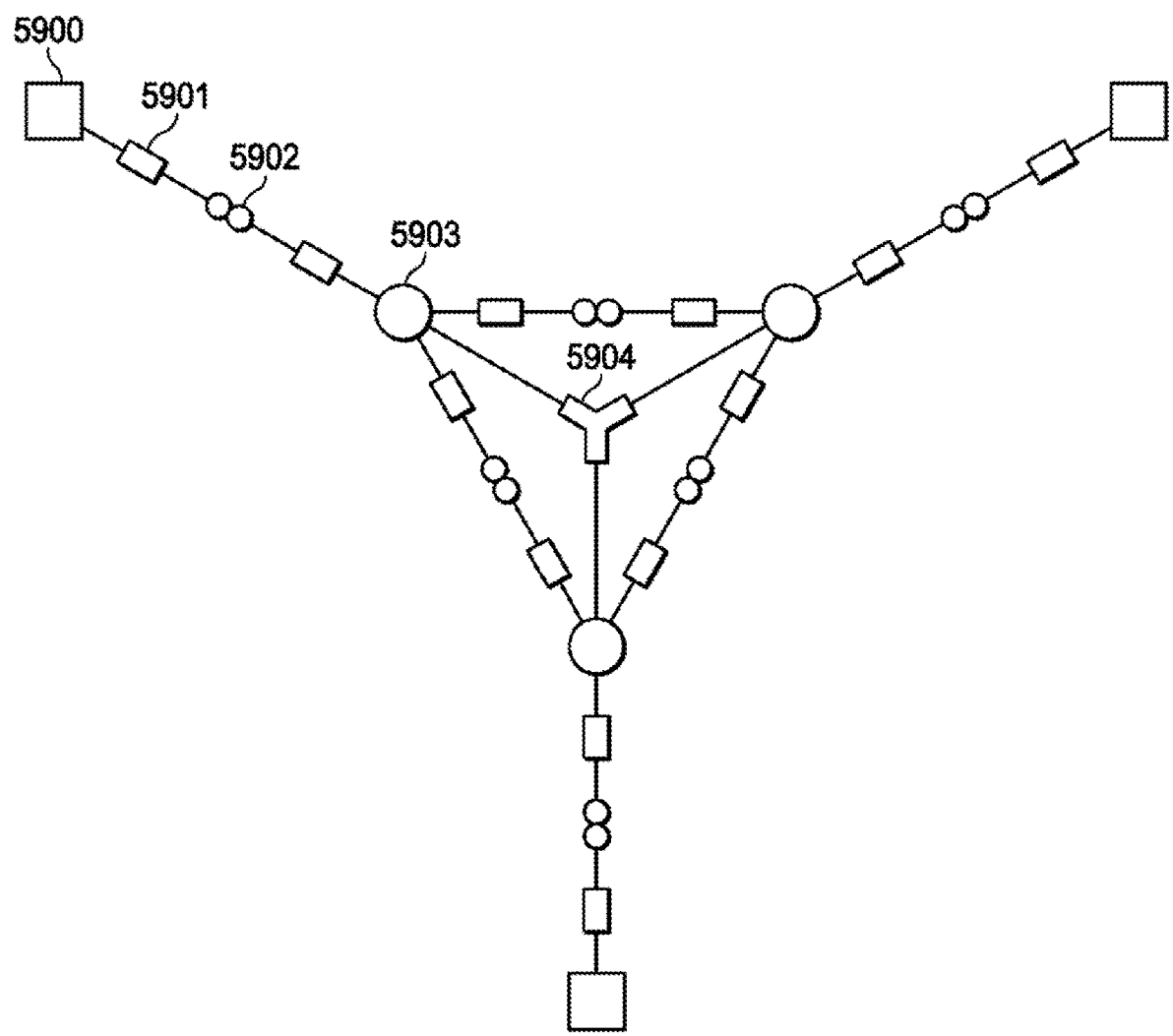

FIG. 54 graphically represents the same farm layout specified and/or illustrated in FIG. 53. Note the three-way junction 5904.

Figure 55:
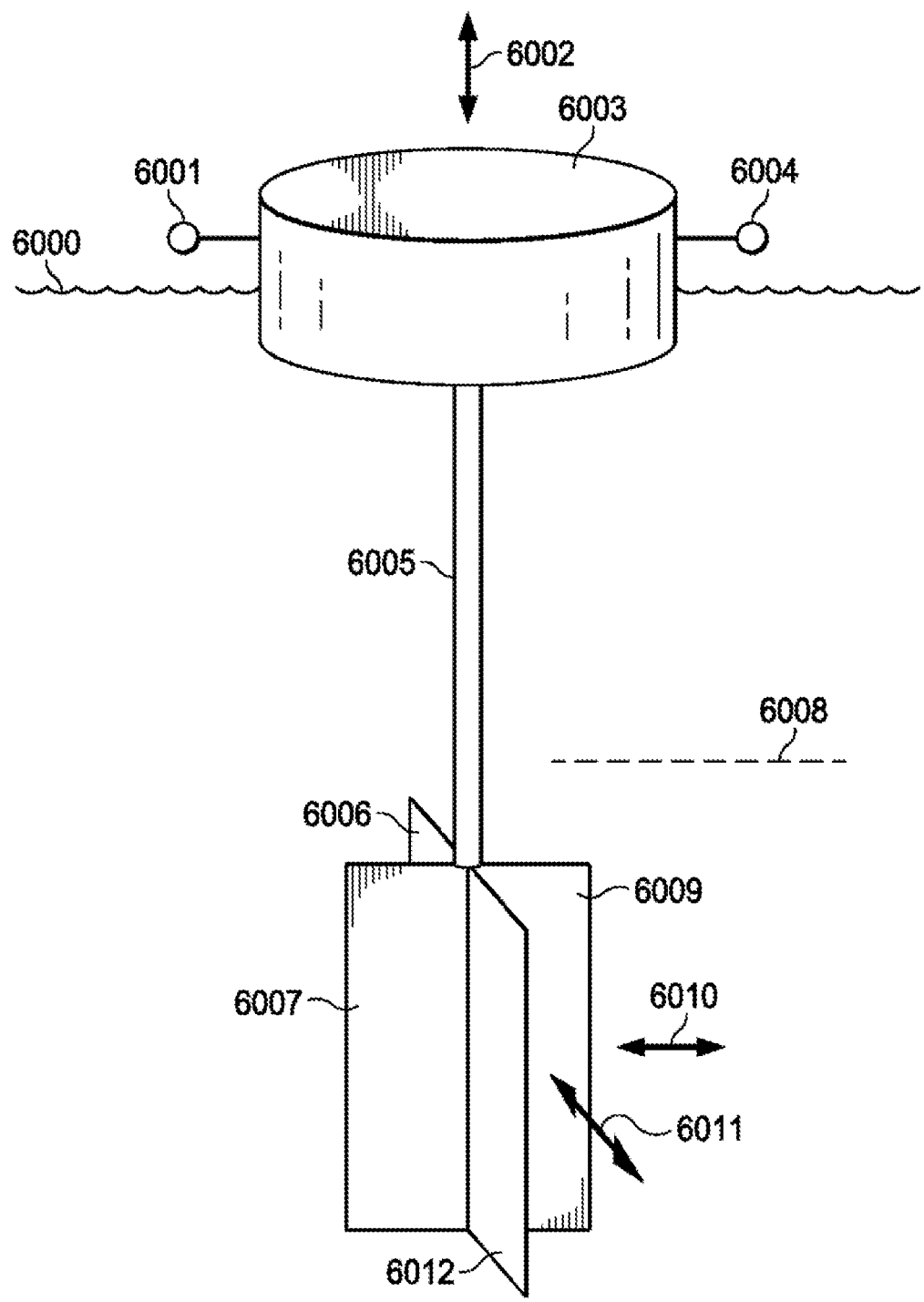
FIG. 55 is a schematic diagram of a lateral stabilizing element.

FIG. 55 illustrates an example of a "laterally-stabilized anchoring element" which is designed to connect to other elements in an interconnected farm of buoyant devices and to resist lateral movements of itself and the farm layout, or a portion thereof, within which it is incorporated and/or connected. The illustrated example shows two connection points 6001 and 6004 which illustrate its connection to two other farm elements and/or connectors. However, such a laterally-stabilized anchoring element may be connected to any number of other farm elements, e.g. 3, 4, 5, etc.

While the "laterally-stabilized anchoring element" illustrated in this figure would be able to move 6002 vertically up-and-down with relative freedom, its lateral movement, e.g. 6010 and 6011, would be greatly impeded by the significant drag generated by the attached lateral sea anchor 6006, 6007, 6009 and 6012 with respect to lateral movements of the anchoring element. Because the lateral sea anchor is positioned adjacent to, and/or below, the wave base 6008, any lateral movement of the illustrated element would require the lateral movement of the lateral sea anchor through the relatively still waters below the wave base (i.e. where wind and wave are absent).

Figure 56:
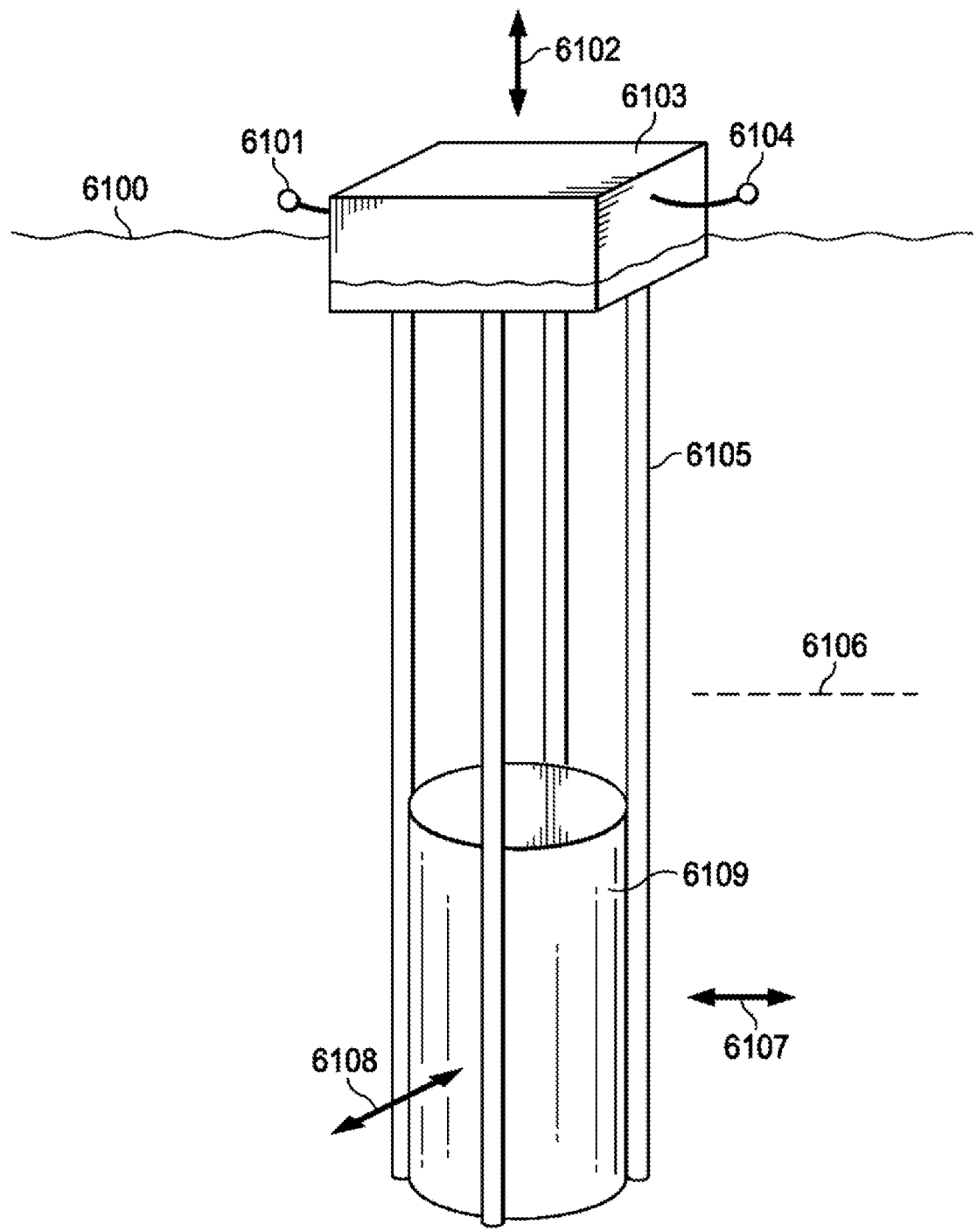
FIG. 56 is a schematic diagram of another lateral stabilizing element.

FIG. 56 illustrates another example of a "laterally-stabilized anchoring element" similar to the example illustrated in FIG. 55 but differing in the design and/or type of lateral sea anchor 6109 that, at least partially, fixes its lateral position by means of drag. FIG. 56 might also illustrate (crudely) a type of "point-absorbing" wave energy device in which vertical heave-induced oscillations of the device by waves at the surface 6100 cause the submerged tube 6109 to be driven up-and-down through the still waters below the wave base 6106. Such as wave-energy device would constitute "laterally-stabilized operational element" within the scope of this disclosure.

Figure 57:
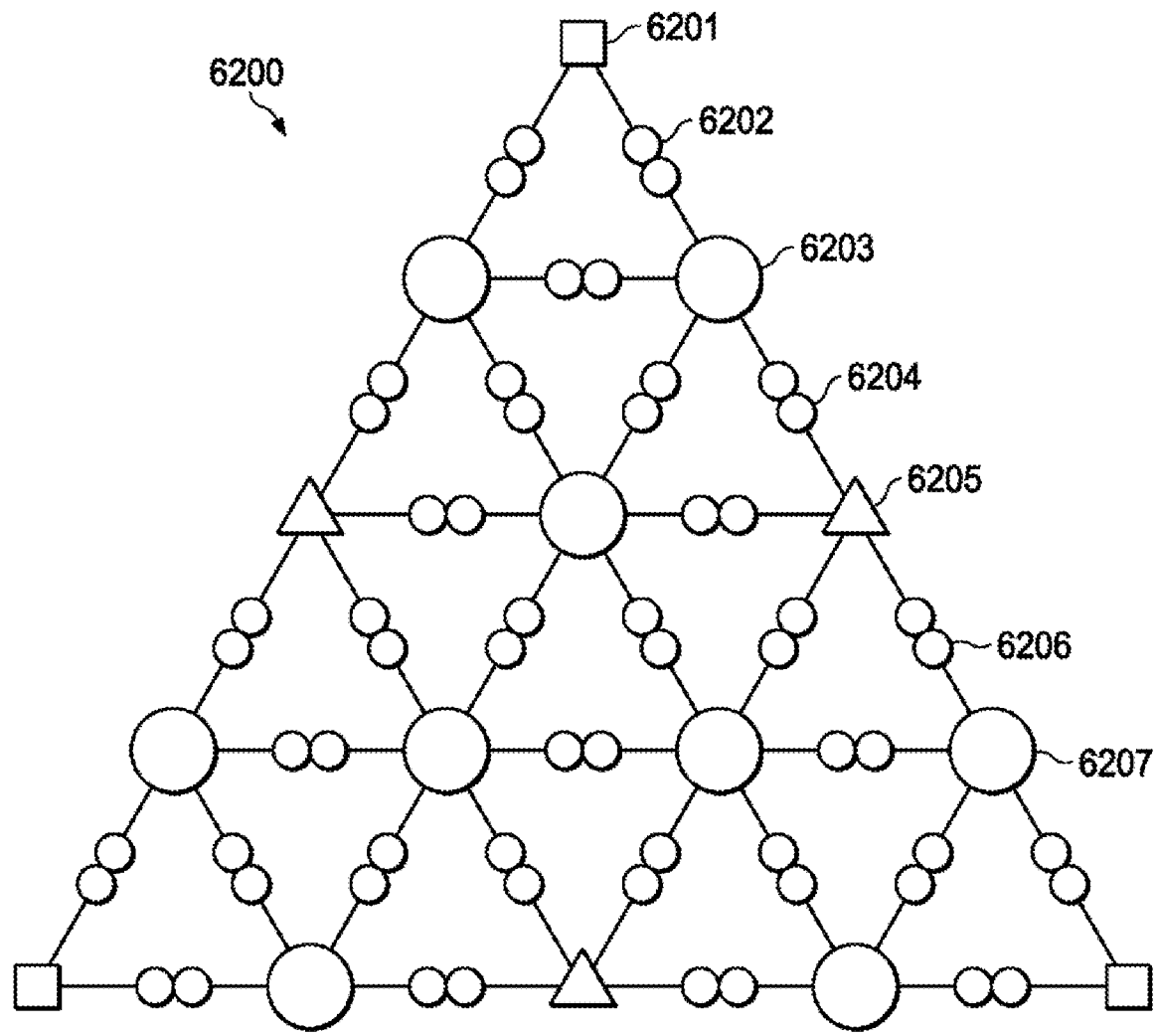
FIG. 57 is a schematic diagram of another farm formation and components.

FIG. 57 illustrates a "farm layout", e.g. 6201-6207, of the type disclosed herein. Three "non-laterally-stabilized anchoring elements" (represented by squares), e.g. 6201, "anchor" the corners of a triangular farm layout. While three "laterally-stabilized anchoring elements" (represented by triangles), e.g. 6205, resist lateral drifting at the centers of the farms perimeter edges. A plurality of "tensioning mechanisms" (represented by pairs of small circles), e.g. 6202, 6204 and 6206, absorb energy from the lateral movements of other directly and/or indirectly connected farm elements and release that potential energy as the original spatial relationships of farm elements are restored. And, nine "operational elements" (represented by individual circles), e.g. 6203, perform some useful function which is facilitated through their mooring within a "laterally-stabilized" farm layout of the kind disclosed herein.

Figure 58:
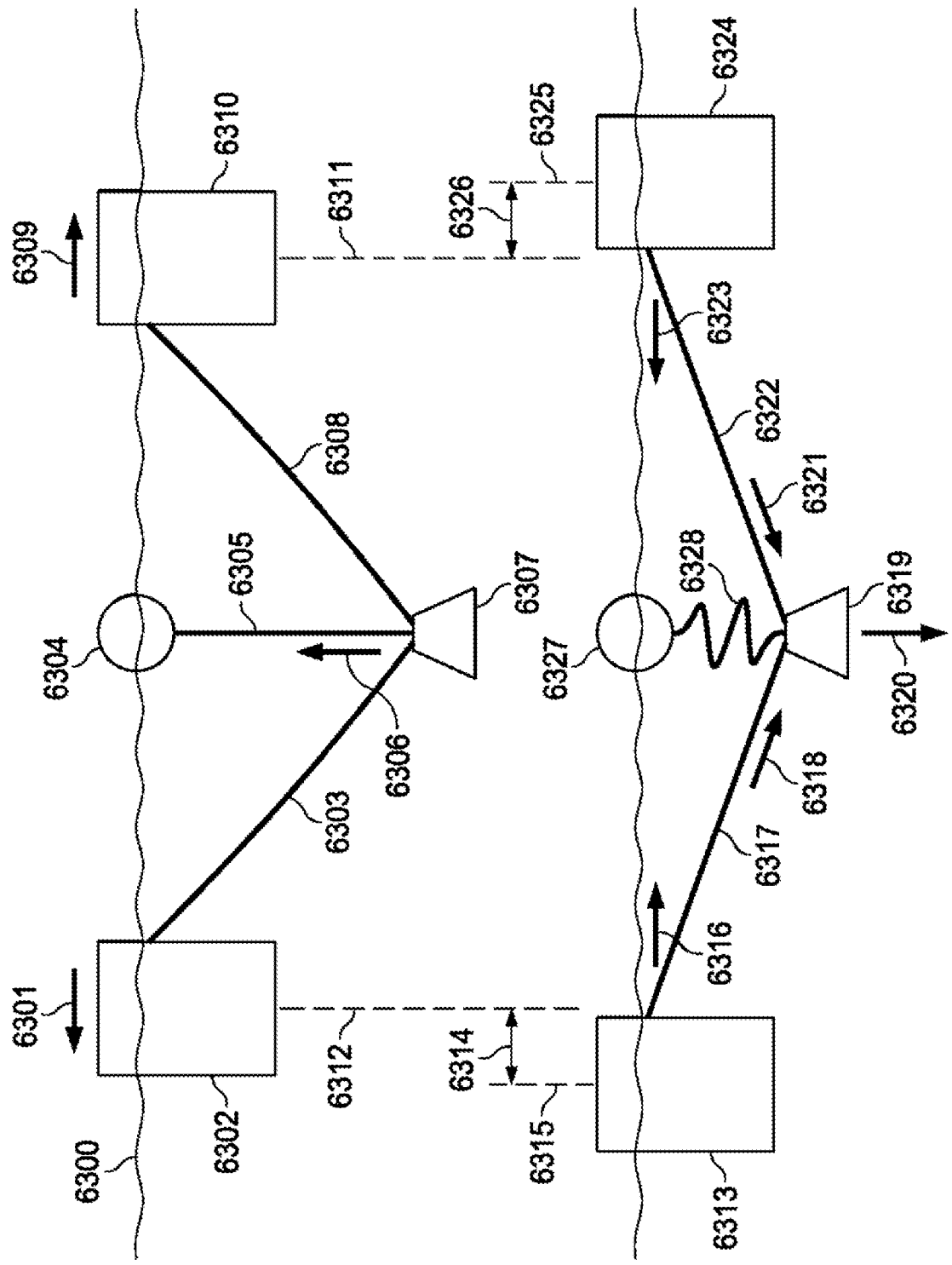
FIG. 58 is a schematic diagram of another buoyancy spring.

FIG. 58 illustrates a tensioning mechanism (the combination of 6304, 6305, and 6307) in which a weight 6307 is suspended by a cable 6305 or other connector beneath a float 6304. In this illustration, the tensioning mechanism is connected to two other elements, 6302 and 6310 by cables 6303 and 6308, respectively, or other connectors. When the attached elements 6302 and 6310 are pulled and/or pushed 6301 and 6309, respectively, apart, and achieve an increase 6314 and 6326 in the distance by which they are separated which causes their total separation to exceed their nominal "resting" separation and/or their nominal relative positions 6312 and 6311, respectively, then the critical separation is achieved and the weight 6319 suspended beneath the float 6327 must rise. The ascension of the weight 6319 causes the cable 6328 and/or connector by which the weight is suspended beneath the float to lose tension and go slack. The downward force 6320 of the weight 6319, which is no longer countered by a taught cable 6328 and/or connector between the weight and the float 6327 from which it is nominally suspended, causes a tension 6318 and 6321 in the cables 6317 and 6322, respectively, which draws 6316 and 6323 back together the overextended attached elements 6313 and 6324, respectively. While the illustration provided in FIG. 58 shows an embodiment of a tensioning mechanism attached to two other farm elements, equivalent embodiments of the same tensioning mechanism design could be used to provide tension to connections between three or more attached farm elements. The scope of this disclosure extends to all such variations of the illustrated embodiment which would be obvious to one skilled in the art.

Figure 59:
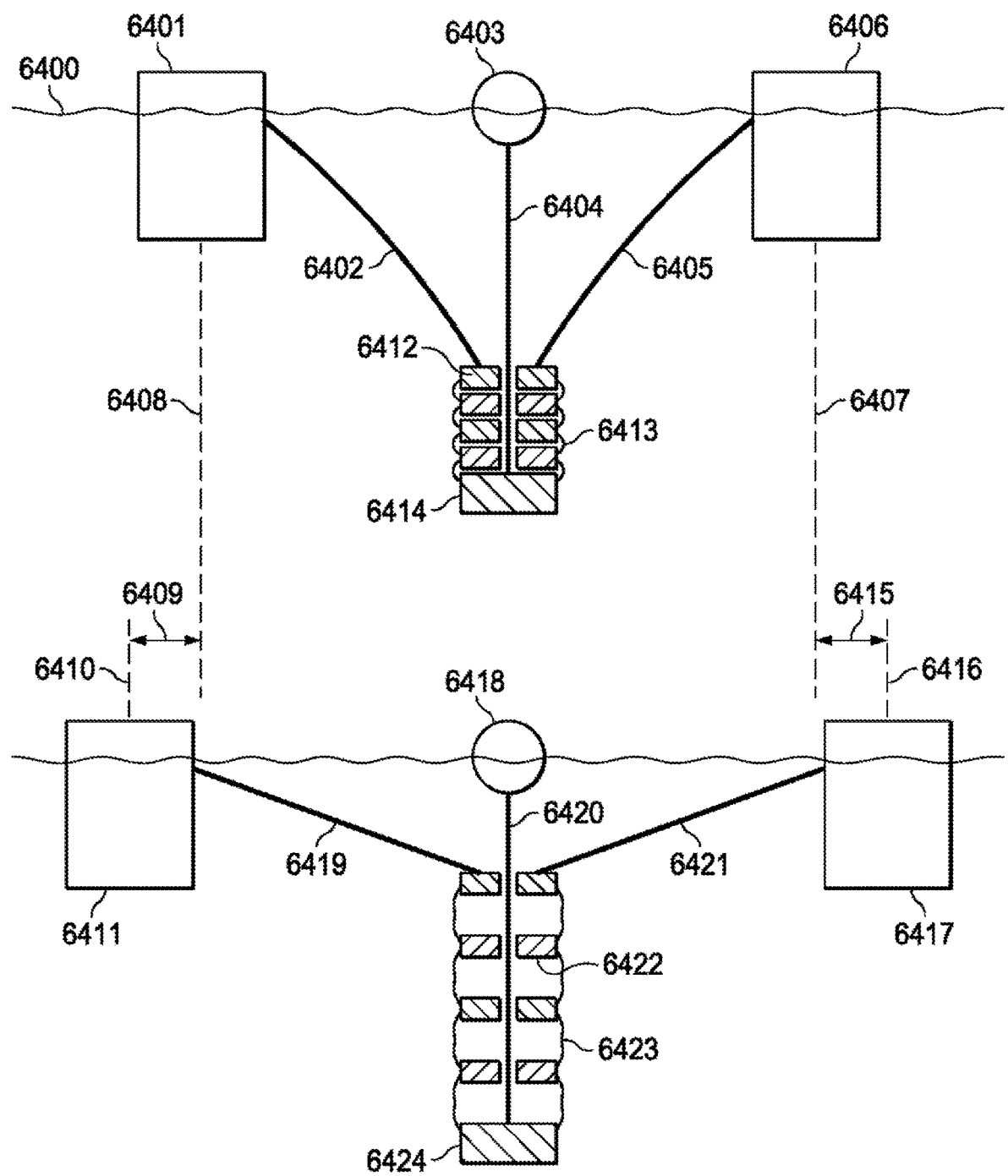
FIG. 59 is a schematic diagram of a variation of the embodiment of FIG. 58.

FIG. 59 illustrates an alternate version of the embodiment illustrated in FIG. 58. In this version of the tensioning mechanism (the combination of 6403, 6404, and 6412-6414), the suspended weight 6412-6414 is composed of separable disks, e.g. 6422, and a single attached bottom-most disk 6424. The cable 6404 and/or connector by means of which the assembly of separable weights are suspended passes through all but the bottom-most disk, and is connected and/or attached to that bottom-most disk 6424. When the attached elements 6401 and 6406 move apart, e.g. by an additional distance of 6409 and 6415, to a separation that exceeds the nominal maximum separation, the distance from 6407 to 6408, then first the top-most disk is raised by the cables 6419 and 6421 and/or connectors which connect the tensioning mechanism to the other elements 6411 and 6417. Any further extension causes the disk 6422 second from the top to be raised. And this process whereby additional incremental extensions in the separation of the attached elements 6411 and 6417 results in the raising of additional disks continues until all of the disks, including the bottom-most disk 6424, are raised. As such, incremental loading on the connectors are imposed by each successive weight being added. While the top-most disk is raised by the cables 6419 and 6421 and/or connectors which connect the tensioning mechanism to the other elements 6411 and 6417, the other disks are raised by cables, e.g. 6423, and/or connectors linking each disk to the one above as well as to the one below (if any).

While the illustration provided in FIG. 59 shows an embodiment of a tensioning mechanism attached to two other farm elements, equivalent embodiments of the same tensioning mechanism design could be used to provide tension to connections between three or more attached farm elements. The scope of this disclosure extends to all such variations of the illustrated embodiment which would be obvious to one skilled in the art.

Figure 60:
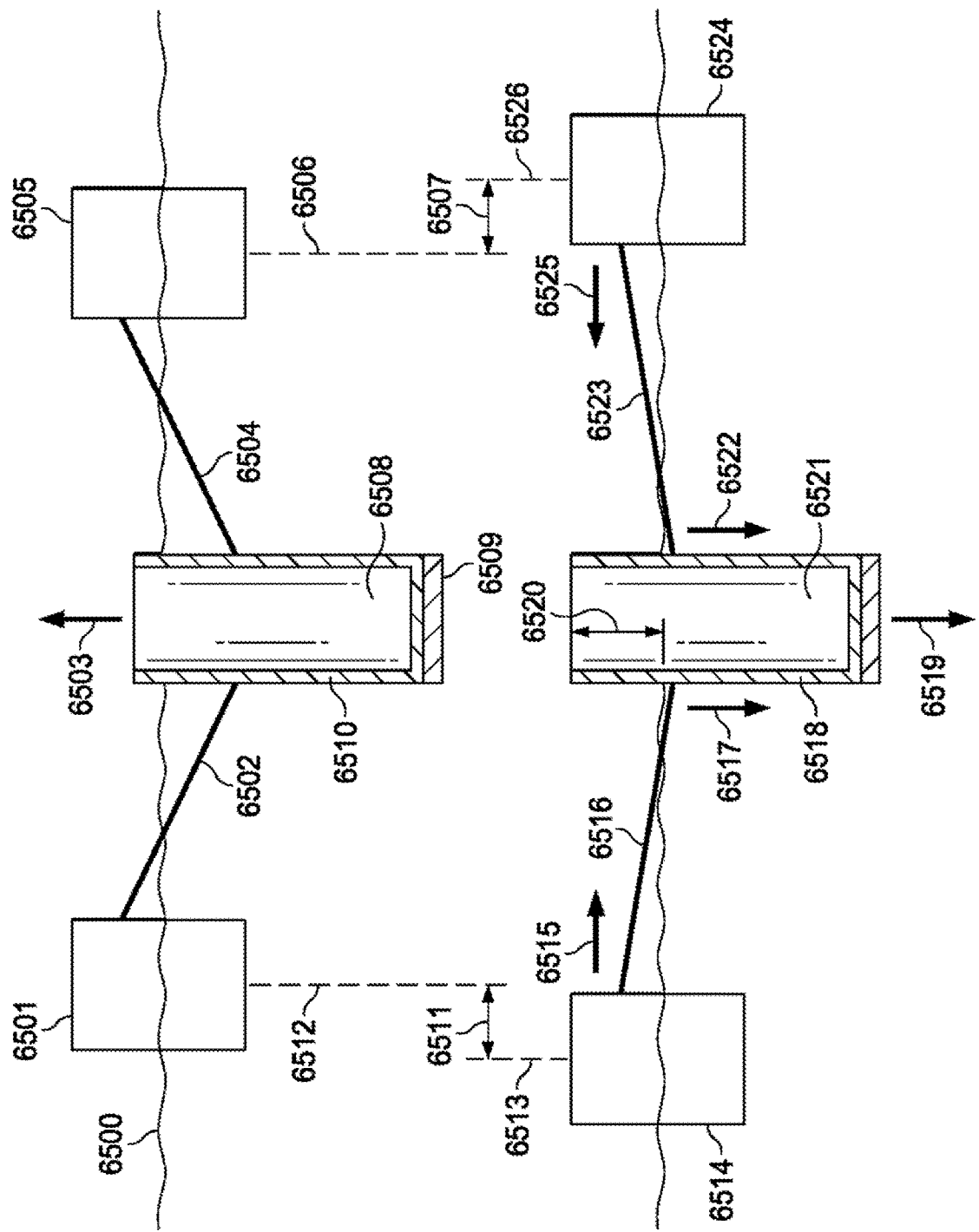
FIG. 60 is a schematic diagram of another buoyancy spring.

FIG. 60 is an illustration of a tensioning mechanism (the combination of 6510 and 6509) in which a hollow chamber 6510, possessing an opening at the upper end, contains water (e.g. seawater). The chamber is neutrally buoyant (or approximately zero buoyancy) when the attached elements 6501 and 6505 are no further separated than the nominal separation distance defined by the chamber and the associated cables 6502 and 6504, and/or connectors.

However, when the attached elements 6514 and 6524 move apart 6511 and 6507, respectively, and become separated by more than the critical distance, then the chamber is raised, which raises at least a portion 6520 of the water inside the chamber above the mean water level, e.g. 6500. Moreover, a part of the buoyant wall 6518 of the chamber is also raised out of the water. Therefore, its buoyancy is no longer able to, at least partially, offset and/or counter the weight, e.g. 6509, at the base of the chamber, which exacerbates the magnitude of the force 6519 exerted by the chamber 6518 on the cables 6516 and 6523. The resulting forces 6515 and 6525 imparted to the attached elements, pulls them back to a proximity that no longer exceeds the critical separation.

While the illustration provided in FIG. 60 shows an embodiment of a tensioning mechanism attached to two other farm elements, equivalent embodiments of the same tensioning mechanism design could be used to provide tension to connections between three or more attached farm elements. The scope of this disclosure extends to all such variations of the illustrated embodiment which would be obvious to one skilled in the art.

Figure 61:
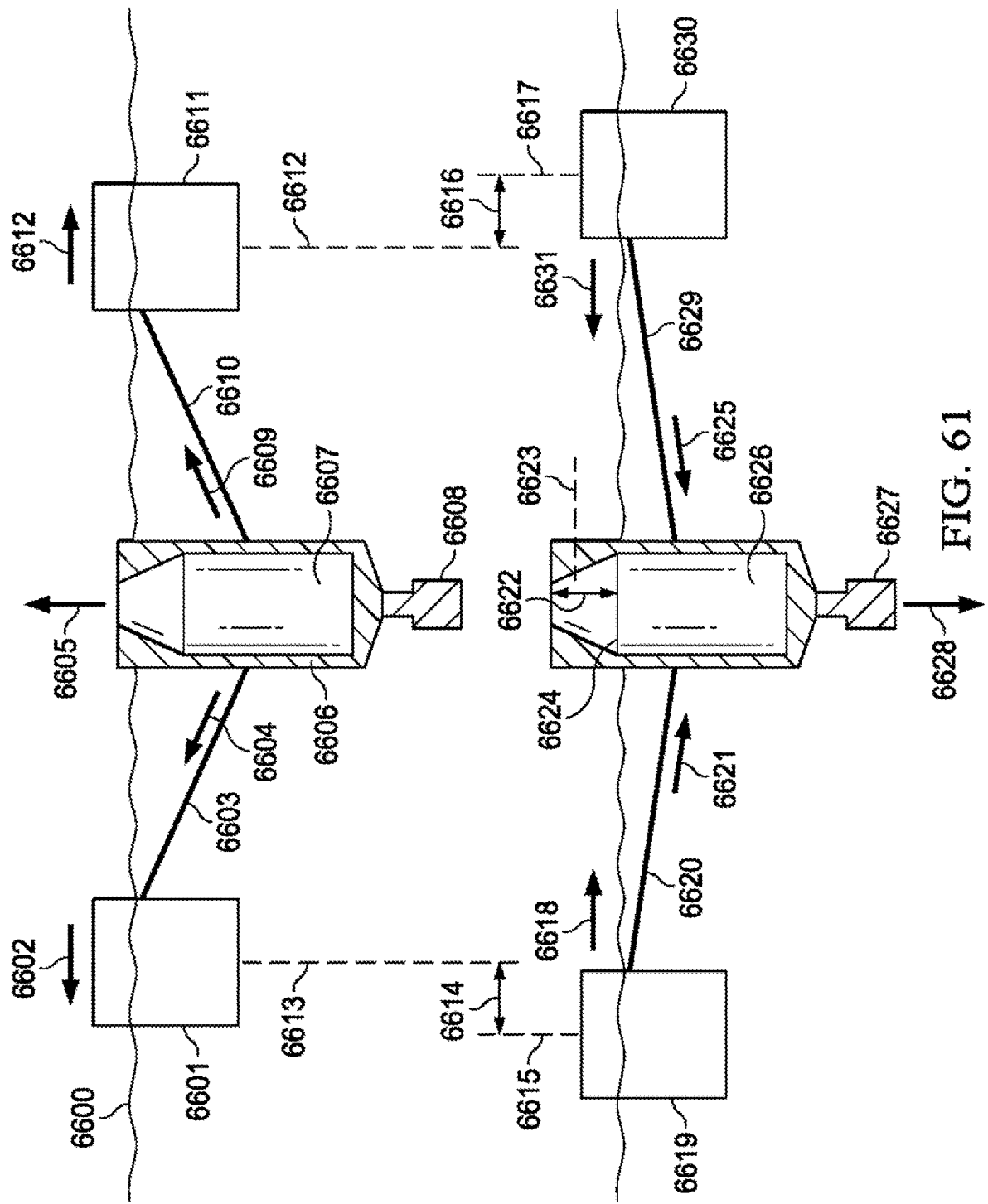
FIG. 61 is a schematic diagram of a variation of the embodiment of FIG. 60.

FIG. 61 illustrates an embodiment of the current disclosure that is similar to the embodiment illustrated in FIG. 60. However, the embodiment in FIG. 61 has an opening at the top of the neutrally buoyant chamber 6606 that is smaller relative to the opening in the embodiment illustrated in FIG. 60. Furthermore, the embodiment illustrated in this figure has a weight 6608 attached to the bottom of the chamber 6606 which differs in design from the weight 6509 attached to the bottom of the chamber in the embodiment illustrated in FIG. 60.

Figure 62:
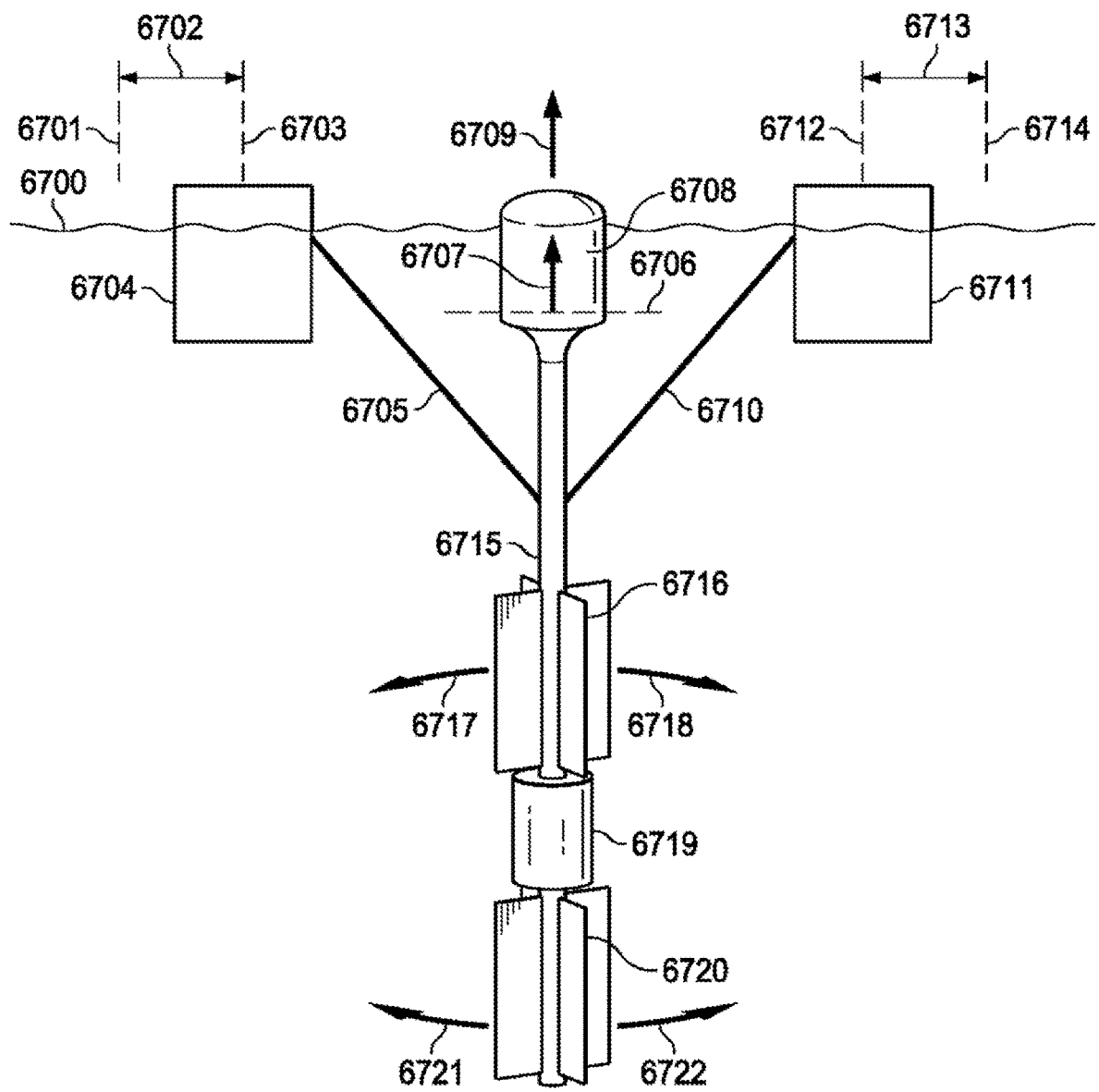
FIG. 62 is a schematic diagram of a buoyancy spring with lateral stabilization.

FIG. 62 illustrates a tensioning mechanism composed of a buoyant upper end 6708 attached, by a strut 6715, to an upper lateral sea anchor 6716, a weight 6719, and a lower lateral sea anchor 6720. The buoyant upper end and the submerged weight work to keep the tensioning mechanism in a vertical orientation. In order for the attached farm elements 6704 and 6711 to separate by more than the nominal maximal separation characteristic of the tensioning mechanism, the cables 6705 and 6710, and/or the connectors, that connect the tensioning mechanism to the connected farm elements 6704 and 6711 must lift the tensioning mechanism such that the upper buoyant end is raised above the mean water level 6700, e.g. until 6706 is raised 6707 up to the mean water level 6700.

When the tensioning mechanism is so raised, then the buoyancy of the buoyant end is significantly reduced and, at least a portion of, the weight 6719 is supported not by the buoyant end 6708 but by the cables 6705 and 6710, and/or the connectors, that connect the tensioning mechanism to the connected farm elements 6704 and 6711, the resulting downward force of the uncompensated weight 6719 draws the overextended attached elements 6704 and 6711 back together. In addition to adding and/or preserving tension between the attached farm elements 6704 and 6711, and resisting the over extension of those farm elements, the illustrated embodiment also resists the movement (e.g. drifting) of the attached pair of farm elements by providing "lateral stabilization" to the tensioning mechanism by means of the lateral sea anchors 6716 and 6720 incorporated therein.

While the illustration provided in FIG. 62 shows an embodiment of a tensioning mechanism attached to two other farm elements, equivalent embodiments of the same tensioning mechanism design could be used to provide tension to connections between three or more attached farm elements. The scope of this disclosure extends to all such variations of the illustrated embodiment which would be obvious to one skilled in the art.

Figure 63:
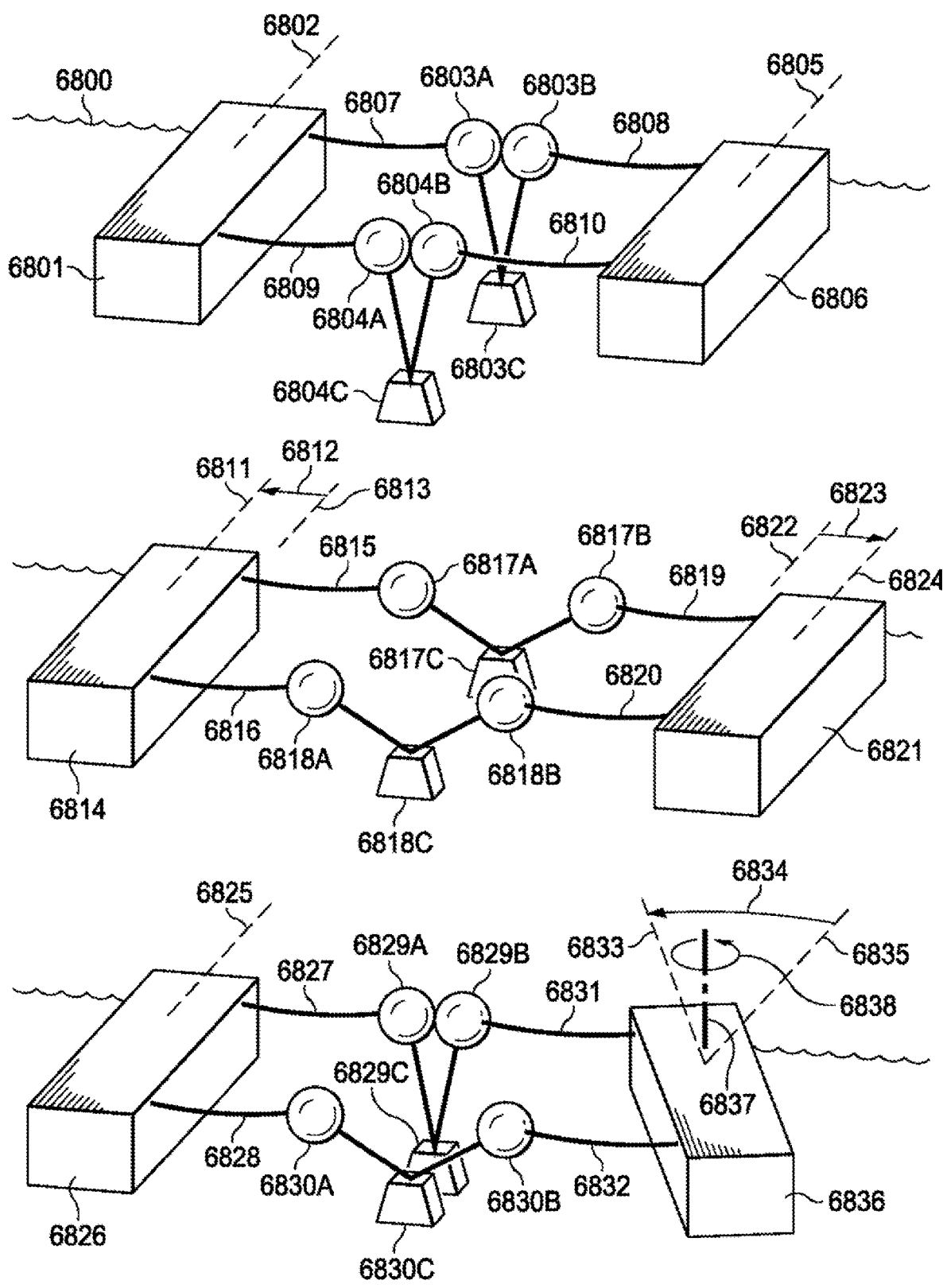
FIG. 63 is a schematic diagram of another embodiment of the present invention.

FIG. 63 illustrates the use of a pair of tensioning mechanisms 6803 and 6804 between a pair of farm elements 6801 and 6806. When the two farm elements 6814 and 6821 move apart, to a separation that exceeds the nominal separation distance (e.g. by the distances 6812 and 6823), then the pair of equally extended tensioning mechanisms 6817 and 6818 will draw the overextended pair of farm elements back together. In this way, this pair of tensioning mechanisms (and any other pair of similar or dissimilar tensioning mechanisms) act together so as to create, in effect, a single tensioning mechanism assembly offering twice the resistance to over extension, and storing twice the restorative potential energy to correct and revert such over extensions, as can be offered by the individual constituent tensioning mechanism.

When one farm element 6836 rotates relative to the other farm element 6826 then one farm element is extended to a greater degree than the other. This unequal extension of the tensioning mechanisms is associated with unequal restorative tensions on the cables 6827, 6828, 6831 and 6832, and/or connectors, attached to a pair of separate points on each attached farm element 6826 and 6836. The unequal restorative forces at the two points on each farm element results in a restorative torque on each attached farm element that restores their original, nominal, relative angular orientations.

With respect to their ability to resist and reverse angular disorientations, two or more tensioning mechanisms linking the same two or more farm elements can provide greater utility than can the linking of those two or more farm elements by means of only a single tensioning mechanism between each unique pair of elements.

Figure 64:
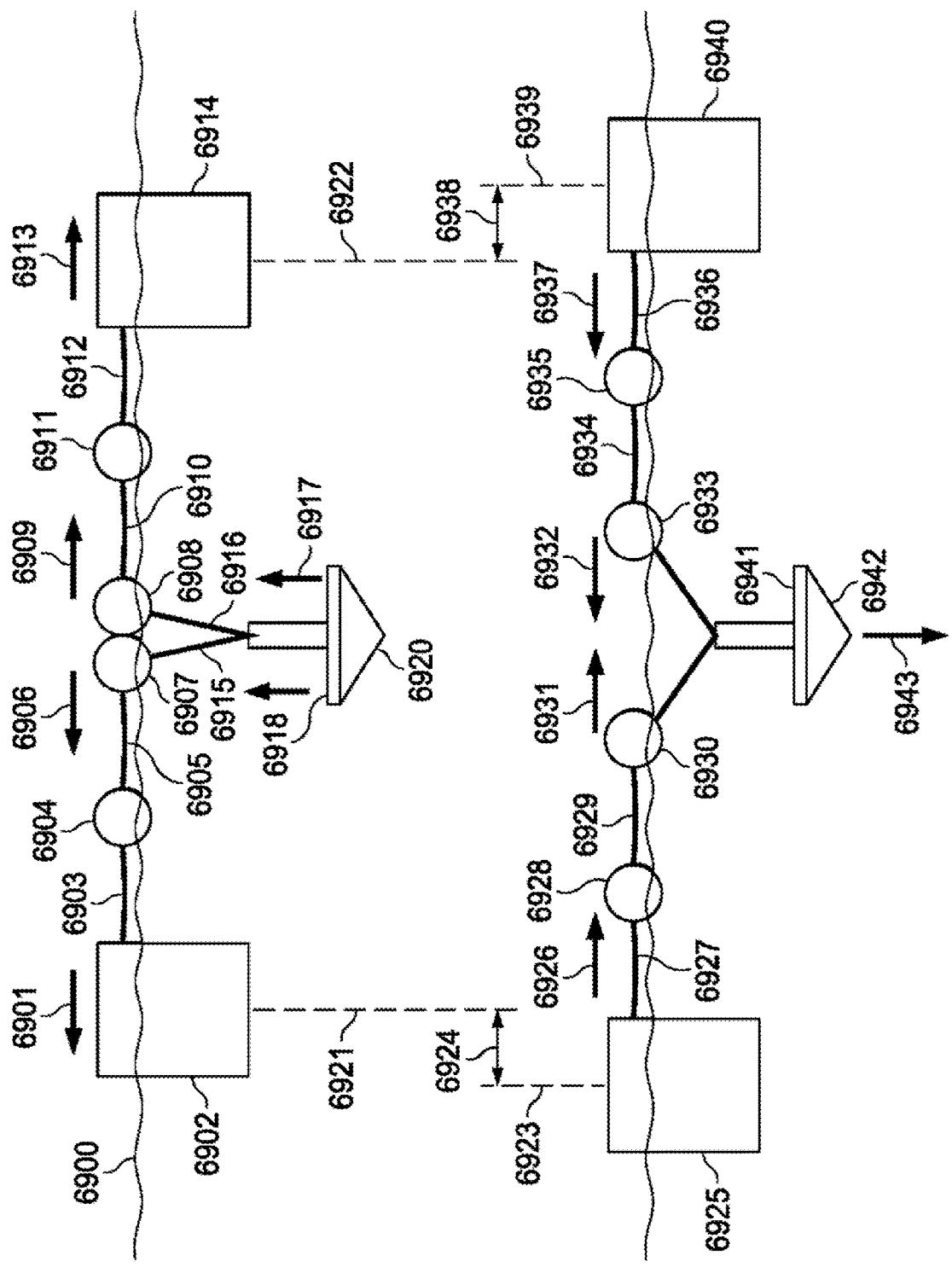
FIG. 64 is a schematic diagram of another embodiment of the present invention.

FIG. 64 illustrates a tensioning mechanism (a combination of 6918 and 6920) attached to two farm elements 6902 and 6914. The illustrated tensioning mechanism incorporates a vertical sea anchor 6918, i.e. the upper flat side of the weight, that increases the drag that must be overcome for the weight to rise and/or to be lifted. By contrast, the bottom side 6920 of the weight is conical, angled, and/or pointed, so as to reduce the drag that is associated with the sinking of the weight. Working together, the significantly greater drag that resists the raising of the weight, and thereby resists the separation of the attached floats 6907 and 6908, as well as the separation of the attached farm elements 6902 and 6914 beyond their nominal separation distance, provides additional resistance to the over extension of the attached elements without a commensurately large increase in the actual mass, or in the specific weight, of the weight (6918 and 6920) suspended beneath the two floats 6907 and 6908. Moreover, note that the connection between the tensioning mechanism and element 6902 includes an intermediate float 6904. The connection between the tensioning mechanism and element 6914 also includes an intermediate float 6911. These intermediate floats are not anchoring elements, tensioning mechanisms, junction elements, nor operational elements.

Actual farms will be adapted in idiosyncratic ways, for specialized purposes, and/or for no obvious reason at all. The scope of this disclosure extends to all farms which incorporate the disclosed elements, and/or incorporate these disclosed elements in characteristic assemblies. However, it also extends to elements and/or patterns of deployment that add "extraneous" and/or extra components, constituents, parts, assemblies, etc., to and/or within an element and/or pattern of deployment that would otherwise more fully flow from this disclosure. In other words, the addition of extra parts, components, constituents, etc., to a farm and/or element of the type(s) disclosed herein does not eliminate the utility, value, and/or foundation, to which those extra parts, components, constituents, etc., were added. The scope of this disclosure extends to, and includes, any novel farm element and/or any novel farm formation consistent with this disclosure, even if said farm element and/or farm formation is modified through the inclusion, embedding, interconnection, and/or decoration of the herein disclosed farm element(s) and/or farm formation(s). If any farm element and/or farm formation can be designed, constructed, and/or specified, through the modification of a farm element and/or farm formation consistent with the novel farm elements and/or farm assemblies herein disclosed, then such "modified" farm elements and/or farm assemblies also fall within the scope of this disclosure.

Figure 65:
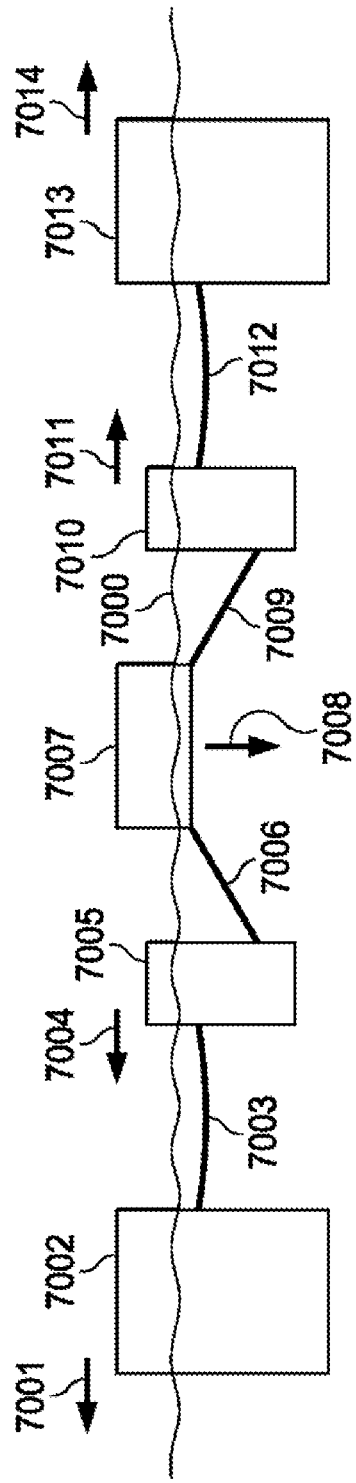
FIGS. 65-67 are schematic diagrams of other embodiments of the present invention.
Figure 66:
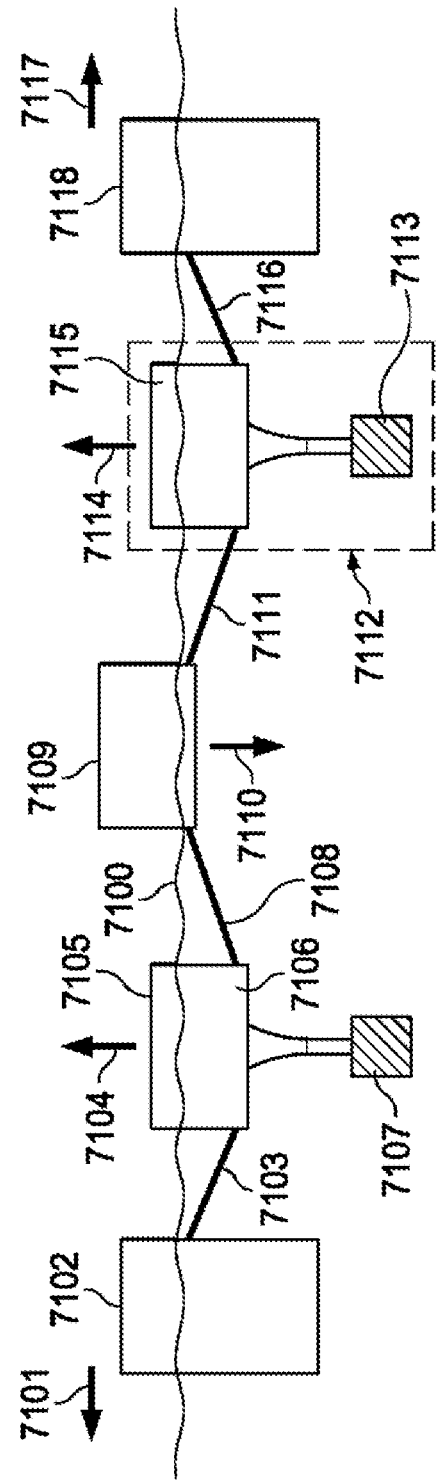

FIG. 65 illustrates a tensioning mechanism 7007 connected to two adjacent "extraneous" elements 7005 and 7010 (which are floats), and which are in turn connected to two farm elements 7002 and 7013. FIG. 66 illustrates two outer farm elements 7102 and 7118 that are each connected to opposing ends of a series of floats 7105, 7109, and 7112. The central float 7109 nominally floats at the surface 7100 of a body of water, and is attached to its neighbors 7105 and 7112 by connectors that connect it to points on its neighbors wherein those neighbor connection points are at greater depths than the corresponding and/or respective connection points on the float 7109. Thus when its neighbors are separated by more than the nominal separation distance, the float 7109 is pulled down to a greater depth. The resulting increase in the buoyant force of the tensioning mechanism, which opposes its submersion, draws the element's neighbors back to a nominal separation distance.

Each neighbor 7105 and 7112 to the central float 7109 is nominally adjacent to the surface 7100. However, unlike the positive buoyancy of the central float 7109, the neighbors 7105 and 7112 have buoyancies that are only slightly greater than neutral buoyancy. These floats 7105 and 7112 are attached to their "outer" neighbors 7102 and 7118 by connectors that connect them to points on their outer neighbors wherein those connection points on the outer neighbors are at lesser depths than the corresponding and/or respective connection points on the floats 7105 and 7112. Thus when the outer neighbors of either floats 7105 or 7112 are separated by more than the nominal separation distance, the respective floats 7105 and/or 7112 are pulled up to a lesser depth. The resulting decrease in the buoyant force of the respective float(s) 7105 and/or 7112, promotes its eventual submersion, which draws the outer neighbors of the respective float(s) back to a nominal separation distance.

While the float 7109 is drawn down into the water as it resists over extension of its portion of the farm formation, the floats 7105 and 7112, which are connected to opposing sides of element 7109, are drawn up and out of the water. Thus, an over extension of the outer farm elements 7102 and 7118 results in the raising up of floats 7105 and 7112, and the pulling down of float 7109. This arrangement of alternately rising and falling floats creates a useful tensioning circuit in which the resisting motions of neighboring floats complement one another.

Figure 67:
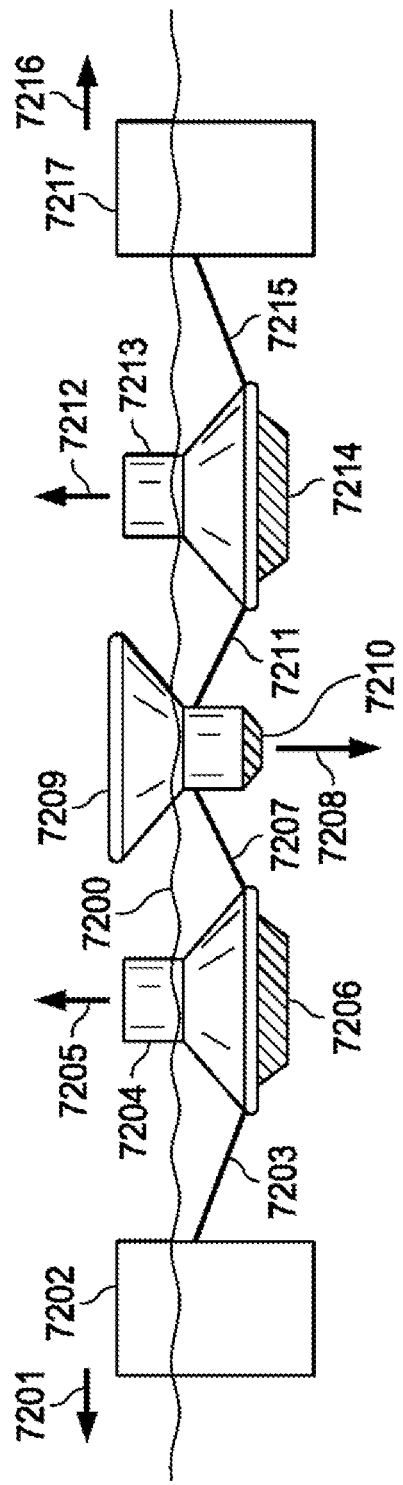

FIG. 67 illustrates a series of alternating rising and falling floats similar to the one illustrated in FIG. 66, and is also an embodiment of the current disclosure. While the cross-sectional areas of the portions of the floats illustrated in FIG. 66 are relatively constant, and therefore provide vertical resistive forces that vary in an approximately linear correlation with the change in the float's depth; the cross-sectional areas of the portions of the floats illustrated in FIG. 67 are not constant and increase significantly and exponentially with increases in their change in depth, and therefore provide vertical resistive forces that increase exponentially with increases in the changes in depths of the respective floats. The floats illustrated in FIG. 67 have buoyant portions, e.g. 7204, at their upper sides, and negatively buoyant (i.e. "heavy") portions, e.g. 7206, at their bottom sides. The angled (i.e. non-vertical) sides of the floats in FIG. 67 allow them to be positioned more closely together.

Figure 68:
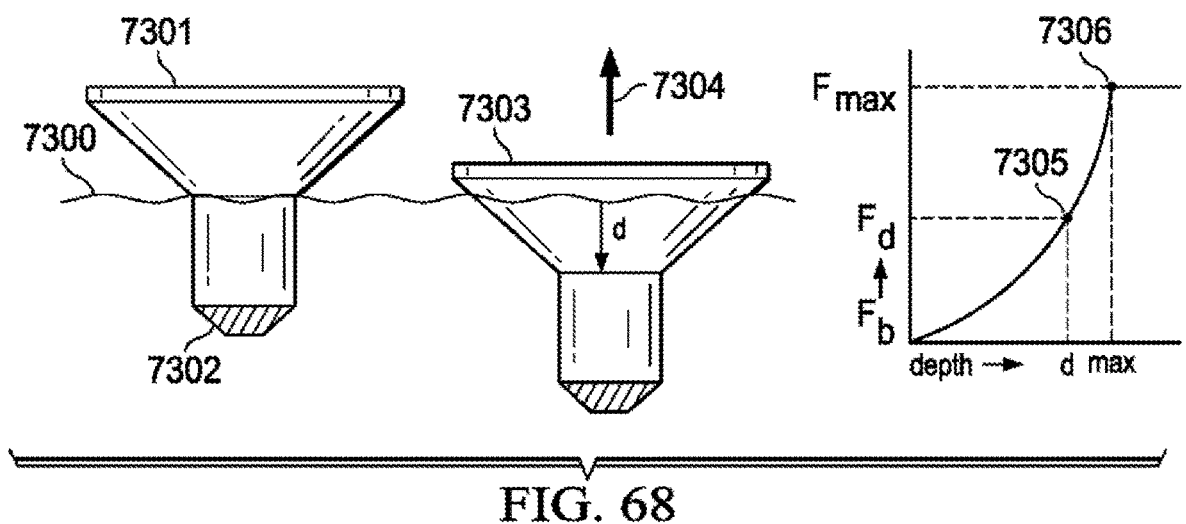
FIGS. 68-71 are a schematic diagrams and charts of buoyant elements.

FIG. 68 illustrates a tensioning mechanism (combination of a float 7301 and a weight 7302) and this figure illustrates the opportunity to adjust, tune, customize, and/or manifest, any desirable resistive-force profile and/or relationship regarding the amount of "vertical" resistive force that will be generated by the element in response to its incremental submersion when neighboring elements (not shown, and attached at connection points of greater depth than the respective and/or corresponding connection points at which the tensioning mechanism is to them connected) over extend and pull the tensioning mechanism down to a greater depth. For example, when float 7301 is pulled down so that it 7303 is positioned at a relative depth of "d", then the vertical buoyant force generated will be 7304 and have a magnitude of "Fd" at depth "d" 7305 as indicated in the associated graph. After the float 7303 is completely submerged, the vertical buoyant force generated will be maximal and correspond to "Fmax" at depth "max" 7306 as indicated in the associated graph. After becoming fully submerged, the vertical resistive force generated by the float 7303 will be constant, e.g. the force profile to the right of point 7306.

The "vertical" force 7304 resulting from the submersion of the float 7303 increases exponentially with increases in depth, and by the profile specified in the associated graph. The actual force imparted by a tensioning mechanism that is drawn up out of the water, and/or drawn down to a greater depth, to two overly separated farm elements, and, therefore, the force that draws those two overly separated farm elements back together, is related to the angles, and to the changes in angles, of the connectors which connect the tensioning mechanism to its neighbors.

Figure 69:
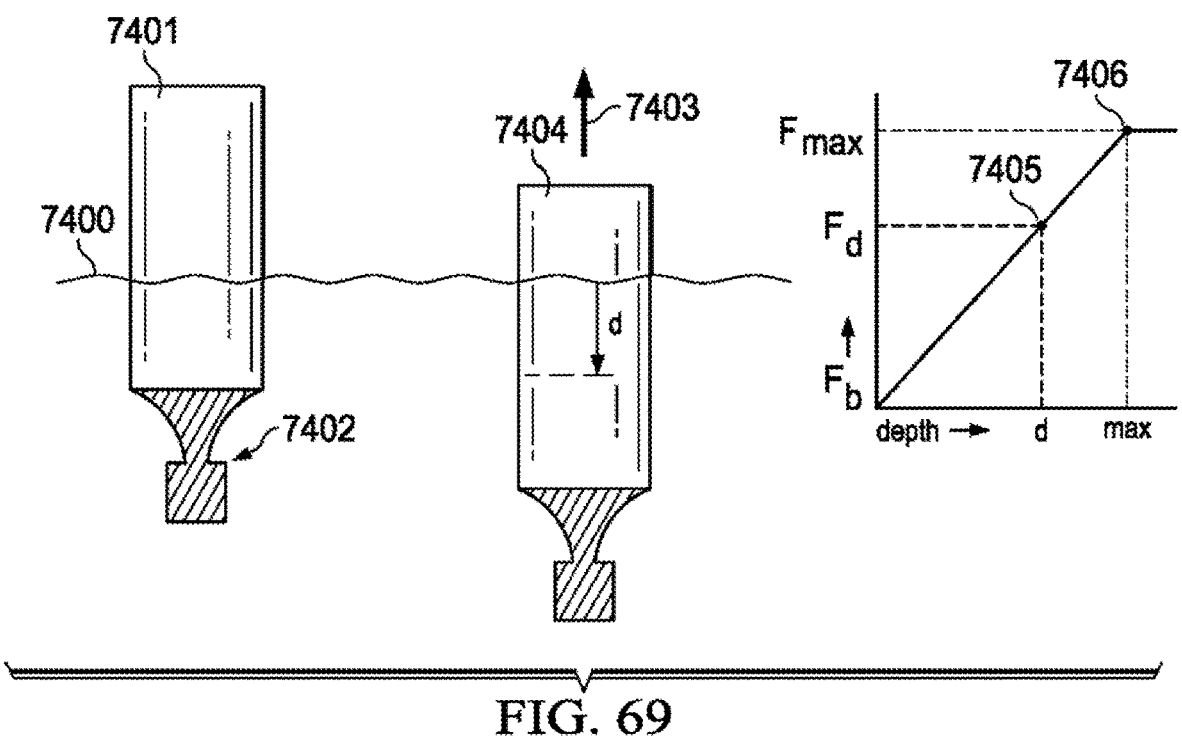

FIG. 69 illustrates a tensioning mechanism (combination of a float 7401 and a weight 7402) and this figure illustrates the opportunity to adjust, tune, customize, and/or manifest, any desirable resistive-force profile and/or relationship regarding the amount of "vertical" resistive force that will be generated by the element in response to its incremental submersion when neighboring elements (not shown, and attached at connection points of greater depth than the respective and/or corresponding connection points at which the tensioning mechanism is to them connected) over extend and pull the tensioning mechanism down to a greater depth. For example, when float 7401 is pulled down so that it 7404 is positioned at a relative depth of "d", then the vertical buoyant force generated will be 7403 and have a magnitude of "Fd" at depth "d" 7405 as indicated in the associated graph. After the float 7404 is completely submerged, the vertical buoyant force generated will be maximal and correspond to "Fmax" at depth "max" 7406 as indicated in the associated graph. After becoming fully submerged, the vertical resistive force generated by the float 7404 will be constant, e.g. the force profile to the right of point 7406. The "vertical" force 7403 resulting from the submersion of the float 7404 increases linearly with increases in depth, and by the profile specified in the associated graph.

Figure 70:
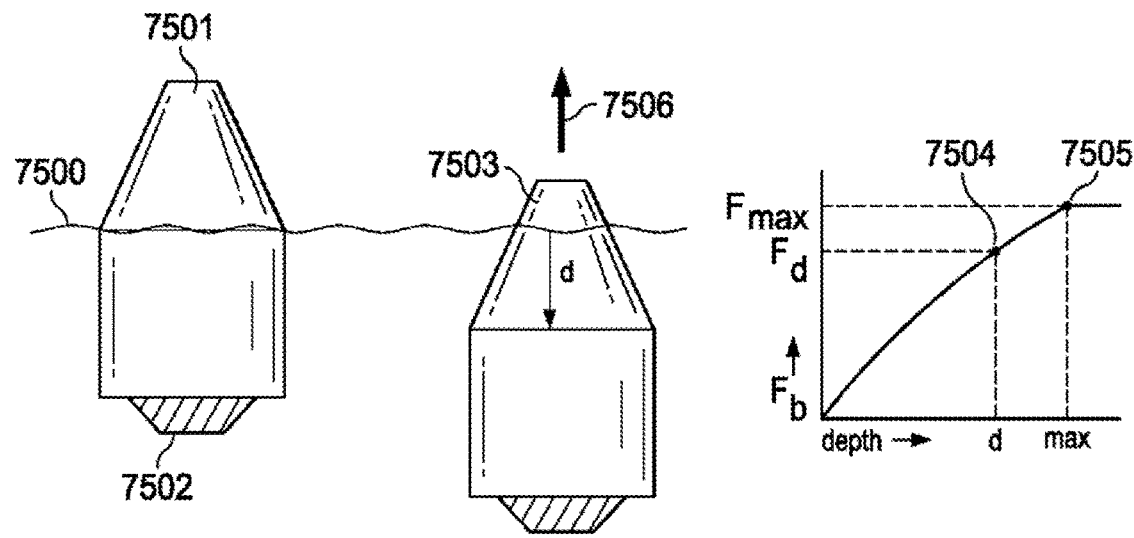

FIG. 70 illustrates a tensioning mechanism (combination of a float 7501 and a weight 7502) and this figure illustrates the opportunity to adjust, tune, customize, and/or manifest, any desirable resistive-force profile and/or relationship regarding the amount of "vertical" resistive force that will be generated by the element in response to its incremental submersion when neighboring elements (not shown, and attached at connection points of greater depth than the respective and/or corresponding connection points at which the tensioning mechanism is to them connected) over extend and pull the tensioning mechanism down to a greater depth. For example, when tensioning mechanism 7501 is pulled down so that it 7503 is positioned at a relative depth of "d", then the vertical buoyant force generated will be 7506 and have a magnitude of "Fd" at depth "d" 7504 as indicated in the associated graph. After the tensioning mechanism 7503 is completely submerged, the vertical buoyant force generated will be maximal and correspond to "Fmax" at depth "max" 7505 as indicated in the associated graph. After becoming fully submerged, the vertical resistive force generated by the tensioning mechanism 7503 will be constant, e.g. the force profile to the right of point 7505. The "vertical" force 7506 resulting from the submersion of the tensioning mechanism 7503 increases in a diminishing fashion with increases in depth, and by the profile specified in the associated graph.

Figure 71:
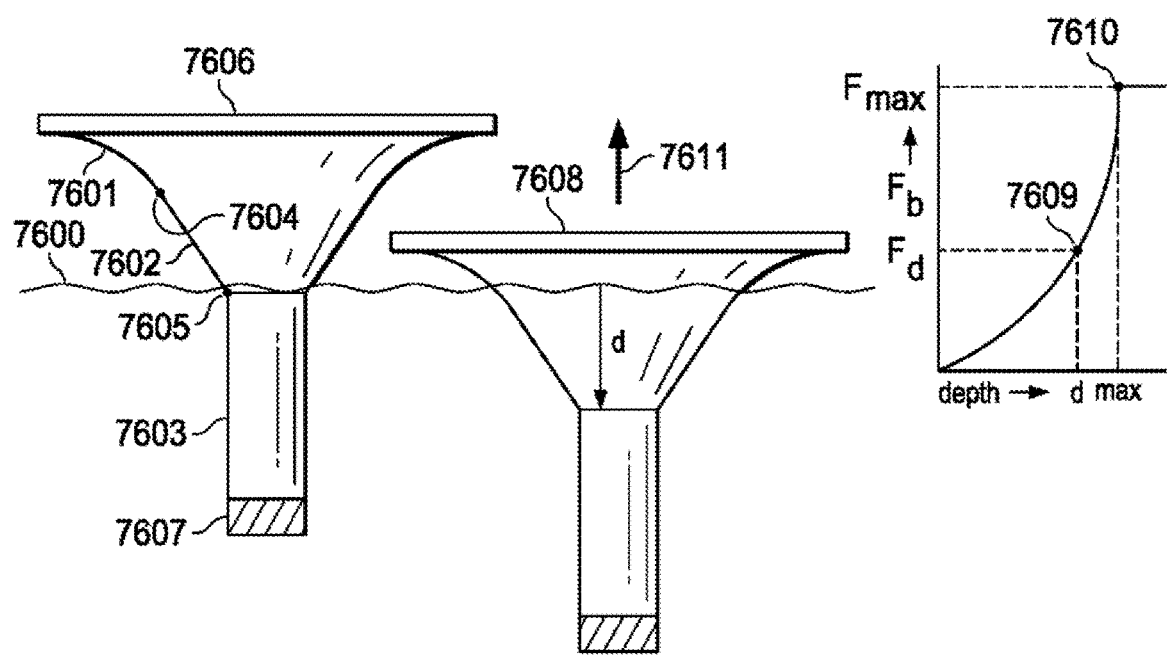

FIG. 71 is an illustration of a tensioning mechanism (combination of a float 7606 and a weight 7607) and this figure illustrates the opportunity to adjust, tune, customize, and/or manifest, any desirable resistive-force profile and/or relationship regarding the amount of "vertical" resistive force that will be generated by the element in response to its incremental submersion when neighboring elements (not shown, and attached at connection points of greater depth than the respective and/or corresponding connection points at which the tensioning mechanism is to them connected) extend beyond a nominal separation and pull the tensioning mechanism down to a greater depth. For example, when tensioning mechanism 7606 is pulled down so that it 7608 is positioned at a relative depth of "d", then the vertical buoyant force generated will be 7611 and have a magnitude of "Fd" at depth "d" 7609 as indicated in the associated graph. When the tensioning mechanism 7608 is further submerged (past depth "d") the rate of its increase in buoyancy will grow rapidly, i.e. due to the more rapid increase in the water-plane area of tensioning mechanism 7608, and faster than the rate at which it grew in response to increases in depth up to the depth "d"—see the curve between points 7609 and 7610 on the associated graph.

After the tensioning mechanism 7608 is completely submerged, the vertical buoyant force generated will be maximal and correspond to "Fmax" at depth "max" 7610 as indicated in the associated graph. After becoming fully submerged, the vertical resistive force generated by the tensioning mechanism 7608 will be constant, e.g. the force profile to the right of point 7610. The "vertical" force 7611 resulting from the submersion of the tensioning mechanism 7608 increases in two stages. The first stage is from its position of neutral buoyancy, e.g. 7606, down to a depth of "d". During this stage the buoyant force opposing its submersion grows rapidly, e.g. exponentially. And, though the buoyant force opposing its submersion also grows rapidly, e.g. exponentially, from depths of "d" up to the point of its complete submersion, this second rate of increase is greater than that of the first stage.

Figure 72:
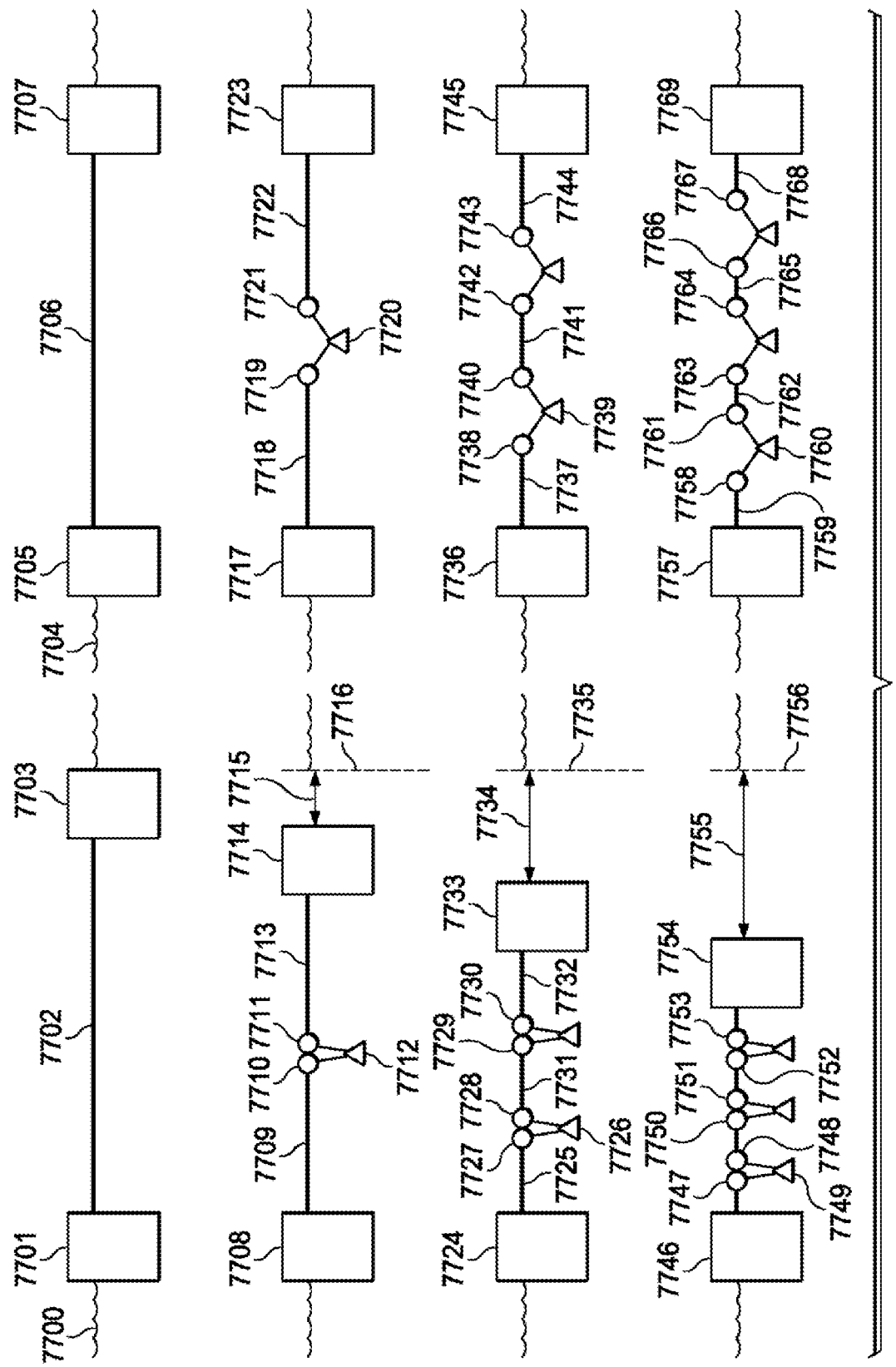
FIG. 72 is a schematic diagram of the operation of one, two, and three buoyant springs.

FIG. 72 illustrates the utility of tensioning mechanisms, and the utility of adjusting, "tuning", selecting, and/or matching, the resistive and/or restorative force of a tensioning mechanism (singular and/or compound) to the farm, network, and/or operational elements being stabilized. At the top, two farm elements 7701 and 7703 are connected by a connector 7702. If free to drift, these two elements will tend to drift until the connector connecting them is taught. After reaching that separation, which is also their maximum separation, any sufficiently large force, especially if that force is impulsive, will risk breaking the connector and/or the attachment means by which the connector is connected to the two elements.

Second from the top are two farm elements 7708 and 7714 which are connected by a connector in which is embedded a single tensioning mechanism (7710-7712). When fully extended, the two elements 7717 and 7723 can achieve the same maximum separation that can be achieved by the configuration above in which two elements 7705 and 7707 are connected by a connector lacking any tensioning mechanism(s). However, because of the tensioning mechanism's influence the default, nominal, resting separation distance of the two elements 7708 and 7714 is now shorter than that of the configuration lacking any tensioning mechanism(s). Because any strong transient and/or impulsive force driving the two elements 7708 and 7714 apart must first extend the tensioning mechanism 7710-7712 into an extended configuration 7719-7721, such a separation of elements 7708 and 7714 some of the energy driving them apart will be absorbed, stored, and/or diverted, as potential energy, and their separation will be delayed, perhaps by a long enough time period for the separating force to diminish.

The tensioning mechanism may also change the resonant frequency of the connected two-element circuit so that it becomes, at least partially, unresponsive to separating impulses of certain frequencies and/or durations. The tensioning mechanism will also absorb some of the energy driving apart the two elements, and, if the periodicity between the separating impulses is long enough, will restore, at least partially, the nominal "shortened" separation of the elements. By restoring, at least partially, some of the "cushion" afforded by a shortened connector, the tensioning mechanism promotes the continued ability of the connector to extend, under tension and with resistance, to future separating impulses. Because of its ability and effect of creating a buffer within a connector, said buffer reduces the probability and/or possibility that a fully-extended connector can be subjected to an impulsive force sufficient to break it and/or its means of connection with attached elements.

In unstable bodies of water, e.g. those characterized by waves and storms, the ability of a formation of energy converters or other types of farm to absorb, without breaking, the impulsive water-mediated forces that might otherwise result in a catastrophic failure of the farm's integrity is particularly valuable. In the present disclosure, this resistance to impulsive and catastrophic losses of interconnection integrity is provided by tensioning mechanisms such as, for example, buoyant springs.

In the lower two configurations illustrated in FIG. 72, the effect, and potential benefit, afforded by two or more tensioning mechanisms being embedded within the same connector is illustrated. Two or more tensioning mechanisms provide incrementally shorter nominal separations between other farm elements. And, because of the concomitant increases in the distances (e.g. 7734 and 7755) over which such farm assemblies can be extended under tension and/or resistance, as well as because of the multiplied degree of resistance, and potential energy storage capacity, that will oppose a maximal extension of such an assembly, the use of multiple tensioning mechanisms has potential benefit for some applications, e.g. the deployment and maintenance of farms in particularly chaotic and hostile environments. Also note that, as discussed in reference to FIGS. 68-71, the resistive power and profiles of individual tensioning mechanisms can be designed to meet specific needs and anticipated challenges.

Figure 73:
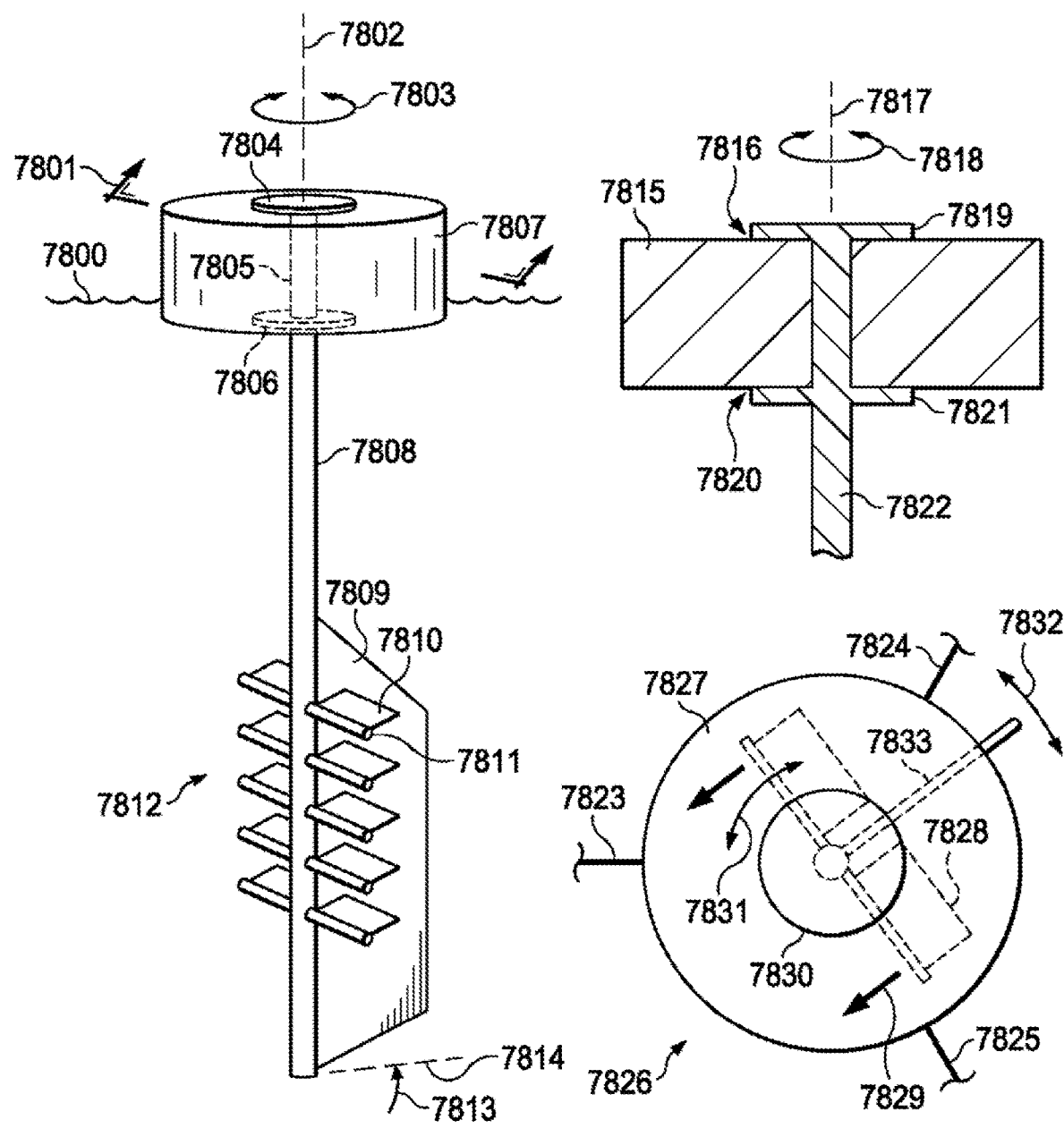
FIG. 73 are various views of a buoyant anchor with lateral stabilizing.

FIG. 73 is an illustration of a laterally-stabilized anchoring element. A strut 7808 is rotatably attached (via plates 7804 and 7806 and strut segment 7805) to a floatation module 7807 which floats adjacent to the surface 7800 of a body of water, e.g. the surface of the sea. The float 7815 is able to move vertically (at least slightly) between the plates 7819 and 7821 which facilitates the ability of the strut 7822 to turn 7818 when the element is moving up and down in response to waves. At the deep-end of the strut is attached a "fin" or "vane" 7809, which retreats from any prevailing current 7812 and 7826 flowing through the water around it and laterally rotates 7813 and 7832 the vane about the element's vertical longitudinal axis, thereby turning the opposing side of the strut "into" the current, in the same way that a wind vane points its arrow into the wind.

Attached to the distal end of the strut, adjacent to the fin 7809, are a number of flaps, e.g. 7810 and 7828. These flaps resistively rotate about axes, e.g. 7811, that are mounted and/or attached to the strut in directions approximately normal to the strut's longitudinal axis 7802 and also approximately normal to the plane defined by the fin 7809. Thus, in the presence of a current within the body of water at a depth at or near the depth of the fin, the fin will turn to point the array of flaps "into" the current, after which these flaps will generate lateral thrust, e.g. 7829 in response to any vertical motions, e.g. the heave of waves, imparted to the buoy. The flap-generated thrust, e.g. 7829, will directly oppose the prevailing current 7812 and 7826. An alternate embodiment utilizes a fixed strut which does not rotate and is instead angularly adjusted and/or set so as to oppose a current at a farm deployment site whose direction is stable and does not tend to change (very much) from a default or nominal direction.

Figure 74:
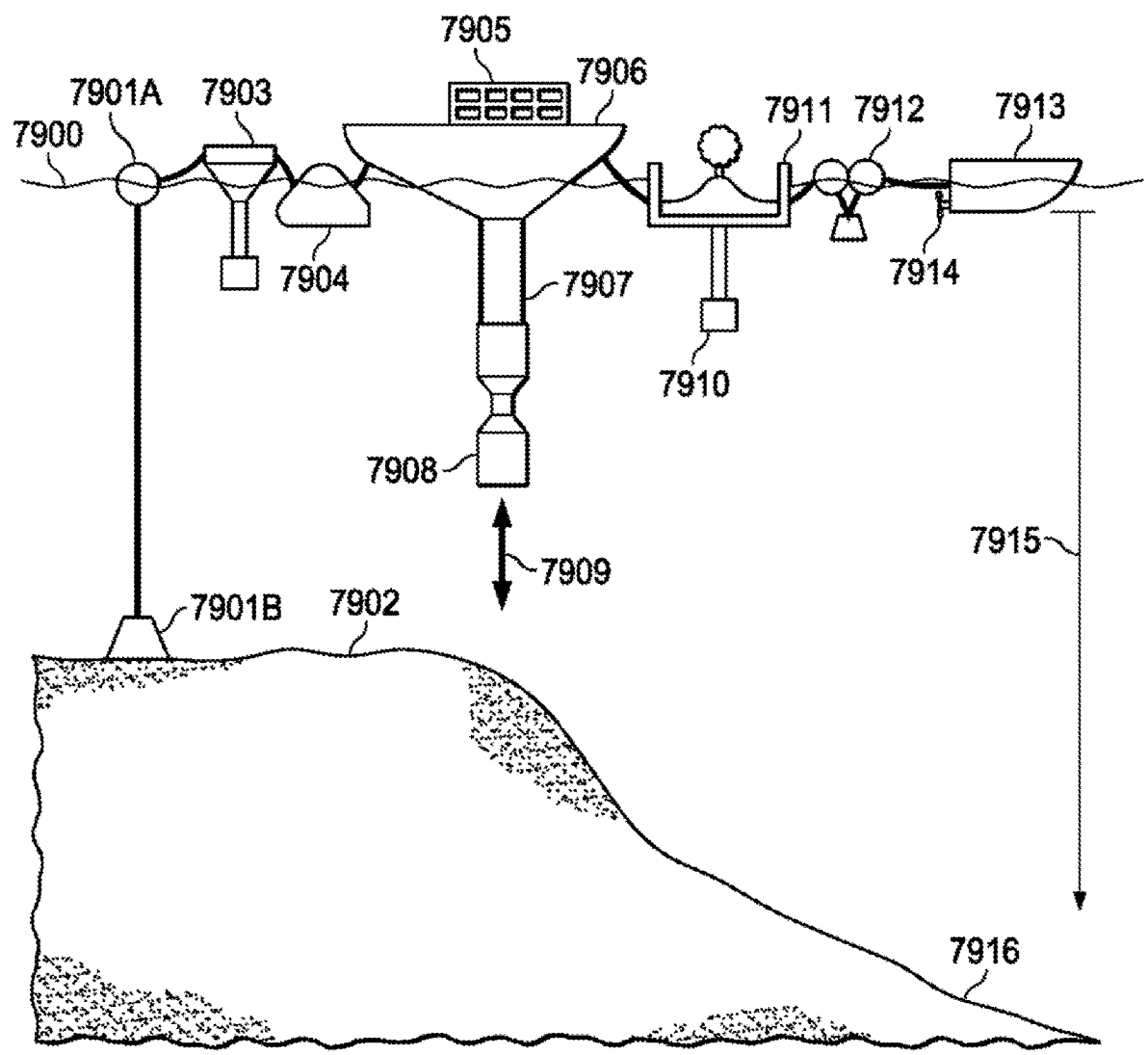
FIGS. 74-77 are schematic diagrams of exemplary preferred embodiments.

FIG. 74 is an illustration of a farm possessing two anchoring elements: one which incorporates a deadweight anchor 7901B resting on the ground (e.g. seafloor), and the other is a self-propelled vessel 7913 or buoy. Because of the greater depth of the water at 7916 the use of a self-propelled anchoring element 7913 may be more cost effective and/or efficient than using a second tethered deadweight anchor at 7916. This farm network has seven elements: two anchoring elements 7901 and 7913; four tensioning mechanisms 7903-7904 and 7911-7912; and one operational element 7906. Note that tensioning mechanism 7911 is also an operational element (providing a greenspace in a sea steading community). Also note that operational element 7906 provides a structure/space 7905 that may be used as living quarters, a manufacturing facility, etc. Operational element 7906 also extracts energy from waves through its incorporation of a point-absorbing Venturi-based wave-energy converter 7908 that generates power in response to the heave motion 7909 imparted by passing waves.

Figure 75:
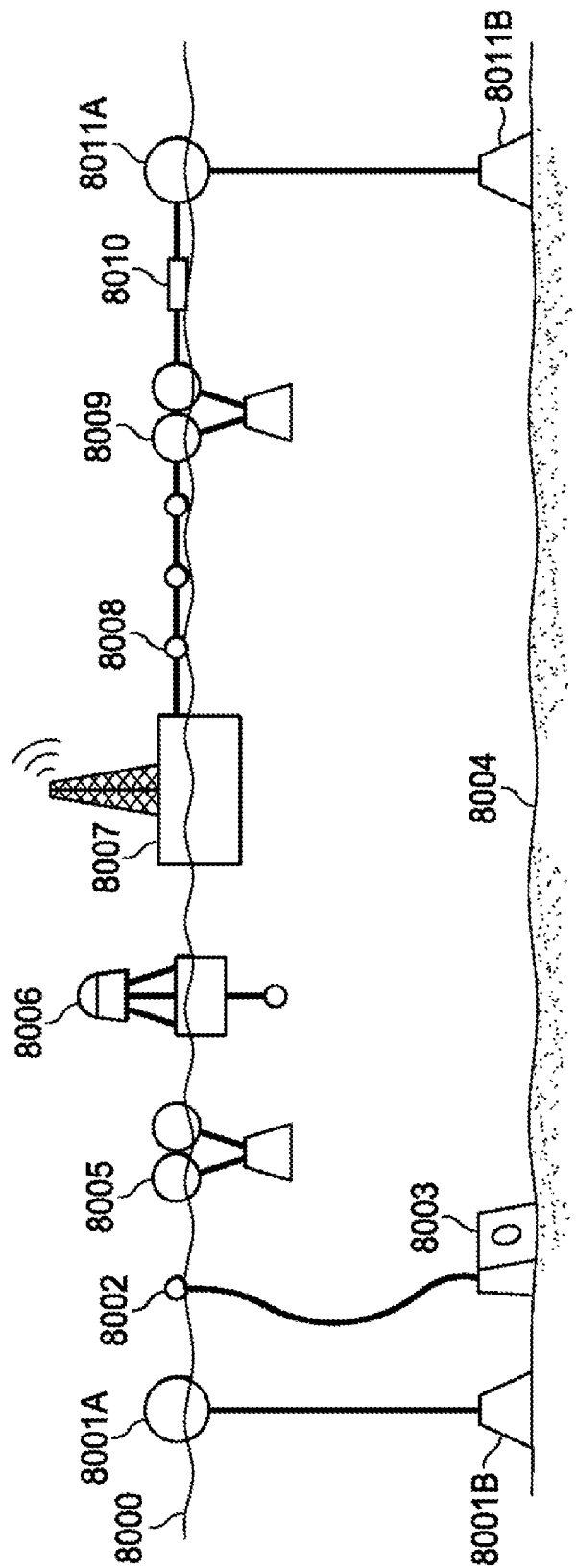

FIG. 75 is an illustration of a farm possessing eleven elements, including two anchoring elements 8001 and 8011; two tensioning mechanisms 8005 and 8009; one junction element 8010; three operational elements 8002-8003 (a lobster trap 8003 and float 8002), 8006 (a navigational aid) and 8007 (a communications device); and note the incorporation of three "extraneous" elements (floats attached to the connector), e.g. 8008.

Figure 76:
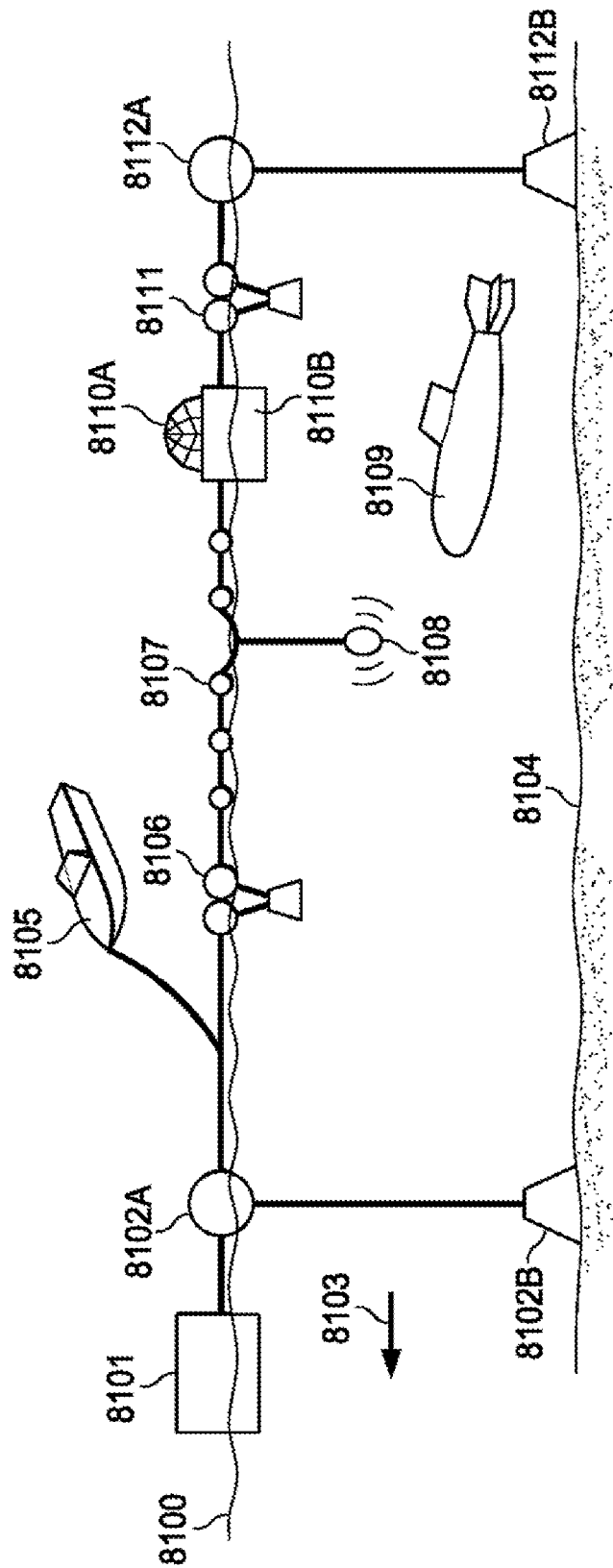

FIG. 76 is an illustration of a farm possessing thirteen elements, including two anchoring elements 8102 and 8112; two tensioning mechanisms 8106 and 8111; three operational elements 8101 (e.g. a storage container), 8108 (a hydrophone for listening for submarines, e.g. 8109), 8110 (a radar station); and six "extraneous" elements 8105 (a boat temporarily tethered to the network), and five floats, e.g. 8107, attached to a connector. Note that operational element 8108 is directly suspended from a connector without a corresponding or associated float. And note that operational element 8101 is free to drift to the left of anchoring element 8102 because of a prevailing current 8103 that precludes the need for a complementary and opposite anchoring element on the left side of operational element 8101.

Figure 77:
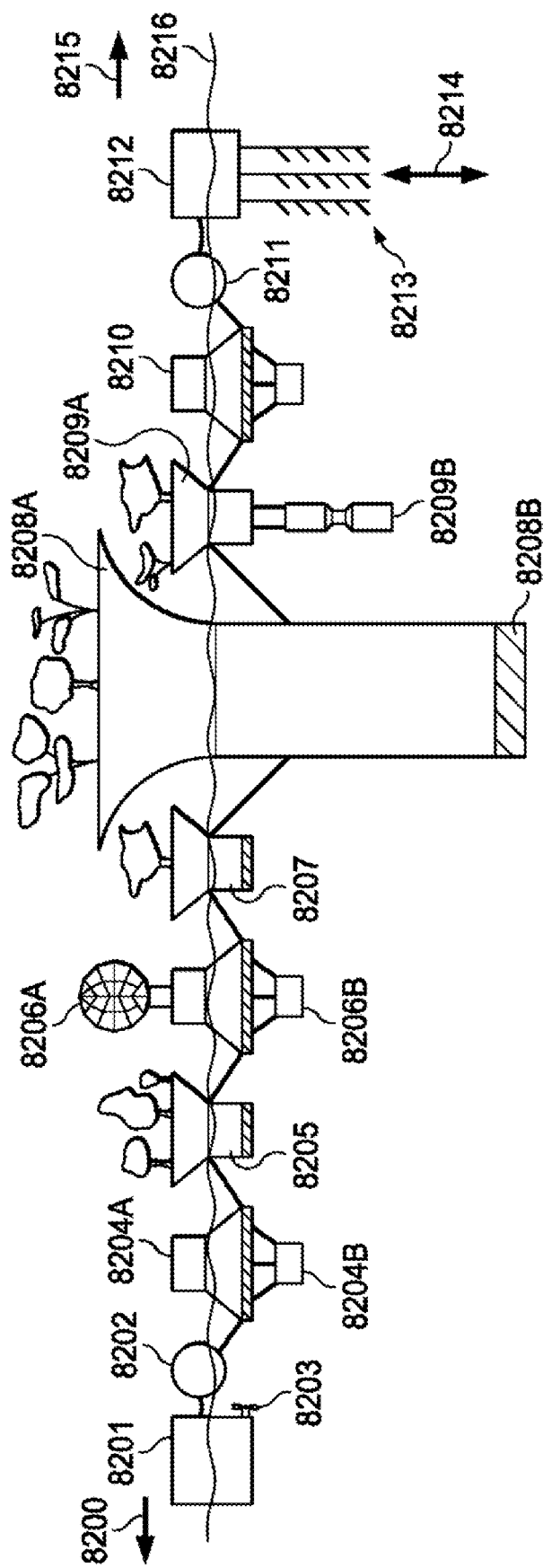

FIG. 77 is an illustration of a farm possessing eleven elements, including two self-propelled anchoring elements 8201 (e.g. using a motor-driven propeller 8203) and 8212 (a surge-driven buoy that generates lateral thrust 8215 that pulls against the farm in response to wave-induced vertical movements 8214 of the buoy); eight tensioning mechanisms 8202, 8204-8207 and 8209-8211; and one operational element 8208 (providing living space for humans). Some elements may qualify for and/or belong to two or more categories. For instance, element 8209 is both a tensioning mechanism (being pulled down and offering buoyant resistance to over-extensions of the network) and an operational element (generating electrical power in response to wave heave through its incorporation of a point absorbing Venturi tube 8209B, as well as providing a living space at its upper side 8209A).

Figure 78:
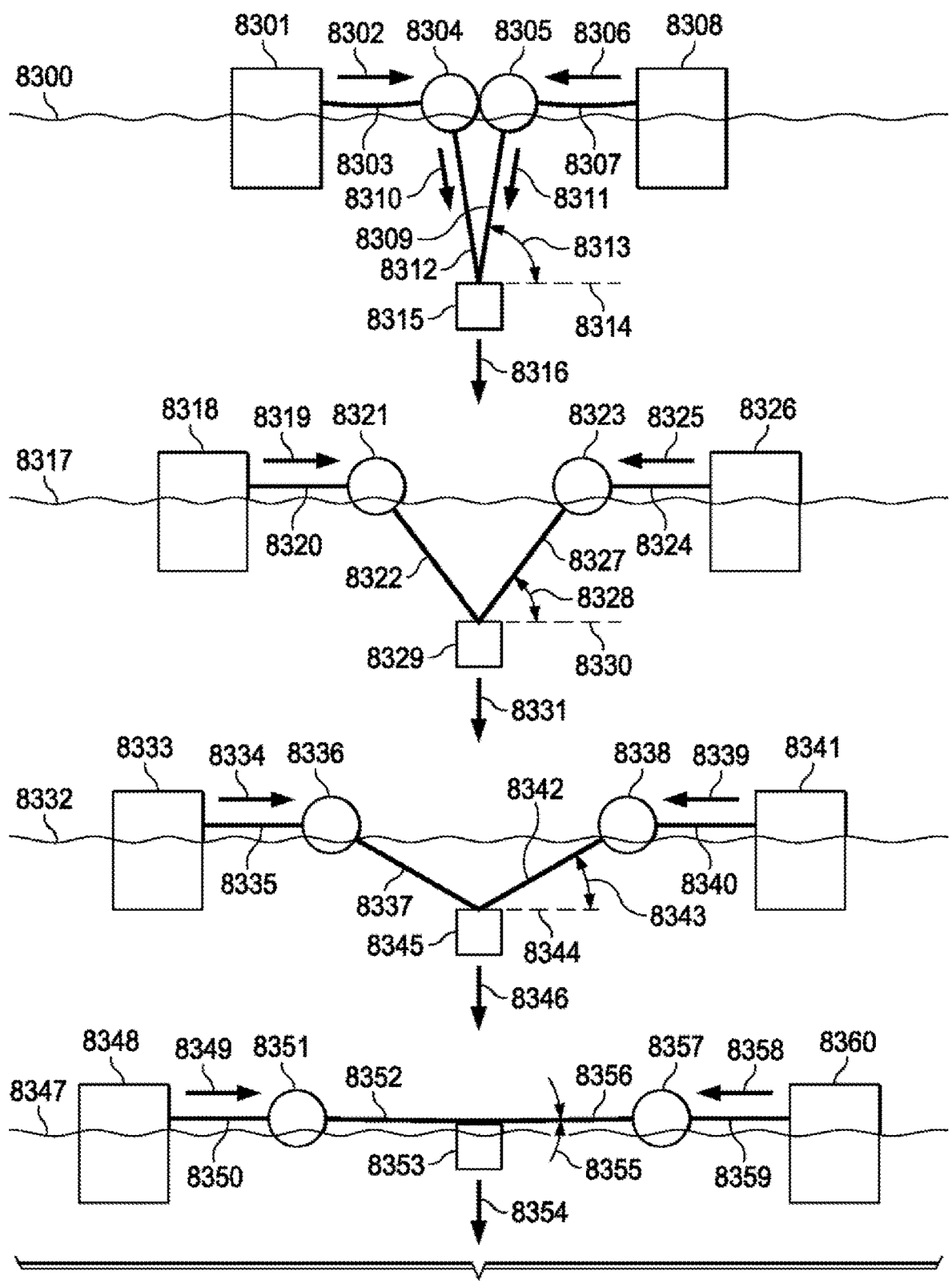
FIG. 78 is a schematic diagram of a buoyancy spring in the inert and energized states.

FIG. 78 is an illustration of an embodiment of the invention disclosed herein. Four illustrations of the same farm configuration are illustrated. Each one has two farm elements 8301 and 8308, e.g. operational elements, interconnected by means of a separation restorative tether. The separation restorative tether is composed and/or comprised of a left-most connector 8303, a central tensioning mechanism containing two floats 8304-8305, beneath which is suspended by an additional connector per float 8309 and 8312 a negatively buoyant weight 8315, and a right-most connector 8307. The uppermost illustration shows the farm configuration and the associated tensioning mechanism in a resting or inert nominal configuration in which the two farm elements 8301 and 8308 are at their "minimum operational width". In this nominal configuration, the "restorative potential energy" of the separation restorative tether is zero.

As the connected farm elements 8318 and 8326 are separated to distances beyond the critical distance width established by the tensioning mechanism and/or the separation restorative tether, the floats 8321 and 8323 are pulled apart, thereby raising the weight 8329 suspended thereunder from its maximal depth 8314 to a raised depth 8330. The raised depth of the weight 8329 creates and/or stores buoyancy related potential energy that will eventually pull the separated floats 8321 and 8323, and the interconnected farm elements 8318 and 8236, back to their minimum operational width. Finally, as illustrated in the bottom-most farm configuration illustrated in FIG. 78, the weight 8353 has been raised to the maximum extent possible. The connectors 8352 and 8356 connecting the weight 8353 to the two floats 8351 and 8357 to which it is connected, are here perfectly parallel to the connectors 8350 and 8359 connecting the two floats 8351 and 8357 to their respective farm elements 8348 and 8360.

It is understood that the bottom-most farm configuration illustrated in FIG. 78 is a physical impossibility, in that the forces imparted to the connectors 8350, 8352, 8356 and 8359 in such a hypothetical configuration (in which the connectors are all parallel and normal to the force of gravity 8354 on the weight 8353) would be infinitely large. One or more of the connectors would break before the configuration illustrated in FIG. 78 could be realized. However, it is useful to note, and of practical benefit, that the magnitude of the forces within a separation restorative tether, at least with respect to some, if not all, tensioning mechanisms, that will resist further extension of, and/or tend to draw back together, two overextended farm elements, e.g. 8348 and 8360, will approach infinity as the overextension approaches the maximum possible extension of the respective separation restorative tether, and/or series of tensioning mechanisms and/or separation restorative tethers.

Figure 79:
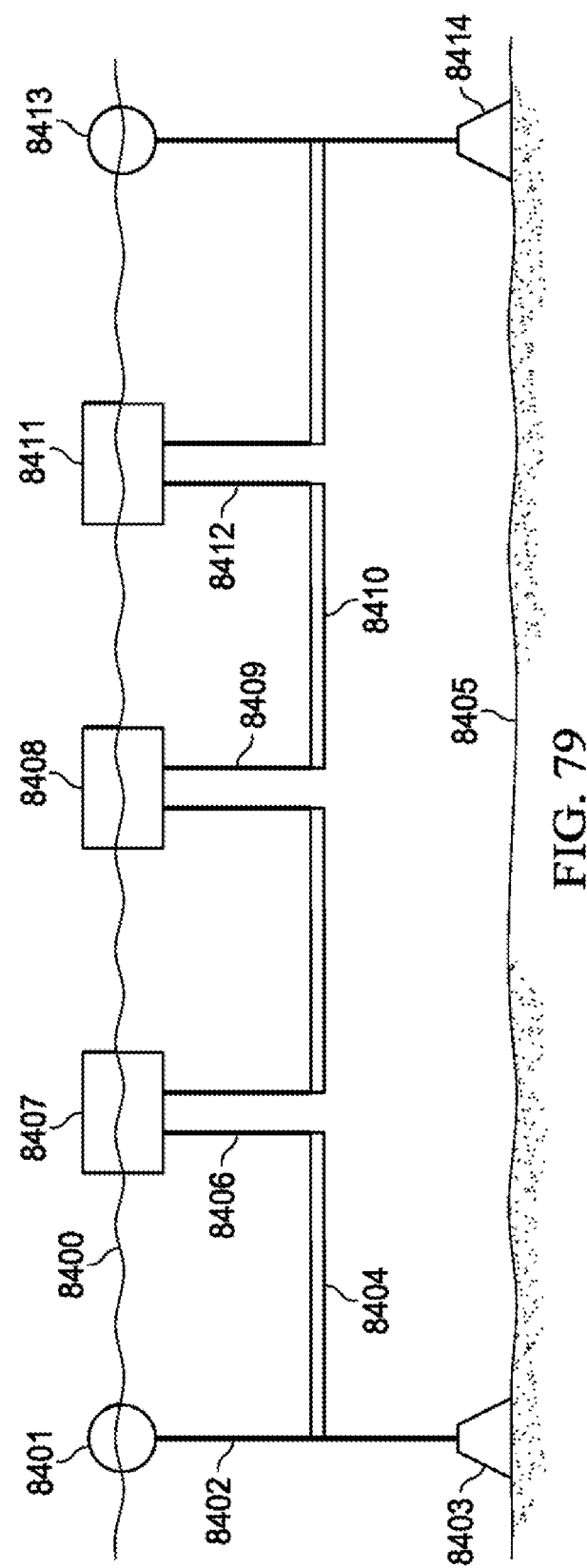
FIGS. 79 and 80 are schematic diagrams of another exemplary embodiment.

FIG. 79 is an illustration of a farm within the scope of the present disclosure that possesses two anchoring elements 8401-8403 and 8413-8414, three operation elements 8407, 8408, and 8411, and four tensioning mechanisms, e.g. one tensioning mechanism is composed of the combination of 8408-8412. Note that the various components from which and/or of which this farm is composed and/or constructed contribute to two or more "functionally-defined" farm elements. For instance, one of the illustrated tensioning mechanisms is composed of two floating objects 8408 and 8411, two cables and/or connectors 8409 and 8412, and one weight 8410.

The illustrated farm configuration has an advantage over those configurations which utilize tensioning mechanisms that utilize dedicated floats, such as floats 102 and 103 illustrated in FIG. 1. The farm configuration illustrated in FIG. 79 has a relatively minimal number of floating objects at the surface. And, since objects floating adjacent to, or even near the surface (i.e. above the wave base) are subject to sometimes violent wave motions (e.g. during storms) as well as to wind and/or wind-induced currents, the minimization of the number of such objects in a configuration like the one illustrated here has the advantage of minimizing the "exposure" of a farm to such energetic, stochastic, and sometimes violent, forces, while at the same time providing all of the benefits of dynamic positional stability for the various farm elements.

The illustrated farm configuration has the added benefit of allowing relatively unfettered access of boats and/or other vessels to each of the operational elements floating adjacent to the surface, i.e. there are no cable and/or connectors near the surface which might otherwise block and/or impeded such access. The weights, e.g. 8410, illustrated in FIG. 79, and characteristic of this embodiment, are relatively long and/or elongate so as to minimize the likelihood that adjacent floating objects, e.g. 8408 and 8411, will collide and suffer collision-related damage and/or loss of function.

Figure 80:
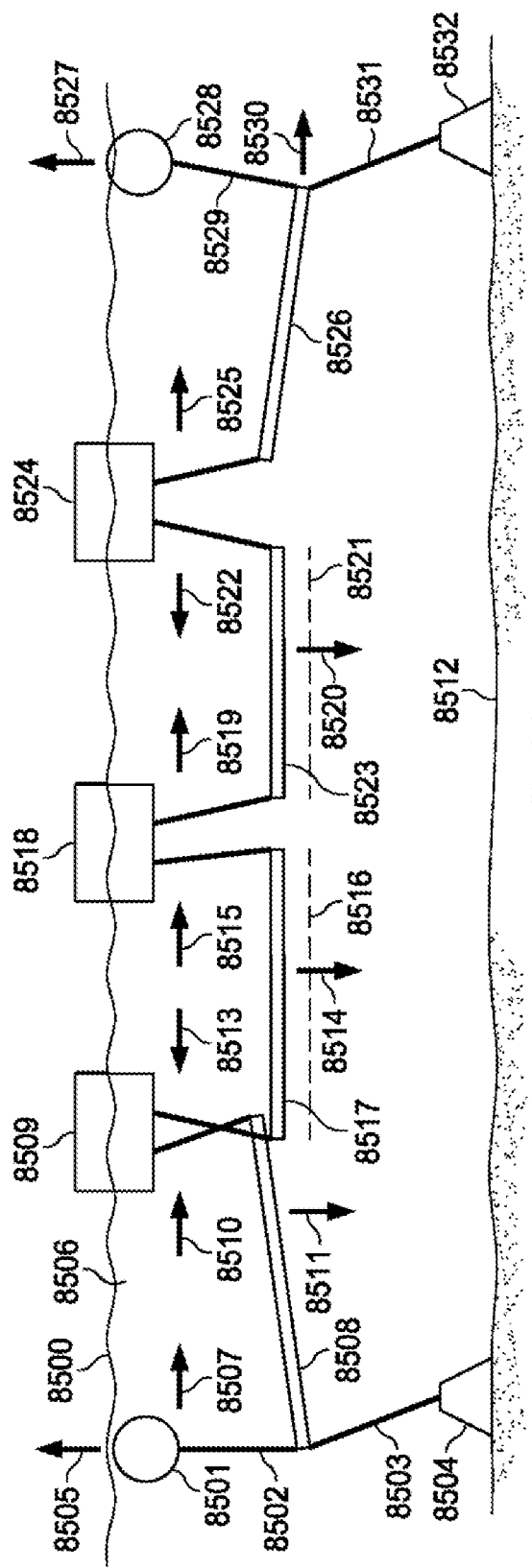

FIG. 80 is an illustration of the same embodiment of the current disclosure that is illustrated in FIG. 79. In this illustration, the configuration and/or spatial distribution and/or orientation of the various components is illustrated as it might appear after the farm has been subjected to one or more impulsive and/or stochastic forces driving floating components and/or elements away from their nominal absolute and relative positions and/or separations. Note that any change, i.e. any reduction or increase, in the separation of two floating components, i.e. in this case the floats 8501 and/or 8528 of anchoring elements and/or the operational elements 8509, 8518, and/or 8524, causes at least a portion of at least one intervening and/or interconnected weight, e.g. 8523, to be raised above its default, nominal, and/or maximal depth, e.g. 8521. The raised weights, and/or portions of weights, stores gravitational potential energy which tends to impart restorative forces, e.g. 8519 and 8522, to the dislocated floating objects, and to thereby pull those dislocated floating objects back to their default and/or nominal absolute locations and relative separations.

Figure 81:
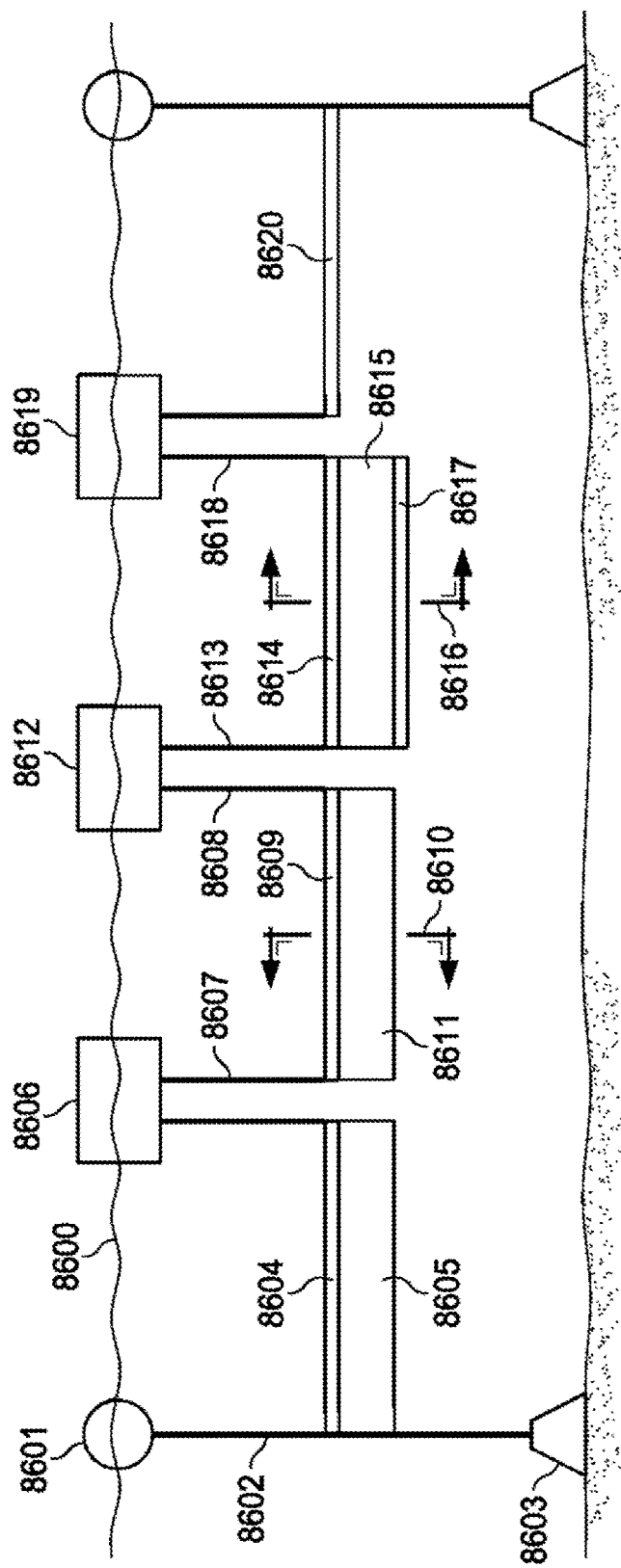
FIG. 81 is a schematic diagram of yet another exemplary embodiment.

FIG. 81 is an illustration of a farm within the scope of the present disclosure that is similar to the embodiment illustrated in FIG. 79, except that three of the tensioning mechanisms, and their associated weights 8604, 8609, and 8614, have been modified to incorporate vertical barriers 8605, 8611, and 8615, respectively, that hang down and tend to act as lateral sea anchors. One of the barriers has been further modified to include an additional weight 8617 attached to a bottom portion of the barrier.

In the presence of strong lateral motion, and if the connectors connecting the weights and attached barriers to their respective associated floating objects, e.g. 8606 and 8612, are not rigid and/or are hingeably attached to their respective floating objects and weights, then these lateral sea anchors will tend to rotate up and away from the water pushing against one of its broad sides. However, due to the inherent specific weight of the barriers, and especially when modified with a supplemental distal barrier weight, e.g. 8617, these lateral sea anchors will enhance and promote the lateral positional stability of the related elements and of the farm in general.

Figure 82:
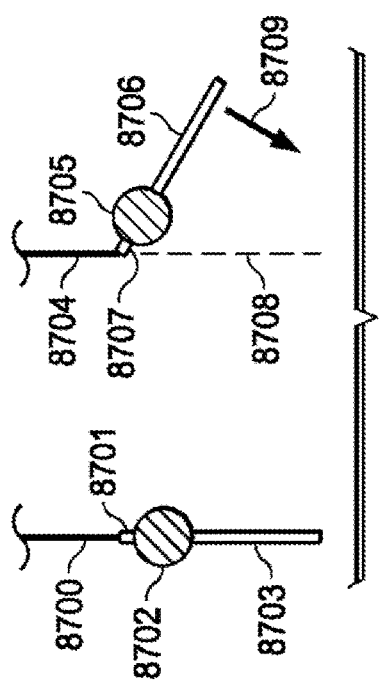
FIGS. 82 and 83 are schematic diagrams of anchors with lateral stability.
Figure 83:
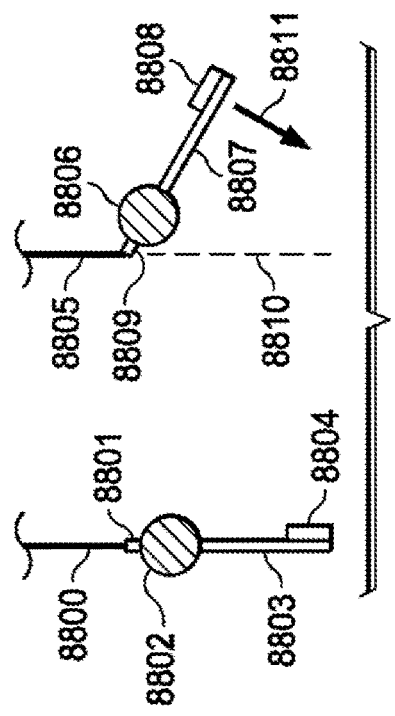

FIG. 82 is a cross-sectional illustration of one of the weights 8609 and/or lateral sea anchors 8611 illustrated in FIG. 81 (taken across line 8610 in FIG. 81). In the absence of a sufficiently strong and imbalanced force against one of its sides the sea anchor 8703 will remain in a vertical orientation due to its 8703 specific weight and the specific weight of the elongate weight 8702. However, when "pushed" by a sufficiently strong force, the weight 8705 and its attached sea anchor and/or barrier 8706 will tend to rotate up and away from the force, and will return 8709 to a vertical orientation when the driving force has subsided to a sufficient degree. FIG. 83 is a cross-sectional illustration of one of the weights 8614 and/or lateral sea anchors 8615 illustrated in FIG. 81 (taken across line 8616 in FIG. 81). This sea anchor is similar to the one illustrated and discussed with respect to FIG. 82. However, this sea anchor and/or barrier 8803 and 8807 includes a supplemental weight 8804 and 8808, respectively, that will tend to increase its resistance to being rotated up and away from a vertical orientation 8810 by a lateral force.

Figure 84:
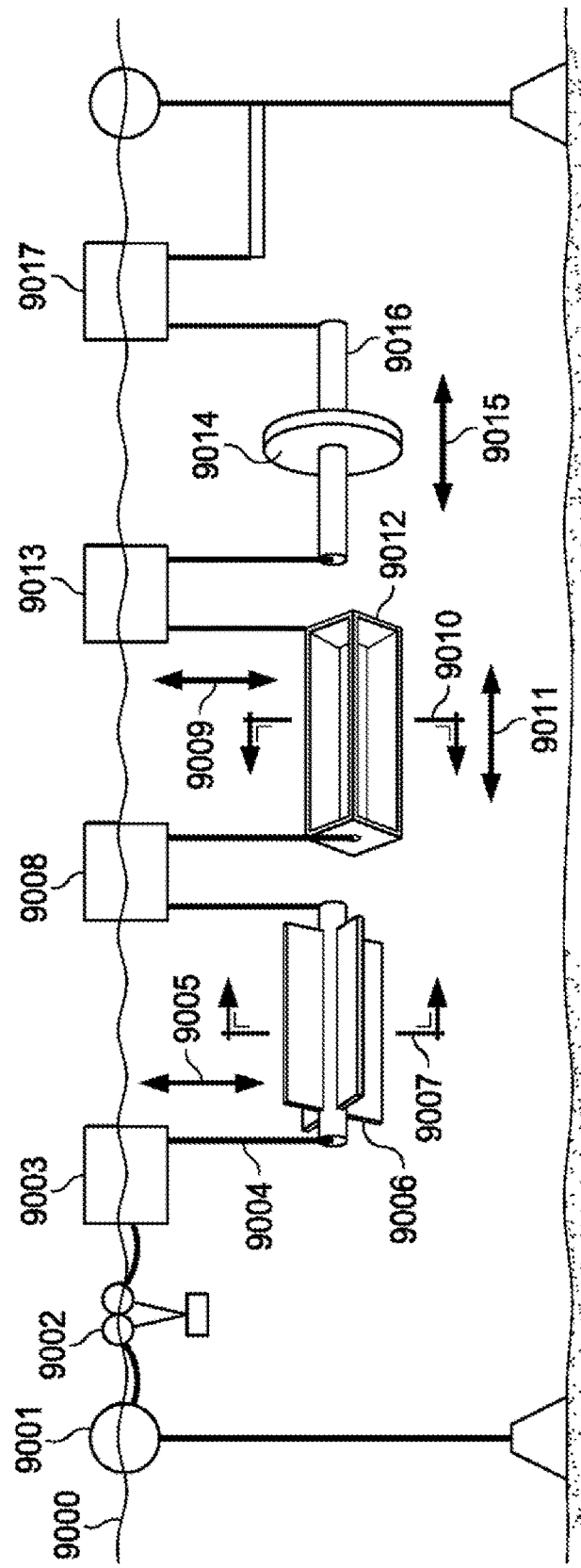
FIG. 84 is a schematic diagram of yet another exemplary embodiment.

FIG. 84 is an illustration of a farm within the scope of the present disclosure that demonstrates the use and utility of five different types of buoyancy spring tensioning mechanisms. The first 9002 has been discussed at length earlier in this disclosure and provides tension by means of a pair of floats each connected to a weight suspended beneath and between them. The tensioning mechanism between operational elements 9003 and 9008 is an elongate weight which utilizes the buoyancy of the attached operational elements instead of dedicated floats. In this case, the elongate weight has attached to it, and/or incorporates, a sea anchor with a cross-section in roughly the shape of an "x" (see FIG. 85) oriented along a horizontal longitudinal axis. This sea anchor is designed to resist vertical movements 9005, as well as lateral movements that are normal to the long axis of the weight and sea anchor.

The tensioning mechanism between operational elements 9008 and 9013 is an elongate weight which also utilizes the buoyance of the attached operational elements instead of dedicated floats. In this case, the elongate weight has attached to it, and/or incorporates, a sea anchor with a cross-section in roughly the shape of an "x" (see FIG. 86) as well as barriers 9012 at each end of the sea anchor. This sea anchor is designed to resist both vertical 9009 and lateral movements, including movements 9011 parallel to the long axis of the weight and sea anchor. Unlike the sea anchors incorporated within the tensioning mechanism weights between operational elements 9003 and 9008, and 9008 and 9013, the sea anchor 9014 incorporated within the weight 9016 of the tensioning mechanism between operational elements 9013 and 9017 resists only lateral movements parallel to the long axis of the weight 9016.

Figure 85:
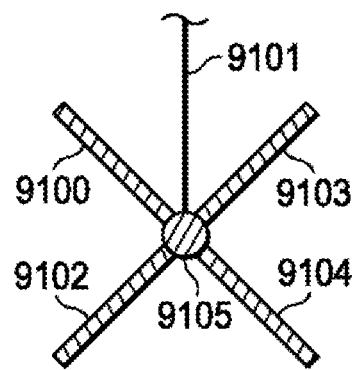
FIGS. 85 and 86 are schematic diagrams of anchors with lateral stability.

FIG. 85 is a cross-sectional illustration of one of the weights and/or lateral sea anchors 9006 illustrated in FIG. 84 (taken along line 9007 in FIG. 84). The weight 9105, and the attached longitudinal barriers 9100, and 9102-9104, are attached to the floating objects from which it is suspended by connectors, e.g. 9101. This sea anchor resists, and provides stability with respect to, movements normal to the long axis of the weight 9105.

Figure 86:
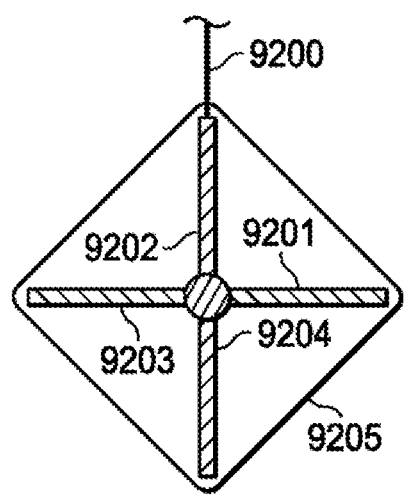

FIG. 86 is a cross-sectional illustration of one of the weights and/or lateral sea anchors 9012 illustrated in FIG. 84 (taken along line 9010 in FIG. 84). The weight at the center is attached to longitudinal barriers 9201-9204 which resist and provide stability with respect to lateral movements normal to the long axis of the weight. Attached at each end of the longitudinal barriers are end plates, e.g. 9205, which resist and provide stability with respect to lateral movements parallel to the long axis of the weight. This weight and sea anchor is attached to the floating objects from which it is suspended by connectors, e.g. 9200.

Figure 87:
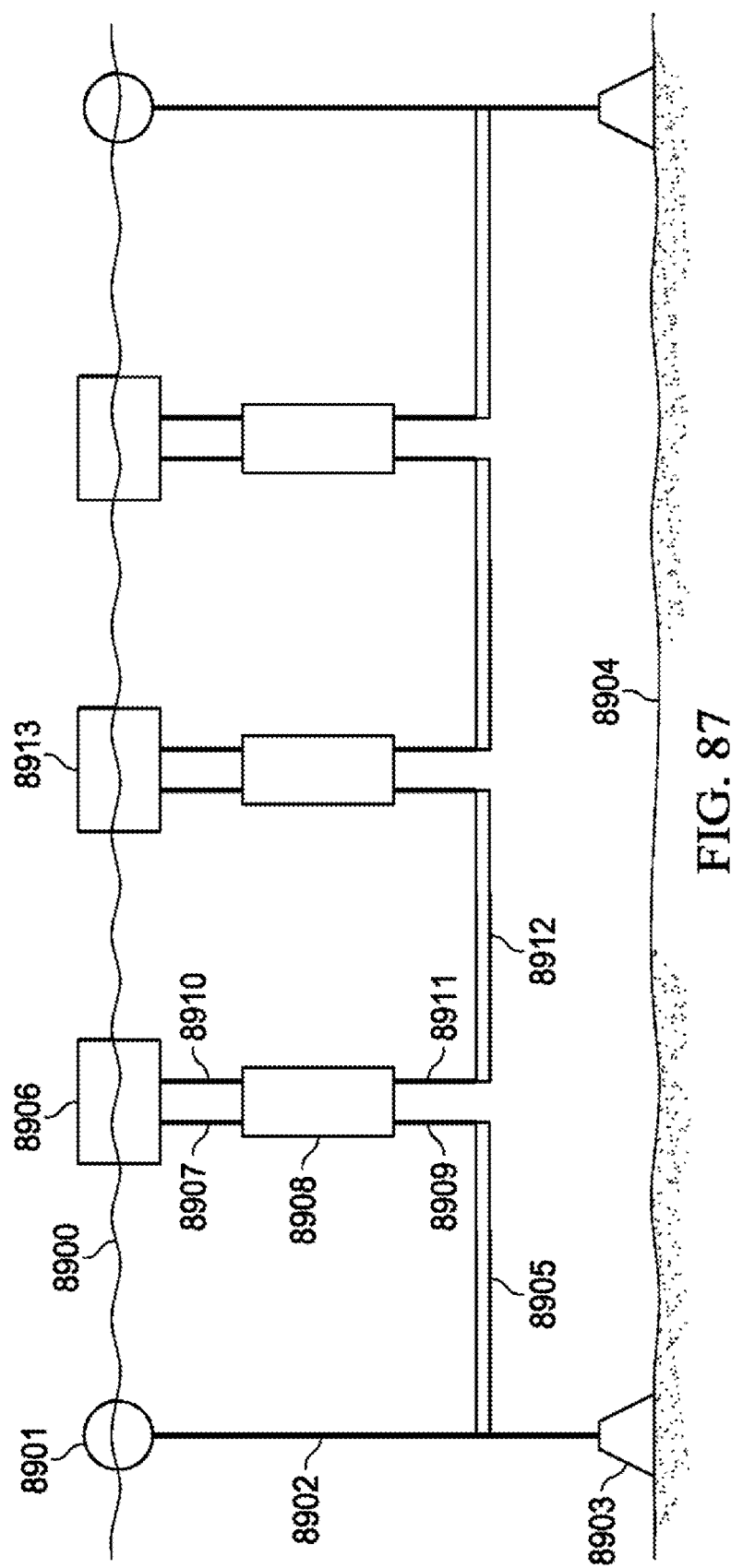
FIGS. 87 and 88 are schematic diagrams of another exemplary embodiment.

FIG. 87 is an illustration of a farm within the scope of the present disclosure that demonstrates the use and utility of "low-profile" tensioning mechanisms in conjunction with laterally-stabilized operational elements (which, in the case of this illustration, are point-absorbing Venturi-style wave energy conversion devices). Weights, e.g. 8912, are suspended beneath, between, and by, adjacent and connected laterally-stabilized operational elements, e.g. 8906 and 8913, respectively.

Figure 88:
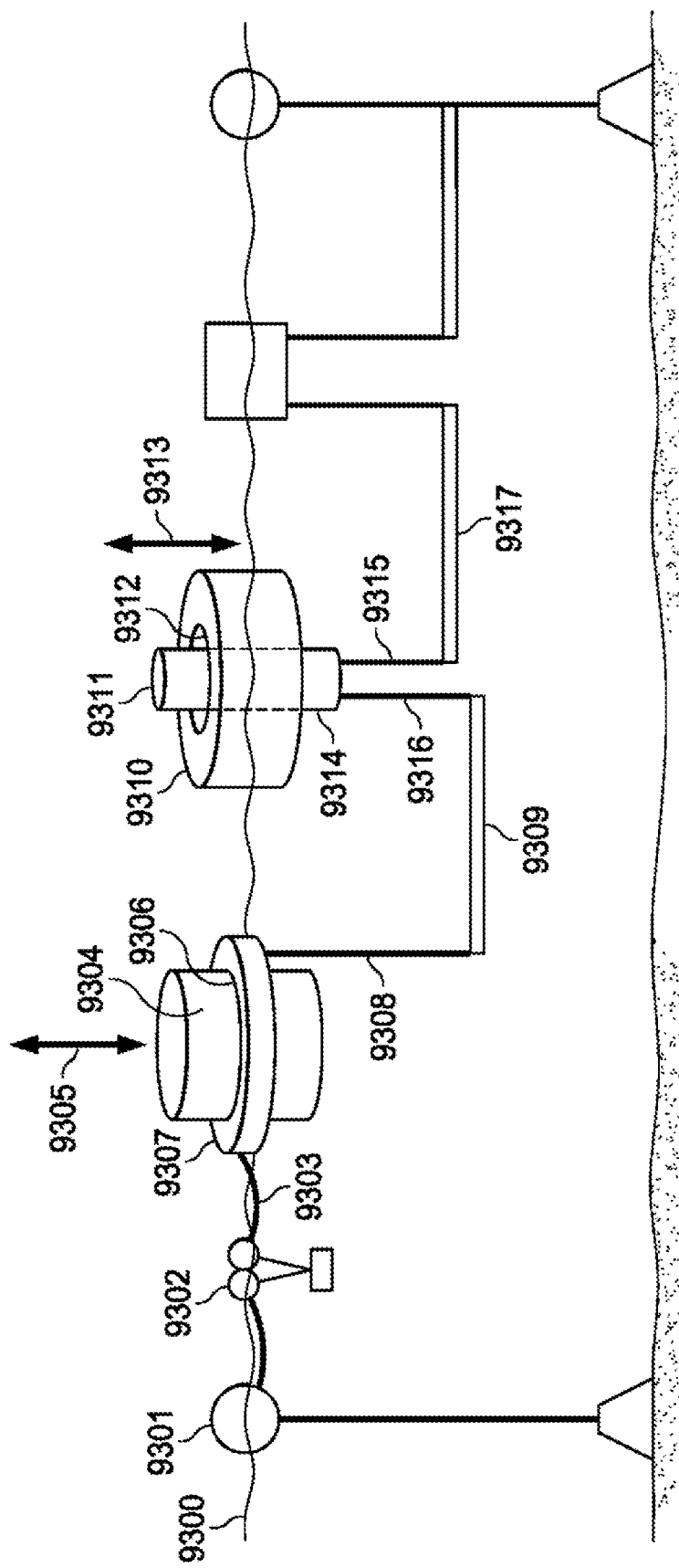

FIG. 88 is an illustration of a farm that demonstrates the use and utility of tensioning mechanisms which do not directly connect with and/or to the respective other elements, e.g. farm and/or operational elements 9304 and 9310, whose positions, locations, and/or orientations, they stabilize. The lateral position of a floating ring 9307 is stabilized by means of the tensioning mechanism (a combination of 9307-9309, 9302-9303, 9311, and 9316) of which it is a part. That ring in turn, surrounds, confines, constrains, and indirectly stabilizes, the farm and/or operational element 9304 which is able to move 9305 freely in a vertical direction, but is unable to escape the lateral positional limitations of the ring 9307. There is a gap 9306, and no direct connection, between the ring 9307 and respective element 9304.

The lateral position of a floating spar 9311 is stabilized by means of the tensioning mechanism (a combination of 9307-9309, 9311, and 9315-9317) of which it is a part. That spar in turn, "pegs", confines, constrains, is surrounded by, and indirectly stabilizes, the farm and/or operational element 9310 which is able to move 9313 freely in a vertical direction, but is unable to escape the lateral positional limitations of the peg 9311 trapped within the annular farm element 9310. There is a gap 9312, and no direct connection, between the peg 9311 and respective element 9310.

Figure 89:
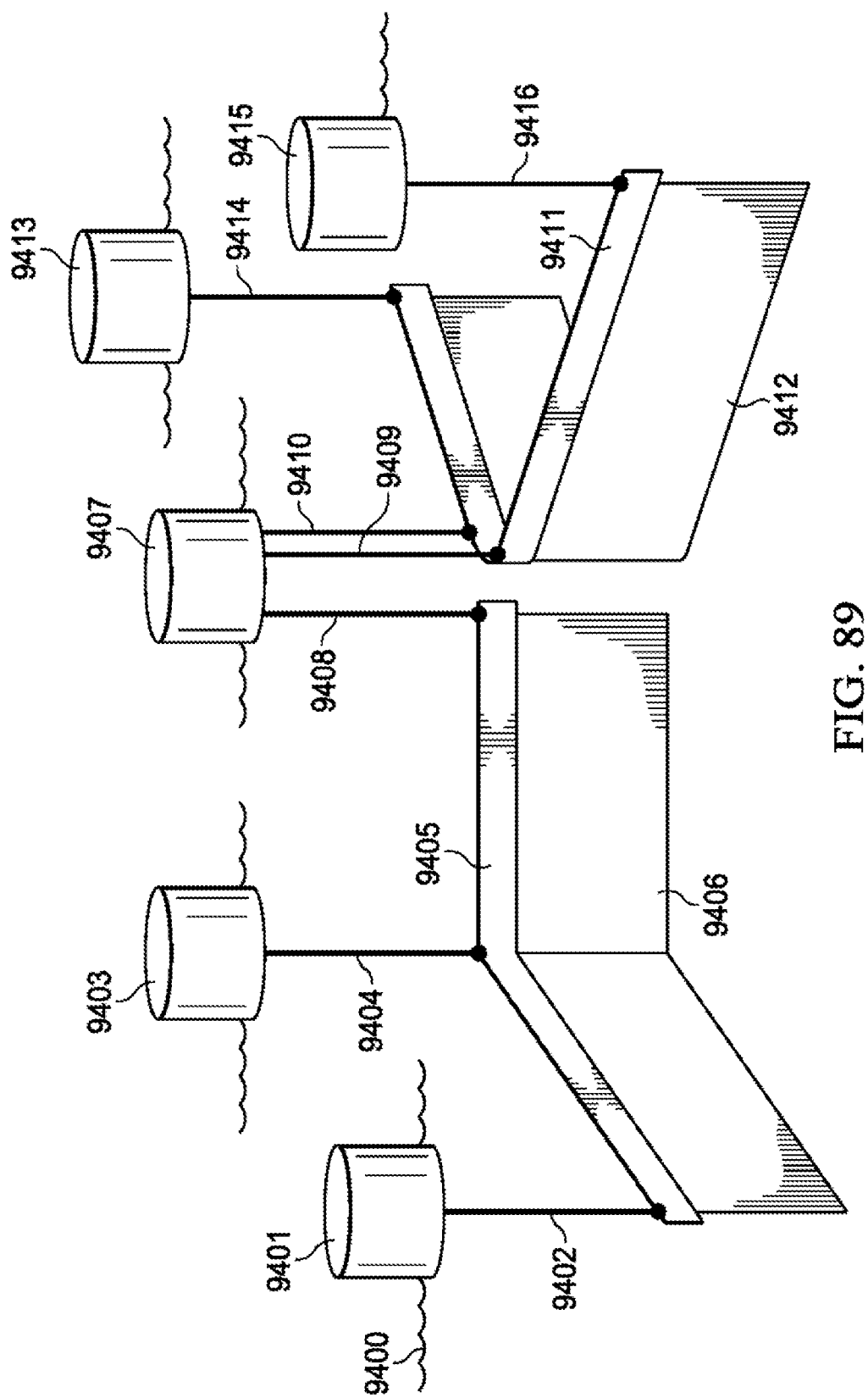
FIG. 89 is a schematic diagram of a linkage of the elements of three element couplings.

FIG. 89 is an illustration of a farm that demonstrates the use and utility of non-linear tensioning mechanisms, which, because of their non-linear shapes, are unable to easily rotate about a single longitudinal axis so as to reduce the effectiveness of any sea anchor thereto attached. The tensioning mechanisms illustrated in FIG. 89 are able to incorporate sea anchors within the respective weights which, because of their "bends" lack a longitudinal axis about which the sea anchor might rotate to dissipate a large force on one side of the sea-anchor barrier, e.g. 9406. Note that some of the floating and/or buoyant farm and/or operational elements, e.g. 9407, in this farm configuration are attached to two or more tensioning mechanisms, e.g. 9405-9406, and 9411-9412, while others, e.g. 9401, are attached to only one, e.g. 9405-9406.

Figure 90:
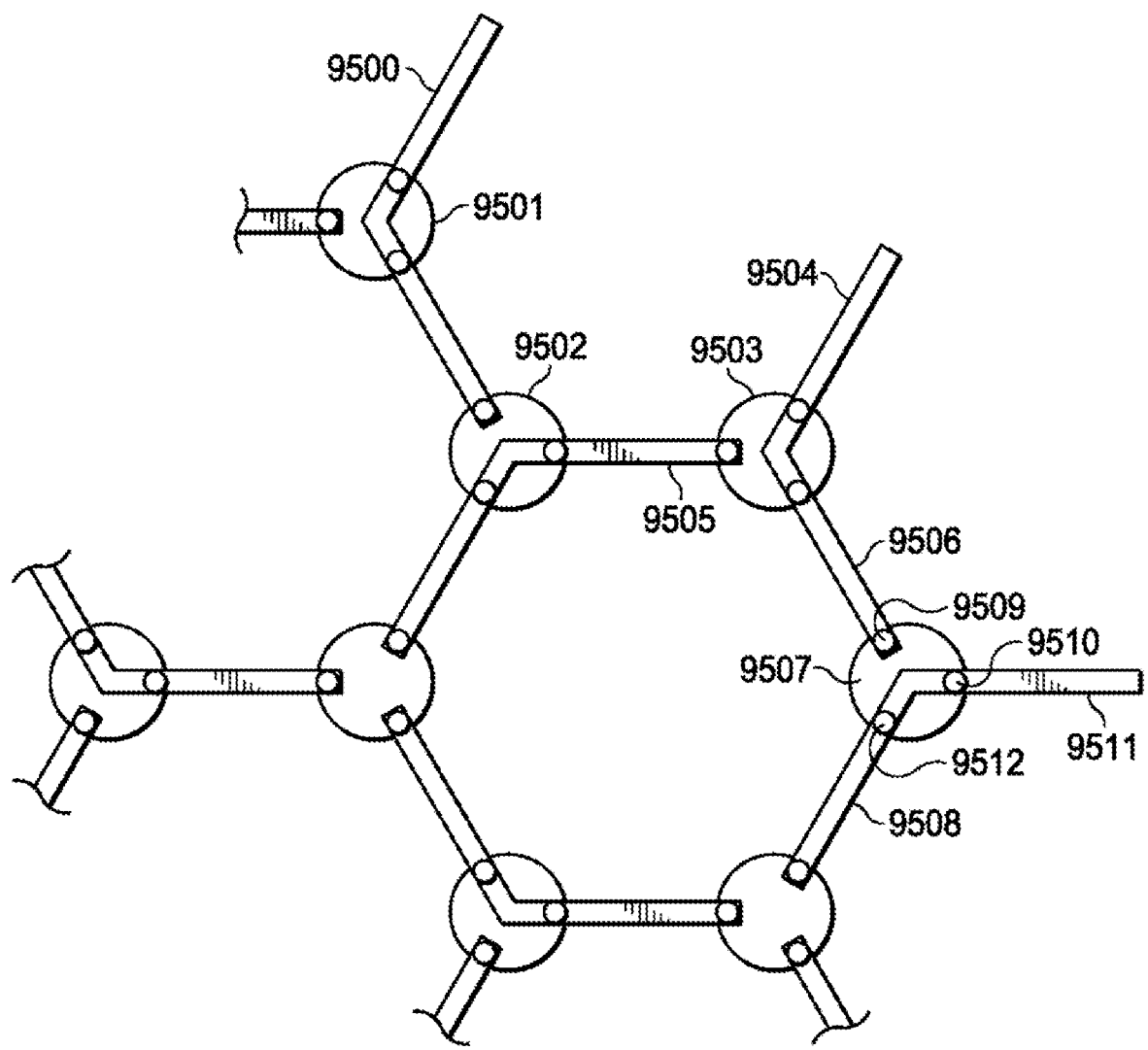
FIG. 90 is a top view of a formation using the linkages of FIG. 89.

FIG. 90 is an illustration of a top-down view of an embodiment of the present disclosure similar to the one illustrated in FIG. 89. In this case, each illustrated farm and/or operational element, e.g. 9502, is connected and/or attached to two "bent" tensioning mechanism weights and respective sea anchors, e.g. 9500 and 9505, via three connection points, cables, and/or connectors, e.g. 9509, 9510, and 9512. This configuration, and others like it, provide a farm with not only dynamic tensioning, and dynamic restoration of stochastic positional deviations, but also with the associated and/or additional lateral stabilization due to the multi-axis network of submerged sea anchors.

Figure 91:
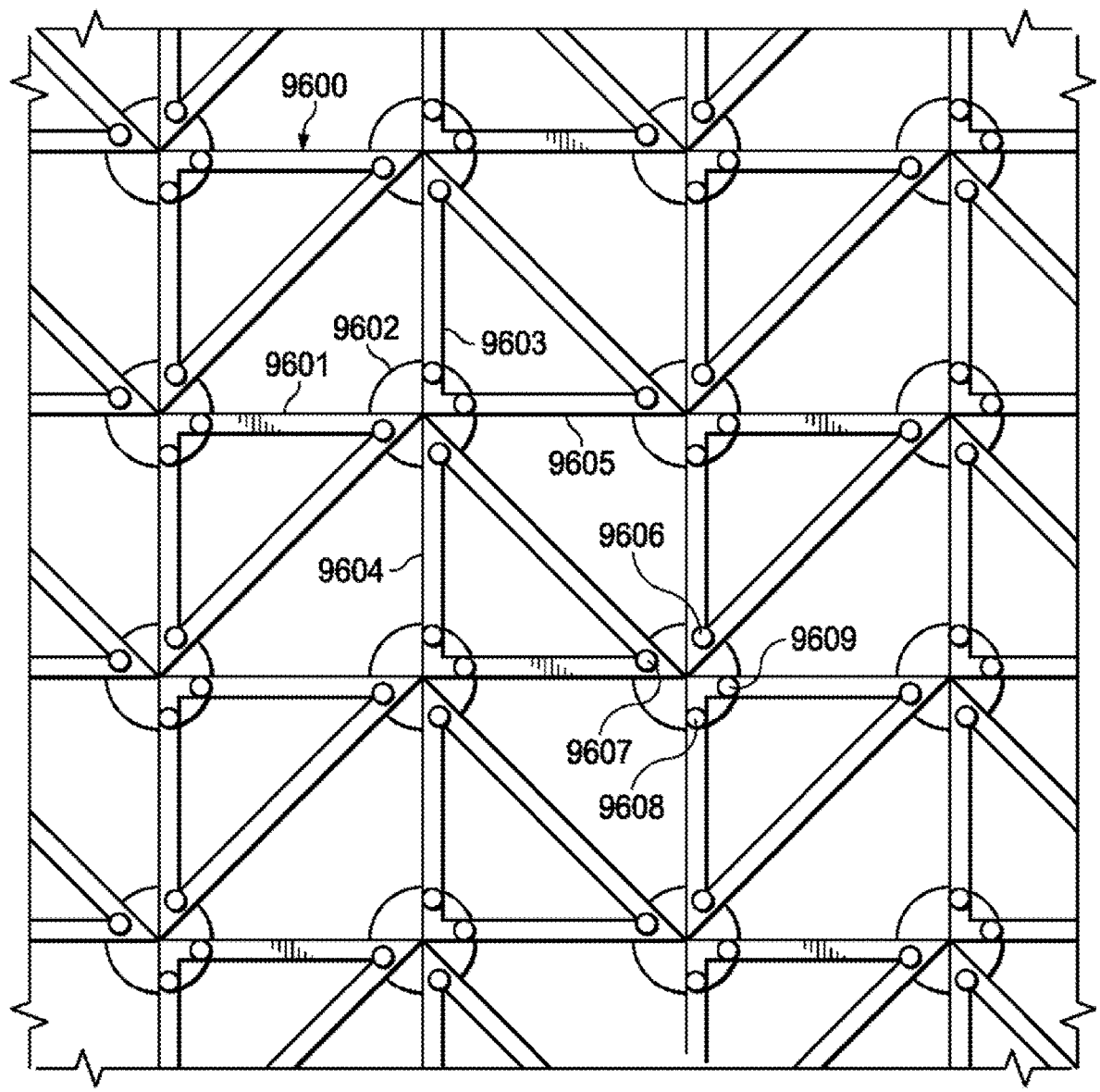
FIG. 91 is a top view of an alternate formation using three way linkages.

FIG. 91 is an illustration of a top-down view of an embodiment of the present disclosure similar to the one illustrated in FIG. 89. However, in this case, the weights and associated sea anchors of each tensioning mechanism has a triangular shape (with respect to a top-down view). And, in this case, each illustrated farm and/or operational element, e.g. 9602, is connected to three different and/or independent tensioning mechanism weights, e.g. 9601, 9603, and 9604. And, in this case, each illustrated farm and/or operational element, e.g. 9602, is connected to the respective three tensioning-element weights by means of four cables, connections, and/or connection points, e.g. 9606-9609. This "low-profile" tensioning mechanism design has the advantage of relatively great strength due to its "closed-loop" triangular design (i.e. in which three otherwise linear elongate weights are connected together at the vertices of a triangle).

FIG. 92 is an illustration of two different states of an embodiment of the present disclosure. On the left is illustrated a resting and/or an inert state of the illustrated embodiment. And, on the right, an "extended" or "energized" state of that same embodiment. In the illustration on the left side of FIG. 92, two operational elements 9701 and 9706 float at the surface 9700 of a body of water. The two operational elements are tethered together by a tether 9707 and/or connector that includes a pair of floats 9702-9703 beneath which is suspended a weight 9704 at a depth of 9705. The operational elements 9701 and 9706 are separated by a distance 9762 at which the weight 9704 is suspended fully and directly beneath the floats 9702-9703. In this configuration, and/or at this separation distance, there is no net force within the tether 9707 pulling together operational elements 9701 and 9706. The configuration is in a resting and/or an inert state. And, the ability of operational elements 9701 and 9706 to move up and down in response to passing waves is uninhibited.

In the illustration on the right side of FIG. 92, the two operational elements 9708 and 9714 are separated by a distance 9760 that is greater than the distance 9762 at which the tether is inert, i.e. operational elements 9708 and 9714 are "energized" to a distance greater than the critical separation distance characteristic of the tether 9710.

Because of their separation beyond the critical distance for the tether, operational elements 9708 and 9714 have separated floats 9711-9712, in turn causing weight 9713 to be raised closer to the surface of the body of water on which floats 9711-9712 float. The portion of the downward gravitational pull exerted on weight 9713 (due to its negative buoyancy) that is transmitted into the tether 9710 as a restoring force 9709 and 9715 is related to the angle "alpha" characteristic of the degree to which it has been lifted. The greater alpha, the greater the amount of force 9709 and 9715 that will tend to draw operational elements 9708 and 9714 back to a separation no greater in length than the critical distance 9762 characteristic of the tether 9710.

FIG. 93 is an illustration of two different states of an embodiment of the present disclosure. The embodiment illustrated in FIG. 93 is similar to the one illustrated in FIG. 92. However, the embodiment in FIG. 93 possesses, incorporates, and/or utilizes, within the tether connecting operational elements 9717 and 9726 two "tensioning weights" 9720 and 9724, each of which is suspended beneath a respective dedicated pair of floats, i.e. 9718-9719 and 9722-9723, respectively, instead of the single "tensioning weight" 9704 characteristic of the embodiment illustrated in FIG. 92. On the left is illustrated an inert state of the illustrated embodiment. And, on the right an "extended" or "energized" state of that same embodiment.

By contrast with the "single-tensioning-weight" embodiment illustrated in FIG. 92, this embodiment achieves the same extensibility, i.e. the same maximal distance over which the tether may be extended (e.g. before breaking), through a pair of tensioning weights 9720 and 9724 that are suspended beneath respective pairs of floats, 9718-9719 and 9722-9723, by shorter tether segments (i.e. depth and tether length 9721 is less than depth and tether length 9705). Two tethered tensioning weights each need only half the "surplus" tether length in order to provide the same maximal total extended tether length compared to the embodiment of FIG. 92. Thus, each of the weights 9720 and 9724 are suspended at a lesser depth of 9721 when in a relaxed tether configuration, than was the single weight 9704 of the embodiment illustrated in FIG. 92. Such a reduced depth requirement would allow a farm configured to include a pair of tensioning weights, instead of a single tensioning weight, to be deployed in a greater number of sites which would include relatively shallow sites that would not be suitable for the deployment of farms utilizing single deeper tensioning weights.

Also, the use of two tensioning weights, each of which possesses a particular "net" weight (i.e. weight net of buoyant force) when submerged, in a tether connecting two operational elements, can provide twice the restoring force, with respect to any specific degree of extension, as can an equivalent tether that utilizes only a single tensioning weight of the same particular net and/or submerged weight. Alternatively, a tether utilizing two tensioning weights can utilize weights wherein each weight is half the particular submerged weight that would be required of a single tensioning weight, in order to achieve the same restoring force with respect to each degree and/or unit of extended separation between the respective operational elements.

If the particular net submerged weight of each of the two tensioning weights 9731 and 9735 incorporated within the tether of the embodiment illustrated on the right side of FIG. 93 is equal to half the particular submerged net weight of the single tensioning weight 9713 incorporated within the tether of the embodiment illustrated on the right side of FIG. 92, then the tether of the embodiment illustrated on the right side of FIG. 93 will manifest an equal restoring force 9728 and 9737 as will the tether of the embodiment illustrated on the right side of FIG. 92 when angle "beta" in FIG. 93 is equal to angle "alpha" in FIG. 92. Smaller, lighter tensioning weights are potentially easier, safer, and less-costly, to deploy than heavier tensioning weights.

Figure 94:
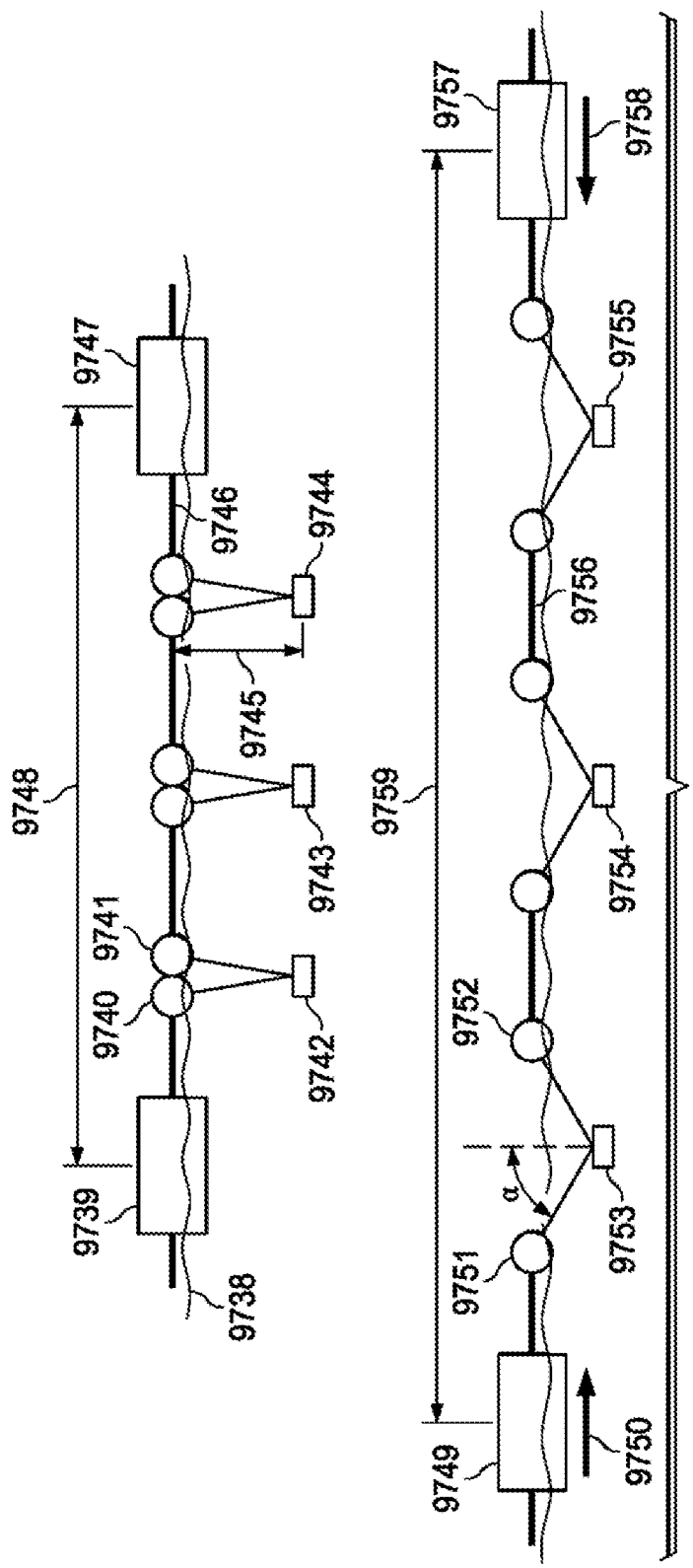

FIG. 94 is an illustration of two different states of an embodiment of the present disclosure. The embodiment illustrated in FIG. 94 is similar to the embodiments illustrated in FIGS. 92 and 93. However, the embodiment in FIG. 94 possesses, incorporates, and/or utilizes, within the tether connecting operational elements 9739 and 9747 three "tensioning weights" 9742-9744, each of which is suspended beneath a respective dedicated pair of floats, e.g. 9740-9741, instead of the single and double "tensioning weights" characteristic of the embodiments illustrated in FIGS. 92 and 93, respectively. On the left is illustrated a resting and/or an inert state of the illustrated embodiment. And, on the right an "extended" or energized state of that same embodiment.

The embodiment illustrated in FIG. 94 achieves, supports, and/or permits, the same total maximal separation of the respective pair of operational elements 9739 and 9747 as is achieved by the embodiments illustrated in FIGS. 92 and 93. However, because the embodiment in FIG. 94 can partition the provision of extensibility across three tensioning weights, instead of two or one as in the embodiments of FIGS. 93 and 92, respectively, its tensioning weights can be suspended to an even lesser depth than those of the other embodiments. This would tend to facilitate its deployment in water even more shallow than the depths required of the earlier embodiments.

The embodiment illustrated in FIG. 94 can achieve the same restoring force as the embodiments illustrated in FIGS. 92 and 93 through the use of three tensioning weights each of which possesses, and/or is characterized by, a submerged and/or net weight equal to one-third the submerged and/or net weight of the tensioning weight of the embodiment illustrated in FIG. 92. This is a potential advantage since it is generally true that smaller, lighter tensioning weights are potentially easier, safer, and less-costly, to deploy than heavier tensioning weights.

Figure 95:
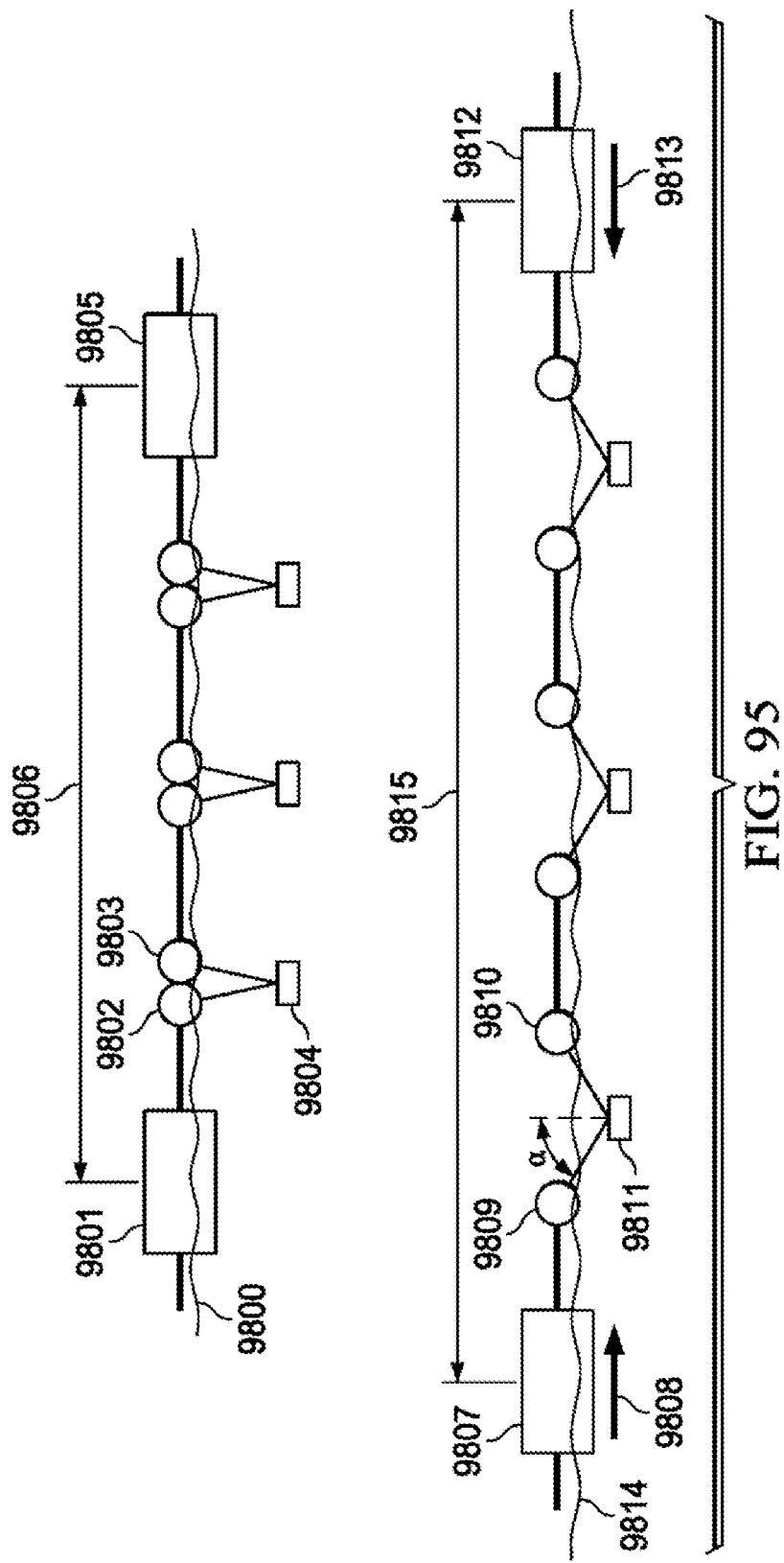

FIG. 95 is an illustration an embodiment of the present disclosure similar to the embodiment illustrated and discussed in relation to FIG. 94. The embodiment illustrated in FIG. 95 utilizes three tensioning weights, e.g. 9804, each suspended by tether segments beneath a respective pair of floats, e.g. 9802-9803. In this embodiment, each of the three tensioning weights is of an equal submerged and/or net weight, and each is suspended to the same approximate depth by their respective tether segments. When stretched, each of the three suspended tensioning weights, e.g. 9811, provides an approximately equal amount of restoring force the summation of which creates a total restoring force 9808 and 9813 that, following an increase in the separation of the respective operational elements 9807 and 9812 beyond the maximal inert length of the tether, tends to return the respective operational elements 9807 and 9812 to their nominal separation distance.

Figure 96:
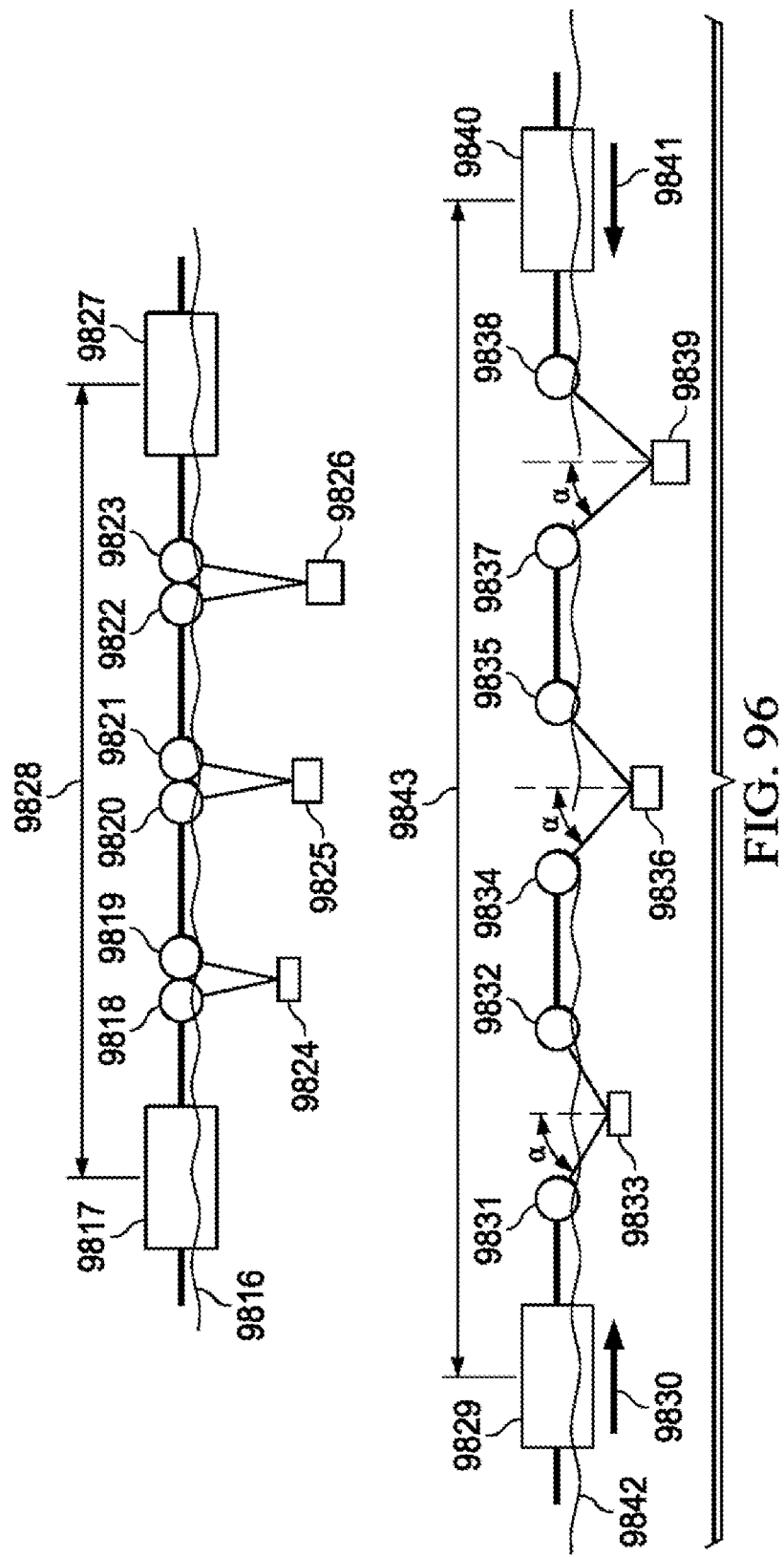

FIG. 96 is an illustration an embodiment of the present disclosure similar to the embodiments illustrated and discussed in relation to FIGS. 94 and 95. However, unlike the embodiments illustrated and discussed in relation to FIGS. 94 and 95, the embodiment illustrated in FIG. 96 utilizes a tether that incorporates three tensioning weights 9824-9826 of unequal submerged net weights. Tensioning weight 9824 is the lightest of the tensioning weights, and tensioning weight 9826 is the heaviest of the tensioning weights. In addition to possessing unique submerged net weights, each of the three tensioning weights is suspended at a unique depth by tether segments of unequal lengths, with tensioning weight 9824 being suspended at the shallowest depth, and tensioning weight 9826 being suspended at the greatest depth.

When operational elements 9829 and 9840 are pulled apart to a separation 9843 greater than their maximum inert separation 9828, the various tensioning weights are raised by unequal amounts due to their unequal nominal, "resting" depths and their unequal submerged net weights. The total tension and/or restoring force 9830 and 9841 applied to the operational elements, and tending to pull those operational elements back together to a separation no greater than their inert separation 9828, is the summation of the individual restoring forces generated by each of the three tensioning weights 9833, 9836, and 9839. Through the selection of particular tensioning-weight depths, and particular submerged net weights, the cumulative restoring force exerted on the pair of separated operational elements 9829 and 9840 by the combined restoring forces of the three individual tensioning weights 9833, 9836, and 9839 in response to each incremental degree of separation beyond the maximal "resting" separation 9828 can be customized and/or tuned to manifest a more optimal influence on the positions of the operational elements.

For instance, an embodiment such as the one illustrated in FIG. 96 might be expected to offer a significant, though relatively small, resistance to slight increases in the separation of operational elements 9829 and 9840, while exerting more substantial resistive forces only after the separation is substantial.

Figure 97:
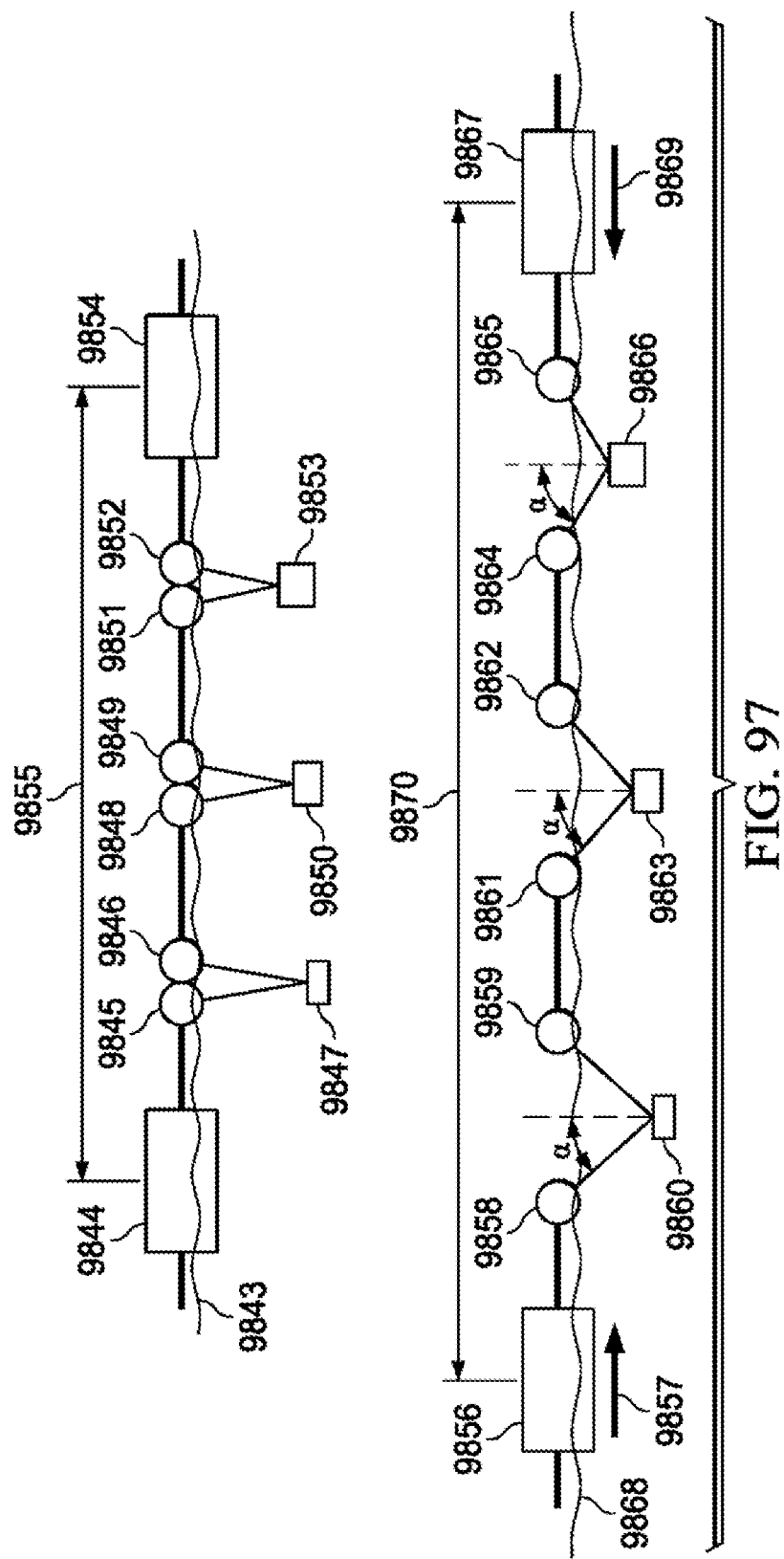

FIG. 97 is an illustration an embodiment of the present disclosure similar to the embodiments illustrated and discussed in relation to FIG. 96. Similar to the embodiment illustrated in FIG. 96, the embodiment illustrated in FIG. 97 utilizes tensioning weights characterized by unequal submerged net weights with tensioning weight 9847 being the lightest of the tensioning weights, and tensioning weight 9853 being the heaviest of the tensioning weights. Likewise, similar to the embodiment illustrated in FIG. 96, the embodiment illustrated in FIG. 97 suspends its three tensioning weights at unique depths by tether segments of unequal lengths. However, unlike the embodiment illustrated and discussed in relation to FIG. 96, the embodiment illustrated in FIG. 97 suspends the lightest tensioning weight 9847 at the greatest depth, and it suspends the heaviest tensioning weight 9853 at the shallowest depth.

Contrary to the embodiment illustrated in FIG. 96, an embodiment such as the one illustrated in FIG. 97 might be expected to offer very little resistance to slight increases in the separation of operational elements 9856 and 9867, while exerting more substantial resistive forces only after the separation is substantial. In addition to possessing unique submerged net weights, each of the three tensioning weights is suspended at a unique depth by tether segments of unequal lengths, with tensioning weight 9853 being suspended at the shallowest depth, and tensioning weight 9847 being suspended at the greatest depth.

Figure 98:
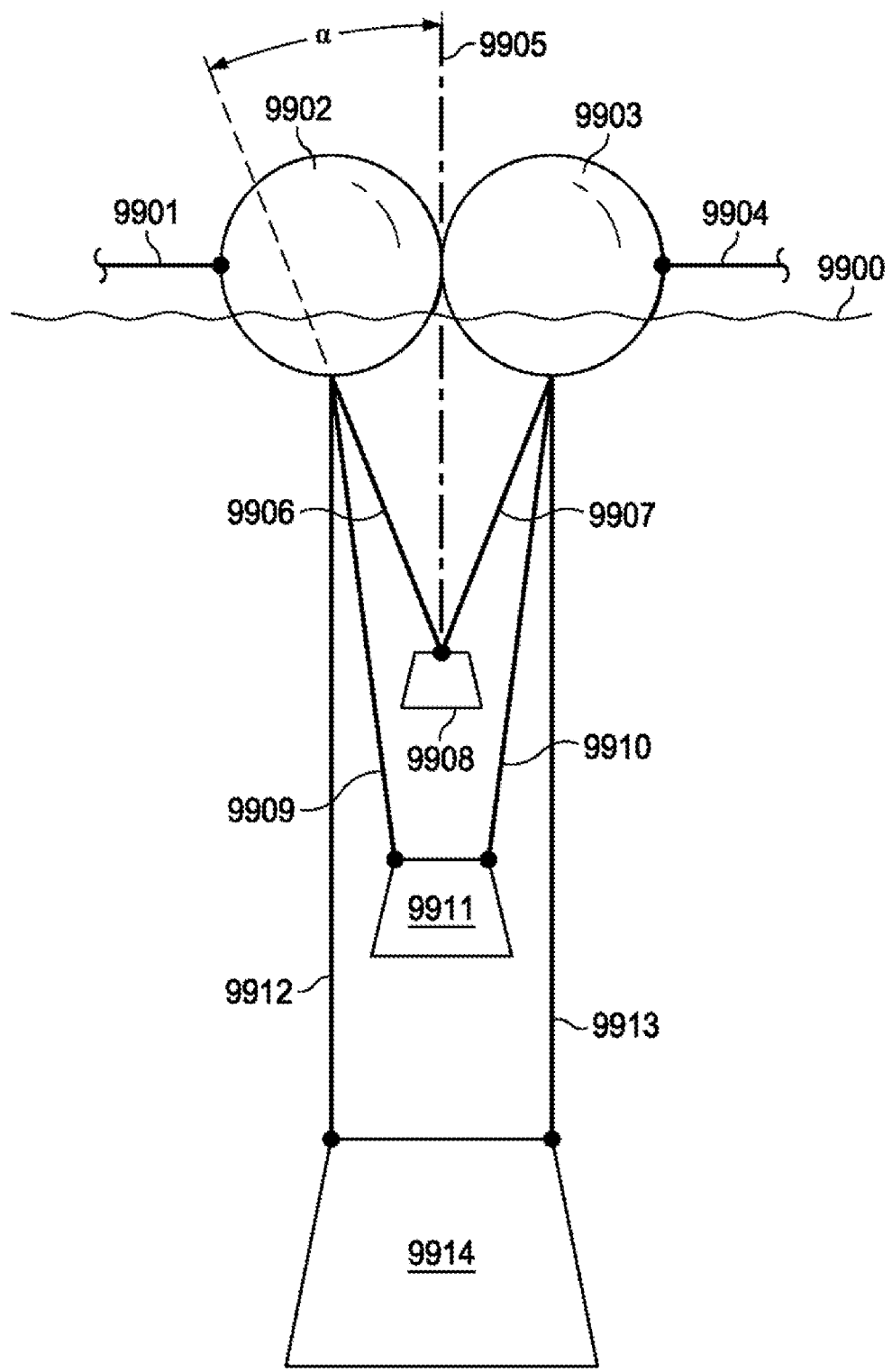
FIGS. 98-100 is a schematic diagram of an alternate buoyancy spring having incremental loading.

FIG. 98 illustrates an embodiment of the present disclosure. Three tensioning weights 9908, 9911, and 9914 are suspended beneath a pair of floats 9902-9903 by tether segments, e.g. 9906-9907. The floats 9902-9903 may be connected and/or tethered, by tether segments 9901 and 9904 to other tensioning weights, other floats, operational elements, and/or any other constituent, component, and/or element of a networked farm of such objects and/or elements. As floats 9902-9903 are pulled apart, each of the suspended tensioning weights 9908, 9911, and 9914 will be lifted, albeit by varying distances, causing them to store gravitational potential energy, and causing them to exert an opposing "restoring" force to the floats 9902-9903 that will tend to pull them back together when and if the restoring force created by the raised tensioning weights 9908, 9911, and 9914 exceeds the force that is pulling the floats 9902-9903 apart.

The magnitude of the restoring force that a tensioning weight imparts to its respective floats increases as the degree to which the floats from which it is suspended are separated. Thus, for example, a tensioning weight suspended beneath and/or by a pair of floats which are in contact with one another, and are therefore not separated, exerts no significant restoring force on those floats. However, if it were possible, a tensioning weight suspended beneath and/or by a pair of floats that were so widely separated that the tether segments connecting them to the tensioning weight were completely horizontal and/or normal to the direction of gravity would exert a restoring force on those floats of a nearly, if not entirely, infinitely large magnitude.

Of the three tensioning weights 9908, 9911, and 9914, tensioning weight 9908 is suspended by the shortest tether segments 9906-9907 and is therefore suspended at the shallowest depth. As the floats 9902-9903 are pulled apart, tensioning weight 9908 will tend to be raised more quickly, and further, than the other two tensioning weights, causing its exponentially-increasing contribution to the total, cumulative restoring force exerted on the floats to quickly rise, i.e. in response to relatively small degrees of separation between the floats. The contribution made by tensioning weight 9911 to the total cumulative restoring force tending to pull back together separated floats 9902-9903 will increase more slowly than will the force generated and/or exerted by tensioning weight 9908. However, because of its greater intrinsic specific submerged weight, the contribution of tensioning weight 9911 to the total restoring force will be significant. And, because of the relatively smaller angular separation, e.g. "alpha," of the tether segments from which it is suspended, its contribution to the total restoring force will tend to increase in a more linear fashion than will the contribution generated by tensioning weight 9908.

Finally, due to its relatively great specific submerged weight, the contribution of tensioning weight 9914 to the total restoring force tending to correct any separation of the floats 9902-9903 will tend to be significant and substantial. However, due to its relatively great depth, and the relatively great length of its tether segments, its contribution to the total restoring force tending to correct any separation of the floats 9902-9903 will tend to increase more linearly than the contributions of either of the two other tensioning weights, with respect to the maximum separation distance between the floats permitted by the assembly of tensioning weights, and their respective tether segments.

Figure 99:
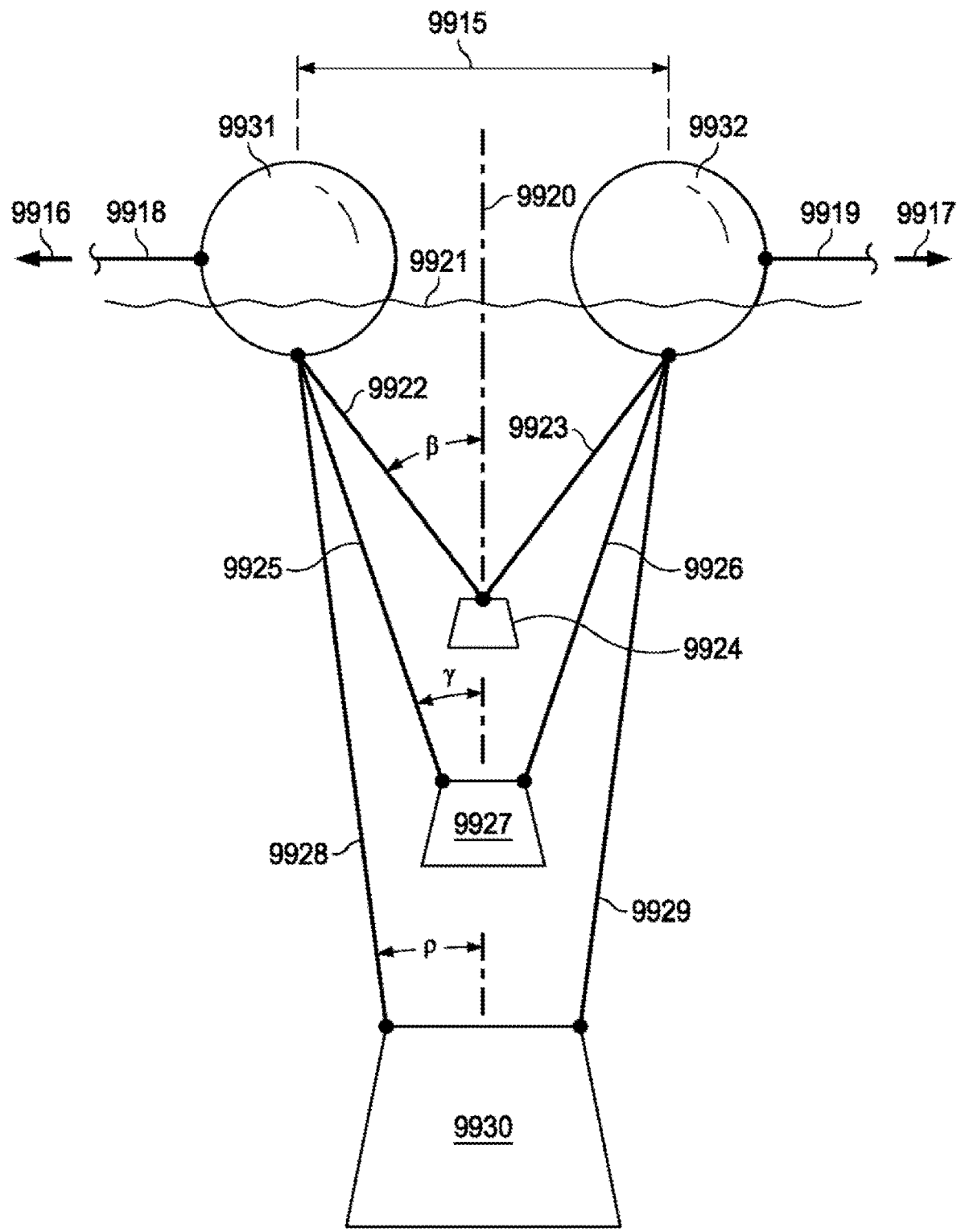

FIG. 99 illustrates the same assembly of tensioning weights 9924, 9927, and 9930 as illustrated in FIG. 98. However, in FIG. 99, the floats 9931-9932 from which they are suspended are separated (center-to-center) by a distance 9915. With respect to the illustrated degree of float separation, and, as a consequence of the differences in the lengths of tether segments by which they are suspended from the floats, the pairs of tether segments by which the three tensioning weights are suspended are separated by differing angular degrees. Likewise, and for the same reason, each tensioning weight is raised by a different amount, with the shallowest tensioning weight 9924 being raised to the greatest degree, and by the greatest amount.

Because the angular deviation "beta" of its tethering segments 9922-9923 is the greatest among the three tensioning weights, so too is the proportion of tensioning weight's 9924 gravitational force that is directed toward the elimination and/or correction of the gap between floats 9931-9932. With respect to this same degree of float separation, the angular deflections and/or distortions of the tethering segments by which tensioning weights 9927 and 9930 are suspended are lesser than the deflections of the tethering segments from which tensioning weight 9924 is suspended. So, even though the submerged net weight of tensioning weight 9930 is greater than the specific submerged weight of tensioning weight 9924, the rate at which the gravitational force associated with the suspension of tensioning weight 9924 is transferred to the floats, so as to bring them back together, increases more rapidly with respect to increases in the separation of the floats. Through a careful selection of the weights of the tensioning weights, and a careful selection of the relative and absolute depths at which they are suspended beneath a pair of floats, the amount of restoring force imparted to the floats with respect to each unit of their separation can be customized, adjusted, and/or optimized with respect to a specific application, context, and/or deployment.

The embodiment illustrated in FIG. 99 includes three tensioning weights suspended beneath and/or by two floats. However, other embodiments may use only two tensioning weights, or four or more tensioning weights, of any variety and/or sequence of specific submerged weights, e.g. so as to achieve any desired relationship between the magnitude of the restoring force generated and the magnitude of the distance characteristic of the separation. Other embodiments may use only one float, or three or more floats. Other embodiments may embed such a tensioning-weight-assembly within a tether flexibly connecting two or more operational elements.

Figure 100:
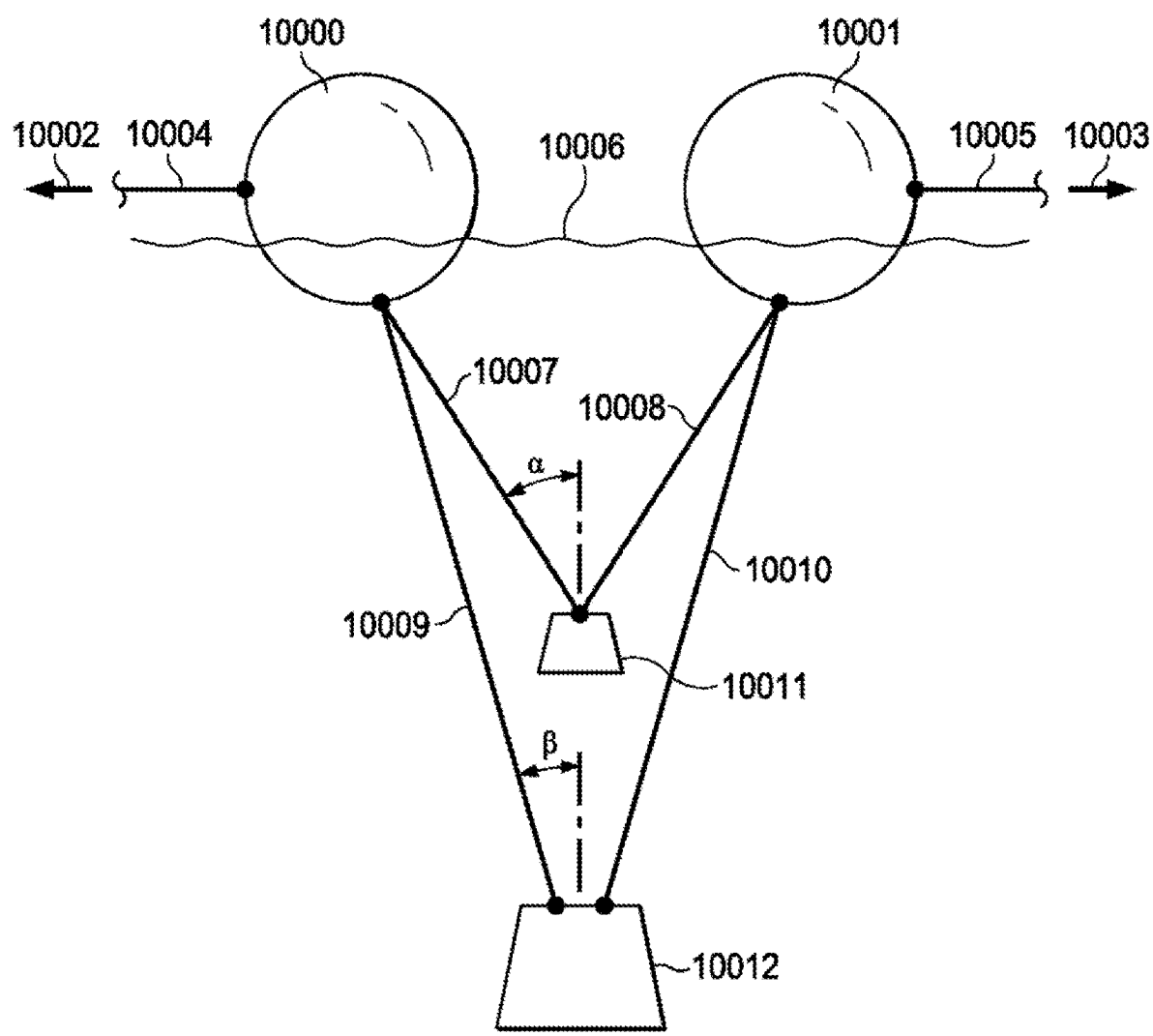

FIG. 100 illustrates an embodiment of the present disclosure similar to the tensioning weight assembly illustrated in FIGS. 98 and 99. However, this assembly includes two tensioning weights 10011-10012, instead of the three included in the embodiment of FIGS. 98 and 99.

Figure 101:
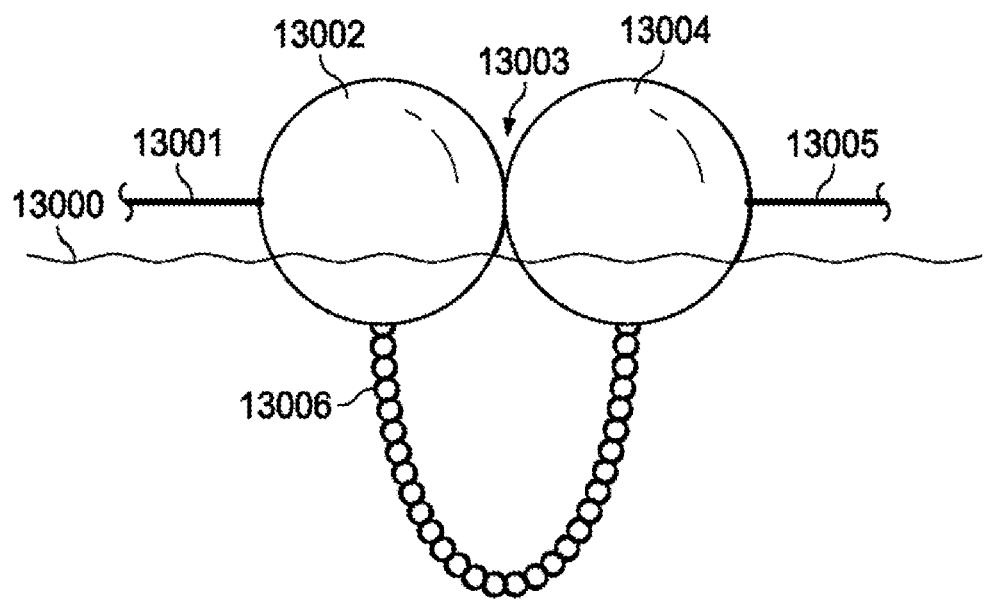
FIGS. 101 and 102 is a schematic diagram of an alternate buoyancy spring.

FIG. 101 illustrates an embodiment of the present disclosure similar to the tensioning weight assemblies illustrated in FIGS. 98-100. However, this assembly includes a flexible weighted connector 13006 (which might be a chain, cable, series of linked rigid beams, etc.) instead of a tensioning weight and associated tether segments. For example, one embodiment would use a chain with relatively heavy links strung and suspended beneath and/or between two floats 13002 and 13004 in order to create a restoring force that would tend to eliminate any gap that might develop between floats 13002 and 13004. Note that these links 13006 would typically be of significantly greater weight and/or size than those of the chain on either side of the tensioning mechanism e.g. 13001 and 13005, and may be interposed/interspersed with further weighted elements like steel balls or rings or concrete balls or rings.

Figure 102:
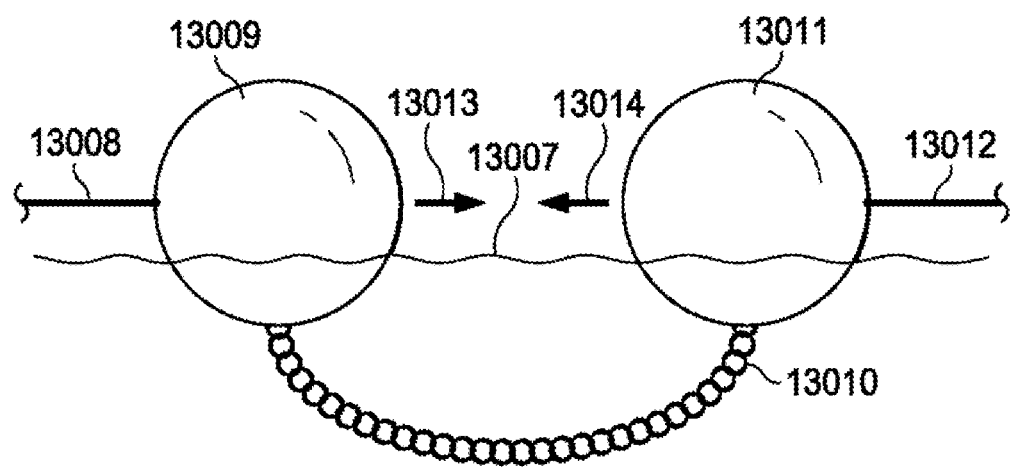

FIG. 102 illustrates the same embodiment as is illustrated and discussed in relation to FIG. 101. However, in this illustration, the floats 13009 and 13011 are separated and a gap 13007 exists between them. As a consequence of the gravitational forces acting on its constituent links and/or members, the lateral extension of weighted connector 13010 creates restoring forces 13013-13014 on the floats, tending to pull them back together.

Figure 103:
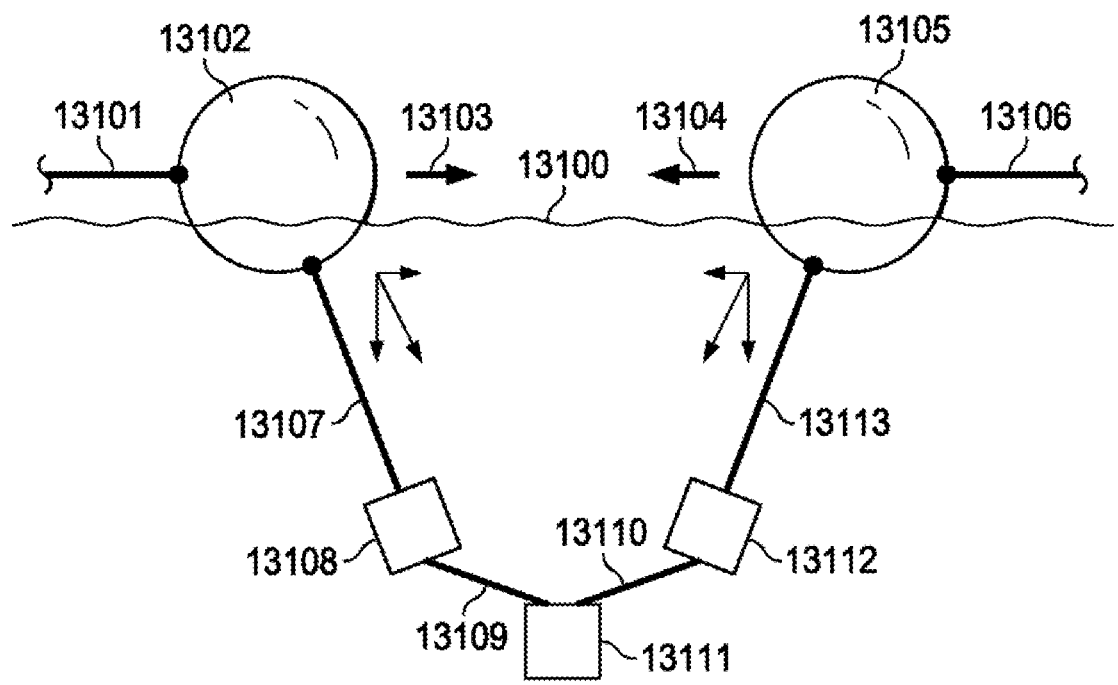
FIGS. 103 and 104 are schematic diagrams of alternate buoyancy springs.

FIG. 103 illustrates an embodiment of the present disclosure similar to the tensioning weight assemblies illustrated in FIGS. 98-102. However, this assembly includes three tensioning weights 13108, 13111, and 13112 connected by, and/or incorporated within, a single common tether connected to and/or between two floats 13102 and 13105. This is similar to the tensioning weight composed of a weighted connector, as illustrated and discussed in relation to FIGS. 101-102. As floats 13102 and 13105 are pulled apart, and/or as a gap forms between them, the tensioning weights 13108, 1311, and 13112 are likewise pulled apart, and their gravitational forces are translated from primarily downward forces within the respective tethers 13107 and 13113 into forces with a substantial lateral component 13103-13104 which tend to pull the floats back together. The tensioning weights 13108, 13111, and 13112 will tend to exert restoring forces on floats 13102 and 13105 until the gap between those floats is eliminated and those floats are restored to their nominal configuration of close proximity and/or mutual contact.

Figure 104:
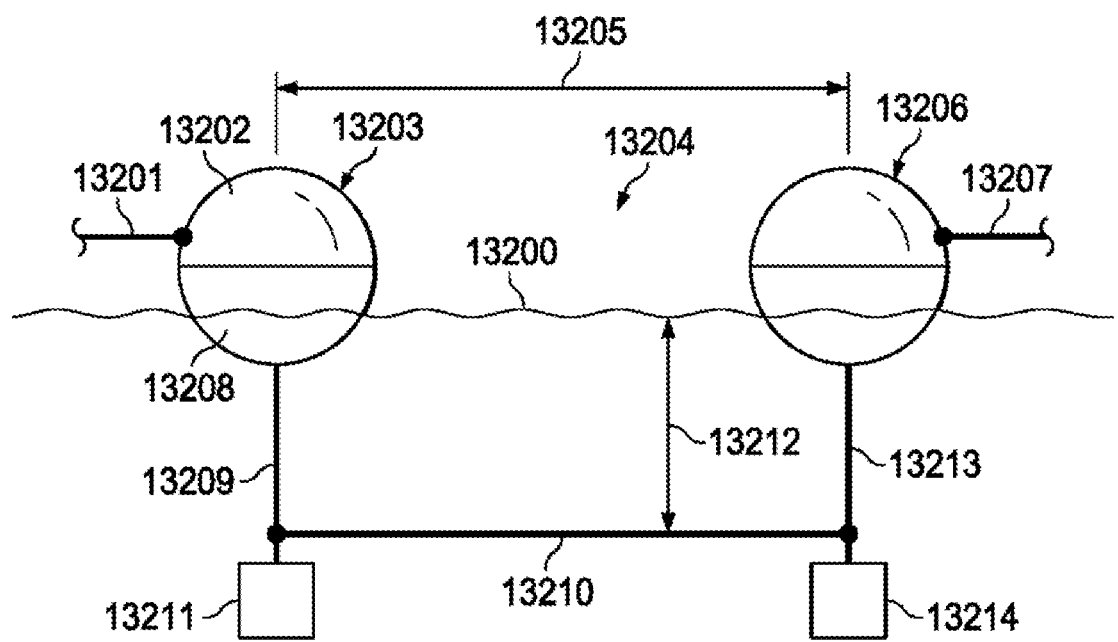

FIG. 104 illustrates an embodiment of the present disclosure similar to the tensioning weight assembly illustrated in, and discussed in relation to, FIG. 103. In this embodiment tensioning weights 13211 and 13214 are suspended directly beneath floats 13202 and 13206, respectively. The nominal separation of the floats, and/or the gap within which the tensioning weights 13211 and 13214 will not exert a significant, if any, restoring force on their respective floats, is determined by, and equal to, the length of tether segment 13210. When the gap 13205, between floats 13202 and 13206, increases beyond the length of tether segment 13210, then tensioning weights 13211 and 13214 will exert a restoring force on those floats that will tend to pull them back together. However, when the gap 13205 is equal to, or less than, the length of tether segment 13210, then tensioning weights 13211 and 13214 will not exert a significant, if any, restoring force on those floats.

The illustrated configuration of tensioning weights and floats provides a nominal gap 13204, which, if wide enough, and, if the depth 13212 of tether segment 13210 is deep enough, will allow boats, ships, and/or other objects, entities, and/or marine creatures, to pass through and to perhaps thereby transit a networked farm of floats, operational elements, etc. Such a "bypass" tether assembly might only be safe to use when the gap between the respective floats is no greater than its nominal resting extent. For example, if and/or when the floats 13202 and 13206 are pulled apart, i.e. to a separation distance which exceeds their nominal separation, then the subsea and/or submerged tether segment 13210 which connects and/or binds together the respective tensioning weights 13211 and 13214 will be a lesser depth than its nominal depth. Such a raised tether segment might present a danger to boats and/or other objects attempting to pass through the gap adjacent to the surface.

The captain of a boat might have difficulty assessing whether or not the gap in a tensioning assembly such as the one illustrated in FIG. 104 is at or below its nominal extent simply from visual observations, and/or without a priori knowledge of its nominal extent. Therefore, other visual indicators which can indicate whether or not the "tensioned bypass" is in its nominal "resting" configuration, and likewise whether or not the submerged tether segment 13210 is at its nominal and maximal depth, would reduce the risk of accidents and/or other harm that might result from the transiting of such a bypass. There are many potential methods, designs, and/or features, of a tensioning assembly such as the one illustrated in FIG. 104 that can provide useful information to an observer as to whether or not, and even the extent to which, a submerged tether segment is at its maximal depth. One such potential feature is illustrated in FIG. 104. Notice that the bottom halves of both floats 13202 and 13206 are of a different color, and/or include markings, which make them readily distinguishable from the upper halves of those floats. The floats can also have lights to differentially mark the upper and lower halves, e.g. with different colors. The floats can also have lights of a single color to simply mark the location of the bypass so that it can be identified at night.

When the floats are pulled apart, thereby raising the subsea tether segment 13210, and thereby making the transit of the bypass gap 13204 less safe, the horizontal planes that separate the upper and lower hemispheres of the floats will noticeably deviate from their nominal orientations parallel to the surface of the body of water on which they float, providing a useful visual indication of the need for caution.

Figure 105:
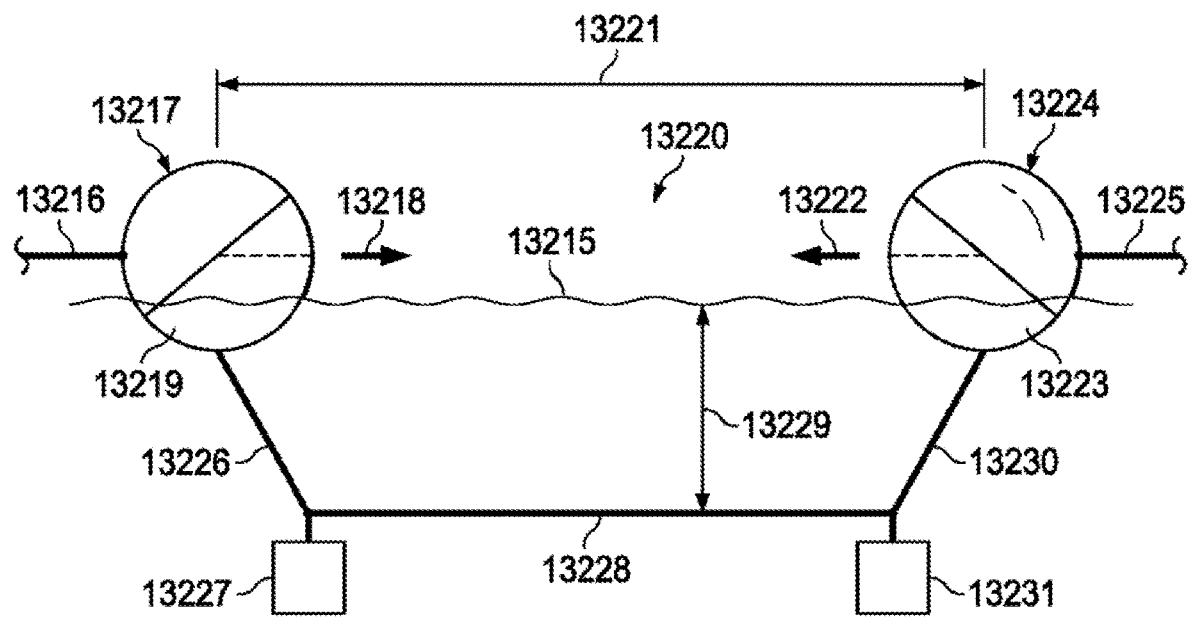
FIGS. 105 and 106 are schematic diagrams of alternate buoyancy springs.

FIG. 105 illustrates the same embodiment illustrated in, and discussed in relation to, FIG. 104. However, in FIG. 105, the embodiment is illustrated as it might appear at a moment when the floats 13217 and 13224 have been pulled apart to a separation distance 13221 that significantly exceeds the nominal "resting" separation equal to the length of the submerged tether segment 13228. In this configuration, the depth 13229 of the submerged tether segment 13228 is substantially less than the depth (13212 in FIG. 104) of that tether segment (13210 in FIG. 104) when the floats and the entire tensioned bypass assembly is in its nominal "resting" configuration. Notice that the separation of the upper and lower hemispheres of the floats 13217 and 13224 are no longer parallel with the surface of the body of water 13214 on which the floats float. One might expect that a boat or ship captain would be able to notice with relative ease the misalignment of the floats, and surmise the related degree of risk that might be associated with a transit of the bypass gap 13220 at such a moment.

Figure 106:
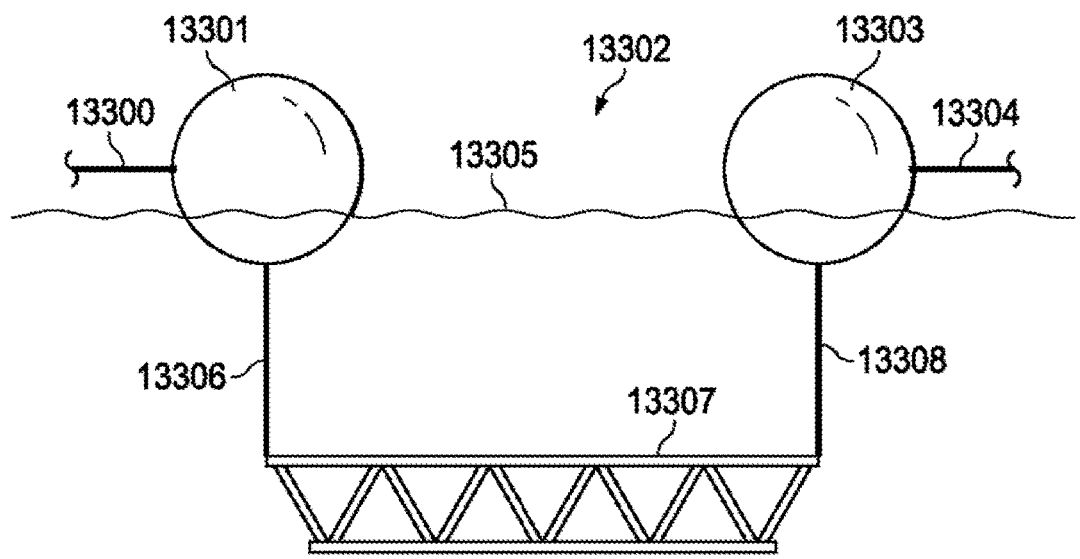

FIG. 106 illustrates a "tensioned bypass" similar to the one illustrated in FIGS. 104-105. However, the embodiment illustrated in FIG. 106 utilizes a submerged truss 13307, suspended by tether segments 13306 and 13308 beneath and/or by floats 13301 and 13303. In its nominal "resting" configuration, and/or degree of float separation, the tensioned bypass provides a stable gap 13302 through which boats may transit the tether, e.g. 13300 and 13304, without interrupting the connection it provides and/or maintains between floats and/or operational elements connected to it, i.e. via 13300 and 13304.

Figure 107:
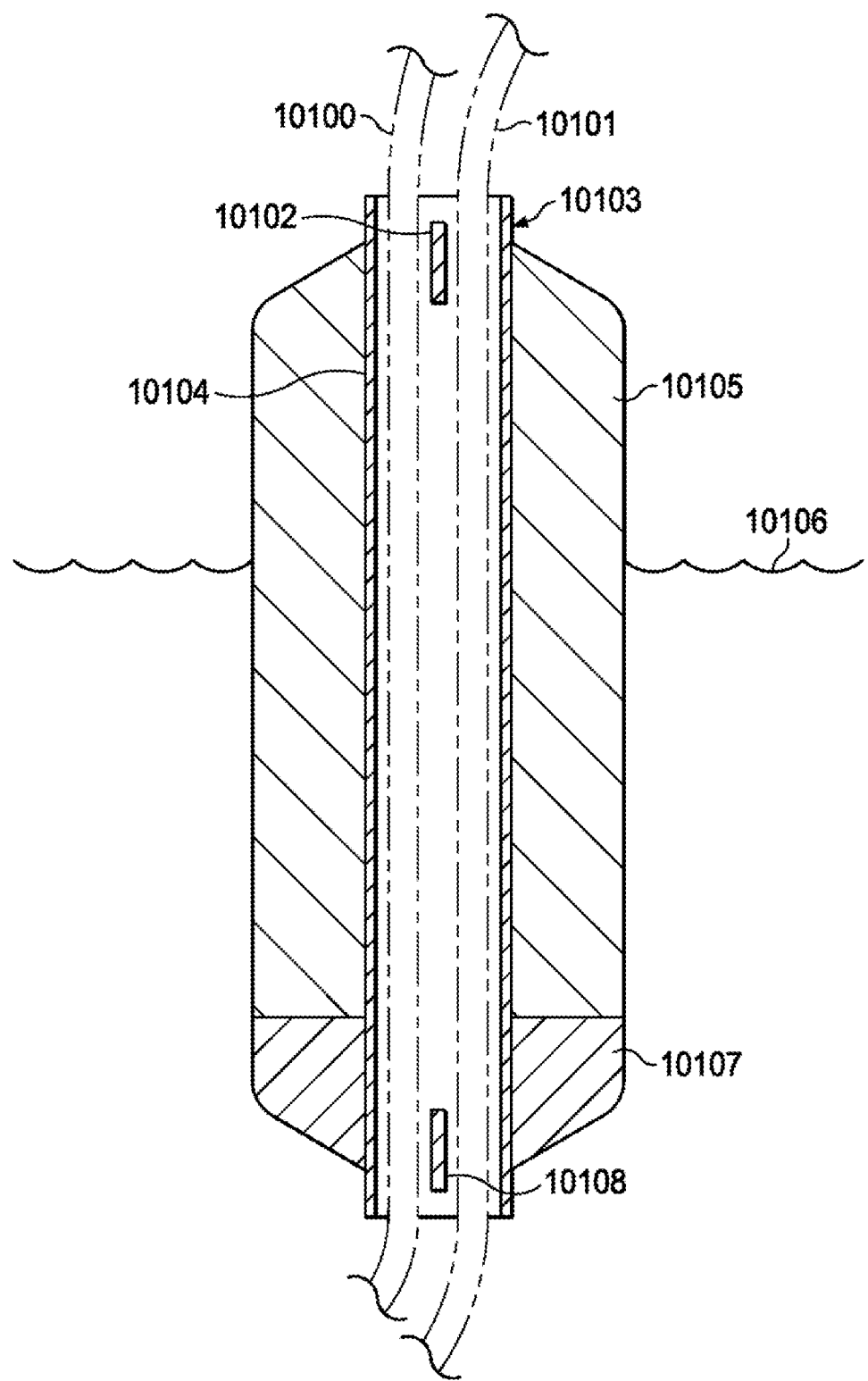
FIG. 107 is a buoy used to connect electrical conduits.

FIG. 107 illustrates a cross-sectional view of a tubular float 10105 that is attached and/or connected to a tubular weight 10107 so as to form a "self-tensioning float." Equivalently, an approximately tubular object is composed of materials of differing buoyancies in which the average buoyancy of an upper end is greater than the buoyancy of a lower end, and/or in which the average buoyancy of one end is positive and tends to float, and the average buoyancy of another end is negative and tends to sink. The resulting integral tubular object and/or assembly has an overall average positive buoyancy and tends to float adjacent to the surface 10106 of a body of water. This embodiment will tend to have a preferred, nominal, and/or typical orientation when allowed to float adjacent to the surface of a body of water. The negatively buoyant end will tend to assume the greater depth, and the positively buoyant end will tend to assume the lesser depth and/or to pass up and project out of the body of water. Inside the buoyant tube 10105 and 10107 is a channel 10103, e.g. a cylindrical channel and/or pipe, which contains posts 10102 and 10108, dividers, and/or other barriers which segregate and/or keep separate, to at least a partial degree, cables, chains, wires, etc., passing through the channel on opposing sides of the dividers 10102 and 10108. A mooring cable 10100, chain, rope, etc., may pass through one side of the channel passing through such a self-tensioning float. An electrical wire, cable 10101, and/or conduit, may pass through the other side of the channel. An embodiment may use such a self-tensioning float to guide and/or support any one or two flexible connectors and/or cables.

An embodiment of this self-tensioning float may not include dividers, e.g. 10102, allowing any and all cables and/or flexible connectors passing through the channel therein to remain in contact with one another and thereso interact. An embodiment of this self-tensioning float may utilize a single divider which spans the full length, or a substantial portion of the full length, of the channel therein. An embodiment of this self-tensioning float may include two or more separate channels, e.g. separate pipes, so as to permit each individual cable and/or flexible connector passing through the float to be protected and/or secured within its own channel. And embodiment of this self-tensioning float may have multiple collars that wrap around the electrical cable, rather than only one.

Figure 108:
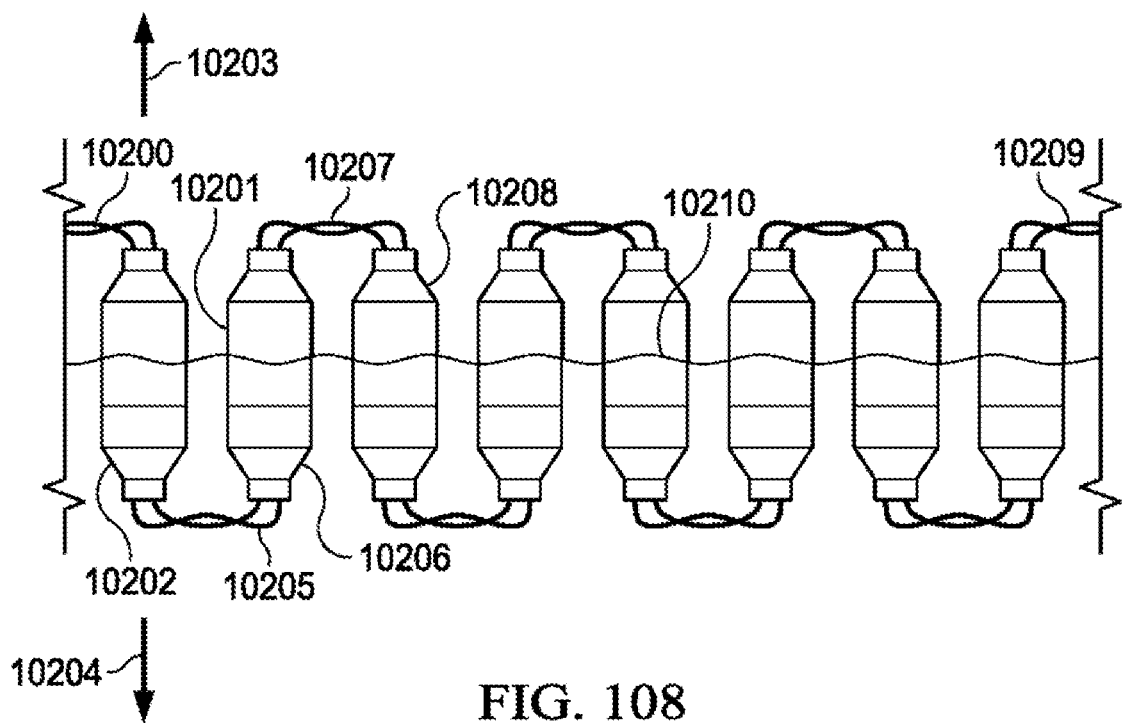
FIGS. 108 and 109 is schematic diagram of an embodiment using the buoy of FIG. 107.

FIG. 108 illustrates a set of self-tensioning floats of the kind illustrated in, and discussed in relation to, FIG. 107, through which pass a single pair, e.g. 10200, 10205, 10207, and 10209, of cables and/or flexible connectors. The pair of cables passes through the channel within each of the self-tensioning floats, e.g. 10201, 10202, 10206, and 10208. And, in the absence of any lateral tension on the pair of cables, and/or the sufficient proximity of the ends 10200 and 10209 of the pair of cables to one another, each self-tensioning float is able to assume a nominal vertical orientation adjacent to the surface 10210 of the body of water. The nominal "resting" orientation of each self-tensioning float is vertical and places the weighted, and/or more negatively buoyant end, of the float at the greater depth, and places the buoyant end of the float at the lesser depth.

Figure 109:
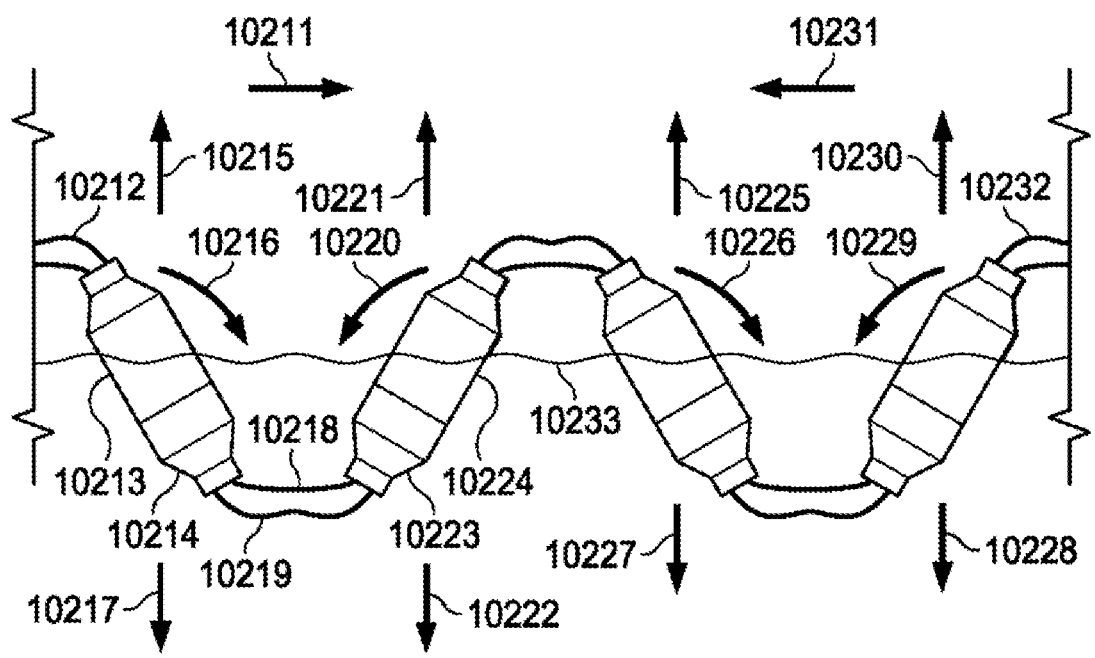

FIG. 109 illustrates the same set of self-tensioning floats illustrated in FIG. 108. However, in FIG. 109 the ends 10212 and 10232 of the pair of cables have been pulled apart such that the self-tensioning floats are compelled to assume non-vertical orientations in which their heavier ends are raised closer to the surface 10233 of the body of water. Because the self-tensioning floats are "tipped" and non-vertical, and because their respective heavy and/or weighted ends are raised above their nominal and/or maximal depths, each self-tensioning float, e.g. 10224, experiences a torque, e.g. 10216 and 10220, about and/or near its center, and/or its center of mass. Each torque applies a restoring force, e.g. 10211, to the pair of cables, wherein said force tends to pull the ends of the pair of cables back together so as to allow each self-tensioning float to assume its nominal vertical orientation.

Figure 110:
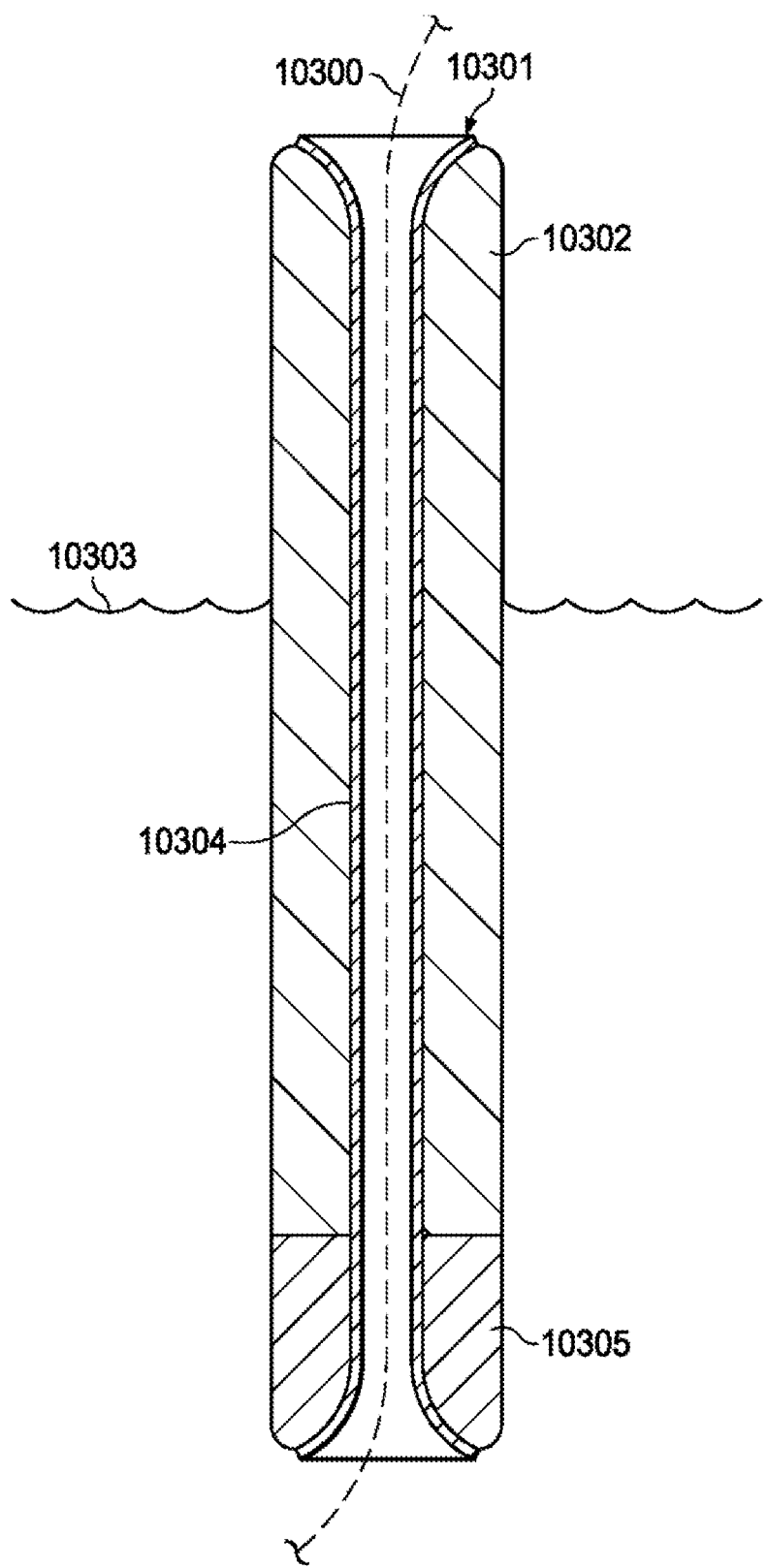
FIG. 110 is a cross sectional view of an alternate buoy.

FIG. 110 illustrates a cross-sectional view of a self-tensioning float similar to the embodiment illustrated in, and discussed in relation to, FIGS. 108-109. In this embodiment, the float incorporates and/or possesses a single undivided channel suitable to the passage and/or positioning of a single cable, e.g. along path 10300, connector, conductor, wire, etc., and/or a single bundle and/or assembly of such cables, connectors, conductors, wires, etc. As was true of the self-tensioning float illustrated in, and discussed in relation to, FIGS. 108-109, this embodiment possesses an end 10302 characterized by positive buoyancy, and an opposing end 10305 characterized by negative and/or lesser buoyancy. When at rest adjacent to the surface 10303 of a body of water, this embodiment will tend to assume a vertical orientation in which the less buoyant end 10305 will assume the greater depth.

When either end of a cable, or cables, positioned within the float's channel 10301 and 10304 is pulled laterally, the self-tensioning float will tend to be moved out of its nominal "resting" vertical orientation, and a the differential buoyancy and/or weight of the opposing ends of the float will tend to create a torque about a center of the float which will tend to pull the cable, or cables, back to a locally vertical orientation.

FIG. 111 is an illustration of the same embodiment illustrated in, and discussed in relation to, FIG. 110. The self-tensioning float 10308 is shown floating adjacent to the surface 10309 of a body of water in a typical, nominal, "resting" vertical orientation. If a cable or cables 10306 positioned within its internal channel 10307 and 10310 are pulled such that the portion of the cable or cables inside the self-tensioning float are pulled out of a vertical orientation, and the self-tensioning float along with it or them, then the gravitational force of the weight, and the buoyant force of the upper end, being pulled from their nominal resting orientation, that is coaxial with the vertical axis of the float, will create a torque about a center of the float which will tend to pull the portion of the cable or cables positioned within its channel back to a vertical orientation, and likewise to pull the outer ends of the cable or cables back to a position wherein their lateral positions projected onto a plane parallel to the plane of the surface 10309 of the body of water will no longer be separated.

FIG. 112 is a top-down (or bottom-up) illustration of the embodiment illustrated in, and discussed in relation to, FIG. 111. Within the self-tensioning float 10312 is a channel 10314 through and/or in which may be positioned a cable or cables. Said channel has "belled" upper and lower mouths 10313 so as to protect a laterally-pulled cable from abrasion, tearing, and/or damage.

Figure 113:
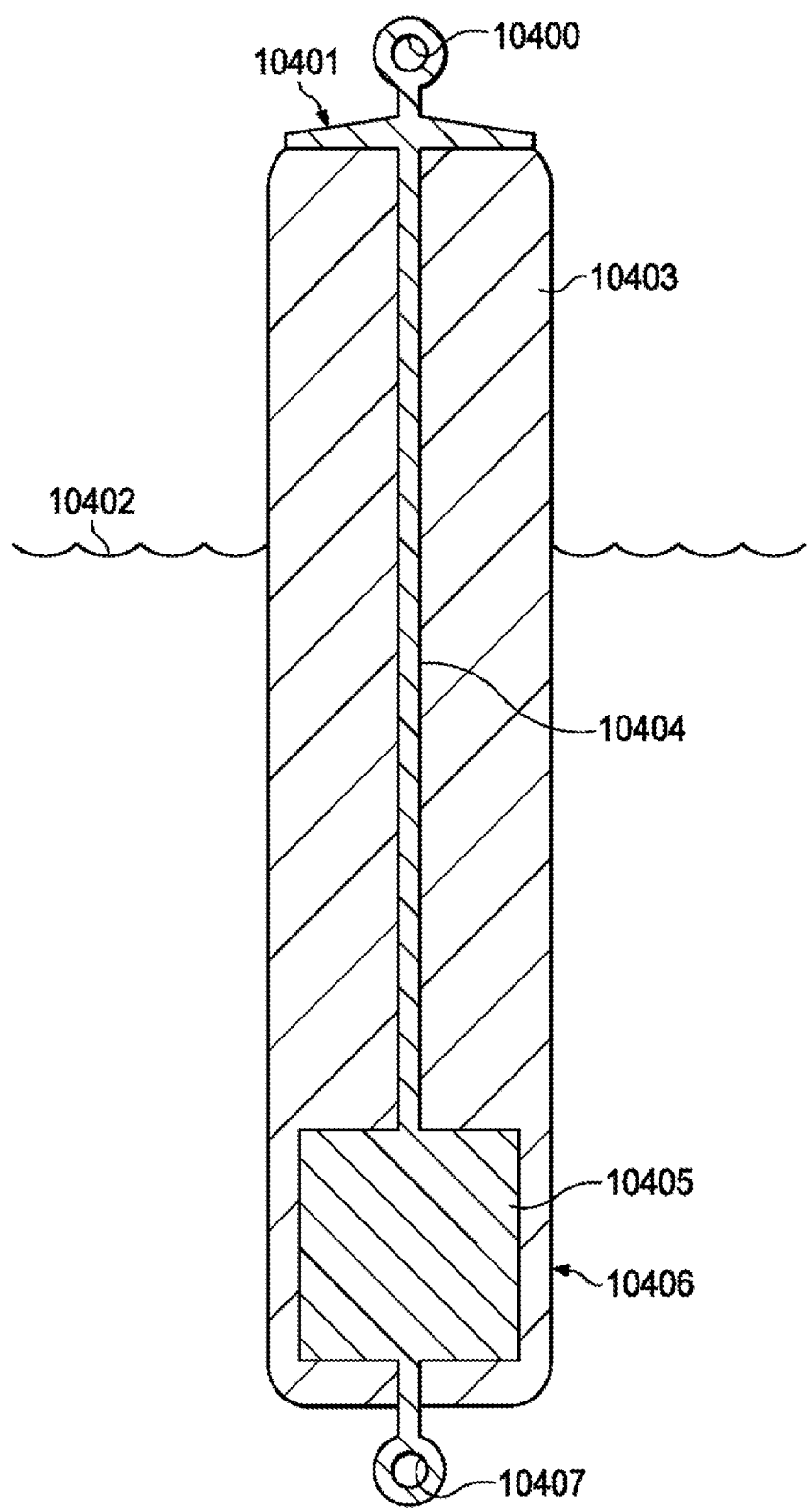
FIG. 113 is a cross sectional view of another alternate buoy.

FIG. 113 is a cross-sectional view of a self-tensioning float that is similar to the ones illustrated in, and discussed in relation to, FIGS. 107-112. However, the embodiment illustrated in FIG. 113 does not possess a channel and makes no provision for the positioning of cables, conductors, connectors, etc. within it. Instead this embodiment, possesses a strong central spine 10404, column, shaft, and/or connector, to one end of which is attached, connected, and/or extruded, a mass 10405 and/or weight of relatively negative buoyancy. Surrounding this mass and the upper portions of the central spine 10404 is material 10403 and/or a portion of positive buoyancy. In this embodiment an upper plate 10401 provides vertical stability and/or protection to the underlying buoyant material 10403. And, upper 10400 and lower 10407 eyelets provide points to which cables, connectors, tethers, chains, etc. may be attached and/or connected, e.g. so as to link a series of such self-tensioning floats and thereby create a tether and/or portion thereof which will provide, create, and/or generate a restoring force to oppose any stretching of the vertically oriented series of floats beyond their nominal resting length.

Figure 114:
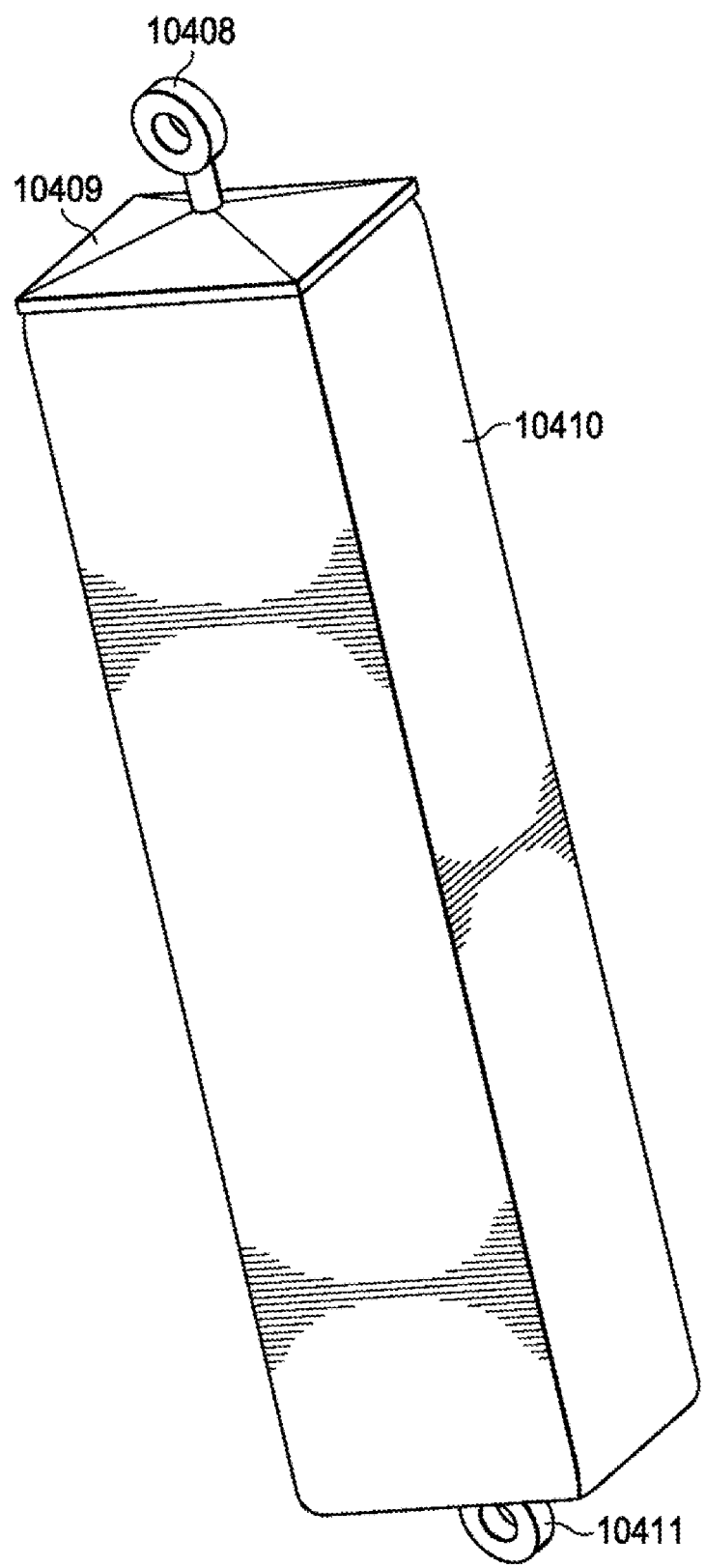
FIG. 114 is a perspective view of the buoy of FIG. 113.

FIG. 114 is a perspective-view illustration of the same embodiment illustrated in FIG. 113. Upper 10408 and lower 10411 eyelets provide points to which mooring cables, connectors, tethers, etc. may be connected and/or attached. And, an upper plate 10409 provides stability and protection to the underlying buoyant end of the self-tensioning float 10410.

Figure 115:
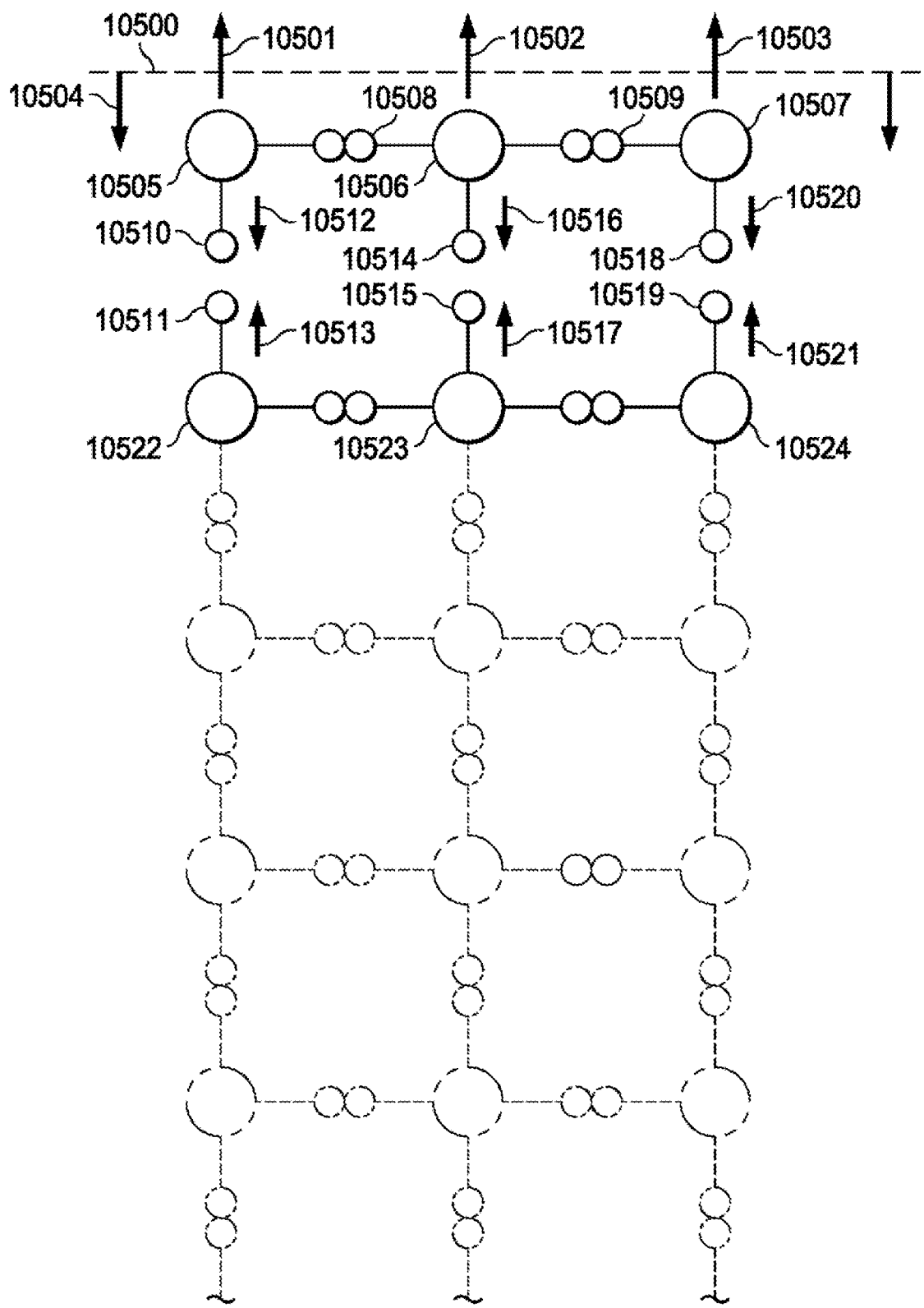
FIGS. 115-117 are schematic diagrams of farm configurations using the buoys of FIG. 114.

FIG. 115 is a top-down illustration of the interaction of a formation or farm of drifting elements with the passage of a wave 10500 through the formation. As the wave crest 10500 approaches an interconnected row of operational elements (e.g. wave energy devices) 10505-10507, those elements are drawn 10501-10503 toward the approaching wave crest. The operational elements are drawn toward the wave crest in a direction that is orthogonal to a pair of separation restorative tethers 10508-10509. Those tethers 10508-10509 remain at their nominal resting lengths as the entire row is drawn toward the wave crest.

However, as the wave crest 10500 approaches, tensioning tethers 10510-10511, 10514-10515, and 10518-10519 whose longitudinal axes are parallel to the direction in which the row of operational elements 10505-10507 is drawn, are pulled and/or stretched to lengths that exceed their critical distance separation. As a result, a gap develops between the nominally adjacent floats, e.g. 10510-10511. Tensioning weights (not shown) suspended between each adjacent pair of floats, e.g. 10510-10511, transmit a portion of their buoyancy related force, e.g. 10512-10513, to their respective floats, e.g. 10510-10511. And, those forces, i.e. restoring forces, tend to oppose and/or resist any further separation of the respective floats, and tend to bias the tethered operational elements, e.g. 10505 and 10522, back to their nominal separation distances.

Figure 116:
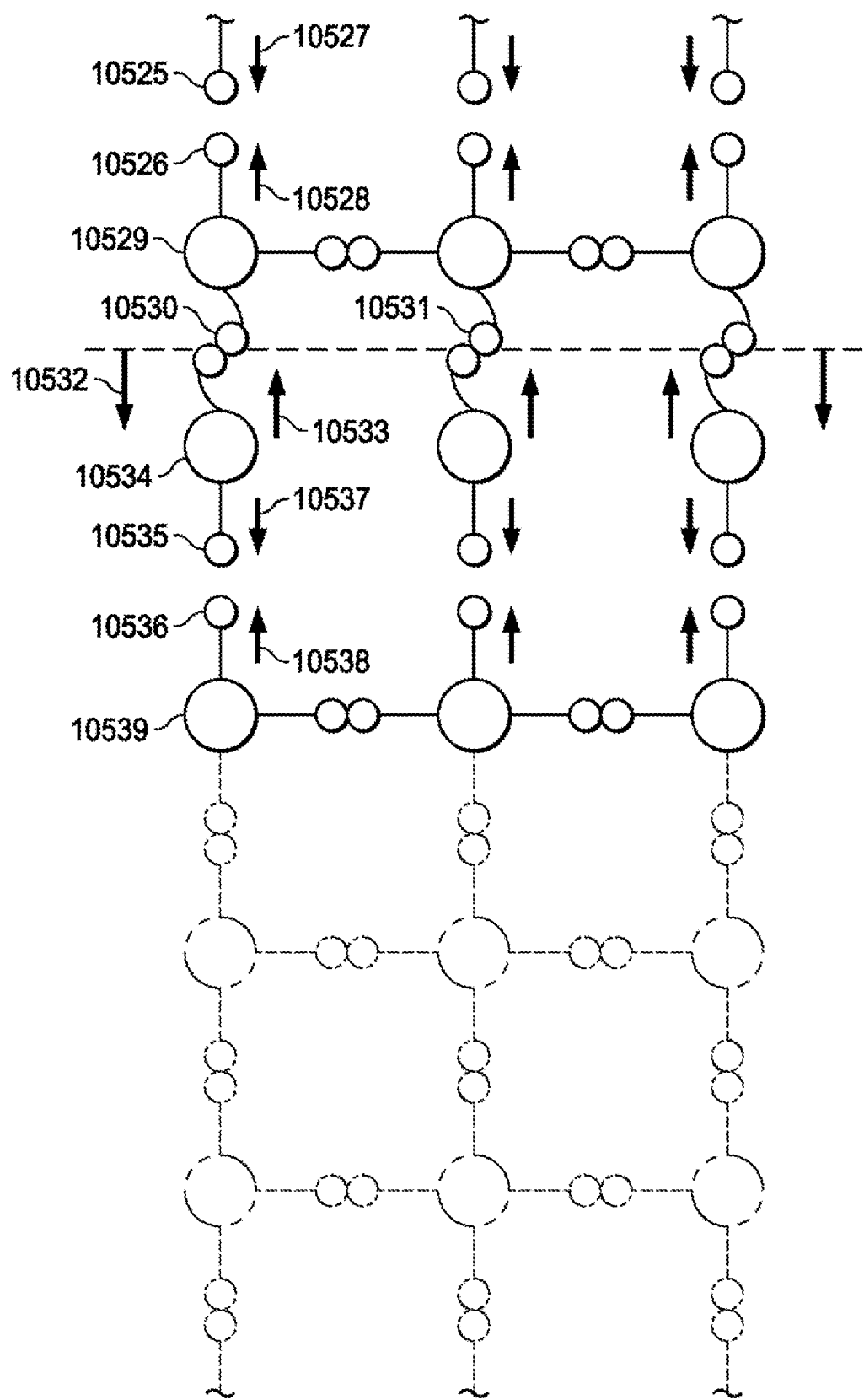

FIG. 116 is an illustration of the same interaction of a formation of drifting objects with the passage of a wave 10531 through the farm illustrated in, and discussed in relation to, FIG. 115. In this illustration, the wave 10531 has continued its propagation through the formation, and has passed the row of operational elements, e.g. 10505, that it was illustrated approaching in FIG. 115. In this illustration, the wave crest 10532 is positioned between two rows of operational elements, e.g. 10529 and 10534, that results in a contraction of those two rows to a separation distance which is less than their nominal resting separation distance. The tethers, e.g. 10530, are unable, and are not intended, to prevent the distance between adjacent operational elements from falling below a nominal distance. The tethers only exert a force to oppose a change in the separation distance between operational elements when stretched, pulled, and/or extended, beyond (not below) a threshold distance. As the row of operational elements, e.g. 10529, passed by the wave crest 10531, moves away from the wave crest, and is drawn toward the approaching wave trough (not shown), its movement is accelerated by the restoring forces generated by the stretched tensioning weights suspended beneath the separated pairs of floats, e.g. 10525-10526.

Figure 117:
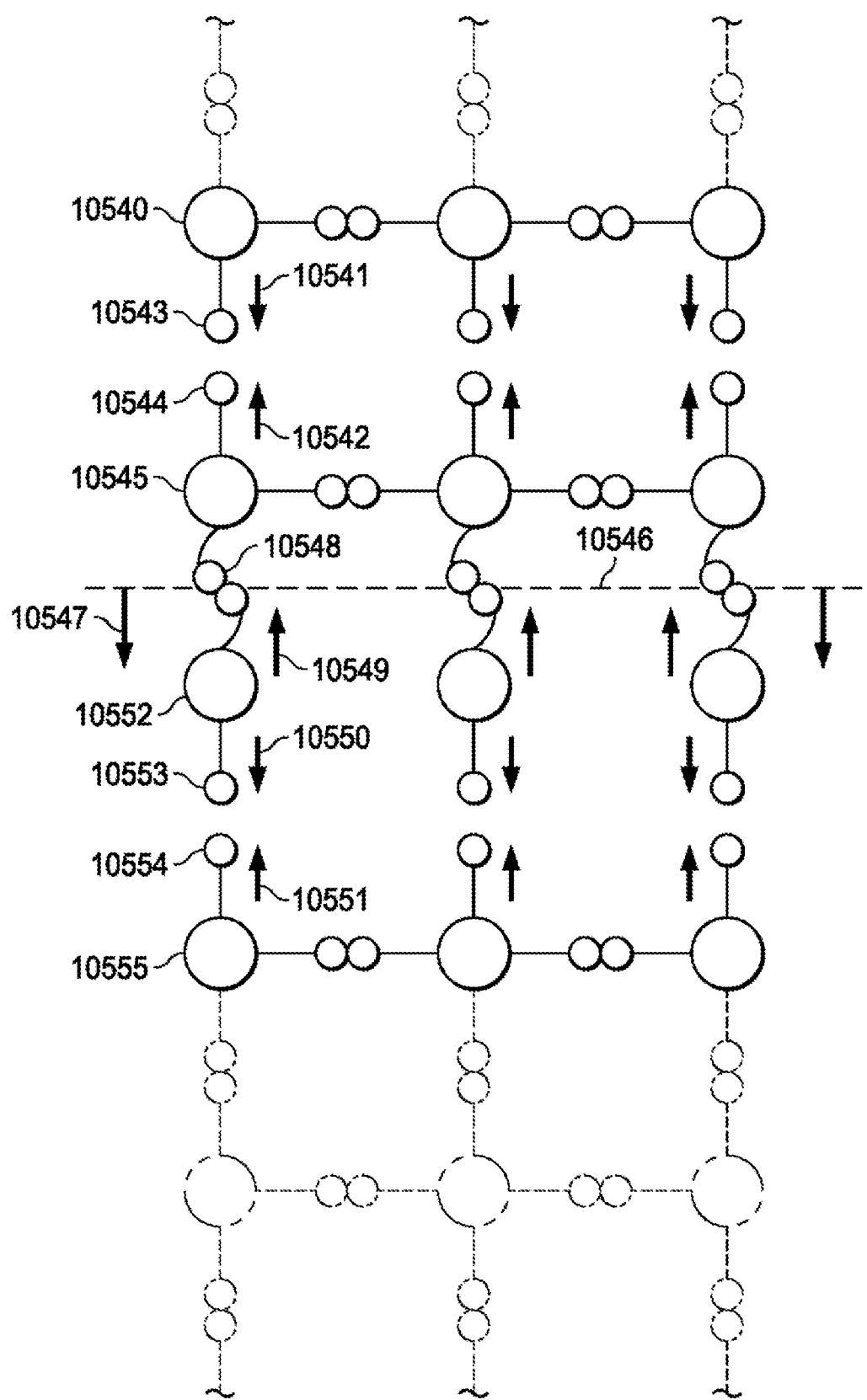

FIG. 117 is an illustration of the same interaction of a formation with the passage of a wave 10546 through the formation illustrated in, and discussed in relation to, FIGS. 115-116. In this illustration, the wave 10546 has continued its propagation through the formation, causing some tethers, e.g. 10543-10544 and 10553-10554, to be stretched beyond their critical distance separation and to manifest restoring forces, e.g. 10541-10542 and 10550-10551, tending to pull back together the operational elements, e.g. 10540, 10545, 10552, and 10555, connected to those tensioned tethers. Even though some tethers, e.g. 10548, are slack, the adjacent tethers, e.g. 10543-10544 and 10553-10554, are stretched and exert a restoring tension that will tend to pull apart operational elements, e.g. 10545 and 10552, that are closer together and insufficiently separated.

Figure 118:
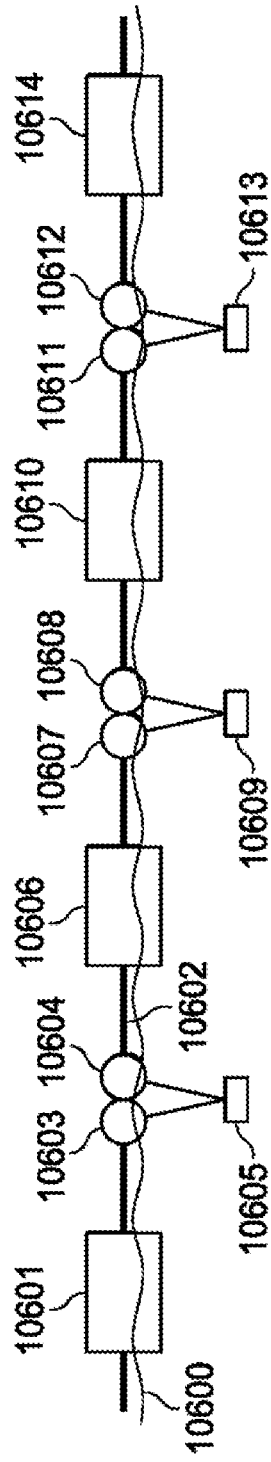
FIGS. 118 and 119 are schematic diagrams of an alternate embodiment of the present invention.

FIG. 118 is an illustration of a set of operational elements, 10601, 10606, 10610, and 10614, interconnected and/or linked together by tensioned tethers, e.g. 10602. In this illustration, the lengths of the tensioned tethers, and/or the distances between the tethered operational elements, are at or below the critical distance separations of the respective tensioned tethers. Therefore, the tethers do not exert any lateral forces on the respective operational elements, and therefore they do not tend to influence, inhibit, nor diminish, the wave-related motions of those operational elements. This is particularly useful when the operational elements are devices that extract energy from ocean waves through their wave-driven motions.

Figure 119:
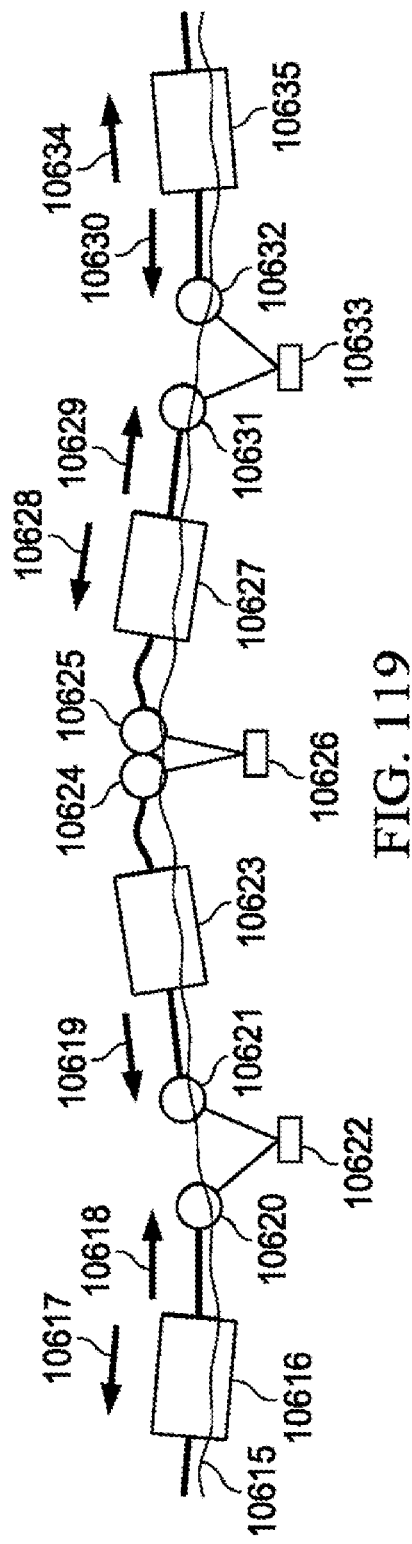

FIG. 119 is an illustration of the same set of operational elements illustrated in, and discussed in relation to, FIG. 118. In this illustration, the positions of the operational elements, and the floats and tensioning weights connected to them, have been altered in response to the passage of a wave passing across the surface 10615 of the body of water on which the floats, e.g. 10620, and operational elements, e.g. 10616, are floating.

As operational element 10616 moves 10617 to the left toward an approaching wave trough 10615, it is pulled away from its neighboring operational element 10623. This results in an increase in the distance separating those operational elements, which results in a separation of the floats 10620-10621, and a lifting of the tensioning weight 10622 suspended beneath, by, and/or under, those floats. The separation of the floats 10620-10621, and the lifting of the tensioning weight 10622, results in the generation of a restoring force 10618-10619 that opposes any further increase in the distance by which the floats, and the respective operational elements 10616 and 10623, are separated. Adjacent to the wave crest, operational elements 10623 and 10627 are separated by a distance that is less than the nominal separation distance. The tether that connects these operational elements is slack, and the floats 10624-10625, and tensioning weight 10626, incorporated within the tether are not generating any restoring forces within the tether. However, the tensioned tethers, e.g. 10620 and 10631, will tend to pull apart the inadequately separated operational elements 10623 and 10627.

Figure 120:
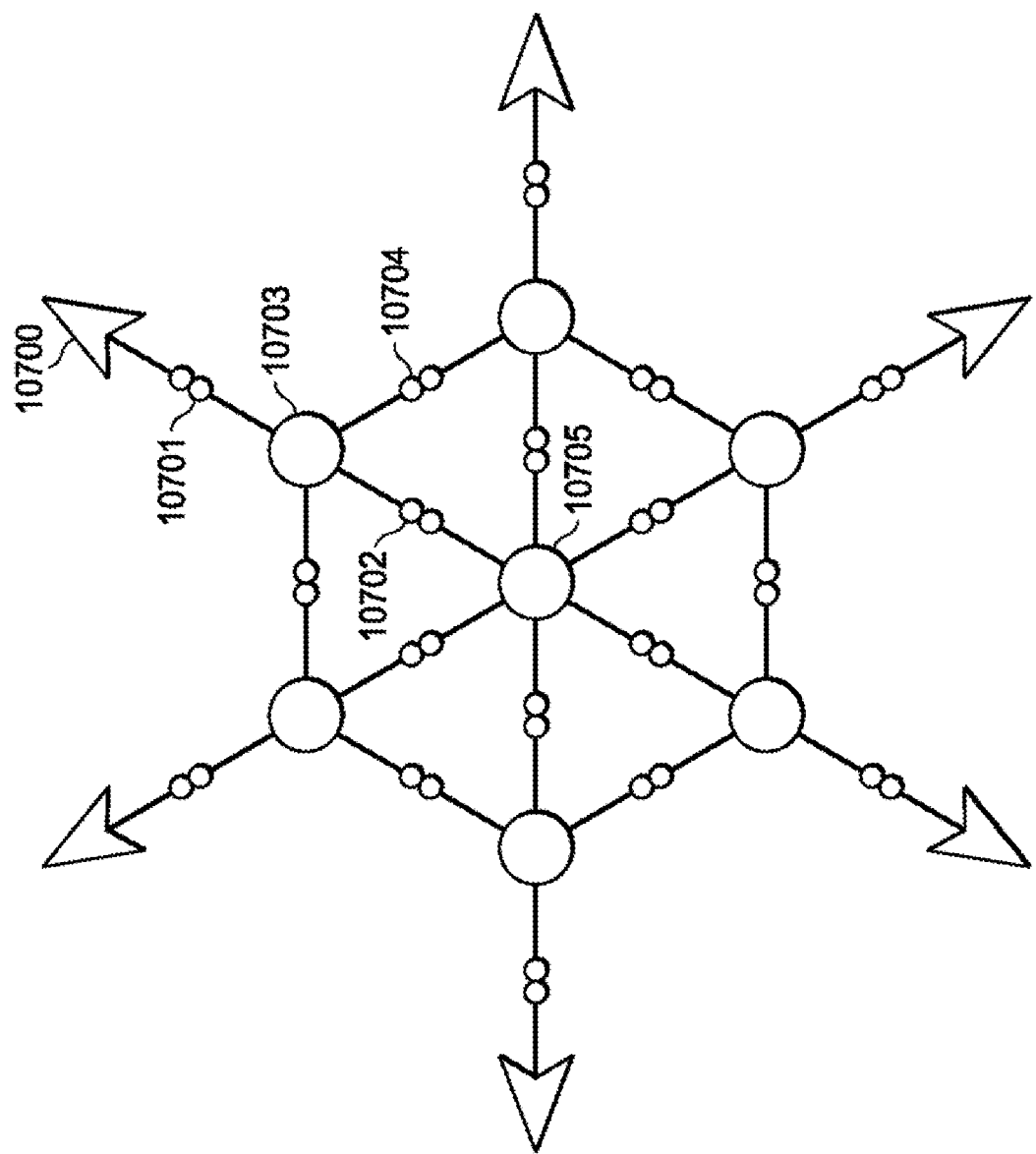
FIGS. 120-123 are schematic diagrams of a farm configuration using buoy connections.

FIG. 120 is an illustration of an interconnected farm network of seven operational elements, e.g. 10703, wherein the operational elements are connected to one another by tethers, e.g. 10704. Around the periphery of the farm, are six propulsive buoys, e.g. 10700, which generate thrust so as to establish, preserve, maintain, and/or restore, the absolute and/or relative positions and/or orientations of the operational elements. Those propulsive buoys are also connected, or can be connected, to the other elements of the farm by means of separation restorative tethers. There are other embodiments in which the farms include three or more operational elements. There is no limit to the number of operational elements, nor to the nature and/or combinations of operational elements, that may be interconnected and/or positioned by means of such farms. There are other embodiments in which the farms include two or more propulsive buoys and/or include both propulsive buoys and anchors. There are other embodiments in which the farms include interconnections between the operational elements by means of tethers, some of which are tensioned, and some of which are not. Some embodiments, of the kinds of farms herein illustrated and disclosed, will act to establish, preserve, maintain, and/or restore, only the relative spacings and/or separation distances of their respective operational elements, e.g. they will keep the operational elements sufficiently far apart from one another, but will otherwise allow the farm to drift freely. Some embodiments, of the kinds of farms herein illustrated and disclosed, will act to establish, preserve, maintain, and/or restore, the relative spacings and/or separation distances of their respective operational elements as well as maintaining an absolute (e.g. with respect to magnetic north and/or with respect to a prevailing wave direction) orientation of the farm. Some embodiments, of the kinds of farms herein illustrated and disclosed, will act to establish, preserve, maintain, and/or restore, the absolute positions (e.g. of latitude and longitude) of their respective operational elements.

Figure 121:
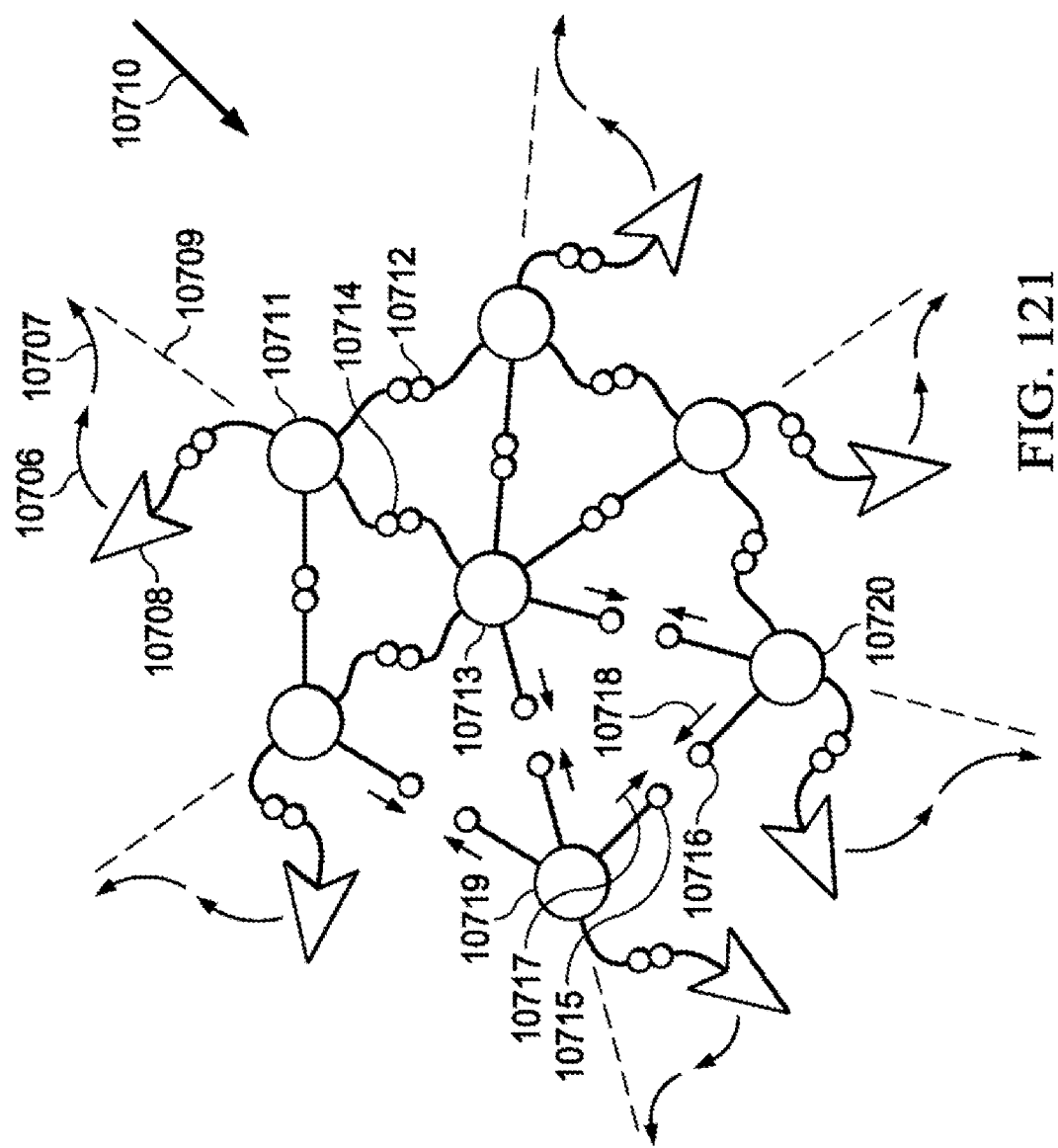

FIG. 121 is an illustration of the same interconnected farm network of seven operational elements as is illustrated in, and discussed in relation to, FIG. 120. In FIG. 121, the farm has suffered a loss of the original, nominal, and/or preferred minimum, separation distances between its operational elements. It has also suffered a loss of the original orientations (e.g. with respect to magnetic north) of its operational elements. Such a loss of relative positioning and orientation within a farm might result from the impact and/or influence of a strong wind and/or current 10710 coupled with a momentary failure of the farm's propulsive buoys and/or control systems to respond adequately to an initial, perhaps relatively minor distortion in the spacing and/or orientation of the farm's operational elements.

Figure 122:
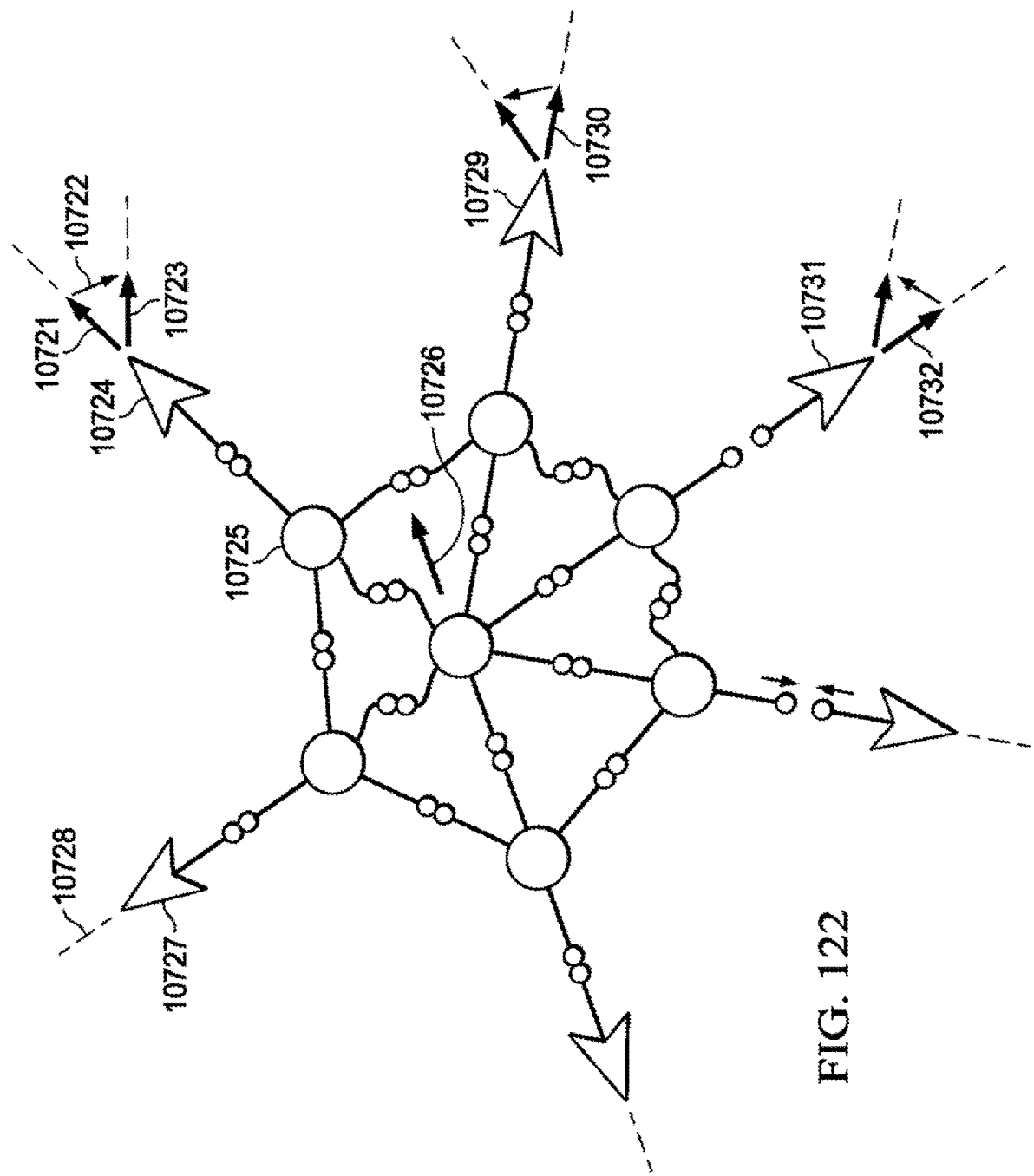

FIG. 122 is an illustration of the same interconnected farm network of seven operational elements as is illustrated in, and discussed in relation to, FIGS. 120-121. FIG. 120 illustrates the farm in its nominal configuration, with its nominal spacing between operational elements, and with those operational elements in their nominal orientation. By contrast, FIG. 121 illustrates the farm after it has suffered a loss of its nominal configuration, of the nominal spacing between its operational elements, and the nominal orientation of those operational elements.

FIG. 122 illustrates the first step in a potential response by the control system and/or by the propulsive buoys in such a farm under such circumstances. In this illustration, the propulsive buoys, e.g. 10727, have either actively (e.g. through the adjustment of rudders) or passively (e.g. by simply pulling against that which holds them back) adjusted their positions and/or orientations so as to assume orientations which direct their propulsive forces approximately away from the center 10726 of the farm. In this case, for this embodiment, a control system has determined the need to move 10726 the location of the center of the farm from its current position to its original, nominal, specified position (at the dashed line adjacent to 10726). It has instructed each propulsive buoy, e.g. 10724, to adjust the magnitude of its thrust so that the combined thrusts of all propulsive buoys, when directed away from the current center of the farm, will not only restore the desired spacing between the operational elements, but will also move the center of the farm to the desired and/or specified location.

Propulsive buoy 10724 will generate a thrust directed away from the center of the farm, and proportional in magnitude to 10721, which is less than the maximum thrust 10723 it is capable of generating. The magnitude of the thrust that propulsive buoy 10724 will generate is approximately equal to the length of the vector 10721 that result from projection of the vector of its full thrust 10723, when that full-thrust vector is oriented parallel to the vector 10726 that defines the direction in which the current center of the farm must be moved in order to restore the position of the center of the farm to its original location.

Figure 123:
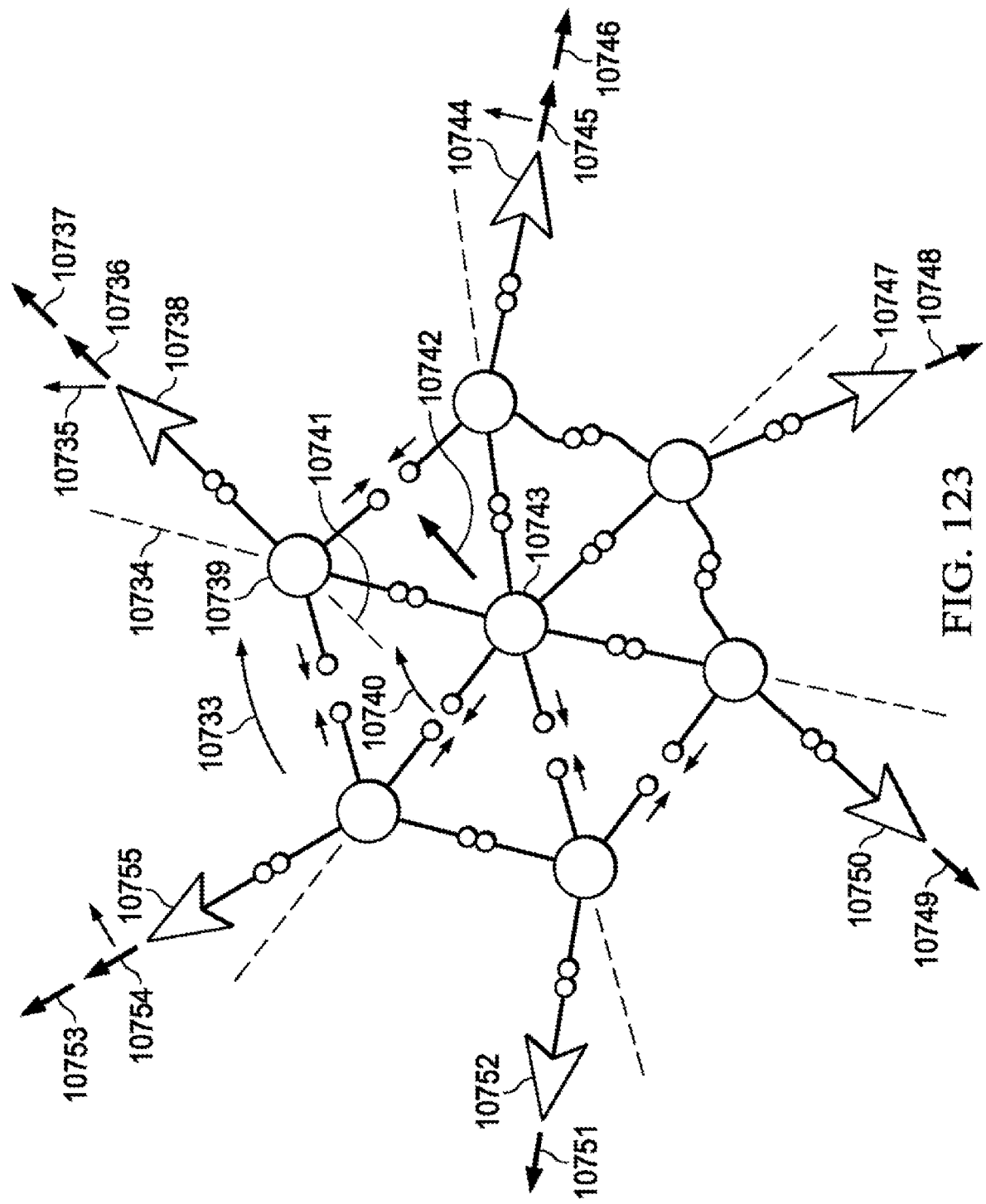

FIG. 123 is an illustration of the same interconnected farm network of seven operational elements as is illustrated in, and discussed in relation to, FIGS. 120-122. FIG. 120 illustrates the farm in its nominal configuration, with its nominal spacing between operational elements, and with those operational elements in their nominal orientation. FIG. 121 illustrates the farm after it has suffered a loss of its nominal configuration, of the nominal spacing between its operational elements, and the nominal orientation of those operational elements. FIG. 122 illustrates the farm's propulsive buoys beginning the process of restoring the farm to its original location and orientation. FIG. 123 illustrates the last step in that process, wherein the propulsive buoys change their orientation, in a radial fashion, so as to not pull directly away from the center of the farm, but to instead pull away from a point tangential to a circle 10740 located about the center of the farm. By orienting themselves in this fashion, the thrust generated by the propulsive buoys will create a torque 10740 that will tend to restore the original radial orientation of the farm. By further matching the magnitudes of their thrusts to the degree to which each thrust will contribute to, or oppose, the movement of the center of the farm to its original location (as was discussed in relation to FIG. 122), the combination of generating torque-inducing thrusts of orientation-specific magnitudes, will tend to restore the farm to its original location and orientation.

The propulsive buoys, propulsive elements, and/or propulsive units need not be discrete or dedicated to that purpose, but can instead be incorporated into operational elements like wave energy converters, e.g. by attaching a propeller and motor (and relevant control systems) thereto. Other embodiments of farms containing propulsive buoys will implement other control algorithms and/or strategies which are perhaps more appropriate to their deployment locations, their operational elements, their functions (e.g. capturing energy from ocean waves), etc.

Figure 124:
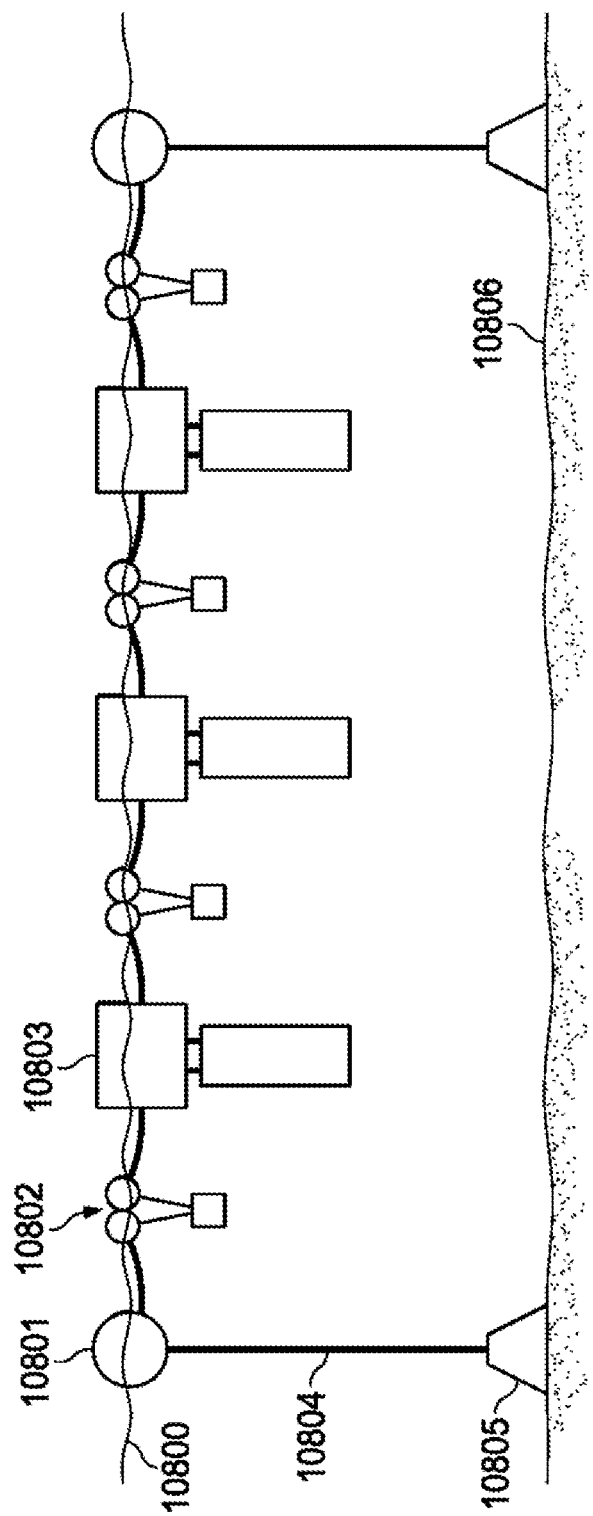
FIGS. 124 and 125 are schematic diagrams of an alternate embodiment of the present invention.

FIG. 124 is a side-view illustration of a farm composed of three operational elements, e.g. 10803, two anchoring elements, (i.e. anchors, e.g. 10805, resting on the seafloor 10806 with dedicated mooring buoys, e.g. 10801), and eight tensioning floats, e.g. 10802, from each pair of which is suspended a weight, e.g. 10802. The illustrated farm is substantially "at rest" without a gap or separation between any pair of tensioning floats, and all suspended weights at their maximum depths.

Figure 125:
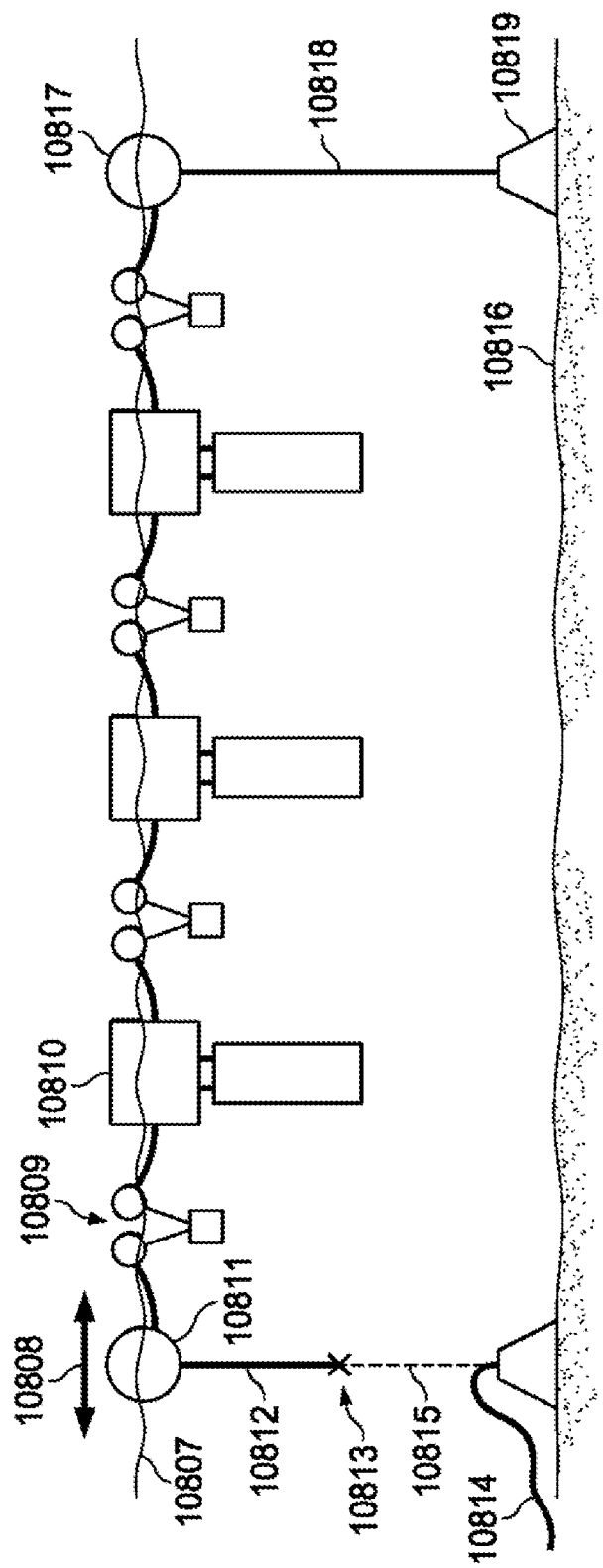

FIG. 125 is a side-view illustration of the same farm illustrated in, and discussed in relation to, FIG. 124. However, in FIG. 124 the tether which in FIG. 124 had connected mooring buoy 10811 to the anchor resting directly beneath it on the seafloor 10816, has broken, ruptured, failed, and/or snapped, at 10813. The upper portion 10812 of that severed tether now hangs from mooring buoy 10811. The lower portion 10814 of that severed tether now rests on the seafloor 10816, still connected to the respective anchor.

Note that the mooring buoy 10811 is now free to move 10808 over the surface 10807 of the body of water on which the farm floats. And, an initial movement of that buoy away from the farm's center (i.e. to the left) has pulled apart the left-most pair of tensioning floats 10809, thereby creating a small gap between them, and lifting by a small distance the weight suspended thereunder. However, the rest of the farm has not immediately changed its configuration. Nor have the absolute, nor the relative, positions of the operational elements changed. No doubt, over time, waves, winds, currents, and other factors, will change the absolute positions of the operational elements. However, as long as they remain tethered to the remaining "anchored" mooring buoy 10817 (i.e. connected to anchor 10819) the relative configuration of the operational elements, e.g. 10810, will tend to remain stable.

The tensioning floats, positioned between operational elements, only exert a "contracting" and/or "restoring" force on the operational elements connected thereto in response to an increase in the distance, by which the respective connected operational elements are separated, that results in a separation distance greater than a non-zero and substantial nominal "resting" and/or "dormant" separation distance. Most importantly, the tensioning floats do not exert a "contracting" and/or "restoring" force on the operational elements connected thereto unless and until those operational elements become separated by a distance that exceeds that non-zero and substantial nominal "resting" and/or "dormant" separation distance.

The nominal "resting" and/or "dormant" configuration of a farm conforming to, and/or incorporating certain elements of, the current disclosure is stable. Only localized deviations in relative separation distances provoke the generation and exertion of a restoring force, and only then until the relative separation distances are returned to values no greater than the nominal "resting" and/or "dormant" separation distance. With respect to the current disclosure, the rupture, breaking, and/or severing, of a tether only diminishes the ability of the operational elements therein to be pulled back to their nominal relative separation distances. It does not provoke a "collapse" and/or contraction of large parts, if not all, of the farm in a catastrophic fashion, e.g. provoking collisions among, and damage to, neighboring operational elements. For example, an embodiment of the current farm disclosure, if it were to break free of its anchors, would tend to drift away from its designated geospatial coordinates. However, it would not tend to collapse. In many cases, the operational elements therein would tend to remain well separated, potentially continuing their normal function and/or operation.

One limitation of the present disclosure is its failure to prevent and/or repel operational elements whose separation distances fall below a certain nominal, preferred separation distance. In the present disclosure, the interconnection of operational elements, as well as the use of anchors and/or propulsive buoys about its periphery, tends to cause any migration of two operational elements toward each other to the point that their relative separation becomes less than a nominal distance, to be coupled with the extension and/or increase in the separation between each of the operational elements and one or more of their neighbors. Thus, while the present disclosure does not provide a means to directly repel two operational elements whose separation is "too close", it does provide an indirect means to prevent such close encounters.

Figure 126:
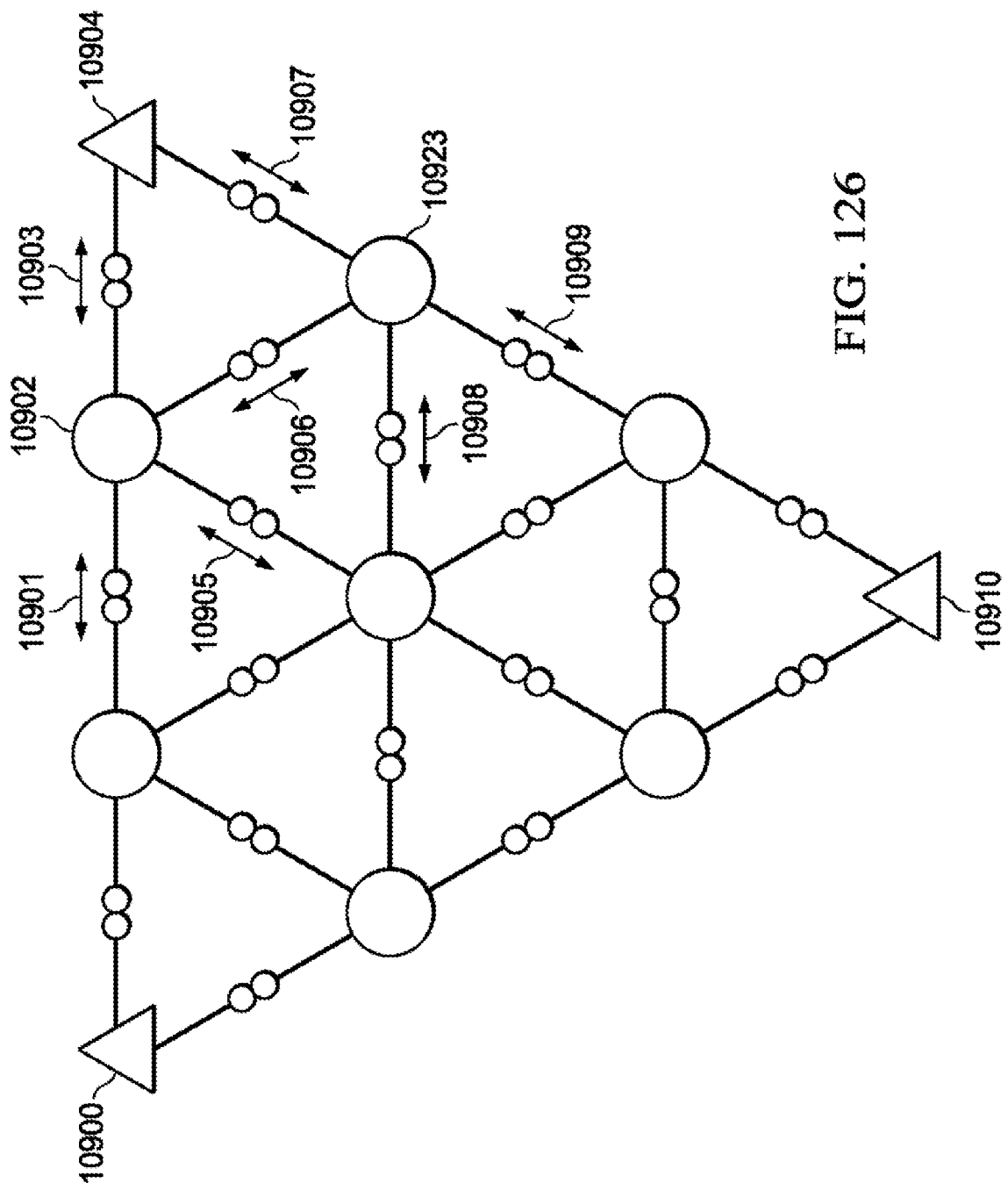
FIGS. 126-129 are schematic diagrams of a farm configuration using multiple connections.

FIG. 126 is a top-down illustration of a farm composed of seven operational elements (represented by circles), e.g. 10902, three anchors and dedicated mooring buoys (represented by triangles), e.g. 10904, and eighteen pairs of tensioning floats (represented by adjacent pairs of smaller circles), e.g. 10903. The illustrated farm is in a nominal, "resting" and/or "dormant" configuration in which all pairs of tensioning floats are at rest, with any gaps between them.

Figure 127:
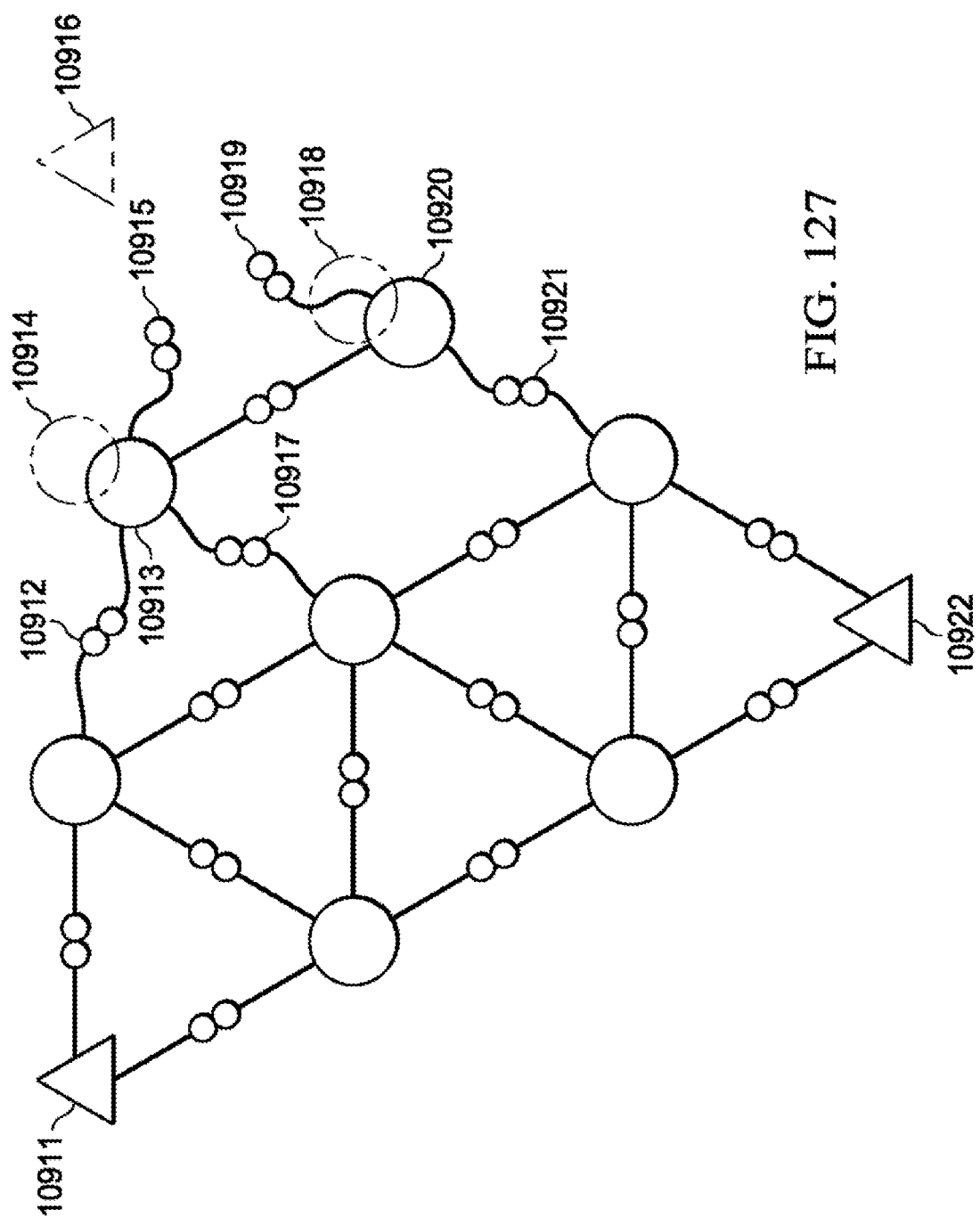

FIG. 127 is a top-down illustration of the same farm illustrated in FIG. 126. However, in FIG. 127, the farm's connection to anchor (and mooring buoy) 10916 has been broken. The two tethers, and the pairs of tensioning floats therein, e.g. 10915, are now free to drift. And, as a result of the loss of the outward pull that had been provided by anchor 10916, operational elements 10913 and 10920 have begun to drift toward the center of the farm. Tensioning float pairs 10912, 10917, and 10921 have also become slack. Those tensioning floats are still able to resist any "outward" migration (e.g. toward anchor 10916) of operational elements 10913 and 10920. However, they are unable to prevent those operational elements from continuing their drift toward the center of the farm. And, while a collision between operational elements remains a possibility, such a collision would be the result of an operational element being driven into another by wind, wave, and/or current. It would not be the result of the farm's inherent tensioning mechanism pulling such operational elements together. The current disclosure directly resists the excessive separation of operational elements, not the excessive proximity of those elements.

Figure 128:
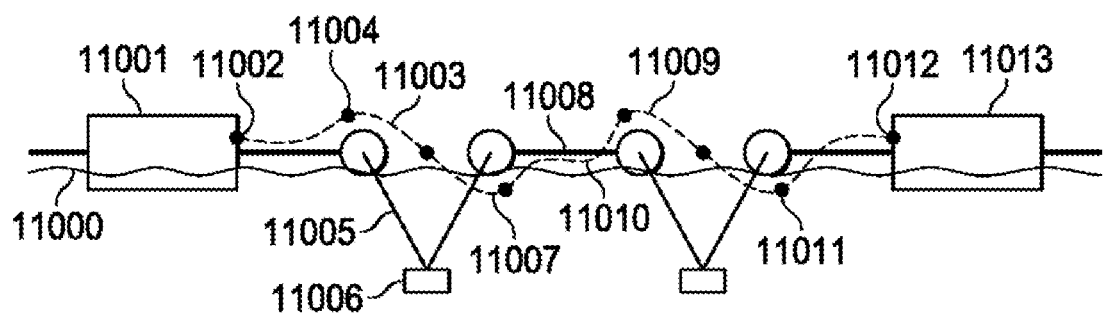

FIG. 128 is a perspective illustration of a farm composed of two operational elements, 11001 and 11013, and two pairs of tensioning floats, beneath each of which is suspended a weight, e.g. 11006. FIG. 128 illustrates the combination of an electrical conduit, e.g. 11010, cable, wires, etc., with the tether, e.g. 11008, and pairs of tensioning floats, e.g. 11005, that connect, and/or hold together, the operational elements. While the separation restorative tether connects the operational elements together, and resists their separation increasing beyond a specific nominal, resting (critical) distance below which the tether remains inert and/or slack and does not pull the operational elements toward one another, it also provides the structural foundation to which the electrical conduit, e.g. 11003, is attached. The combination of an energized, or even an "untensioned" tether, with an electrical conduit, allows electrical power to be distributed within a farm of the present disclosure in an relatively inexpensive manner, and, in a manner which facilitates the maintenance and repair of such electrical conduits.

An embodiment of 30 wave energy converters, deployed in water with a depth of 100 meters, would require no less than 3,000 meters of electrical conduit if the electrical power from each converter were to be sent separately to a common, shared power cable on the seafloor, i.e. 30×100 m=3,000 m. Some embodiments of the present disclosure will incorporate operational elements that generate useful products other than, or in addition to, electrical power. Some may synthesize chemicals, some may pressurize air and/or water, etc. These embodiments can utilize similar "conduits" connected, attached, fastened, and/or anchored, to the tensioned and/or untensioned tethers in the embodiment, and can similarly transmit some or all of these alternate products through these similar conduits.

The tether-bound and/or -linked electrical conduit illustrated in FIG. 128 is attached and/or connected to those portions and/or segments of the tensioned tether which are, in and of themselves, not directly a part of the tensioning float assembly. At each tensioning float assembly, the electrical conduit is set adrift, and is not directly attached nor connected to the tensioning float assembly, nor to the segments of tether within. Through the attachment of floats, e.g. 11004, and/or other buoyant components, and/or through its own inherent positive buoyancy, the electrical connector floats adjacent to the surface between the points of its connection to the tether. Enough slack is provided in the electrical connector, e.g. 11007, at the points of its passage through, around, and/or across, a tensioning float assembly, so that when and if the tensioning float assembly is fully extended and/or tensioned, e.g. to the point of being taught, then the electrical connector will be sufficiently long to span the requisite gap created by the extended tensioning float assembly.

Figure 129:
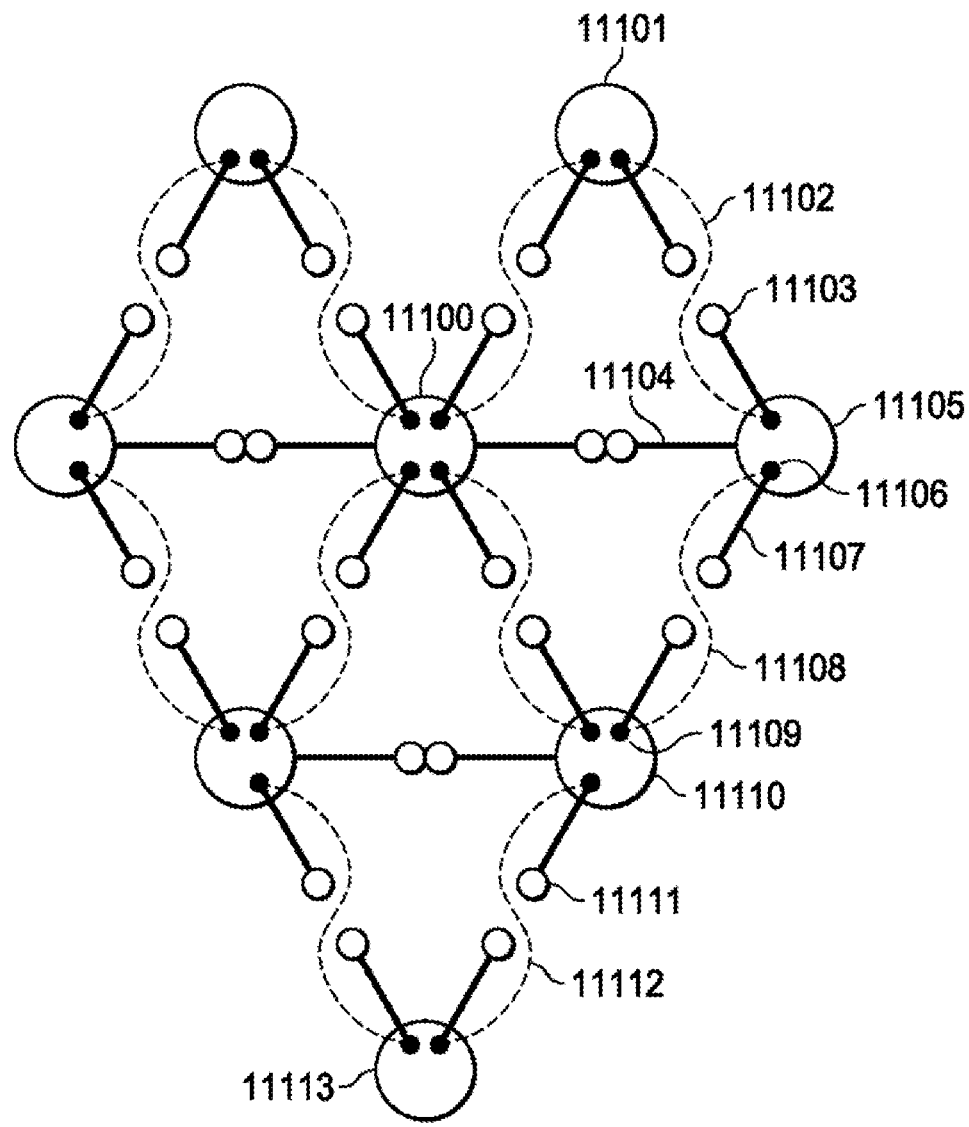

FIG. 129 is a top-down illustration of a farm similar to the one illustrated in, and discussed in relation to, FIG. 128. This farm is composed of eight operational elements (represented as circles), e.g. 11101, thirteen tensioned tethers (represented as straight lines, e.g. 11107, with approximately central pairs of tensioning floats (represented as adjacent pairs of smaller circles, and implicitly possessing weights suspended between and below each such pair of floats), e.g. 11111, and ten electrical conduits, e.g. 11108.

Each electrical conduit, e.g. 11108, provides an electrical connection between two neighboring operational elements, e.g. 11105 and 11110. Each electrical conduit in this embodiment connects to a "plug", e.g. 11106 and 11109, adjacent to the outside of each respective operational element. Different operational elements within the present disclosure may utilize different numbers of such modular electrical conduits in order to be electrically connected with different numbers of other operational elements. For example, and by way of illustration, in FIG. 129, operational element 11101 is electrically connected to two other operational elements, 11100 and 11105 via two electrical conduits, e.g. 11102. Operational element 11110 is electrically connected to three other operational elements 11113, 11100, and 11105 via three electrical conduits, e.g. 11112 and 11108. Operational element 11100 is electrically connected to four other operational elements, e.g. 11101, via four electrical conduits.

Through the judicious use of an appropriate number of electrical conduits, and through their judicious placement within and/or among the operational elements within a farm of the present disclosure, most, if not all, of the electrical power (and/or other useful product) generated by the operational elements in a farm, may be spooled together, daisy-chained, combined, and/or gathered together, so as to facilitate the more centralized use, and/or the more centralized transmission, of said electrical power (and/or other useful products). For example, by combining the electrical power generated by a farm of wave energy converters to a single point, all of the electrical power generated by the farm may be transmitted to a subsea power cable (and from there to a substation and/or consumer of that power, e.g. on an adjacent landmass) through a single conduit that reaches from the farm at the surface to the subsea cable adjacent to the seafloor.

Other embodiments utilize similar electrical conduits, deployed adjacent to the surface of the body of water on which the farm floats, that electrically link some, or all, of the wave energy converters. However, some of these embodiments utilize electrical conduits that do not use "plugs" but instead have electrical connections that are integrated within and/or between the respective operational elements. Still other embodiments, utilize conduits that are comprised of bundles of multiple independent conduits. Some utilize conduits that may vary in the numbers of bundled conduits and/or the transmission capacities supported even among the conduits in a single farm.

As was the case in the farm illustrated in FIG. 129, the electrical connectors remain adjacent to the surface, even when spanning sections of the tethers in which a weight deviates the tensioned tether away from the surface, and to greater depths. Sufficient slack is provided in the electrical connectors so that are long enough to remain connected to their respective operational elements even when their respective tensioning float assemblies, and/or their tensioned tethers, are fully-extended and/or fully-tensioned.

Figure 130:
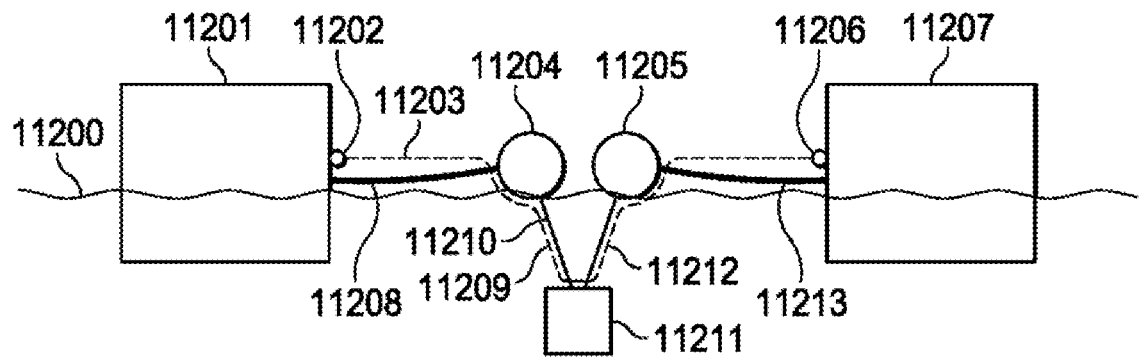
FIGS. 130 and 131 are a schematic diagram of a buoyancy spring with an electrical conduit.

FIG. 130 is a side-view illustration of a pair of operational elements 11201 and 11207, floating adjacent to the surface 11200 of a body of water, and are connected to each other by means of a shared, common "tensioned tether" 11208/11213, i.e. the tether 11208/11213 includes a pair of tensioning floats 11204-11205 from, and or below, which is suspended a weight 11211. An electrical conduit (and/or a conduit facilitating the transmission, sharing, combining, etc. of other products generated by the operational elements, e.g. pressurized air, pressurized water, desalinated water, synthetic chemicals, chemical fuels, etc.) is attached, connected, lashed, secured, fastened, conjoined, and/or tied, to the tensioned tether. And, in some embodiments, the tensioned tether provides strength and resistance to stretching which helps to protect, maintain, and/or ensure, the integrity of the electrical conduit. I.e. a relatively fragile, and perhaps relatively less expensive, electrical conduit may be safely deployed within a farm, and may have a long trouble-free operational life, by leveraging the inherent robustness and strength of a tether, whether tensioned or not.

In the illustrated embodiment, the electrical conduit, e.g. 11203, 11209, and 11212 is attached to the entire length of the tensioned tether, e.g. from point 11202 to 11206, even in those portions of the tether that connect the tensioning floats 11204-11205 to a submerged weight 11211. Thus, if the tensioned tether is extended to its maximum length, the electrical conduit will remain sufficiently long to remain connected to the respective operational elements, and to avoid being torn, broken, ruptured, etc.

Figure 131:
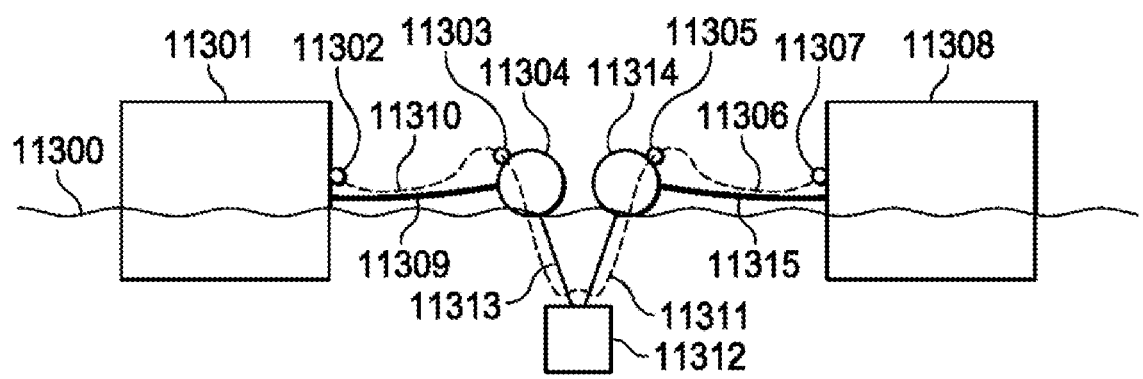

FIG. 131 is a side-view illustration of a pair of interconnected operational elements similar to the pair illustrated in, and discussed in relation to, FIG. 130. In FIG. 131, operational elements 11301 and 11308 are floating adjacent to the surface 11300 of a body of water, and are connected to each other by means of a tensioned tether, i.e. a tether, e.g.

11309/11315, which contains a tensioned pair of floats 11304 and 11314, beneath which is suspended a weight 11312. Attached to this tensioned tether is an electrical conduit, e.g. 11310 and 11306, similar to the one illustrated in FIG. 130.

However, the electrical conduit, as well as the tensioned floats, illustrated in FIG. 131, differ from those of the embodiment illustrated in FIG. 130 in that the electrical conduit illustrated in FIG. 131 has at least three interconnected electrical-conduit segments and/or portions, 11310, 11311, and 11306. The conduit segments 11310 and 11306 are connected, at one end, to an operational element, e.g. at 11302. These points of connection may involve a modular plug adjacent to the exterior of the operational element into which a suitably adapted end of a modular electrical conduit segment "plugs in." The other end of each of these conduit segments 11310 and 11306, plug into and/or connect with a suitable interface, adapter, and/or plug, adjacent to an exterior surface of one of the tensioning floats 11304 and 11314. The tensioning mechanism, i.e. the tensioned floats 11304 and 11314 combined with the weight 11312, and the tether segments, e.g. 11313, which connect them, incorporates an integral and/or modular electrical conduit segment 11311 which transmits electrical power across the portion of the tether composed of the tensioning mechanism.

Figure 132:
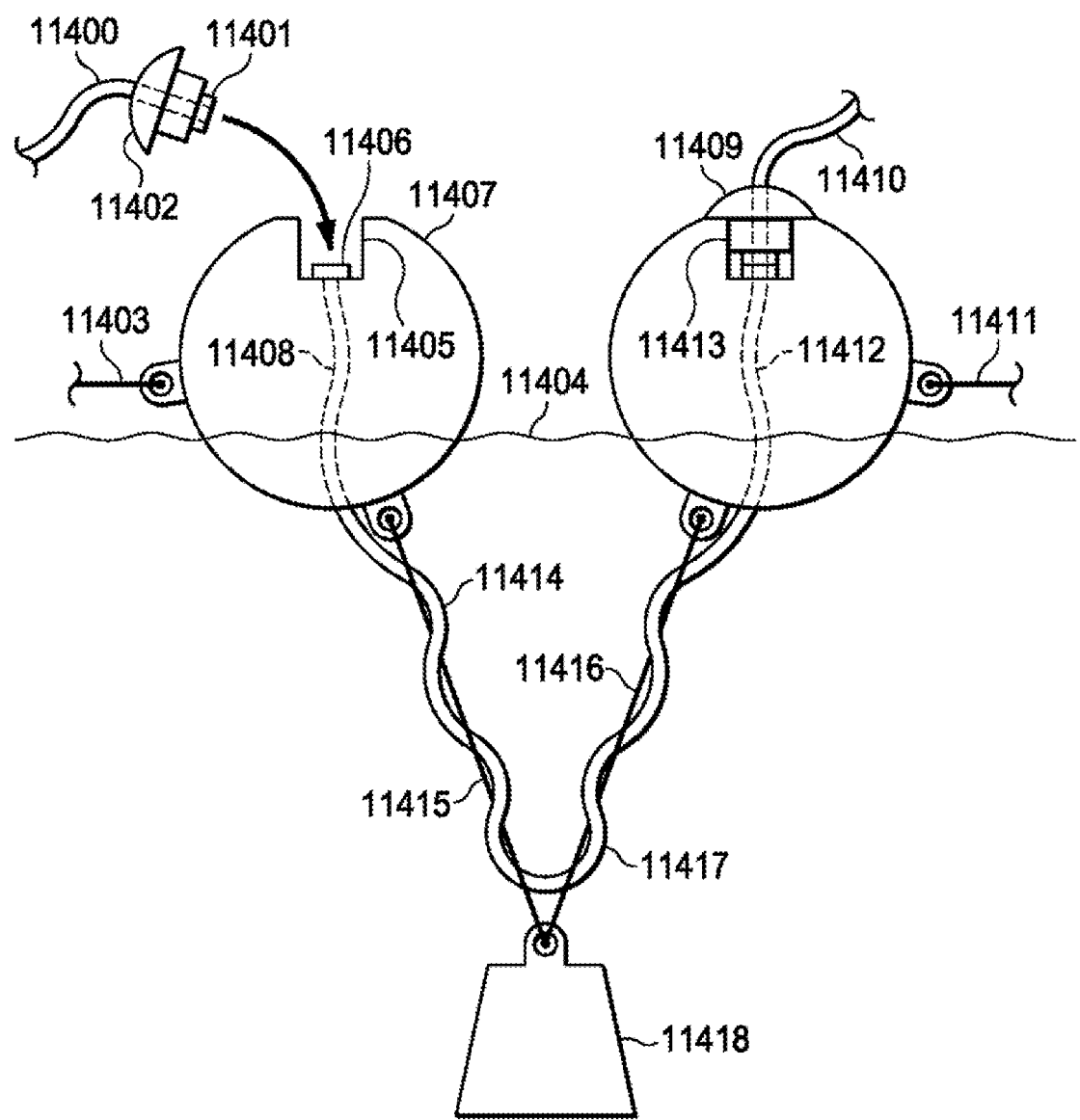
FIG. 132 is a schematic diagram partially in phantom of the buoyancy spring of FIG. 130.

FIG. 132 is a side-view illustration of a tensioning mechanism similar to the one illustrated in, and discussed in relation to, FIG. 131. Tether segments 11403 and 11411 connect to the floats 11407 and 11409, floating adjacent to the surface 11404 of a body of water in which also float two or more operational elements (not shown), and may thereby be incorporated into a tensioned tether. A plug, adapter, and/or interface 11401 on an electrical conduit 11400 connects to plug, adapter, and/or interface, 11406 incorporated within float 11407. This interconnection provides electrical continuity and a continuous conduit between conduit segments 11400 and 11408. Similarly, a plug, adapter, and/or interface on an electrical conduit 11410 connects to plug, adapter, and/or interface, incorporated within float 11409, forming a "connected" plug interface and/or connection 11413. This interconnection provides electrical continuity and a continuous conduit between conduit segments 11400, 11408, and 11412. "Sealing plugs" 11402 and 11409 isolate the points of electrical connection from the water 11404.

Pre-fabricated and modular tensioning mechanisms, e.g. including the kind illustrated herein offer the opportunity to improve fabrication efficiencies, cost efficiencies, and to ease deployment. They also potentially ease the task of maintaining and repairing such elements through the swapping in and out of such modular units. When such pre-fabricated and modular tensioning mechanisms include and/or contain integrated electrical conduits and/or bundles of conduits, perhaps of varying numbers of individual conduits, varying bandwidths and/or gauges, etc., then farms of the present disclosure may be customized and/or optimized so as to minimize costs and reduce wasted time and/or materials.

Figure 133:
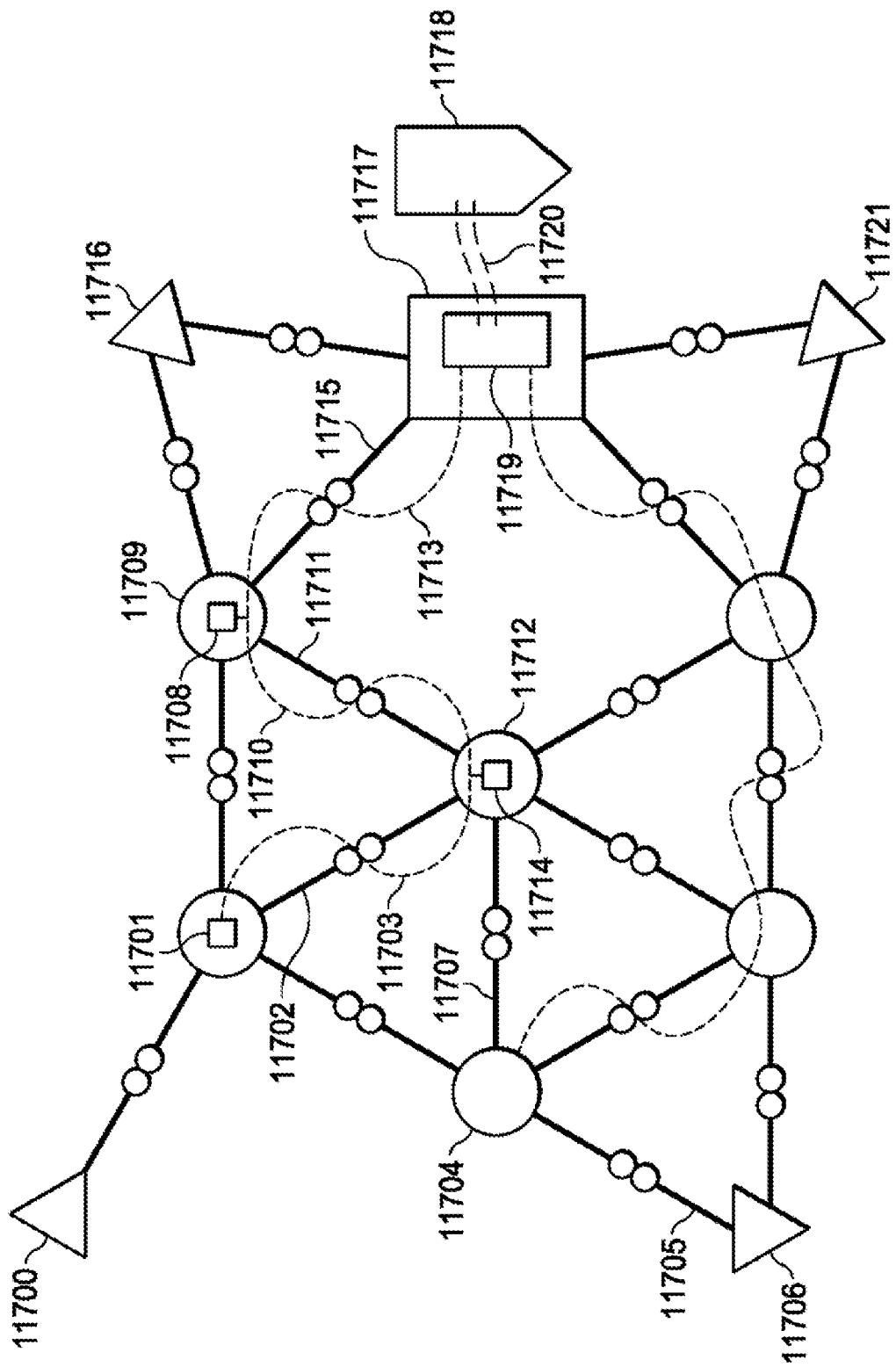
FIG. 133 is a schematic diagram of a farm configuration using the buoyancy spring of FIG. 130.

FIG. 133 is a top-down illustration of a farm of the present disclosure, comprising six operational elements (represented as circles), e.g. 11704, four anchoring elements (represented by triangles), e.g. 11700, eighteen tensioned tethers (represented as straight lines with a pair of small circles approximately in the center of each), e.g. 11705, six electrical conduits, e.g. 11713, electrically connecting six respective pairs of operational elements, a centralized processing platform and/or buoy 11717, and, including the presence of a boat 11718 onto, and/or into, which is being transferred some product produced, at least in part, by the centralized processing platform.

In the illustrated farm, electrical power (and/or other useful products, including, but not limited to: chemical fuels, pressurized air, pressurized water, desalinated water, etc.) is generated by one or more generators, e.g. 11701, within at least some of the operational elements, e.g. 11709. Some or all of this electrical power and/or other product(s) is transmitted to neighboring operational elements via conduits, e.g. 11713, and, eventually, to a central processing platform 11717, wherein which at least one processor 11719 utilizes, transforms, combines, modifies, compresses, packages, and/or otherwise manipulates, at least some of the electrical power and/or other product(s) transmitted to it via the conduits from at least some of the operational elements. In such a farm, a ship 11718, may periodically or continuously offload, and/or receive, some or all of the power and/or material produced by at least some of the processors 11719 on the centralized processing platform 11717, via a conduit and/or bundle of conduits 11720.

Such a farm might drift far from shore and use wave energy to produce electrical power when might then be used by the centralized processing platform to generate chemical fuels which might then be transferred to ships and ferried back to shore where they might be consumed directly and/or used to generate electrical power.

Figure 134:
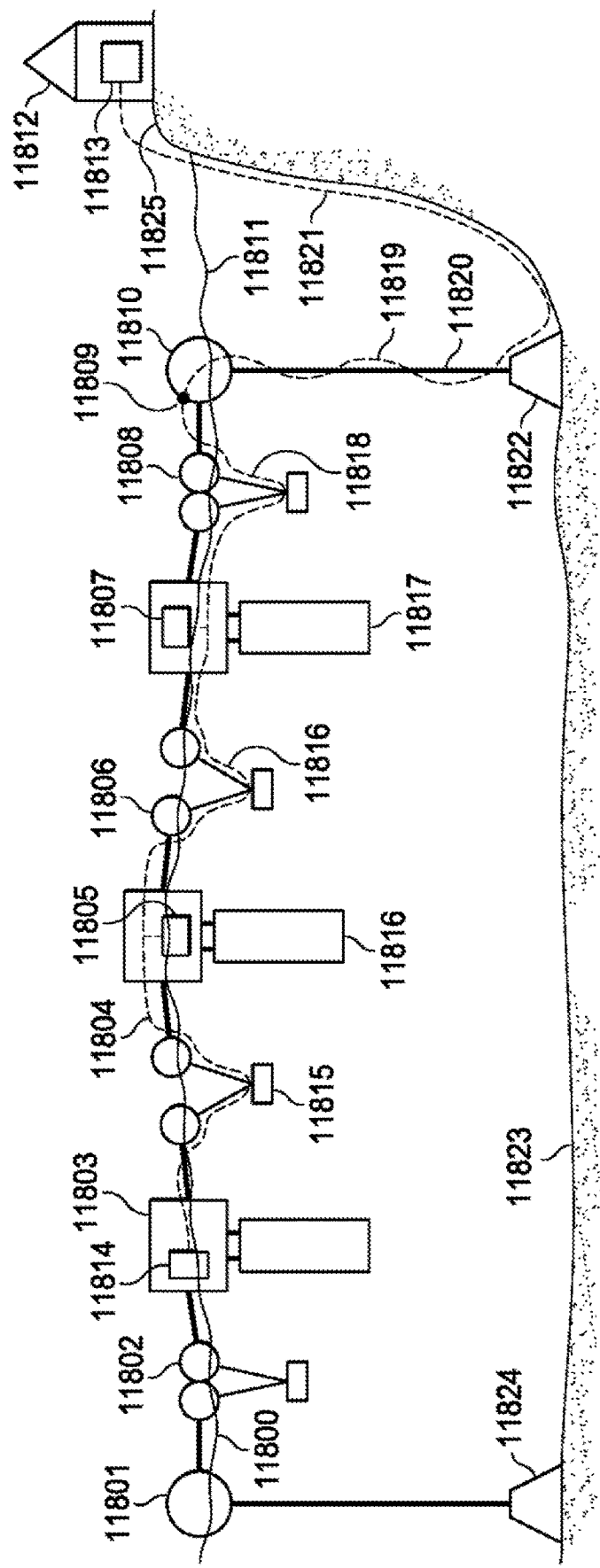
FIG. 134 is a schematic diagram of an alternate embodiment of the present invention.

FIG. 134 is a side-view illustration of a farm of the present disclosure, comprising three operational elements 11803, 11816, and 11817, two anchoring elements 11824/11801 and 11822/11810, four tensioned tethers 11802, 11815, 11806, and 11808, and a shared electrical conduit, e.g. 11818, that electrically connects the three operational elements and transmits the combined electrical energy that they generate along the seafloor 11823 and up to an electrical substation 11812 and/or electrical consumer 11813 on the shore 11825.

Figure 135:
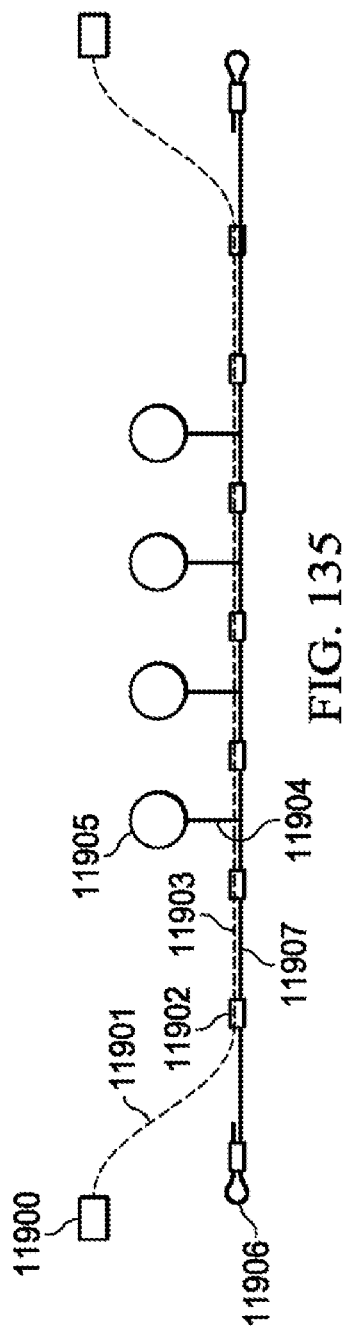
FIG. 135 is a schematic diagram of a float and electrical conduit combination.

FIG. 135 is an illustration of the present disclosure and describes a modular tensioned tether with an integrated electrical conduit 11901. A tether 11907 has end points of attachment, e.g. 11906, to which operational elements and/or other tethers may be attached and/or connected. Parallel to the tether, and connected and/or attached thereto by bindings, e.g. 11902, is an electrical conduit 11901 and/or bundle of conduits. Also connected by separate tether segments, e.g. 11904, to the tether 11907, are four individual floats, e.g. 11905. At each end of the electrical conduit, and/or bundle of conduits, are plugs, e.g. 11900, electrical connectors, and/or interfaces, which permit the electrical conduit to be electrically connected to other such conduits and/or to the electrical conduits within operational elements.

Figure 136:
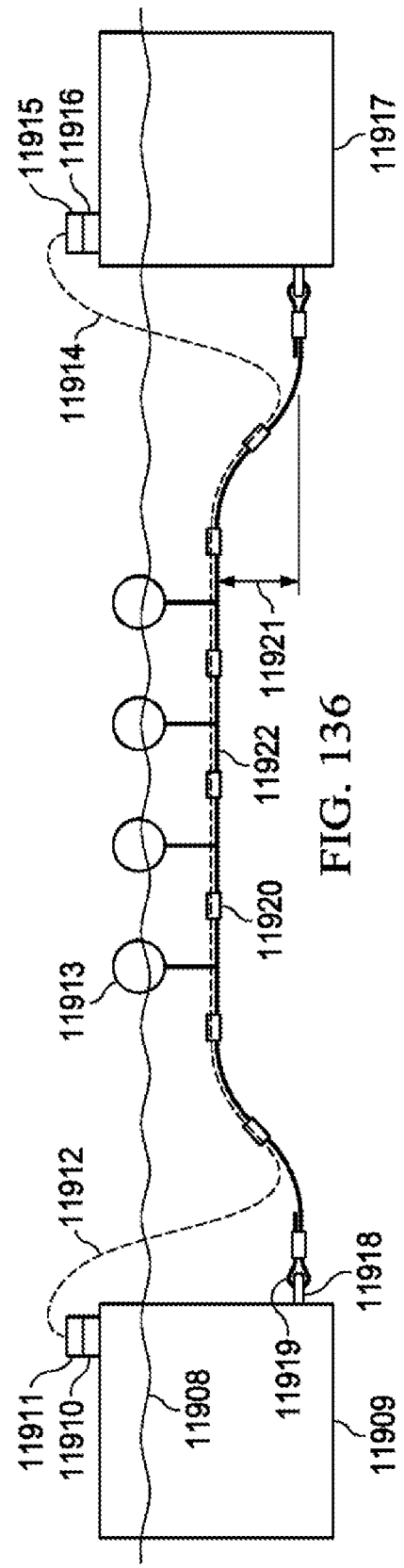
FIG. 136 is a schematic diagram of a buoyancy spring using the float and electrical conduit combination of FIG. 135.

FIG. 136 is a side-view illustration of the present disclosure, in which a pair of operational elements 11909 and 11917 are connected and/or joined together by a shared tensioned tether 11919. The tensioned tether 11919 in this illustration is similar to the tensioned tether illustrated in, and discussed in relation to, FIG. 135. Connected to the tether 11919 is an electrical conduit 11912, and/or bundle of conduits, which connects, via plug 11911, to the electrical system of operational element 11909 at plug 11910, and, via plug 11915, to the electrical system of operational element 11917 at plug 11916. Thus, electrical conduit 11912 effectively connects the electrical systems of the two operational elements.

Note that the "structural" mooring portion of the tether, i.e. the "tether" proper, 11919 is connected to each operational element, e.g. 11909 at a respective connector, e.g. 11918, located below the surface 11908 of the body of water on which each respective operational element, e.g. 11909, floats. When the two operational elements become separated by a distance greater than their maximum "free-range" separation distance, the tether 11919 is pulled taught, and, with each increase in their separation distance, the tether 11919 is pulled further and further down and away from the surface. Eventually, if the operational elements were pulled apart with sufficient force, and if the tether did not first break, then it would become approximately straight at a depth 11921 equal to the depths of the shackles, e.g. 11918, and/or other connectors to which, and/or by which, it is connected to the operational elements. As the tether is pulled down, and away from the surface 11908, the floats, e.g. 11913, are pulled down into the water as well. The upward forces imparted to the tether as a result of the submersion of the floats increases until the floats are fully submerged, after which that buoyant force remains approximately constant and at its maximal value.

When the force(s) drawing apart the operational elements diminish sufficiently, and the buoyant forces of the submerged floats, e.g. 11913, begin to dominate, then the contractual lateral forces imparted to the tether as a consequence of the upward buoyant forces generated by the submerged floats will begin to pull the too-widely separated operational elements back together. The imposition of those contractual and/or restoring force(s) within the tether will continue to be manifested until, and unless, the tether regains sufficient "slack" through the sufficient proximity of the respective operational elements to once again allow the full complement of floats, e.g. 11913, to rise to a sufficiently shallow depth such that their displacement is only just sufficient to suspend their own weight and their "share" of the weight of the tensioned tether.

Figure 137:
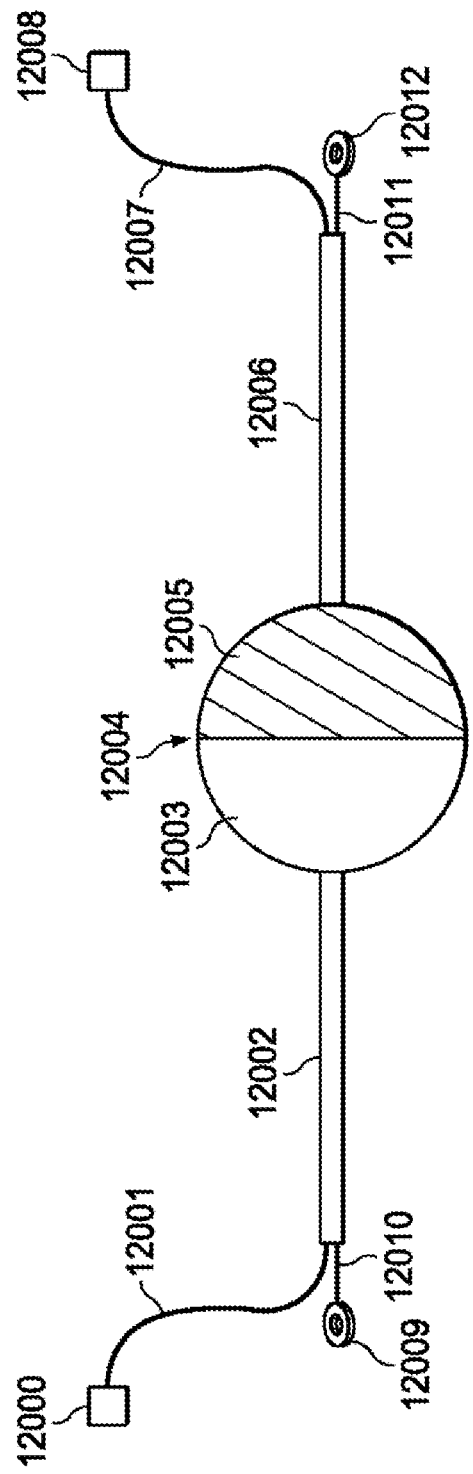
FIG. 137 is a schematic diagram of a buoyant member and electrical conduit combination.

FIG. 137 is an illustration of a modular tensioned tether of the present disclosure. An approximately spherical buoyant structure 12004 is composed of upper 12003 and lower 12005 portions. The upper portion 12003 is positively buoyant and tends to float. The lower portion 12005 is negatively buoyant and tends to sink. The combined portions have an average positive buoyancy, and the integral structure tends to float. Passing through, around, and/or adjacent to, the spherical buoyant structure 12004 are both a tether 12010/12011 (to connect together other buoyant objects, tensioned tethers, untensioned tethers, operational elements, etc.) and an electrical conduit 12001/12007 and/or bundle of conduits. Both the tether and the electrical conduit(s) are conjoined, connected, and/or attached to each other, within a protective jacket and/or sheath 12002/12006. At opposing ends of the tether 12010/12011 are connectors 12009/12012 to facilitate its connection to other buoyant objects, tensioned tethers, untensioned tethers, operational elements, etc. At opposing ends of the electrical conduit(s) 12001/12007 are plugs 12000/12008, connectors, interfaces, adapters, etc. to facilitate its electrical connection to, and its ability to electrically connect, two or more buoyant objects, tensioned tethers, untensioned tethers, operational elements, etc.

Other embodiments of the modular electrically-conductive tensioned tether include embodiments in which the buoyant structure 12004 is cylindrical, cuboidal, etc., instead of spherical. All buoyant structure shapes are included within the scope of this disclosure. Other embodiments of the modular electrically-conductive tensioned tether include embodiments in which the buoyant structure 12004 is not integral, but is instead composed of separate, and/or separated, positively and negatively buoyant portions.

Figure 138:
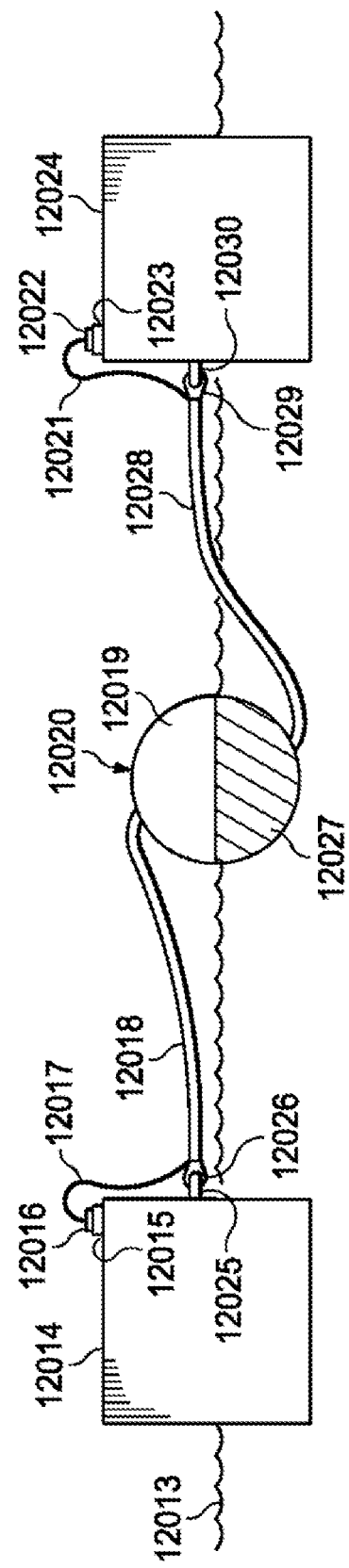
FIG. 138 is a schematic diagram of a buoyancy spring comprising the buoyant member and electrical conduit of FIG. 137.

FIG. 138 is an illustration of the present disclosure. In FIG. 138, a pair of operational elements 12014 and 12024 are connected, tethered, and/or joined together, by a modular electrically-conductive tensioned tether similar to the one illustrated in, and discussed in relation to, FIG. 137. The tether 12026/12029 of the modular electrically-conductive tensioned tether is connected to connection points 12025/12030 on the respective operational elements. Similarly, the electrical conduit 12017/12021 of the modular electrically-conductive tensioned tether is connected to plugs 12015 and 12023 on the respective operational elements by respective plugs 12016 and 12022 on the ends of the electrical conduit 12017/12021.

Figure 139:
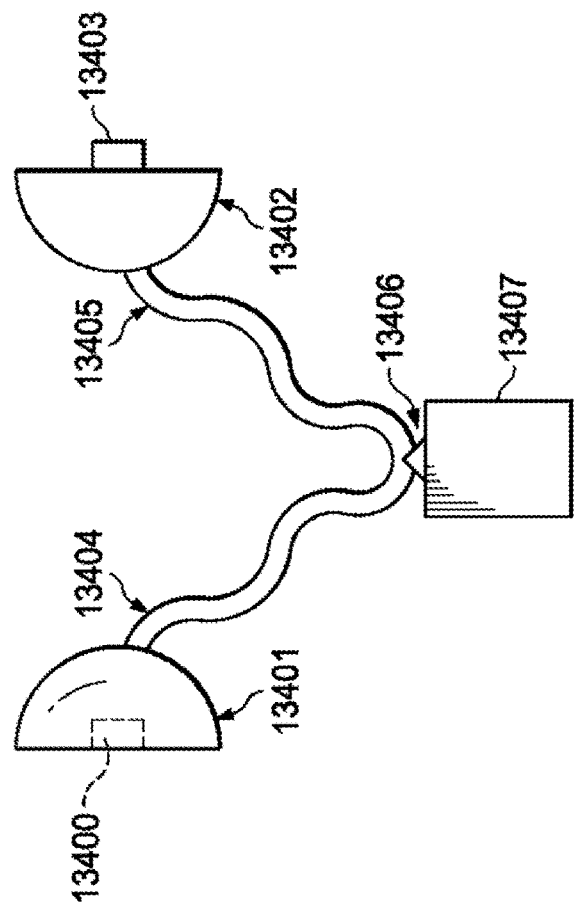
FIG. 139 is a schematic diagram of a coupling configuration for an electrical connection.

FIG. 139 is an illustration of a modular tensioned tether of the present disclosure. Two hemi-spherical buoyant portions 13401 and 13402 are at the ends of a shared, common cable 13405. Attached and/or connected to cable 13405 is a weight 13407, which, when the tensioned tether is in an operational position adjacent to the surface of a body of water is suspended beneath the buoyant portions. Cable 13405 contains and/or provides the structural support and/or functionality of a tether. It also contains and/or provides the electrical and/or other (e.g. air, fluid, etc.) connectivity and/or functionality of a conduit and/or bundle of individual conduits.

One hemi-spherical buoyant portion 13401 includes a "female" plug 13400, receptacle, interface, and/or adapter. The other hemi-spherical buoyant portion 13402 includes a "male" and/or complementary-to-plug-13400 plug 13403, interface, and/or adapter. Through its incorporation of complementary plugs, interfaces, and/or adapters, two or more such modular tensioned tethers may be "daisy-chained" and/or joined together in a serial fashion. Other embodiments of the illustrated modular tensioned tether my include buoyant portions of other shapes, including, but not limited to, cylinders, cubes, rectangular prisms, etc. Other embodiments of the illustrated modular tensioned tether my include two or more weights connected to the shared cable. Other embodiments of the illustrated modular tensioned tether my include two or more shared cables and/or tethers and/or electrical or other conduits. Other embodiments of the illustrated modular tensioned tether my include more than a single pair of opposing electrical plugs, interfaces, and/or adapters. And, some or all of those plugs, interfaces, and/or adapters may be positioned at other locations on the buoyant components, and/or on the cable(s), and/or on the weight(s).

Figure 140:
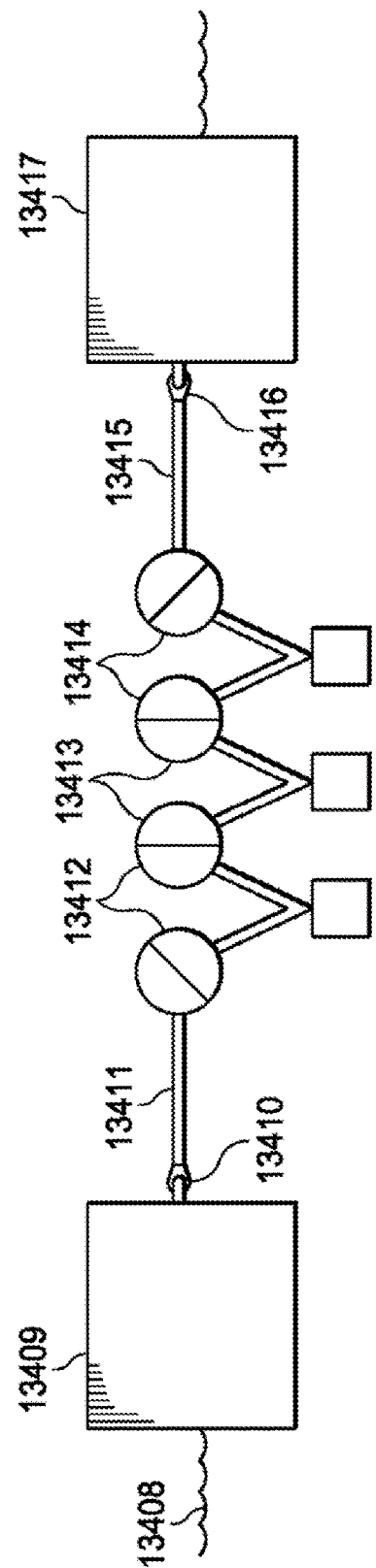
FIG. 140 is a schematic diagram of a buoyancy spring with the coupling configuration of FIG. 139.

FIG. 140 is an illustration of the present disclosure. In FIG. 140, a pair of operational elements 13409 and 13417 are connected, tethered, and/or joined together, by a series of interconnected modular electrically-conductive tensioned tethers similar to the one illustrated in, and discussed in relation to, FIG. 139. Operational element 13409 is connected to a "terminal modular tether" 13411 (as illustrated and discussed below in relation to FIGS. 142 and 143) at point/connector 13410. That terminal modular tether 13411 is connected, via complementary buoyant portions, to modular tensioned tether 13412. Modular tensioned tether 13412 is connected, via complementary buoyant portions, to modular tensioned tether 13413. And so on . . . . And, finally, operational element 13417 is connected to a "terminal modular tether" 13415 at point/connector 13416. The interconnected series of modular electrically-conductive tethers resists the separation of the operational elements to which, and/or between which, it is connected, from growing beyond a threshold distance, as well connecting them electrically (and/or otherwise).

Figure 141:
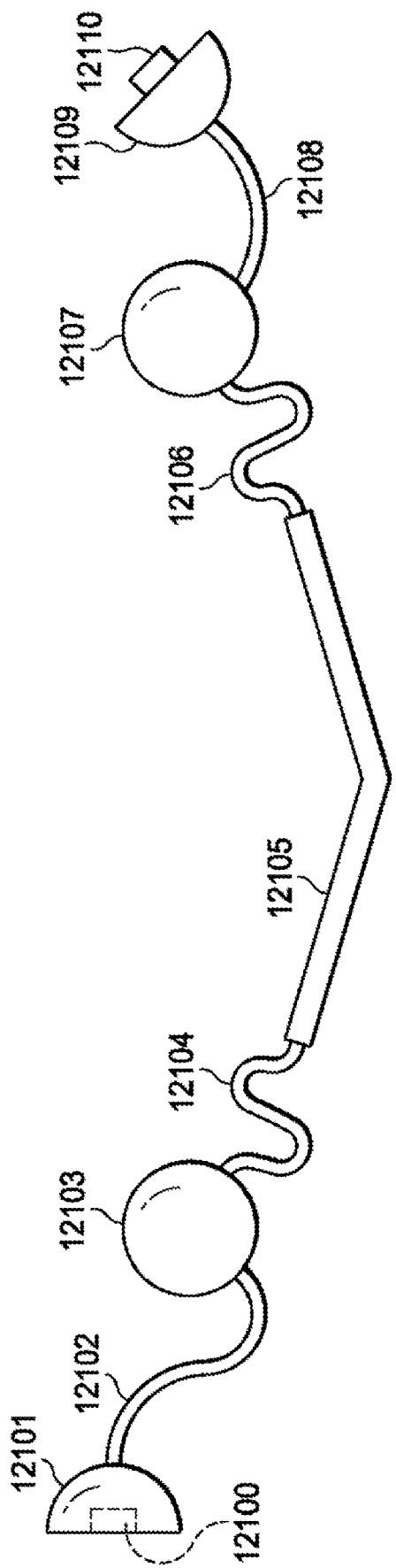
FIG. 141 is a schematic diagram of an alternate buoyancy spring with an electrical conduit.

FIG. 141 is an illustration of a modular tensioned tether of the present disclosure. Two hemi-spherical buoyant portions 12101 and 12109 are at the ends of a shared, common cable 12102/12104/12106/12108. Cable 12102/12104/12106/12108 contains and/or provides the structural support and/or functionality of a tether. It also contains and/or provides the electrical and/or other (e.g. air, fluid, etc.) connectivity and/or functionality of a conduit and/or bundle of individual conduits. About a central portion of the cable is a pipe 12105 or other rigid structural member that serves as the elongate weight characteristic of a "bypass" tensioned tether (as illustrated in, and discussed in relation to, FIGS. 6-8, and 30). A short distance from, and on either side of, the central elongate weight 12105, are floats 12103 and 12107 from, and/or beneath which, the elongate weight is suspended when the modular tensioned tether is in an operational position adjacent to the surface of a body of water. Other embodiments might attach, and/or connect, a strut or beam to the cable 12104/12106 instead of passing said cable through a pipe.

Figure 142:
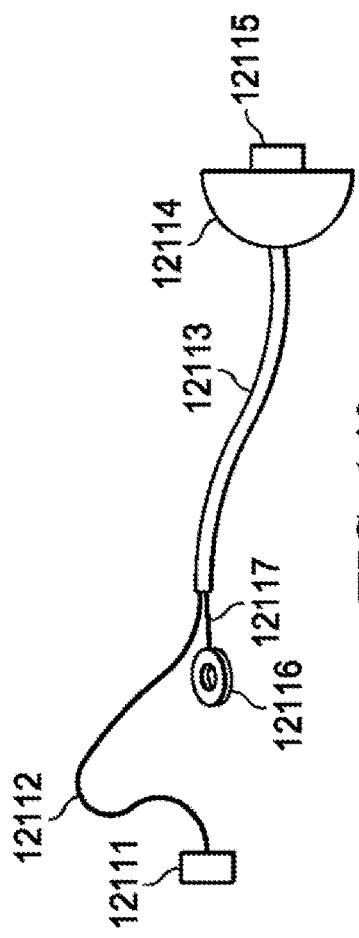
FIGS. 142 and 143 are schematic diagrams of a coupling member and electrical connector.

FIG. 142 is an illustration of a "terminal modular tether" of the present disclosure. A "terminal modular tether" may be used to connect an operational element to one or more connected modular electrically-conductive tensioned tethers (e.g. of the kind illustrated in, and discussed in relation to, FIGS. 132, and 135-141). The illustrated "terminal modular tether" incorporates a structural tether 12117 which is capable of resisting strong lateral strains and/or forces. The end of the tether 12117 contains a fixture, feature, component, and/or element, that facilitates its connection to an operational element. The illustrated "terminal modular tether" also incorporates one or more electrical conduits and/or conductors 12112. The end of the conduit 12112 contains a plug 12111 to facilitate its connection to other similar conductors.

One end of the illustrated "terminal modular tether" incorporates a hemi-spherical (or other shaped) buoyant element 12114, in which is embedded and/or connected a "male" plug 12115, interface, and/or adapter. Other embodiments do not have either or both of the end "plugs" 12111 and/or 12115 on the electrical conduit(s). Other embodiments do not have a connector 12116 at the end of the tether. Other embodiments incorporate one or more conduits that facilitate the transmission of air, water, fuel, etc., in addition to, or instead of, electricity.

Figure 143:
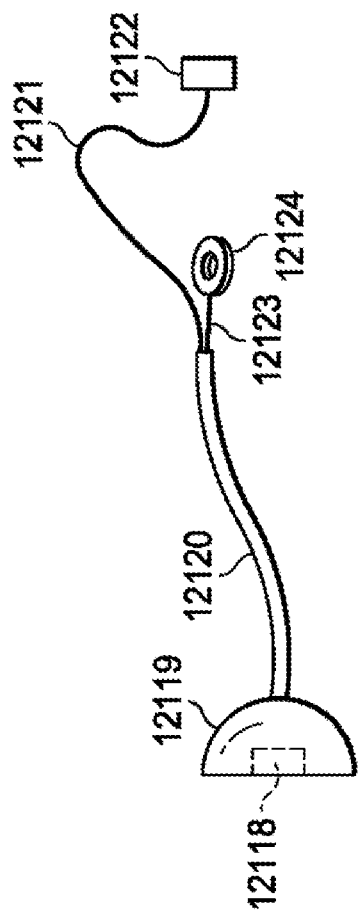

FIG. 143 is an illustration of a "terminal modular tether" of the present disclosure, which is almost identical to the "terminal modular tether" illustrated in, and discussed in relation to, FIG. 142. A "terminal modular tether" may be used to connect an operational element to one or more connected modular electrically-conductive tensioned tethers (e.g. of the kind illustrated in, and discussed in relation to, FIGS. 132, and 135-141). Unlike the "terminal modular tether" illustrated in FIG. 142, the one illustrated in FIG. 143 incorporates a "female" plug 12118, receptacle, interface, adaptor, and/or connector, and/or a plug that is otherwise complementary to the plug illustrated and/or embodied by the device disclosed in relation to FIG. 142.

Figure 144:
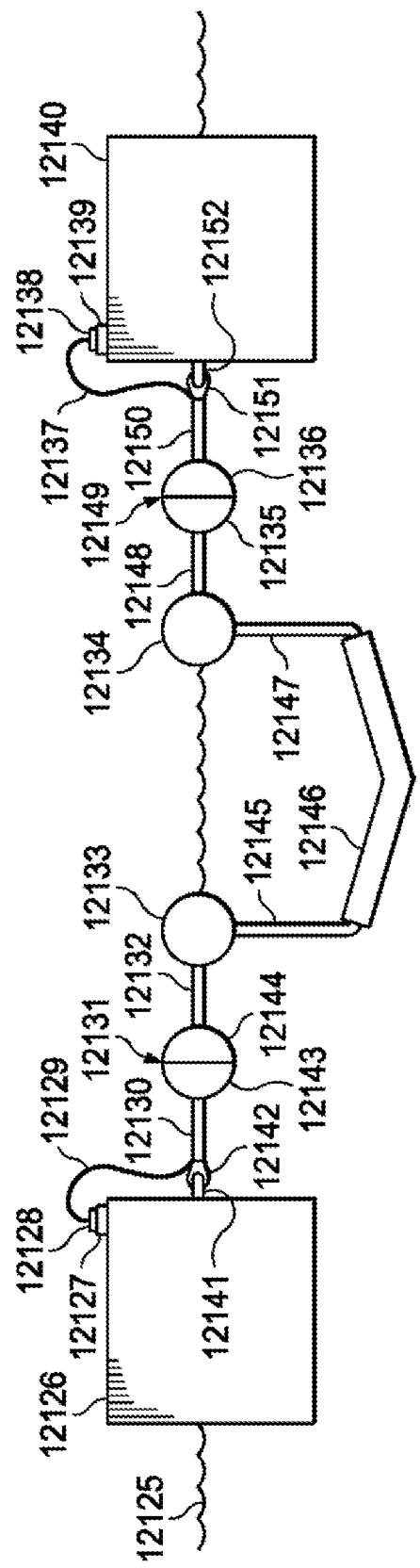
FIG. 144 is a schematic diagram of an embodiment of the present invention using the buoyant spring of FIG. 141.

FIG. 144 is an illustration of the present disclosure. In FIG. 144, a pair of operational elements 12126 and 12140 are connected, tethered, and/or joined together, by a series of interconnected modular electrically-conductive tethers similar to the one illustrated in, and discussed in relation to, FIG. 141, as well as the ones illustrated in, and discussed in relation to, FIGS. 142 and 143. Operational element 12126 is connected to a "terminal modular tether" 12130 at point/connectors 12141/12142. That terminal modular tether 12130 is connected, via complementary buoyant portions, to modular "bypass" tensioned tether 12144/12133/12146/12134/12135. Modular "bypass" tensioned tether 12144/12133/12146/12134/12135 is connected, via complementary buoyant portions, to "terminal modular tether" 12150 at point/connectors 12151/12152. The interconnected series of modular electrically-conductive tethers resists the separation of the operational elements to which, and/or between which, it is connected, from growing beyond a threshold distance, as well connecting them electrically (and/or otherwise).

Figure 145:
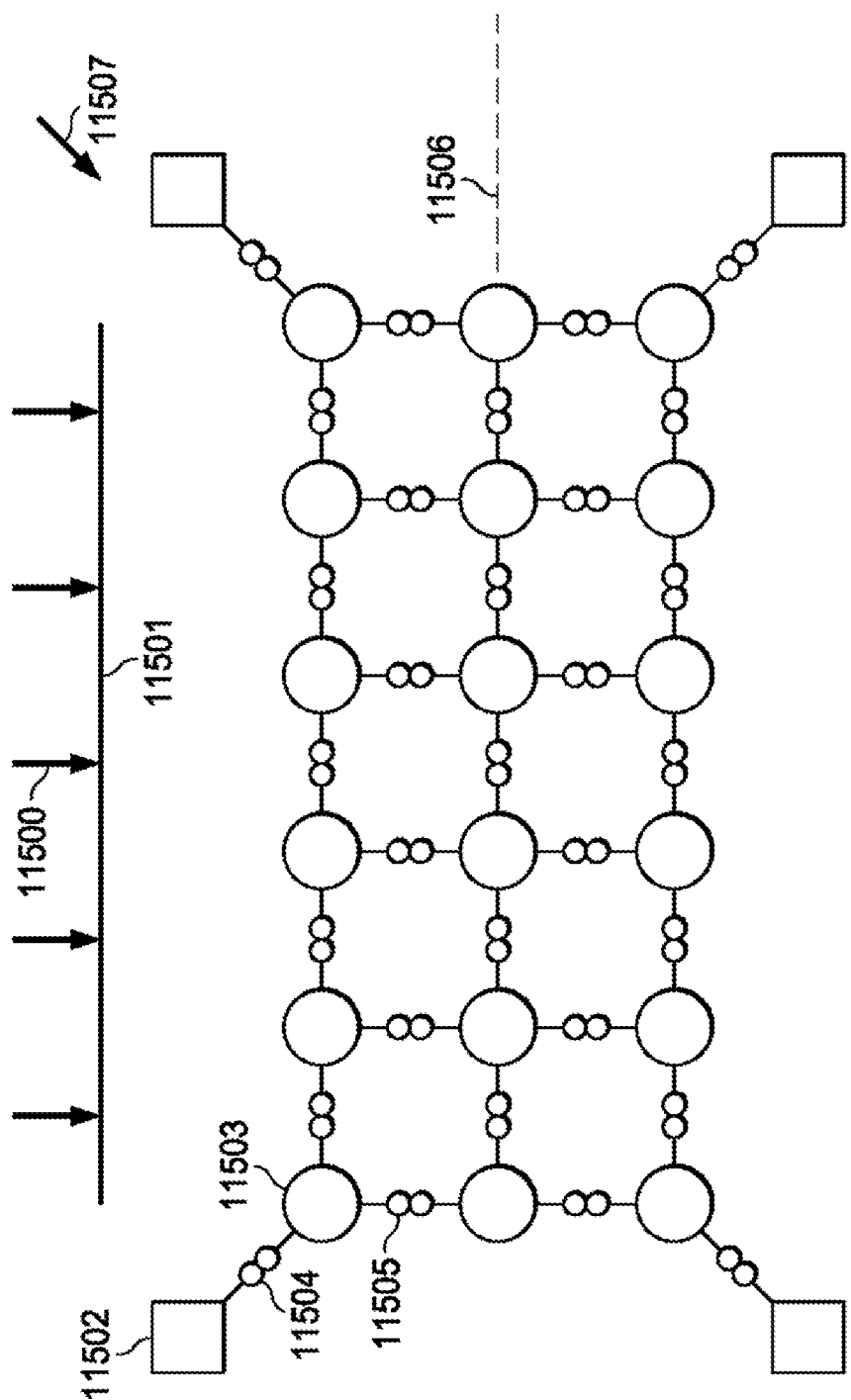
FIGS. 145-154 are schematic diagrams of various farm configurations.

FIG. 145 is a top-down illustration of the present disclosure. An interconnected and/or networked farm is composed of, and/or includes, eighteen operational elements (represented as circles), e.g. 11503, four anchoring elements (e.g. typically each composed of an anchor resting on the seafloor tethered to a dedicated mooring buoy floating adjacent to the surface of the body of water on which the farm floats) (represented here by squares), e.g. 11502, and thirty-one tensioned tethers (each of which is represented by a straight line overlaid with a central pair of smaller circles), e.g. 11505. This farm is deployed, positioned, and/or configured, in an approximately rectangular pattern, such that its long axis 11506 (in a plane approximately parallel to the surface of the body of water on which it floats) is typically approximately parallel to the wave front 11501, and/or normal to the typical direction with which waves travel through the farm. Arrow 11507 represents a current within the body of water.

Figure 146:
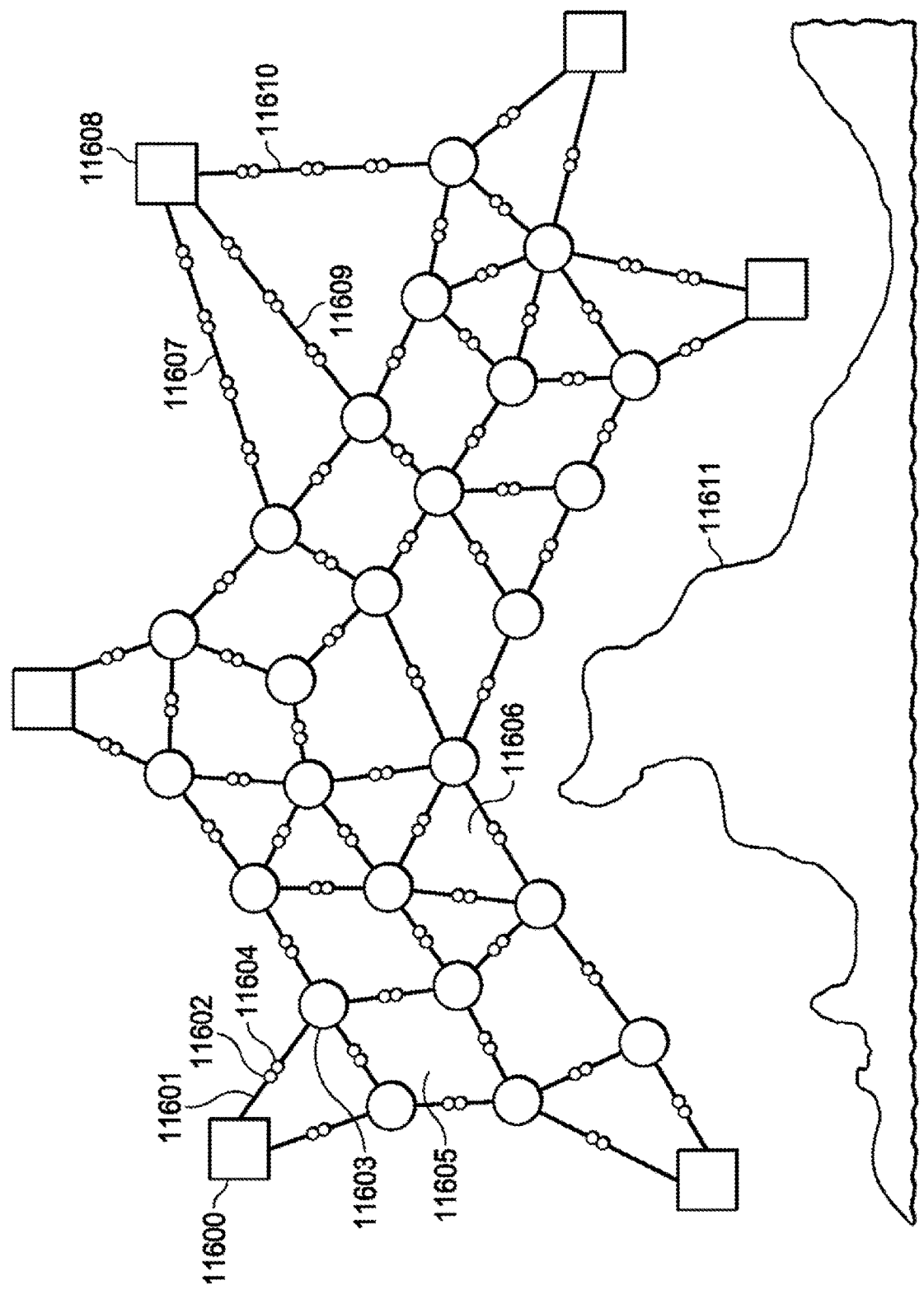

FIG. 146 is a top-down illustration of an interconnected and/or networked farm composed of, and/or includes, twenty-four operational elements (represented as circles), e.g. 11603, six anchoring elements (e.g. typically each composed of an anchor resting on the seafloor tethered to a dedicated mooring buoy floating adjacent to the surface of the body of water on which the farm floats) (represented here by squares), e.g. 11600, and many tensioned tethers (each of which is represented by a straight line, e.g. 11601, overlaid with a central pair of smaller circles, e.g. 11602 and 11604). This farm is deployed, positioned, and/or configured, in a curving pattern such that its shape is approximately conformal to the shape of the adjacent coastline 11611.

Figure 147:
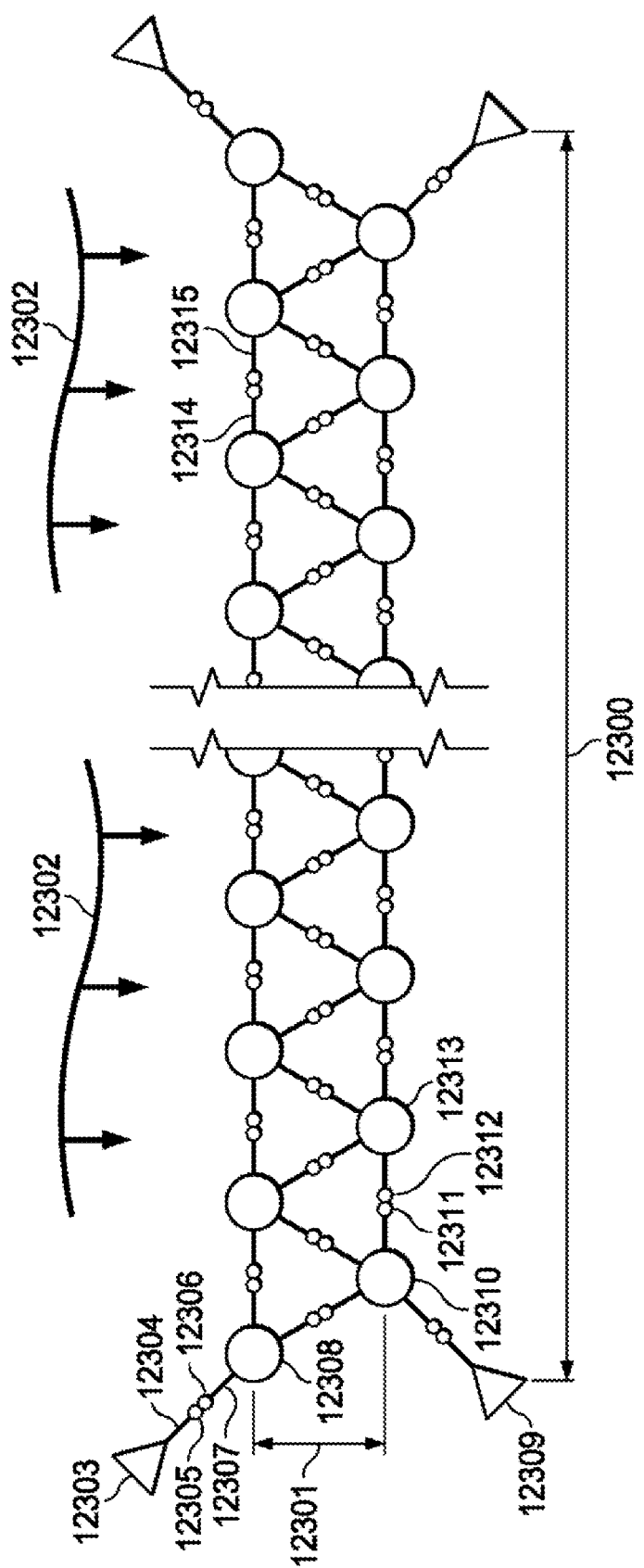

FIG. 147 is a top-down illustration of another interconnected and/or networked farm composed of, and/or includes, a large number of operational elements (represented as circles), e.g. 12308, four anchoring elements (e.g. typically each composed of an anchor resting on the seafloor tethered to a dedicated mooring buoy floating adjacent to the surface of the body of water on which the farm floats) (represented here by triangles), e.g. 12303, and a large number of tensioned tethers (each of which is represented by a straight line, e.g. 12304 and 12307, overlaid with a central pair of smaller circles, e.g. 12305-12306). This farm is deployed, positioned, and/or configured, in an approximately rectangular pattern, which much longer 12300 than it is wide 12301, and such that its long axis (in a plane approximately parallel to the surface of the body of water on which it floats) is typically approximately parallel to the wave front 12302, and/or normal to the typical direction with which waves travel through the farm.

Figure 148:
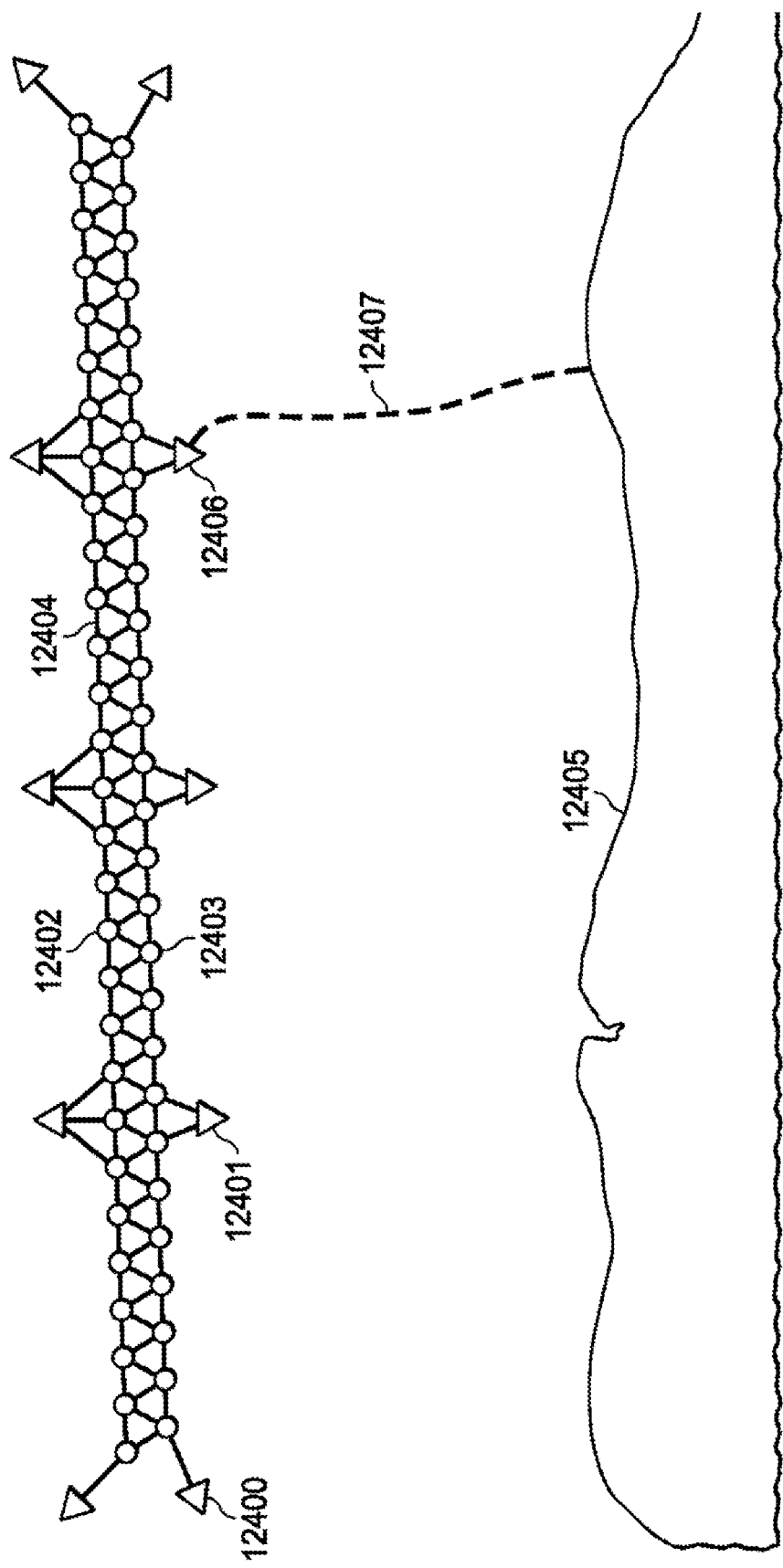

FIG. 148 is a top-down illustration of another interconnected and/or networked farm composed of, and/or includes, a large number of operational elements (represented as circles), e.g. 12402, ten anchoring elements (e.g. typically each composed of an anchor resting on the seafloor tethered to a dedicated mooring buoy floating adjacent to the surface of the body of water on which the farm floats) (represented here by triangles), e.g. 12400, and a large number of tensioned tethers (represented as straight lines, e.g. 12404).

A single subsea power cable 12407 connects a power cable, that descends from the farm along a tether connecting anchoring element 12406 to the seafloor, and crosses the seafloor to reach the shore 12405 where that power may be used and/or added to a power grid.

Through the use of electrical interconnects, positioned adjacent to the surface of the body of water in which the farm floats, to collect, gather, combine, and/or transmit, the power generated by each individual operational element to a centralized connection and/or conduit, much, if not all, of the farm's generated power can be transmitted to shore via a single power cable descending from the surface of the body of water to the seafloor, and then via a single conduit spanning, and/or travelling across, the seafloor to the shore. Another embodiment uses a single subsea power cable 12407, in conjunction with a single power cable ascending from the seafloor to the surface, in order to convey electrical power to operational elements within the farm that require and/or benefit from such power, and/or which use a portion, if not all, of that electrical power to perform useful work, e.g. to extract minerals from the seawater. Other farm embodiments may use two or more subsea power cables in order to transmit their generated power to, and/or to receive their power from, the shore.

Figure 149:
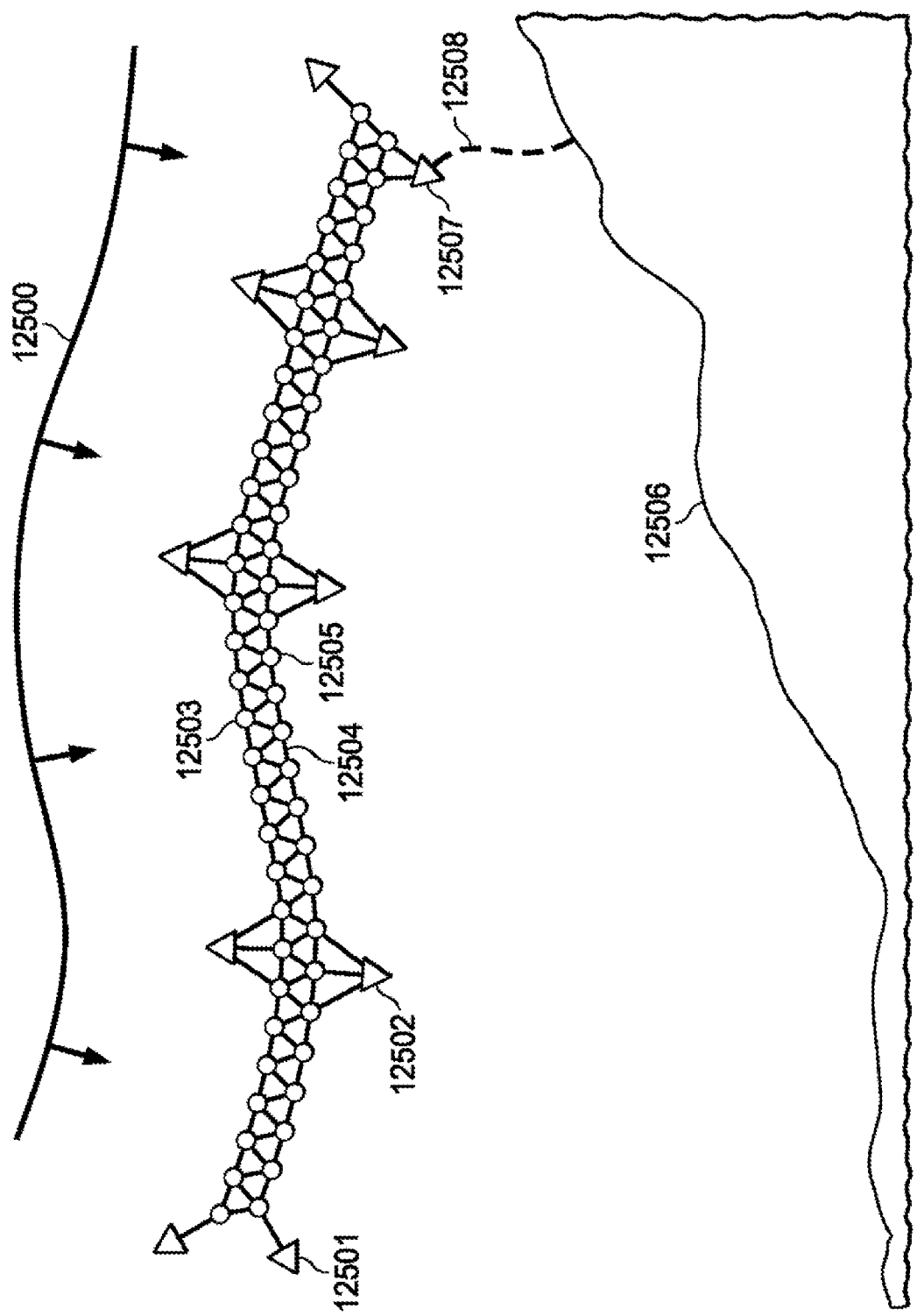

FIG. 149 is a top-down illustration of another interconnected and/or networked farm composed of, and/or includes, a large number of operational elements (represented as circles), e.g. 12503, ten anchoring elements (e.g. typically each composed of an anchor resting on the seafloor tethered to a dedicated mooring buoy floating adjacent to the surface of the body of water on which the farm floats) (represented here by triangles), e.g. 12501, and a large number of tensioned tethers (represented as straight lines, e.g. 12504). A single subsea power cable 12508 transmits the electrical power generated by the farm to the shore 12506 where it may be used and/or added to a power grid. The farm is patterned, laid out, and/or positioned, such that its long axis (albeit curving), conforms to the typical and/or prevailing curved wave front 12500 characteristic of that geographical location.

Figure 150:
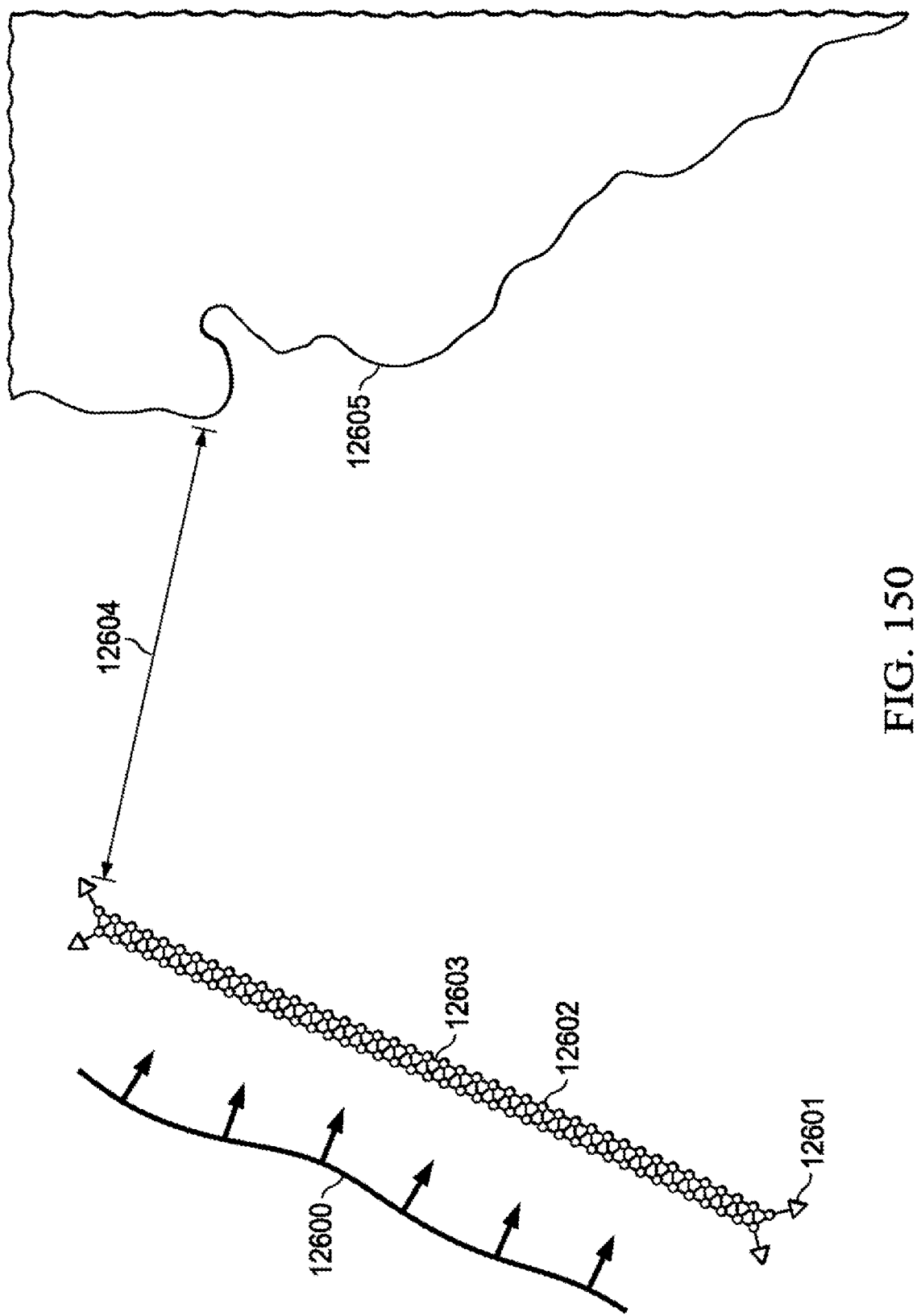

FIG. 150 shows a top-down view of a farm and/or interconnected network 12603 composed of a plurality of operational elements and/or wave energy converters and/or other useful buoyant devices (e.g. 12602) (represented as circles), interconnected by connectors and/or linkages and/or chains, and including at least two anchors and/or propulsive elements e.g. 12601 (represented as triangles). A plurality of the linkages between operational elements (represented as straight lines) have at least one tensioning mechanism on and/or included within said linkage. Or, in other words, a plurality of the linkages are tensioned linkages as disclosed in previous figures. For instance, each linkage may contain a float or other buoyant component and the linkage may be attached to operational elements below the water line or mean water mark on those operational elements, so that when the operational elements move apart, the float is submerged, creating a tension in the line that tends to restore the operational elements to their starting and/or resting positions.

The farm 12603 is elongate, having a first dimension in a plane parallel to the surface of the ocean that is at least 5 times, 10 times, 20 times, 30 times, 50 times, and/or 100 times larger than a second dimension in the same plane, e.g. it has a (longitudinal) length that is at least 5 times, 10 times, 20 times, 30 times, 50 times and/or 100 times its (transverse) width, when considered/viewed from a top view. Farm and/or interconnected network 12603 also has length measured by number of operational elements that is greater than 10 times its width measured by number of operational elements. In this figure, farm 12603 has a length of approximately 35 operational elements and a width of approximately 2 operational elements. In other embodiments, the ratio of number of operational elements in a first dimension is greater than 30, 50, or 100 the number of operational elements in a second dimension.

Farm 12603 also consists of a number of operational elements and/or wave energy converters along the shortest linkage-path spanning the longitudinal extent of the network that is more than 10 times the number of buoyant wave energy converters along the shortest linkage-path spanning a transverse extent of the network. By shortest-linkage path we mean a path following linkages of the farm that traverses as few linkages as possible, where (for this purpose) the linkage from one operational element to another, including any intervening tensioning mechanisms, counts as exactly one linkage. Farm 12603 is laid out approximately parallel to a prevailing wave front 12600 characteristic of the geographical area in which the farm is deployed. Farm 12603 can be any distance 12604 from shore 12605 including 1 mile, 10 miles, 50 miles, and can dynamically adjust its orientation relative to the shoreline and/or its distance from the shoreline by using propulsive units such as those disclosed in FIGS. 120-123. Farm 12603 can have one or more electrical power cables descending from the farm to the seafloor and going to a substation or end user on shore, or it can have one or more electrical power cables carried/suspended by buoys and carried thereby to a substation or end user on shore.

Figure 151:
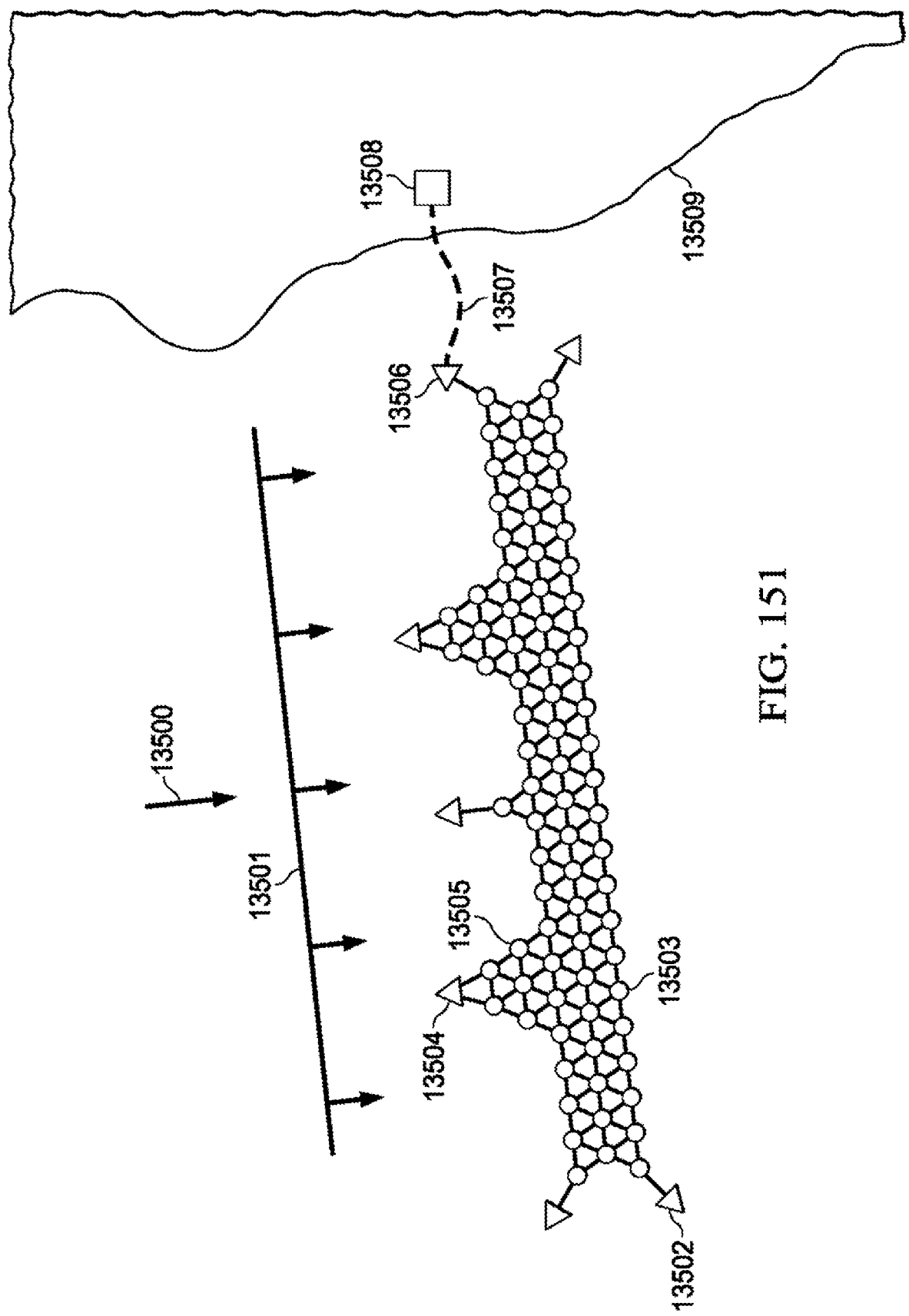

FIG. 151 is a top-down illustration of an interconnected and/or networked farm composed of, and/or includes, a large number of operational elements (represented as circles), e.g. 13505, seven anchoring elements (e.g. typically each composed of an anchor resting on the seafloor tethered to a dedicated mooring buoy floating adjacent to the surface of the body of water on which the farm floats) (represented here by triangles), e.g. 13502, and a large number of tensioned tethers (represented as straight lines). A single subsea power cable 13507 transmits the electrical power generated by the farm to the shore 13509 where it may be used and/or added to a power grid at location and/or facility 13508. The farm is patterned, laid out, and/or positioned, so as to have an approximately rectangular shape, and such that its long axis is approximately conformal to the typical and/or prevailing wave front 13501 characteristic of that geographical location. However, due to the presence of a prevailing current (represented by arrow 13500), the layout of the farm is modified to more rigorously anchor the "leading edge" of the farm, e.g. 13504, i.e. the lateral side of the farm into which the current 13500 flows. And, for similar reasons, the opposing edge and/or side of the farm, e.g. 13503, tends to be naturally and sufficiently energized by the current 13500 that tends to pull it "downstream." Therefore, no anchors are required along that opposing edge of the farm.

Figure 152:
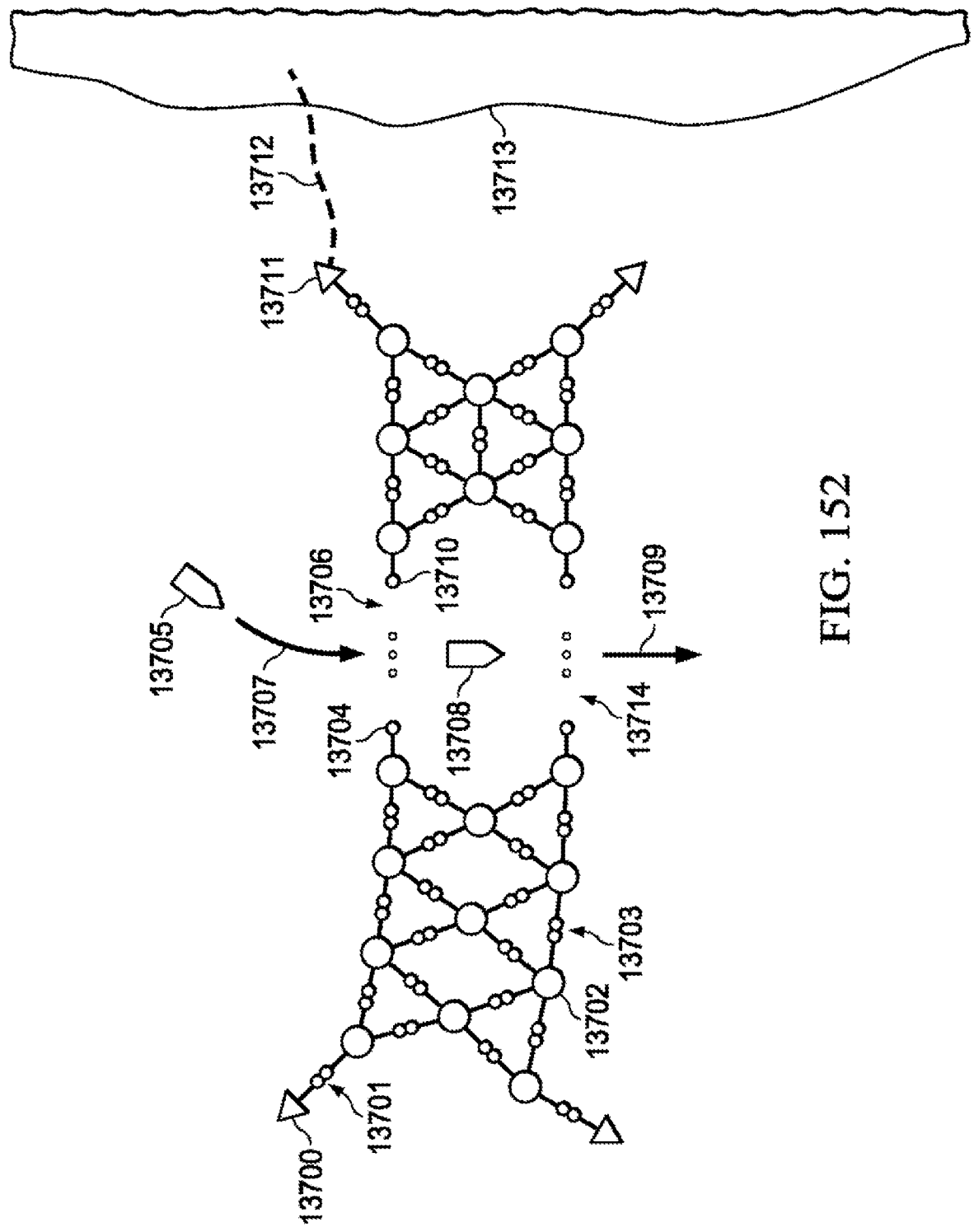

FIG. 152 is a top-down illustration of an interconnected and/or networked farm composed of, and/or including, a large number of operational elements (represented as circles), e.g. 13702, four anchoring elements (e.g. typically each composed of an anchor resting on the seafloor tethered to a dedicated mooring buoy floating adjacent to the surface of the body of water on which the farm floats) (represented here by triangles), e.g. 13700, and a large number of tensioned tethers (represented as straight lines overlaid with a pair of smaller circles, e.g. 13703).

A single subsea power cable 13712 transmits the electrical power generated by the farm to the shore 13713 where it may be used and/or added to a power grid at location and/or facility. The farm is patterned, laid out, and/or positioned, so as to have an approximately rectangular shape, and such that its long axis is approximately normal to the shoreline 13713. This farm also includes two "bypass" tensioning mechanisms, e.g. 13704/13710, in order to facilitate the safe and convenient passage of ships, e.g. 13705 and 13708, boats, barges, and/or other water and/or marine conveyances, into 13707, through, and/or out of 13709 the farm.

Figure 153:
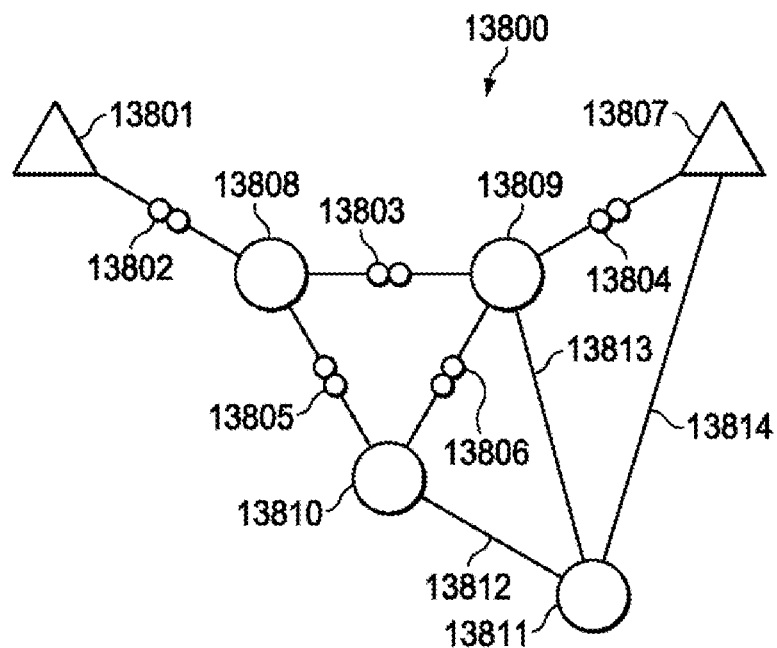

FIG. 153 is a top-down illustration of an embodiment of the present disclosure. An interconnected and/or networked farm is composed of, and/or includes, four operational elements (represented as circles), e.g. 13808, two anchoring elements (represented here by triangles), e.g. 13801, five tensioned tethers (represented as straight lines overlaid with a pair of smaller circles, e.g. 13802), and three untensioned tethers (represented as straight lines), e.g. 13814. The layout, pattern, orientation, and/or position, of this farm is conducive to its deployment in a body of water subjected to a current flowing in the direction of 13800.

Figure 154:
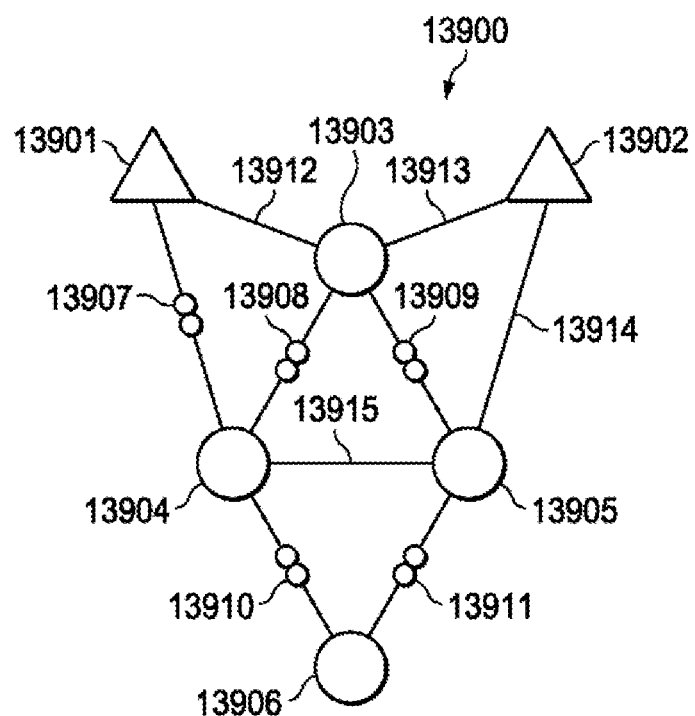

FIG. 154 is a top-down illustration of another embodiment of the present disclosure. An interconnected and/or networked farm is composed of, and/or includes, four operational elements (represented as circles), e.g. 13904, two anchoring elements (represented here by triangles), e.g. 13901, five tensioned tethers (represented as straight lines overlaid with a pair of smaller circles, e.g. 13910), and three untensioned tethers (represented as straight lines), e.g. 13914. The layout, pattern, orientation, and/or position, of this farm is conducive to its deployment in a body of water subjected to a current flowing in the direction of 13900.

FIG. 155 is a side-view illustration of an embodiment of the present disclosure. An interconnected and/or networked farm is composed of, and/or includes, two operational elements 12202 and 12206 (represented as squares), two anchors (represented as squares), e.g. 12208, three tensioned tethers, and/or three tensioning mechanisms, e.g. 12200-12201/12210-12212. The simple farm illustrated here is always under at least a minimum amount of tension, e.g. the anchors "stretch" the opposing ends of the farm to a separation distance that precludes those tensioning mechanisms from reaching a state of relaxation. Therefore, and/or as a consequence of this, all of these tensioning mechanisms are continuously exerting "contracting" and/or "restoring" forces on the operational elements and/or anchors to which they are attached. Those minimal restoring forces may be increased when the objects to which they are attached move even further apart. And, they may be decreased when the objects to which they are attached move closer together. However, because of its "pre-stretched" configuration, at least one tensioning mechanism is under tension, and exerting a restoring force, at any moment in time.

FIG. 156 is a side-view illustration of the current disclosure, in which two operational elements 12701 and 12709 are separated by a distance which requires the separation of the two floats 12704 and 12707 of the tensioning mechanism incorporated within the tether 12711 that connects them. The restoring force 12703 imparted to operational element 12701 by the tensioning mechanism 12704/12713-12715/12707 is the result of the nominally, resting approximately downward force imparted to each float by the weight 12715 suspended by and beneath them from tether segments 12713 and 12714, being diverted 12706 to a direction that includes a lateral component 12705 in addition to its nominal vertical component 12712. The magnitude of the lateral force imparted to the floats 12704 and 12707 by weight 12715 grows exponentially and/or quickly with increases in the separation of the floats. For this reason, the restoring force(s) that tend to draw the separated operational elements back to their nominal, maximal "resting" separation distance increase exponentially and/or quickly with the magnitude of the separation distance which exceeds that nominal, maximal "resting" separation distance.

FIG. 157 is a side-view illustration of the current disclosure, in which two operational elements 12717 and 12723 are separated by a distance which does not require the separation of the two floats 12719 and 12721 of the tensioning mechanism incorporated within the tether 12725 that connects them. Because the floats 12719 and 12721 are in contact, any lateral forces drawing them together are cancelled and of no significance with respect to the relative separations of the respective operational elements. The tensioning mechanisms disclosed herein are associated with a finite and non-zero distance by which connected operational elements, other tensioning mechanisms, anchors, and/or other floating objects, may be separated without experiencing any force(s) generated by and/or as a result of the tensioning mechanisms that would tend to draw them together. This is a beneficial attribute which allows and/or permits operational elements, other tensioning mechanisms, anchors, and/or other floating objects, interconnected in this manner to move freely, e.g. up and down with the waves, so long as the distance(s) by which they are separated are no greater than a certain maximal value.

The tensioning mechanisms disclosed herein are also associated with primarily, if not exclusively, lateral restoring forces. When a tensioning mechanism within the current disclosure is "resting," e.g. because the elements to which it is connected are separated by a distance no greater than its maximal resting separation distance, it tends to not impart an appreciable force to either or any of the elements to which it is connected. However, when a tensioning mechanism within the current disclosure is under tension, and/or not "resting," e.g. because the elements to which it is connected are separated by a distance that is greater than its maximal resting separation distance, it tends to impart a restoring force to each of the elements to which it is connected that is primarily "lateral" and/or approximately parallel to the surface of the body of water on which the farm floats.

Figure 158:
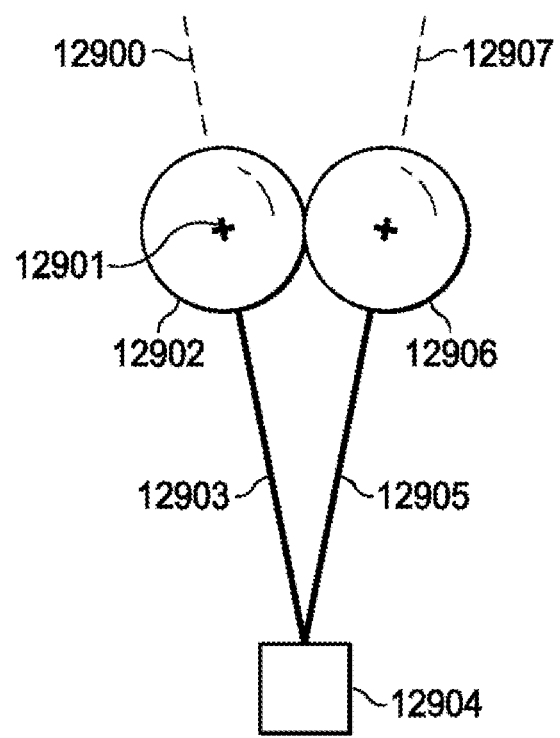
FIGS. 158-160 are schematic diagrams of an alternate buoyancy spring.
Figure 159:
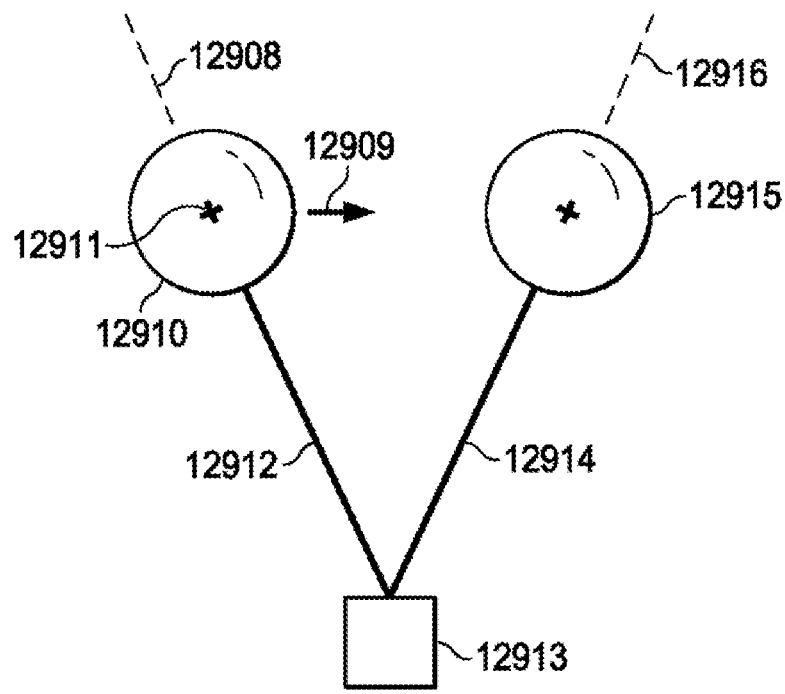
Figure 160:
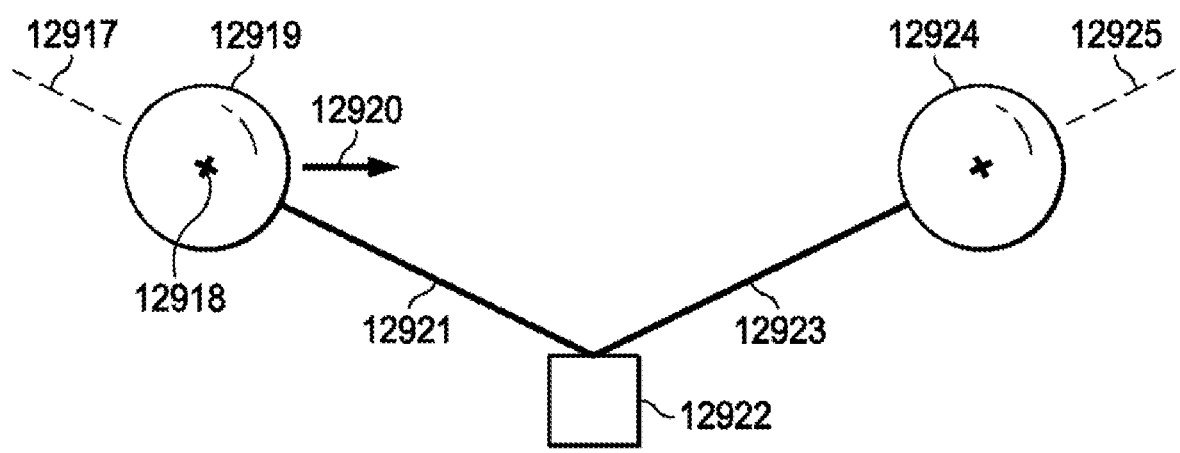

FIGS. 158-160 are side-view illustrations of a tensioning mechanism disclosed herein. A weight, e.g. 12904, is suspended beneath and/or by two floats, e.g. 12902 and 12906, by tether segments, e.g. 12903 and 12905, respectively. In FIG. 158, the two floats are in contact with each other, and both fully support the downward gravitational force of weight 12904. Crosses, e.g. 12901, on each float provide a visual indicator of each float's orientation about an axis of rotation that projects into and out of the page. Lines 12900 and 12907 provide visual indicators of the longitudinal axes of the tether segments by which the weight 12904 is suspended.

In FIG. 159, the two floats 12910 and 12915 are separated by a gap. The downward gravitational force of weight 12913 is transmitted up a non-vertical conduit, i.e. each tether segment 12912 and 12914. This results in the exertion on each float, e.g. 12910, of not only a downward force equal to approximately one-half the "submerged specific weight" (i.e. the net downward gravitational force of the weight, less the downward gravitational force that would be exerted by an equal volume of water) of the weight, but also of a lateral component, e.g. 12909, which is the "vector" complement to the transmission of the weight's downward force through a non-vertical channel. This lateral force exerted on each float, and directed toward the center of the gap between the floats, is the same "restoring" force that will tend to draw back together the operational elements, or other elements, responsible for drawing apart such tensioning-element floats. Also notice that the crosses on the floats illustrated in FIG. 159 have rotated relative to their orientations in FIG. 158. Each cross, like the float with which it is associated, has rotated away from the gap in the same manner as the tether segments 12912 and 12914 have rotated away from their vertical orientations.

In FIG. 160, the gap between the floats 12919 and 12924 is even larger than it was in FIG. 159. Likewise, the lateral component of the force, e.g. 12920, exerted by the weight on each of the floats has increased dramatically. And, the floats, and the crosses thereon, have rotated even further.

Figure 161:
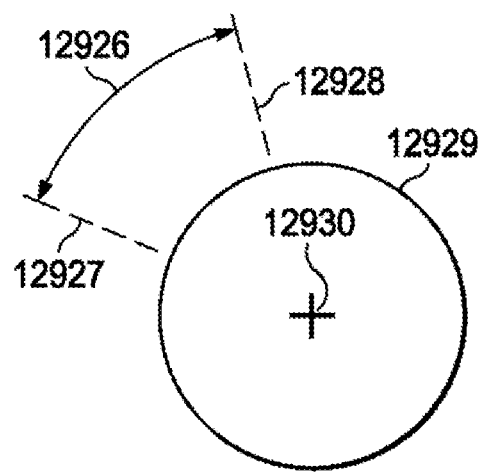
FIGS. 161 and 162 are diagrams of elements of the buoyancy spring of FIG. 158.

FIG. 161 illustrates the rotation about a horizontal axis that is characteristic of the "tensioning," i.e. of the adding of a separation and/or gap which brings about the manifestation of a restoring force, of the kind of tensioning mechanism that involves, includes, and/or is founded on, the lifting of a weight suspended beneath two or more floats. As a gap develops between the floats, the float tends to rotate, e.g. 12926, from a more vertical orientation, e.g. 12928, to a more horizontal orientation, e.g. 12927.

Figure 162:
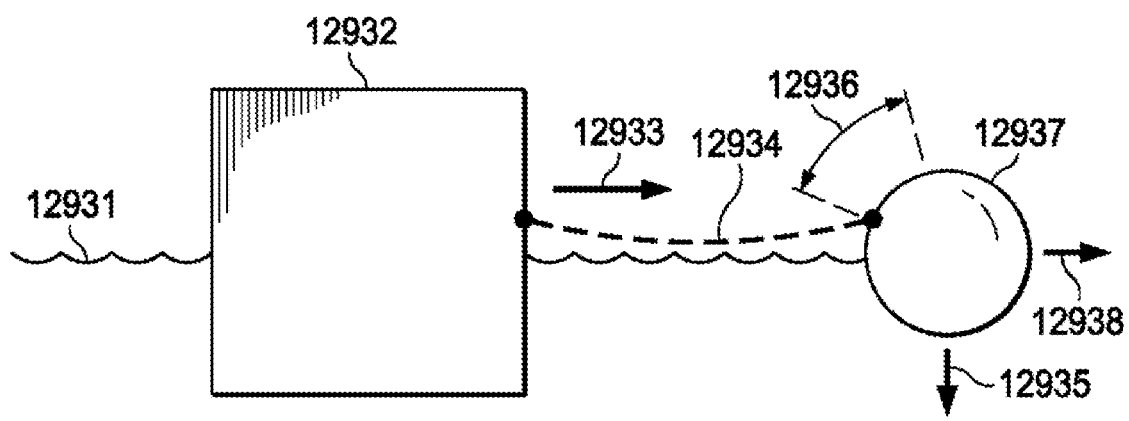

FIG. 162 illustrates the rotation 12936 of one float 12937, within a tensioning mechanism of the kind that involves, includes, and/or is founded on, the lifting of a weight suspended beneath two or more floats, as it exerts and releases a restoring force 12933 on a connected operational element 12932.

There is a high cost, and significant effort, associated with the deployment of a large array of devices, e.g. wave energy devices, in the sea. Anchoring individual devices is expensive, tedious, and maximizes the negative impact of a deployment on the life and ecosystem(s) of the seafloor. Anchoring individual devices also makes the deployment of a large farm of devices in relatively deep water more difficult, more expensive, and less practical.

Further reference to "marine devices" and/or deployments in a "marine environment" should not be construed as an explicit nor an implicit limitation of the scope of the present disclosure. The present disclosure has equal utility with respect to the deployment of devices, structures, and/or operational elements of any kind, in any body of water. Reference is herein often made to "marine" devices and deployments since those are the most typical at this time, and deployments of "marine" devices currently tend to be the most challenging, as well as the most promising with respect to the gathering, generating, and/or extraction, of renewable energies such as wave energy. The present disclosure provides an alternate, and, in many cases, a superior method, structure, and set of enabling tools, for achieving large-scale deployments of devices in a marine environment (although it is equally applicable and useful in fresh-water environments).

A large-scale deployment of marine devices in a farm has two primary goals: 1) to position devices at particular locations, whether specific geospatial locations and/or relative locations within the farm, and 2) to establish a structure, mechanism, and/or assembly, that will maintain and/or preserve those locations, even in, during, and/or despite, violent storms that create large and often impulsive movements of the waters on which the farm floats, at least in part, and have the potential to disrupt, rupture, and/or tear apart, such farms. The present disclosure is an system that supports the economical, practical, and cost-effective deployment of a farm of marine devices. The advantages provided by the present disclosure include, but are not limited to, the following:

ALTERNATE APPLICATIONS

The present disclosure is made with respect to the improvement of farms, especially those moored at sea, and elements thereof. However, this present disclosure applies with equal force, and extends its scope to be inclusive of, the application of the invention disclosed herein, to the improvement of related instances, variations, and embodiments of wave energy conversion devices, wind energy conversion devices such as floating wind turbines and/or electrohydrodynamic panels (or other apparatuses) and/or kites, seafaring vessels, autonomous seafaring vessels, etc.

The present disclosure teaches a set of components that can operate together within an interconnected farm structure such that the operational elements within the farm will enjoy positional stability within a flexible, extensible, cooperative, and low-cost structure. Currently, farms of operational elements are typically, if not exclusively, constructed through the clustering of individually and independently anchored operational elements. Current farm structures are inefficient, expensive, and impose unnecessarily extensive damage on the underlying and/or surrounding ecological environment.

The present disclosure teaches a novel farm structure, incorporating many novel position-stabilizing elements, that work together, in a complementary fashion, so as to distribute the generation of forces resistant to positional instabilities over an extensive network. The novel farm structure disclosed herein also distributes the generation and storage of the gravitational potential energy generated during the network's resistance of positional deviations. And, the novel farm structure disclosed herein distributes the generation of restorative forces that reverse and correct positional deviations through the dissipation and/or release of the gravitational potential energy stored in response to the positional deviations.

While the present disclosure teaches an explicit, if flexible and adaptable, novel farm structure, as well as many novel position-stabilizing elements that may be incorporated within it in order to achieve, implement, and/or enforce, the positional stability of a related set or collection of operational elements, it is not exhaustive in terms of the potential modifications, adaptations, augmentations, and/or variations, that might be designed, implemented, and/or executed, in the future. The scope of this disclosure extends to, and is compatible with, all future modifications, adaptations, augmentations, and/or variations, to the farm, and/or farm layout and/or design, and/or to any or all of the various farm elements, disclosed herein.

For example, a farm within the scope of the present disclosure might be augmented through the addition and/or attachment of floats or buoys along the connectors, perhaps to improve and/or facilitate their access, performance, detection, avoidance, etc. Even though this disclosure does not explicitly consider, disclose, specify, and/or otherwise discuss, such "connector buoys and/or markers", the underlying farm structure still falls within the scope of this disclosure, and the addition of other elements, components, objects, etc., and/or other modifications, changes, additions, variations, etc., among, between, within, on, over, under, and/or around, a farm that is otherwise within the scope of this disclosure does not remove such a modified farm from that scope.

We claim:

1. A formation-restoring system for drifting Motion-To-Electrical Energy Transforming Devices (MTEETDs), comprising:
a plurality of drifting MTEETDs connected by separation restorative tethers, the separation restorative tethers each incorporating a tensioning mechanism, each tensioning mechanism comprising multiple positively buoyant elements each connected to a negatively buoyant element, and the separation restorative tethers each characterized by a Critical Distance between its respective connected drifting MTEETDs such that:
at a separation less than the Critical Distance, no biasing force is applied to the respective connected drifting MTEETDs by the separation restorative tether; and
at a separation greater than the Critical Distance, a biasing force is applied by the associated separation restorative tether on the respective connected drifting MTEETDs to bias said respective connected drifting MTEETDs to a separation less than the Critical Distance;
wherein a relative movement of connected drifting MTEETDs that leads to a separation exceeding the Critical Distance of the associated separation restorative tether, horizontally expands the tensioning mechanism to transition the tensioning mechanism from an inert state having a neutral horizontal applied force to an energized state having a net horizontal applied force, the energized state characterized by the expansion of the tensioning mechanism to impart a buoyancy-related potential energy to a vertically displaceable element of the tensioning mechanism; and
wherein a subsequent release of the buoyancy-related potential energy of the vertically displaceable element contracts the tensioning mechanism until the tensioning mechanism reaches its inert state, the contraction of the tensioning mechanism biasing the connected drifting MTEETDs to a separation less than the Critical Distance.

2. The formation restoring system of claim 1, wherein the buoyancy-related potential energy corresponds to a positive buoyancy.

3. The formation restoring system of claim 1, wherein the buoyancy-related potential energy corresponds to a negative buoyancy.

4. The formation restoring system of claim 1, wherein the MTEETDs convert wave motion to electrical energy.

5. The formation restoring system of claim 1, wherein the MTEETDs convert wind motion to electrical energy.

6. The formation restoring system of claim 1, further comprising an anchor confining a position of at least one of the MTEETDs to a pre-established surface area.

7. The formation restoring system of claim 1, wherein the tensioning mechanism comprises a tether slack reducer comprising a pair of floats connected to an object having a density greater than a surrounding fluid, the tether slack reducer having an inert state when the pair of floats are in contact with each other and when the object is suspended directly below the pair of floats.

8. The formation restoring system of claim 7, wherein the tensioning mechanism comprises a plurality of tether slack reducers.

9. The formation restoring system of claim 1, wherein the tensioning mechanism comprises a plurality of floats connected at spaced intervals along an elongate connector having a first end terminating below a surface of a body of water and a second end terminating below a surface of a body of water, the tensioning mechanism having an inert slate when a separation between connected MTEETDs imparts a downward force on the plurality of floats insufficient to submerge any of the plurality of floats.

10. The formation restoring system of claim 1, wherein the tensioning mechanism comprises a float connected on opposite sides by respective first and second elongate connectors at respective first ends, and respective second ends of the first and second elongate connectors terminating below a surface of a body of water, the tensioning mechanism having an inert state when a separation between connected MTEETDs imparts a downward force on the float insufficient to submerge the float.

11. The formation restoring system of claim 1, wherein the tensioning mechanism comprises a spherical slack reducer comprising a spherical body having an upper portion having a density less than a surrounding fluid and a lower portion having a density greater than a surrounding fluid, the spherical slack reducer having an inert state when the upper portion is positioned above the lower portion.

12. The formation restoring system of claim 1, further comprising thrust-generating positioning devices for moving the formation of drifting MTEETDs.

13. The formation restoring system of claim 12, wherein the thrust-generating positioning devices comprise wind driven sails.

14. The formation restoring system of claim 12, wherein the thrust-generating positioning devices comprise fans mounted on MTEETDs.

15. The formation restoring system of claim 1, wherein the tensioning mechanism comprises a spar vertically extending upward from a float, and a counterweight vertically extending downward from the float, the separation restoring tether connected to an upper portion of the spar such that deflection of the spar from a vertical position leads to a restoring force by the counterweight to a return to the vertical position.

16. The formation restoring system of claim 1, wherein the tensioning mechanism comprises an object having a density greater than a density of a surrounding fluid, the object suspended substantially vertically by a cable from a float, and suspended diagonally by second and third cables from second and third floats, respectively.

17. The formation restoring system of claim 16, wherein the tensioning mechanism incrementally increases a load on the second and third floats as a distance increases greater than the Critical Distance.

18. The formation restoring system of claim 1, wherein the tensioning mechanism comprises a zero buoyancy body connected at a first height by first and second elongate connectors at respective first ends of the elongate connectors, the first and second elongate connectors each having respective second ends connected adjacently along the separation restorative tether at a height above said first height, the tensioning mechanism having an inert state when a separation between connected MTEETDs imparts an upward force on the zero buoyancy body that is insufficient to raise the zero buoyancy body above the surface of the body of water.

19. The formation restoring system of claim 1, wherein the tensioning mechanism comprises multi-stages of biasing force, each stage increasing a biasing force in response to an expansion of the tensioning mechanism.

20. The formation restoring system of claim 19, wherein the function is a cosine of an angle a suspended element of each stage of the tensioning mechanism makes with a vertical axis and a line connecting the suspended element with a float.

21. The formation restoring system of claim 1, wherein the tensioning mechanism suspends an object below two spaced apart floats by cables connecting the object at respective first and second ends, the tensioning mechanism having an inert state when the cables are vertical and an energized state when the cables are non-vertical.

22. The formation restoring system of claim 1, wherein the tensioning mechanism comprises a plurality of floats having a preferred vertical orientation and couplings alternately connecting respective upper portions of adjacent floats and respective lower portions of respective floats.

23. The formation restoring system of claim 1, further comprising an electrical conduit connecting first and second MTEETDs.

24. The formation restoring system of claim 23, wherein the electrical conduit couples to the first and second MTEETDs via a plug and socket arrangement.

25. The formation restoring system of claim 23, wherein the electrical conduit is incorporated into the tensioning mechanism.

26. The formation restoring system of claim 1, wherein the separation restoring tether includes portions that are elastic.

27. The formation restoring system of claim 1, further comprising digital data transmitting conduits connecting first and second MTEETDs.

28. The formation restoring system of claim 1, wherein the formation of drifting MTEETDs includes a submerged bypass for marine vessels to cross.

* * * * *